United States Patent
Ellis et al.

(10) Patent No.: US 9,055,322 B2
(45) Date of Patent: *Jun. 9, 2015

(54) SYSTEMS AND METHODS FOR INTERACTIVE PROGRAM GUIDES WITH PERSONAL VIDEO RECORDING FEATURES

(71) Applicant: United Video Properties, Inc., Santa Clara, CA (US)

(72) Inventors: Michael D. Ellis, Boulder, CO (US); Danny R. Gaydou, Tulsa, OK (US); M. Scott Reichardt, Tulsa, OK (US); Joseph P. Baumgartner, Tulsa, OK (US); William L. Thomas, Evergreen, CO (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/229,758

(22) Filed: Mar. 28, 2014

(65) Prior Publication Data

US 2014/0212113 A1   Jul. 31, 2014

Related U.S. Application Data

(63) Continuation of application No. 14/222,431, filed on Mar. 21, 2014, which is a continuation of application No. 13/335,787, filed on Dec. 22, 2011, which is a continuation of application No. 12/546,301, filed on (Continued)

(51) Int. Cl.
*H04N 5/76* (2006.01)
*H04N 21/4147* (2011.01)
(Continued)

(52) U.S. Cl.
CPC .......... *H04N 21/4147* (2013.01); *G11B 27/005* (2013.01); *G11B 27/034* (2013.01);
(Continued)

(58) Field of Classification Search
None
See application file for complete search history.

(56) References Cited

U.S. PATENT DOCUMENTS

| 4,103,524 A | 8/1978 | Mitchell et al. |
| 4,264,924 A | 4/1981 | Freeman |

(Continued)

FOREIGN PATENT DOCUMENTS

| AU | 2008201306 A1 | 4/2008 |
| DE | 44 40 419 | 5/1996 |

(Continued)

OTHER PUBLICATIONS

"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.

(Continued)

*Primary Examiner* — Heather Jones
(74) *Attorney, Agent, or Firm* — Ropes & Gray LLP

(57) ABSTRACT

Methods and systems that provide enhanced personal video recorder ("PVR") and interactive television program guide ("IPG") functionality are provided. An interactive television application may be used to display a list of PVR recordings, schedule recordings to a PVR, configure recordings, view a list of scheduled recordings, configure recording settings, or select delete priority settings for recordings. The application may integrate pay-per-view and PVR functionality. The application may send user notifications for changes that are to be made to the recording content of a PVR. Live programming may be buffered by the application using straight buffers that are created for each new program. Parallel buffers for concurrent programs may be implemented using multiple tuners. Straight buffers may be used in managing or controlling the flow of programming. Television content may be automatically paused when a user is using the application. Multiple IPGs for different users of a PVR may be implemented.

18 Claims, 123 Drawing Sheets

Related U.S. Application Data

Aug. 24, 2009, now abandoned, which is a continuation of application No. 11/356,928, filed on Feb. 16, 2006, now Pat. No. 8,457,475, which is a continuation of application No. 10/105,128, filed on Feb. 21, 2002, now abandoned.

(60) Provisional application No. 60/270,469, filed on Feb. 21, 2001, provisional application No. 60/271,809, filed on Feb. 27, 2001, provisional application No. 60/284,703, filed on Apr. 18, 2001, provisional application No. 60/290,709, filed on May 14, 2001, provisional application No. 60/296,593, filed on Jun. 7, 2001, provisional application No. 60/301,589, filed on Jun. 28, 2001.

(51) Int. Cl.
| | |
|---|---|
| *G11B 27/00* | (2006.01) |
| *G11B 27/034* | (2006.01) |
| *G11B 27/32* | (2006.01) |
| *G11B 27/34* | (2006.01) |
| *H04N 5/445* | (2011.01) |
| *H04N 7/16* | (2011.01) |
| *H04N 21/2747* | (2011.01) |
| *H04N 21/426* | (2011.01) |
| *H04N 21/431* | (2011.01) |
| *H04N 21/433* | (2011.01) |
| *H04N 21/4335* | (2011.01) |
| *H04N 21/45* | (2011.01) |
| *H04N 21/454* | (2011.01) |
| *H04N 21/462* | (2011.01) |
| *H04N 21/472* | (2011.01) |
| *H04N 21/475* | (2011.01) |
| *H04N 21/4782* | (2011.01) |
| *H04N 21/482* | (2011.01) |
| *H04N 21/485* | (2011.01) |
| *H04N 21/488* | (2011.01) |
| *H04N 21/81* | (2011.01) |
| *H04N 21/84* | (2011.01) |
| *G11B 20/10* | (2006.01) |
| *H04N 5/782* | (2006.01) |
| *H04N 5/783* | (2006.01) |
| *H04N 9/79* | (2006.01) |
| *H04N 5/44* | (2011.01) |

(52) U.S. Cl.
CPC .............. *G11B27/329* (2013.01); *G11B 27/34* (2013.01); *G11B 2020/10962* (2013.01); *G11B 2220/41* (2013.01); *H04N 5/44543* (2013.01); *H04N 5/76* (2013.01); *H04N 5/782* (2013.01); *H04N 5/783* (2013.01); *H04N 7/163* (2013.01); *H04N 7/165* (2013.01); *H04N 9/7921* (2013.01); *H04N 21/2747* (2013.01); *H04N 21/4263* (2013.01); *H04N 21/4312* (2013.01); *H04N 21/4314* (2013.01); *H04N 21/4331* (2013.01); *H04N 21/4333* (2013.01); *H04N 21/4334* (2013.01); *H04N 21/4335* (2013.01); *H04N 21/4532* (2013.01); *H04N 21/454* (2013.01); *H04N 21/4622* (2013.01); *H04N 21/47214* (2013.01); *H04N 21/4751* (2013.01); *H04N 21/4753* (2013.01); *H04N 21/4755* (2013.01); *H04N 21/4782* (2013.01); *H04N 21/482* (2013.01); *H04N 21/4828* (2013.01); *H04N 21/485* (2013.01); *H04N 21/4882* (2013.01); *H04N 21/812* (2013.01); *H04N 21/84* (2013.01); *H04N 2005/4419* (2013.01)

(56) References Cited

U.S. PATENT DOCUMENTS

| | | |
|---|---|---|
| 4,264,925 A | 4/1981 | Freeman et al. |
| 4,355,415 A | 10/1982 | George et al. |
| 4,573,072 A | 2/1986 | Freeman |
| 4,602,279 A | 7/1986 | Freeman |
| 4,605,964 A | 8/1986 | Chard |
| 4,694,490 A | 9/1987 | Harvey et al. |
| 4,706,121 A | 11/1987 | Young |
| 4,718,107 A | 1/1988 | Hayes |
| 4,847,698 A | 7/1989 | Freeman |
| 4,847,700 A | 7/1989 | Freeman |
| 4,857,999 A | 8/1989 | Welsh |
| 4,908,707 A | 3/1990 | Kinghorn |
| 4,930,158 A | 5/1990 | Vogel |
| 4,945,563 A | 7/1990 | Horton et al. |
| 4,959,720 A | 9/1990 | Duffield et al. |
| 4,977,455 A | 12/1990 | Young |
| 5,012,409 A | 4/1991 | Fletcher et al. |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,119,577 A | 6/1992 | Lilly |
| 5,134,719 A | 7/1992 | Mankovitz |
| 5,151,789 A | 9/1992 | Young |
| 5,172,413 A | 12/1992 | Bradley |
| 5,187,589 A | 2/1993 | Kono et al. |
| 5,195,134 A | 3/1993 | Inoue |
| 5,200,822 A | 4/1993 | Bronfin et al. |
| 5,210,611 A | 5/1993 | Yee et al. |
| 5,223,924 A | 6/1993 | Strubbe |
| RE34,340 E | 8/1993 | Freeman |
| 5,241,428 A | 8/1993 | Goldwasser et al. |
| 5,251,921 A | 10/1993 | Daniels |
| 5,253,066 A | 10/1993 | Vogel |
| 5,285,284 A | 2/1994 | Takashima et al. |
| 5,296,931 A | 3/1994 | Na |
| 5,323,234 A | 6/1994 | Kawasaki |
| 5,335,277 A | 8/1994 | Harvey et al. |
| 5,345,430 A | 9/1994 | Moe |
| 5,351,075 A | 9/1994 | Herz et al. |
| 5,353,121 A | 10/1994 | Young et al. |
| 5,371,551 A | 12/1994 | Logan et al. |
| 5,410,344 A | 4/1995 | Graves et al. |
| 5,412,720 A | 5/1995 | Hoarty |
| 5,416,508 A | 5/1995 | Sakuma et al. |
| 5,442,389 A | 8/1995 | Blahut et al. |
| 5,459,522 A | 10/1995 | Pint |
| 5,461,415 A | 10/1995 | Wolf et al. |
| 5,479,266 A | 12/1995 | Young et al. |
| 5,479,268 A | 12/1995 | Young et al. |
| 5,479,302 A | 12/1995 | Haines |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,517,254 A | 5/1996 | Monta et al. |
| 5,517,257 A | 5/1996 | Dunn et al. |
| 5,524,195 A | 6/1996 | Clanton |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,550,576 A | 8/1996 | Klosterman |
| 5,559,548 A | 9/1996 | Davis et al. |
| 5,559,549 A | 9/1996 | Hendricks et al. |
| 5,568,272 A | 10/1996 | Levine |
| 5,576,755 A | 11/1996 | Davis et al. |
| 5,583,561 A | 12/1996 | Baker et al. |
| 5,583,563 A | 12/1996 | Wanderscheid et al. |
| 5,583,653 A | 12/1996 | Timmermans |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |

(56) References Cited

U.S. PATENT DOCUMENTS

| | | |
|---|---|---|
| 5,592,551 A | 1/1997 | Lett et al. |
| 5,594,491 A | 1/1997 | Hodge et al. |
| 5,598,523 A | 1/1997 | Fujita |
| 5,600,364 A | 2/1997 | Hendricks et al. |
| 5,602,582 A | 2/1997 | Wanderscheid et al. |
| 5,619,274 A | 4/1997 | Roop et al. |
| 5,621,579 A | 4/1997 | Yuen |
| 5,625,464 A | 4/1997 | Compoint et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,648,824 A | 7/1997 | Dunn et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,666,645 A | 9/1997 | Thomas et al. |
| 5,671,607 A | 9/1997 | Clemens et al. |
| 5,684,525 A | 11/1997 | Klosterman |
| 5,692,335 A | 12/1997 | Magnuson |
| 5,694,163 A | 12/1997 | Harrison |
| 5,694,381 A | 12/1997 | Sako |
| 5,699,107 A | 12/1997 | Lawler et al. |
| 5,703,604 A | 12/1997 | McCutchen |
| 5,717,452 A | 2/1998 | Janin et al. |
| 5,721,829 A | 2/1998 | Dunn et al. |
| 5,724,091 A | 3/1998 | Freeman et al. |
| 5,727,060 A | 3/1998 | Young |
| 5,732,216 A | 3/1998 | Logan et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,761,607 A | 6/1998 | Gudesen |
| 5,768,528 A | 6/1998 | Stumm |
| 5,771,354 A | 6/1998 | Crawford |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,246 A | 7/1998 | Alten et al. |
| 5,790,198 A | 8/1998 | Roop et al. |
| 5,790,202 A | 8/1998 | Kummer et al. |
| 5,796,952 A | 8/1998 | Davis et al. |
| 5,801,787 A | 9/1998 | Schein et al. |
| 5,802,284 A | 9/1998 | Karlton et al. |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takahisa et al. |
| 5,818,438 A | 10/1998 | Howe et al. |
| 5,819,019 A | 10/1998 | Nelson |
| 5,819,156 A | 10/1998 | Belmont |
| 5,822,123 A | 10/1998 | Davis et al. |
| 5,828,945 A | 10/1998 | Klosterman |
| 5,838,314 A | 11/1998 | Neel et al. |
| 5,850,218 A | 12/1998 | LaJoie et al. |
| 5,851,149 A | 12/1998 | Xidos et al. |
| 5,880,768 A | 3/1999 | Lemmons et al. |
| 5,883,621 A | 3/1999 | Iwamura |
| 5,899,920 A | 5/1999 | DeSatnick et al. |
| 5,900,867 A | 5/1999 | Schindler et al. |
| 5,930,493 A | 7/1999 | Ottesen et al. |
| 5,940,572 A | 8/1999 | Balaban et al. |
| 5,945,988 A | 8/1999 | Williams et al. |
| 5,949,954 A | 9/1999 | Young et al. |
| 5,959,592 A | 9/1999 | Petruzzelli |
| 5,963,264 A | 10/1999 | Jackson |
| 5,963,645 A | 10/1999 | Kigawa et al. |
| 5,969,748 A | 10/1999 | Casement et al. |
| 5,970,486 A | 10/1999 | Yoshida et al. |
| 5,973,683 A | 10/1999 | Cragun et al. |
| 5,974,222 A | 10/1999 | Yuen et al. |
| 5,977,964 A | 11/1999 | Williams et al. |
| 5,987,213 A | 11/1999 | Mankovitz et al. |
| 5,987,509 A | 11/1999 | Portuesi |
| 5,987,621 A | 11/1999 | Duso et al. |
| 5,991,498 A | 11/1999 | Young et al. |
| 5,991,799 A | 11/1999 | Yen et al. |
| 5,995,155 A | 11/1999 | Schindler et al. |
| 6,002,394 A | 12/1999 | Schein et al. |
| 6,005,561 A | 12/1999 | Hawkins et al. |
| 6,005,631 A | 12/1999 | Anderson et al. |
| 6,006,257 A | 12/1999 | Slezak |
| 6,020,880 A | 2/2000 | Naimpally |
| 6,020,883 A | 2/2000 | Herz et al. |
| 6,031,806 A | 2/2000 | Tomita |
| 6,038,367 A | 3/2000 | Abecassis |
| 6,052,145 A | 4/2000 | Macrae et al. |
| 6,057,872 A | 5/2000 | Candelore |
| 6,057,890 A | 5/2000 | Virden et al. |
| 6,072,982 A | 6/2000 | Haddad |
| 6,075,526 A | 6/2000 | Rothmuller |
| 6,081,291 A | 6/2000 | Ludwig, Jr. |
| 6,088,945 A | 7/2000 | Sanderfoot |
| 6,091,883 A | 7/2000 | Artigalas et al. |
| 6,091,884 A | 7/2000 | Yuen et al. |
| RE36,801 E | 8/2000 | Logan et al. |
| 6,125,230 A | 9/2000 | Yaginuma |
| 6,130,726 A | 10/2000 | Darbee et al. |
| 6,133,910 A | 10/2000 | Stinebruner |
| 6,141,488 A | 10/2000 | Knudson et al. |
| 6,147,715 A | 11/2000 | Yuen et al. |
| 6,154,771 A | 11/2000 | Rangan et al. |
| 6,155,001 A | 12/2000 | Marin |
| 6,157,413 A | 12/2000 | Hanafee et al. |
| 6,163,316 A | 12/2000 | Killian |
| 6,166,778 A | 12/2000 | Yamamoto et al. |
| 6,167,188 A | 12/2000 | Young et al. |
| 6,172,674 B1 | 1/2001 | Etheredge |
| 6,177,931 B1 | 1/2001 | Alexander et al. |
| 6,185,360 B1 | 2/2001 | Inoue et al. |
| 6,195,501 B1 | 2/2001 | Perry et al. |
| 6,208,335 B1 | 3/2001 | Gordon et al. |
| 6,208,799 B1 | 3/2001 | Marsh et al. |
| 6,219,839 B1 | 4/2001 | Sampsell |
| 6,226,447 B1 | 5/2001 | Sasaki et al. |
| 6,233,389 B1 | 5/2001 | Barton et al. |
| 6,275,648 B1 | 8/2001 | Knudson et al. |
| 6,324,338 B1 | 11/2001 | Wood et al. |
| 6,326,982 B1 | 12/2001 | Wu et al. |
| 6,327,418 B1 | 12/2001 | Barton et al. |
| 6,334,022 B1 | 12/2001 | Ohba et al. |
| 6,357,043 B1 | 3/2002 | Ellis et al. |
| 6,441,832 B1 | 8/2002 | Tao et al. |
| 6,442,332 B1 | 8/2002 | Knudson et al. |
| RE37,881 E | 10/2002 | Haines |
| 6,473,559 B1 | 10/2002 | Knudson et al. |
| 6,480,667 B1 | 11/2002 | O'Connor |
| 6,486,892 B1 | 11/2002 | Stern |
| 6,487,362 B1 | 11/2002 | Yuen et al. |
| 6,498,895 B2 | 12/2002 | Young et al. |
| 6,505,348 B1 | 1/2003 | Knowles et al. |
| 6,507,953 B1 | 1/2003 | Horlander et al. |
| 6,564,005 B1 | 5/2003 | Berstis |
| 6,601,074 B1 * | 7/2003 | Liebenow ............... 348/E7.061 |
| 6,611,842 B1 | 8/2003 | Brown |
| 6,611,958 B1 * | 8/2003 | Shintani et al. ................. 725/58 |
| 6,614,987 B1 | 9/2003 | Ismail et al. |
| 6,670,971 B1 | 12/2003 | Oral |
| 6,681,396 B1 | 1/2004 | Bates et al. |
| 6,721,954 B1 | 4/2004 | Nickum |
| 6,727,914 B1 | 4/2004 | Gutta |
| 6,744,967 B2 | 6/2004 | Kaminski et al. |
| 6,756,987 B2 | 6/2004 | Goyins et al. |
| 6,760,537 B2 | 7/2004 | Mankovitz |

(56) References Cited

U.S. PATENT DOCUMENTS

| | | |
|---|---|---|
| 6,760,538 B1 | 7/2004 | Bumgardner et al. |
| 6,766,100 B1 | 7/2004 | Komar et al. |
| 6,771,317 B2 | 8/2004 | Ellis et al. |
| 6,771,886 B1 | 8/2004 | Mendelsohn |
| 6,788,882 B1 | 9/2004 | Geer et al. |
| 6,820,278 B1 | 11/2004 | Ellis |
| 6,837,791 B1 | 1/2005 | Ramsey et al. |
| 6,850,693 B2 | 2/2005 | Young et al. |
| 6,920,278 B1 | 7/2005 | Yano et al. |
| 6,920,281 B1 | 7/2005 | Agnibotri et al. |
| 6,925,035 B2 | 8/2005 | Ueki |
| 6,934,964 B1 | 8/2005 | Schaffer et al. |
| 6,973,669 B2 | 12/2005 | Daniels |
| 6,985,188 B1 | 1/2006 | Hurst, Jr. |
| 7,017,118 B1 | 3/2006 | Carroll |
| 7,017,179 B1 | 3/2006 | Asamoto et al. |
| 7,027,716 B1 | 4/2006 | Boyle et al. |
| 7,088,910 B2 | 8/2006 | Potrebic et al. |
| 7,096,486 B1 | 8/2006 | Ukai et al. |
| 7,143,430 B1 | 11/2006 | Fingerman et al. |
| 7,181,128 B1 | 2/2007 | Wada et al. |
| 7,185,355 B1 | 2/2007 | Ellis et al. |
| 7,200,859 B1 | 4/2007 | Perlman et al. |
| 7,209,640 B2 | 4/2007 | Young et al. |
| 7,218,839 B2 | 5/2007 | Plourde et al. |
| 7,229,012 B1 | 6/2007 | Enright et al. |
| 7,229,354 B2 | 6/2007 | McNutt et al. |
| 7,356,246 B1 | 4/2008 | Kobb |
| 7,369,749 B2 | 5/2008 | Ichioka et al. |
| 7,369,750 B2 | 5/2008 | Cheng et al. |
| 7,454,515 B2 | 11/2008 | Lamkin et al. |
| 7,477,832 B2 | 1/2009 | Young et al. |
| 7,519,268 B2 | 4/2009 | Juen et al. |
| 7,577,336 B2 | 8/2009 | Srinivasan et al. |
| 7,599,753 B2 | 10/2009 | Taylor et al. |
| 7,603,685 B2 | 10/2009 | Knudson et al. |
| 7,689,995 B1 | 3/2010 | Francis et al. |
| 7,707,617 B2 | 4/2010 | Birleson |
| 7,778,158 B2 | 8/2010 | Vogel et al. |
| 7,823,055 B2 | 10/2010 | Sull et al. |
| 7,859,571 B1 | 12/2010 | Brown et al. |
| 7,925,141 B2 | 4/2011 | Geer et al. |
| 8,265,458 B2 | 9/2012 | Helmstetter |
| 8,363,679 B2 | 1/2013 | Sorenson et al. |
| 8,707,366 B2 | 4/2014 | Wong et al. |
| 2001/0013122 A1 | 8/2001 | Hirata |
| 2001/0028782 A1 | 10/2001 | Ohno et al. |
| 2001/0034237 A1 | 10/2001 | Garahi |
| 2001/0043795 A1 | 11/2001 | Wood et al. |
| 2002/0009283 A1 | 1/2002 | Ichioka et al. |
| 2002/0057893 A1 | 5/2002 | Wood et al. |
| 2002/0059599 A1 | 5/2002 | Schein et al. |
| 2002/0110353 A1 | 8/2002 | Potrebic et al. |
| 2002/0144279 A1 | 10/2002 | Zhou |
| 2002/0147977 A1 | 10/2002 | Hammett et al. |
| 2002/0154888 A1 | 10/2002 | Allen et al. |
| 2002/0174424 A1 | 11/2002 | Chang et al. |
| 2002/0174430 A1 | 11/2002 | Ellis et al. |
| 2002/0174433 A1 | 11/2002 | Baumgartner et al. |
| 2002/0191954 A1* | 12/2002 | Beach et al. .................... 386/46 |
| 2002/0194596 A1 | 12/2002 | Srivastava |
| 2002/0199185 A1 | 12/2002 | Kaminski et al. |
| 2003/0005445 A1 | 1/2003 | Schein et al. |
| 2003/0009766 A1 | 1/2003 | Marolda |
| 2003/0088873 A1 | 5/2003 | McCoy et al. |
| 2003/0098891 A1 | 5/2003 | Molander |
| 2003/0103088 A1 | 6/2003 | Dresti et al. |
| 2003/0118323 A1 | 6/2003 | Ismail et al. |
| 2003/0126607 A1 | 7/2003 | Phillips et al. |
| 2003/0149988 A1 | 8/2003 | Ellis et al. |
| 2003/0198462 A1 | 10/2003 | Bumgardner et al. |
| 2003/0206719 A1 | 11/2003 | Bumgardner et al. |
| 2003/0210898 A1 | 11/2003 | Juen et al. |
| 2004/0049794 A1 | 3/2004 | Shao et al. |
| 2004/0060063 A1 | 3/2004 | Russ et al. |
| 2004/0070594 A1 | 4/2004 | Burke |
| 2004/0103434 A1 | 5/2004 | Ellis |
| 2004/0128686 A1 | 7/2004 | Boyer et al. |
| 2004/0156614 A1 | 8/2004 | Bumgardner et al. |
| 2004/0181814 A1 | 9/2004 | Ellis et al. |
| 2004/0210932 A1 | 10/2004 | Mori et al. |
| 2005/0028218 A1 | 2/2005 | Blake |
| 2005/0183123 A1 | 8/2005 | Lee et al. |
| 2005/0204388 A1 | 9/2005 | Knudson et al. |
| 2005/0235323 A1 | 10/2005 | Ellis et al. |
| 2005/0240962 A1 | 10/2005 | Cooper et al. |
| 2005/0240968 A1 | 10/2005 | Knudson et al. |
| 2005/0251827 A1 | 11/2005 | Ellis et al. |
| 2005/0273819 A1 | 12/2005 | Knudson et al. |
| 2006/0083484 A1 | 4/2006 | Wada et al. |
| 2006/0140584 A1 | 6/2006 | Ellis et al. |
| 2007/0204308 A1 | 8/2007 | Nicholas et al. |
| 2010/0247065 A1 | 9/2010 | Cooper et al. |

FOREIGN PATENT DOCUMENTS

| | | |
|---|---|---|
| EP | 0 572 090 | 12/1993 |
| EP | 0 682 452 | 11/1995 |
| EP | 0 753 964 | 1/1997 |
| EP | 0 762 756 | 3/1997 |
| EP | 0 789 488 | 8/1997 |
| EP | 0 797 355 | 9/1997 |
| EP | 0 836 320 | 4/1998 |
| EP | 0 843 468 | 5/1998 |
| EP | 0 854 645 | 7/1998 |
| EP | 0 856 847 | 8/1998 |
| EP | 0 921 682 | 6/1999 |
| EP | 0 924 927 | 6/1999 |
| EP | 0936811 B1 | 8/1999 |
| EP | 0 940 983 | 9/1999 |
| EP | 0 940 985 | 9/1999 |
| EP | 1 014 715 | 6/2000 |
| EP | 1 059 749 | 12/2000 |
| GB | 2 227 622 | 8/1990 |
| GB | 2 229 595 | 9/1990 |
| GB | 2 346 251 | 8/2000 |
| JP | 5-53378 | 7/1993 |
| JP | 06-111413 | 4/1994 |
| JP | 06-303541 | 10/1994 |
| JP | 0865622 | 3/1996 |
| JP | 08-130517 | 5/1996 |
| JP | 9-270965 | 10/1997 |
| JP | 09-289630 | 11/1997 |
| JP | 09-322213 | 12/1997 |
| JP | 10-214449 | 8/1998 |
| JP | 10-228500 | 8/1998 |
| JP | 10-234007 | 9/1998 |
| JP | 10-257400 | 9/1998 |
| JP | 11-136615 | 5/1999 |
| JP | 11-136658 | 5/1999 |
| JP | 11-177962 | 7/1999 |
| JP | H-11205740 | 7/1999 |
| JP | 11-261917 | 9/1999 |
| JP | 11-308561 | 11/1999 |
| JP | 11-313280 | 11/1999 |
| JP | 2000-013708 | 1/2000 |
| JP | 2000-138886 | 5/2000 |
| JP | 2000-224533 | 8/2000 |
| JP | 2000-235540 | 8/2000 |
| JP | 2000-261750 | 9/2000 |
| JP | 2000-287179 | 10/2000 |
| JP | 2000-295554 | 10/2000 |
| JP | 2000-306314 | 11/2000 |
| JP | 2000-312333 | 11/2000 |
| JP | 2000-339931 | 12/2000 |
| JP | 2000-022282 | 1/2001 |
| JP | 2001-86423 | 3/2001 |
| JP | P2001-88372 | 4/2001 |
| JP | P2001-165669 | 6/2001 |
| JP | P2001-167522 | 6/2001 |
| JP | P2001-257950 | 9/2001 |
| JP | 2002-109347 | 4/2002 |
| JP | 2003-199004 | 7/2003 |
| JP | P2004-7592 | 1/2004 |

(56) References Cited

FOREIGN PATENT DOCUMENTS

| | | |
|---|---|---|
| JP | P2004-23326 | 1/2004 |
| KR | 10-0996475 | 11/2010 |
| TW | 247388 | 5/1995 |
| WO | WO 88/04507 | 6/1988 |
| WO | WO 90/00847 | 1/1990 |
| WO | WO 92/22983 | 12/1992 |
| WO | WO 93/23957 | 11/1993 |
| WO | WO 94/14284 | 6/1994 |
| WO | WO 95/04431 | 2/1995 |
| WO | WO 95/32587 | 11/1995 |
| WO | WO 96/26605 | 8/1996 |
| WO | WO 96/31980 | 10/1996 |
| WO | WO 96/34491 | 10/1996 |
| WO | WO 96/36172 | 11/1996 |
| WO | WO 96/37075 | 11/1996 |
| WO | WO 96/41470 | 12/1996 |
| WO | WO 96/41478 | 12/1996 |
| WO | WO 97/13368 | 4/1997 |
| WO | WO 97/34413 | 9/1997 |
| WO | WO 97/40623 | 10/1997 |
| WO | WO 97/46943 | 12/1997 |
| WO | WO 97/47124 | 12/1997 |
| WO | WO 97/48230 | 12/1997 |
| WO | WO 97/49237 | 12/1997 |
| WO | WO 97/49242 | 12/1997 |
| WO | WO 98/06219 | 2/1998 |
| WO | WO 98/10589 | 3/1998 |
| WO | WO 98/14009 | 4/1998 |
| WO | WO 98/17064 | 4/1998 |
| WO | WO-9831148 A1 | 7/1998 |
| WO | WO 98/43183 | 10/1998 |
| WO | WO 98/47283 | 10/1998 |
| WO | WO 98/47290 | 10/1998 |
| WO | WO 98/48566 | 10/1998 |
| WO | WO 99/03267 | 1/1999 |
| WO | WO 99/04561 | 1/1999 |
| WO | WO 99/35827 | 7/1999 |
| WO | WO 99/37045 | 7/1999 |
| WO | WO 99/38092 | 7/1999 |
| WO | WO 99/45700 | 9/1999 |
| WO | WO 99/52279 | 10/1999 |
| WO | WO 99/57837 | 11/1999 |
| WO | WO 99/57839 | 11/1999 |
| WO | WO 99/60493 | 11/1999 |
| WO | WO 99/60790 | 11/1999 |
| WO | WO 99/65237 | 12/1999 |
| WO | WO 99/66725 | 12/1999 |
| WO | WO 00/04706 | 1/2000 |
| WO | WO 00/04709 | 1/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/11869 | 3/2000 |
| WO | WO 00/13416 | 3/2000 |
| WO | WO 00/16336 | 3/2000 |
| WO | WO 00/16548 | 3/2000 |
| WO | WO 00/28379 | 5/2000 |
| WO | WO 00/28739 | 5/2000 |
| WO | WO 00/40014 | 7/2000 |
| WO | WO 00/51310 | 8/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 01/10126 | 2/2001 |
| WO | WO 01/10128 | 2/2001 |
| WO | WO 01/11865 | 2/2001 |
| WO | WO 01/22729 | 3/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/76239 | 10/2001 |
| WO | WO 01/76248 | 10/2001 |
| WO | WO 01/76704 | 10/2001 |
| WO | WO 01/82600 | 11/2001 |
| WO | WO 02/078317 | 10/2002 |
| WO | WO 03/005712 | 1/2003 |

OTHER PUBLICATIONS

"Digital Video Broadcasting (DVB); DVB specification for data broadcasting", European Telecommunications Standards Institute, Draft EN 301 192 V1.2.1 (Jan. 1999).
"DIRECTV Digital Satellite Receiver—Operating Instructions," Sony Electronics Inc. (2001). "DIRECTV Receiver—Owner's Manual," DIRECTV, Inc. (2002).
"DIRECTV Receiver with TiVo Digital Satellite Receiver/Recorder SAT-T60—Installation Guide," Sony Corporation (2000).
"DIRECTV Receiver with TiVo Installation Guide," Philips (2000).
"DIRECTV Receiver with TiVo Viewer's Guide" (1999, 2000).
"DishPro Satellite System—User's Guide," Dish Network (undated).
"Electronic Programme Guide (EPG); Protocol for a TV Guide using electronic data transmission" by European Telecommunication Standards Institute, May 1997, Valbonne, France, publication No. ETS 300 707.
"Fall 2001 TiVo Service Update with Dual Tuner!," TiVo Inc. (2001).
"PTV Recorder Setup Guide," Philips (2000). "RCA Satellite Receiver User's Guide," Thomson Multimedia Inc. (2001).
"Rewind, Replay and unwind with new high-tech TV devices," by Lawrence J. Magid, LA Times. This document was printed from the Internet on Jun. 6, 1999 and bears a date of May 19, 1999.
"Start Here," Sony, TiVo and DIRECTV (undated).
"Windows 98 Feature Combines TV, Terminal and the Internet." New York Times, Aug. 18, 1998.
CNN Tech: Sonicblue revives ReplayTV, articles cnn.com, Sep. 10, 2001, retrieved from the internet http://articles.cnn.com/2001-09-10/tech/replay.tv.idg_1_replaytv-sonicblue-digital-video?_s=PM:TECH Gavron, Jacquelyn, Moran, Joseph, How to Use Microsoft Windows NT 4 Workstation, 1996, entire document.
Hofmann, Neumann, Oberlies, and Schadwinkel, "Videotext Programmiert Videorecorder," Rundfunktechnische Mitteilungen, Nov.-Dec. 1982, pp. 254-257.
Komarinski, Mark, Anonymous FTP p. 1, May 1, 1995 Linux Journal, entire document.
Postel, J., Reynolds, J., Request for Comments: 959 File Transfer Protocol, Oct. 1985, entire document.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64.
SONICblue Incorporated: ReplayTV 4000 User Guide 12.17, Chapter Five: Networking, Sep. 10, 2001; retrieved from the internet: http://www.digitalnetworksna.com/support/replaytv/dowloads/ReplayTV4000UserGuide.12.17.pdf.
User's Gude RCA Color TV with TV Plus + Guide, 1997.
S. Cherrick et al., Individually addressable TV receiver with interactive channel guide display, VCR, and cable box control, IEEE Transactions on Consumer Electronics, vol. 4:3 (Aug. 1994), pp. 317-328.
U. Ramachandran, Space-Time Memory: a parallel programming abstraction for interactive multimedia applications, SIGPLAN Notices, vol. 34:8 (Aug. 1999), pp. 183-192.
S. Imke, Interactive Video Management and Production, Educational Technology Publications, 1991, http://www.amazon.com/interactive-Video-Management-Production-Steven/dp/0877782334/ref=sr_1_1 ?ie=UTF8&qid=1416426739&sr=8-1& keywords=interactive+video+management+and+production& pebp=1416426742553.

* cited by examiner

PRIORITY LEVEL INFORMATION

TOTAL HOURS AVAILABLE: 80 hours
TOTAL HOURS USED: 75 hours
TOTAL HOURS REMAINING: 5 hours

CAN'T MISS
HOURS USED: 60 hours
 Adequate space for all scheduled programs

IF POSSIBLE
HOURS USED: 10 hours
 Adequate space for all scheduled programs

DESIRED
HOURS USED: 3 hours
The guide will have to start deleting programs on Tuesday at 8:00 p.m.

SPACE AVAILABLE
HOURS USED: 2 hours
The guide will have to start deleting programs on Sunday at 9:00 p.m.

Digital Cable

Selectable Advertisement

Selectable PPV Advertisement

FIG. 22

SYSTEMS AND METHODS FOR INTERACTIVE PROGRAM GUIDES WITH PERSONAL VIDEO RECORDING FEATURES

CROSS-REFERENCE TO RELATED APPLICATIONS

This application is a continuation of U.S. patent application Ser. No. 14/222,431, filed Mar. 21, 2014, which is a continuation of U.S. patent application Ser. No. 13/335,787, filed Dec. 22, 2011, which is a continuation of U.S. patent application Ser. No. 12/546,301, filed Aug. 24, 2009 (now abandoned), which is a continuation of U.S. patent application Ser. No. 11/356,928, filed Feb. 16, 2006 (now U.S. Pat. No. 8,457,475), which is a continuation of U.S. patent application Ser. No. 10/105,128, filed Feb. 21, 2002 (now abandoned), which claims the benefit of U.S. Provisional Application No. 60/270,469, filed Feb. 21, 2001, U.S. Provisional Application No. 60/271,809, filed Feb. 27, 2001, U.S. Provisional Application No. 60/284,703, filed on Apr. 18, 2001, U.S. Provisional Application No. 60/290,709, filed on May 14, 2001, U.S. Provisional Application No. 60/296,593, filed on Jun. 7, 2001, and U.S. Provisional Application No. 60/301,589, filed on Jun. 28, 2001. All of these prior applications, which are hereby incorporated herein by reference in their entireties.

BACKGROUND OF THE INVENTION

The present invention relates to interactive television program guide ("IPG") systems and personal video recording ("PVR") systems, and more particularly to enhanced PVR-IPG features.

Interactive television systems such as interactive television program guide systems are now widely available to the general public. Interactive television program guide systems may be used to provide interactive television services such as services for allowing a user to tune to a program, to set parental locks, to record a program, to set reminders, etc. Interactive program guide systems are illustratively described, for example, in Knee et al. U.S. Pat. No. 5,589,892, and Knudson et al. U.S. patent application Ser. No. 09/357,941, filed Jul. 16, 1999, which are hereby incorporated herein by reference in their entireties.

In recent years, PVRs such as those provided by companies such as Tivo and ReplayTV have become available. Such systems and devices may be used to provide interactive television services such as services for recording television programs onto a digital medium, such as a hard disk. In one known system, a PVR may use an MPEG encoder to digitize broadcast television and then store the digitized broadcast television for later retrieval on a hard disk drive. In such systems, a digitized broadcast may be converted to an analog NTSC signal for display on a television.

In conventional PVRs, a program buffer is typically used to allow users to pause, rewind, or playback a television broadcast that a user is watching. A PVR buffer is typically a circular buffer that stores the most recent "n" minutes of programming that was watched by a user. One drawback of this buffering technique is that the buffer only allows the user to pause or rewind up to the last "n" minutes and only on the currently tuned channel since it was most recently tuned.

Conventional PVR systems may also provide other features such as features for allowing users to select to record television content. In such systems, a live program is typically recorded from the point at which a user requests the program to be recorded. One drawback of such systems is that portions of the live program that were previously buffered are typically ignored.

In such systems, interactive television services are typically provided to users through the presentation of graphics. One drawback of such systems is that the presentation of the graphics may undesirably cause a user to miss live television content that the user is watching.

Another drawback of known PVR systems is that such systems do not typically support pay-per-view television programming. Pay-per-view ("PPV") television programs are now widely available through cable television service providers, but are not typically supported by PVRs for scheduling recordings or providing other types of PVR-related functionality.

Improvements to these IPG and/or PVR systems are desirable to alleviate these and other drawbacks and to simplify the use of such systems while providing additional functionality to television viewers. Accordingly, new systems and methods for interactive program guides with personal video recording functions are provided.

SUMMARY OF THE INVENTION

In accordance with the principles of the present invention, an interactive television application may be implemented on a television system to provide enhanced PVR-related functionality.

An interactive television application may be implemented to integrate PVR and set-top box program guide features, functionality, and information. For example, an interactive television application may be implemented to provide PVR features, functionality, and information in an interactive television program guide such as an interactive television program guide running on a cable set-top box. Other configurations for integrating such features may also be used.

An interactive television application may display a main menu display screen that may include options such as a program listings option, a video-on-demand option, a pay-per-view ("PPV") option, or a current weather option to provide interactive services. The main menu display screen may include PVR-related options such as a recordings option, a scheduled recordings option, and a delete priority option.

A recordings display screen may be displayed when the user selects the recordings option. The recordings display screen may include a list of recordings that are available from a PVR. The programs that are included in the list of recordings may be programs that were manually or automatically recorded by the PVR. The listings in the display screen may be selectable to allow a user to access information and/or options that are related to a selected listing. Other techniques for accessing the list of recordings may also be provided.

A scheduled recordings display screen may be displayed when a user selects a scheduled recordings option from a main menu display screen. Other techniques for accessing a scheduled recordings display screen may also be used. The scheduled recordings display screen may include a list of programs that are scheduled to be recorded (e.g., scheduled to be recorded by a PVR). Programs on the list may have been scheduled to be recorded automatically or manually. Programs that are automatically scheduled to be recorded or that are automatically recorded may be programs that an interactive television application selects for recording based on some criteria such as user preferences. Programs that are manually recorded or manually scheduled to be recorded may be programs that a user specifically selected to be recorded.

Series recordings that are selected for recording by a user may also be considered to be manual recordings. Listings in a scheduled recordings display screen may be selectable to allow a user to access information and/or options that are related to a selected program listing. Information about series recordings may be accessed through a scheduled recordings display screen.

An interactive television application may allow a user to schedule and cancel one-time and/or series recordings from a program listings screen, a browse overlay, a flip overlay, a video of a program that is being watched, an advertisement, or any other suitable location. A series recording may be used to schedule and record a series of episodes in a particular program series. The user may be provided with an opportunity to configure series recordings based on episode type (e.g. first-run, repeat, etc.) and/or channels.

The interactive television application may provide a user with an opportunity to configure a recording buffer around a program that is scheduled to be recorded. The record quality of a recording may also be selected by a user. An interactive television application may allow a user to schedule a recording from practically any point in a program guide. For example, a recording may be scheduled from a program listing bar, a program information display screen, an advertisement display screen, or any other suitable point in a program guide.

The interactive television application may provide a user with the ability to record PPV programs and to schedule PPV programs to be recorded. An interactive television application may automatically order a PPV program that a user schedules to be recorded. A user may be prompted to purchase a PPV program when the user schedules a PPV program to be recorded. Recording configuration settings for a PPV program, such as recording quality and recording buffer time, may be selected by a user.

The interactive television application may provide VCR type functions for watching a recorded program including pause, fast-forward, rewind, stop, play, record, and other suitable functions. When pausing live content, the interactive television application may display paused video of the television content and display a timer showing how far back the paused video is behind live content. Program flow control options such as a play option, a rewind option, a fast-forward option, and a record option may also be displayed.

If desired, television programming may be recorded without including graphics such as interactive television application display screens and overlays as part of the recordings. If desired, television programming may be recorded without including in the recording changes in volume settings that a user selects during the recording.

An interactive television application may display different PVR related overlays at appropriate points in interactions with a user. For example, an overlay may be displayed when a recording is canceled, when a program starts to be recorded, when a recording is completed, or when other events occur. A user may be permitted to cancel a recording that is underway. For example, the user may cancel the recording by pressing a remote control record button or by pressing a remote control button to change the current channel. If desired, a user may not be permitted to change the current channel unless the user affirmatively confirms the cancellation of the recording.

The interactive television application may provide a user with a reminder that a scheduled recording is about to start. A reminder may be displayed at a preset time before the start of a scheduled recording. The reminder may include the title of the program that is scheduled to be recorded. A user may be provided with an opportunity to confirm that the program should be recorded, for example, by selecting a particular item in the reminder overlay.

The interactive television application may provide a user with the ability to set delete priority settings for recordings. The user may set delete priority settings for a specific program. The user may be allowed to set general delete priority settings. The interactive television application may provide user-selectable options for editing the order in which individual recordings will be deleted. A delete priority order may be set for recordings in general based on program type or broadcast type. A delete priority order may be set between series recordings. Options may also be available for deleting recordings after a specified period of time and after the program has been viewed.

An interactive television application may be implemented to provide multiple program guides with respect to PVR information and features. Each program guide may correspond to a different user in a household. Information related to a specific user may be displayed and/or updated when the program guide corresponding to that user is accessed. The program guides may be configured to interact differently with different users. The list of recordings and/or list of scheduled recordings for one user may not be available to other users in their program guides. To identify a current user, the interactive television application may require users to log into their program guides. If desired, users may be required to login when they seek to access PVR related features and/or information. Different users may use their program guides to select different programs to be recorded. A PVR may record programs based on the user selections. Recordings may be performed independent of which user is currently logged into the system. Users may be permitted to delete recordings from their list of recordings. The interactive television application may delete information related to a recording that a user selects to delete. Deleting information related to a recording may remove the recording from that user's list of recordings. The interactive television application may delete a program from a PVR based on user selections. If a particular recording is associated with more than one user, the interactive television application may delete the recording when all of the users associated with that recording have selected that program to be deleted.

PVR users may be notified of changes that are to be made to the recording content in a storage device. A notification may be sent to inform a user that a particular program is about to be recorded or deleted. In a multiple program guide environment, notifications may be sent to users to which the upcoming change pertains. The notification may provide the user with an opportunity to confirm or cancel the change that is to be made. The notification may be sent via a program guide overlay, using e-mail, or using other suitable techniques. A notification may notify a user that a particular program that was earlier selected by the user to be recorded is about to be recorded. A notification may notify a user that a particular program, which was automatically selected to be recorded (e.g., based on user preferences), is about to be recorded. A notification may notify a user that a particular program is about to be deleted based on user-selected delete priority settings. A notification may notify a user that a particular program is about to be recorded based on automatic delete settings.

An interactive television application may maintain a global list of programs that are presently stored on a PVR. The list may contain all programs that have been recorded. The list may contain programs that were deleted (automatically or manually), but are still available from the storage medium of the PVR. For example, in one instance, the deletion of a recording may only delete particular information about that recording without actually deleting the video of the recording from the PVR.

In order to not re-record a program, an interactive television application may check a global list of programs to determine whether a program that has been selected to be recorded is already available from the PVR. The interactive television application may not record a program if that program is currently on the global list. The currently stored program on the PVR may be used for the selected recording. If desired, a user may be provided with an opportunity to edit the global list. A user may be permitted to permanently delete a program from the global list.

Stored video advertisements may be presented to users using a storage device such as a PVR. Video advertisements may be presented using full screen video or scaled video. A video advertisement may be presented when a user is interacting with a program guide. Scaled video for an advertisement may be presented in a program guide display screen. Full screen video of the advertisement may be presented when a user selects the scaled video in a program guide display screen. A stored video advertisement may be displayed when a user enters a program guide (e.g., a user selects a guide button of a remote control while watching live television). A stored video advertisement may be linked to a live video advertisement that is being presented to a user. The stored video advertisement may be presented after the presentation of the live video. The stored video advertisement may be presented based on user preferences or other criteria. Current television content may be paused for a user when the stored video advertisement is displayed. The stored video advertisement may be used replace a live television advertisement.

A storage device such as a PVR may be used to buffer television content to provide a user with an opportunity to control the flow of current television content and to take other actions. A straight buffer may be created when a user tunes a new channel or program. The straight buffer may be used to buffer the currently tuned program. If desired, a buffer size may be allocated to the buffer that is suitable for holding the remainder of the current program. Each time a user changes to viewing a new program, the interactive television application may create a new buffer. Space for a buffer may be allocated by allocating free space that is available on a storage device, by deleting an existing buffer (e.g., the oldest existing buffer), or by deleting a portion of an existing buffer (e.g., the oldest portion of the oldest buffer). If desired, the size of a buffer may be incrementally increased as needed.

In the situation where a user tunes away and returns to a particular program, a buffer that was created for that program may combine video that was buffered before the user tuned away and video buffered when the user returned to watching that program. The separate portion of the program before and after the user tuned away may be combined by concatenating the two portions, by inserting blank video between the two portions, by inserting text or other content between the two portions, or by using combinations thereof. If desired, content that is inserted between the two portions may have a duration that corresponds to the length of the break between the portions. In a multi-tuner environment, the buffer for a program may contain the portions of the video that the user may have missed by tuning away. Multiple tuners may be implemented to permit the PVR to buffer different programs in parallel. Multiple tuners may also be used to record one program while watching another program or to record two or more programs at the same time.

A user may be allowed to control program flow using a buffer. A user may be permitted to rewind a program that is playing from a program buffer. Rewinding a current program to the top of that program may allow the user to skip to a previous program by selecting to rewind again. Using fast-forward to reach the end of a program may cause the program to stop playing or may cause the next program from the buffer to be played.

The buffer for a current program may be used as part of a recording when the user selects to record that program. A program that is being buffered may be recorded by recording currently airing video of the program and saving previous portions of the program that are buffered. An interactive television application may retain buffers for programs that have ended. A user may be permitted to view a list of programs that are currently stored in program buffers. An interactive television application may save a buffer for a program as a recording when a user selects that program to be recorded. The selection may be made even after the program has ended.

Storage space in a storage device may be assigned automatically or manually to buffer programming. An interactive television application may automatically assign all or a portion of the storage space in a storage device to buffer programming. If desired, a user may be provided with an opportunity to set the total size to be used for buffering, set the total number of buffers that can be active at one time, set the size of each buffer, and set how often buffers should be deleted.

An interactive television application may automatically pause television content that a user is watching when the user interacts with the interactive television application. A current television program or commercial that a user is watching may be paused when a program guide display screen or a stored video advertisement is displayed. The television content may remain paused while the user interacts with the interactive television application or watches the stored video advertisement. The display of the television content may resume when the user exits the interactive television application. The display of the television content may resume from the point at which it was paused. If desired, the interactive television application may provide the user with an opportunity to select whether the television content should be resumed from the point at which it was automatically paused or resumed from its current point.

Other PVR related features may also be provided. An interactive television application may display a scheduled recording icon that changes based on the status of a scheduled recording. The interactive television application may provide the user with the ability to create keyword-based recordings. The interactive television application may provide the user with the ability to set the recording priority for a program. The recording priority settings may, for example, include a can't miss priority, an if possible priority, a desired priority, an if space available priority, or any other suitable recording priority. Providing a user with three or more different recording priority levels to chose from allows a user greater flexibility in configuring his or her recording preferences. An interactive television application may display recorded programs within a browse overlay, a program listings display screen, or within other listing screens. Recorded programs may be listed amongst regularly scheduled programs.

The interactive television application may indicate how much memory is available on the PVR, and specifically how much memory is available at each recording priority level and when memory will run out based on the current recording settings.

Playback controls may be used to fast-forward and rewind a program at different speeds. The range of different speeds may include a range from different slow motion speeds to different fast-forward speeds. The interactive television application may provide the user with the ability to schedule VOD programs for recordings. The interactive television application may propose a selection of times at which the VOD program may be recorded. The interactive television application may propose a time for recording a VOD program based on currently scheduled recordings and reminders to avoid conflicts in recordings. If a VOD or PPV program is marked as copy-protected, the interactive television application may restrict whether a user can schedule a recording for the copyrighted program.

VOD and PPV programs may be priced to have different prices depending on the usage. For example, one price may be for watching a program, another price may be for recording a program, and a third price may be for each playback of a recording. The interactive television application may also support pay-per-recording and pay-per-playback of ordinary content. The interactive television application may also support a system in which the user pays for recording space by the amount of storage space used on a remote server (e.g., pay for the amount of storage in a remote server that stores personal video of a user).

An interactive television application may be implemented to push television advertisements and other content to be locally stored and displayed.

An interactive television application may allow a user to set a manual recording by specifying the time, date, channel, and duration for recording. When the interactive television application identifies data matching the manual recording, the manual recording may be converted to a program-based recording (a one-time recording).

The interactive television application may provide the use with the ability to edit recorded programs. Editing features may include, removing sections from a recording, removing commercials from a recording, combining recorded programs, creating playlists of recordings, marking locations in recorded programs for quick reference, or other suitable editing features.

BRIEF DESCRIPTION OF THE DRAWINGS

The principles and advantages of the present invention can be more clearly understood from the following detailed description considered in conjunction with the following drawings, and in which:

FIG. 22 shows an illustrative priority level information display screen in accordance with one embodiment of the present invention;

DETAILED DESCRIPTION OF THE INVENTION

Figure 1:
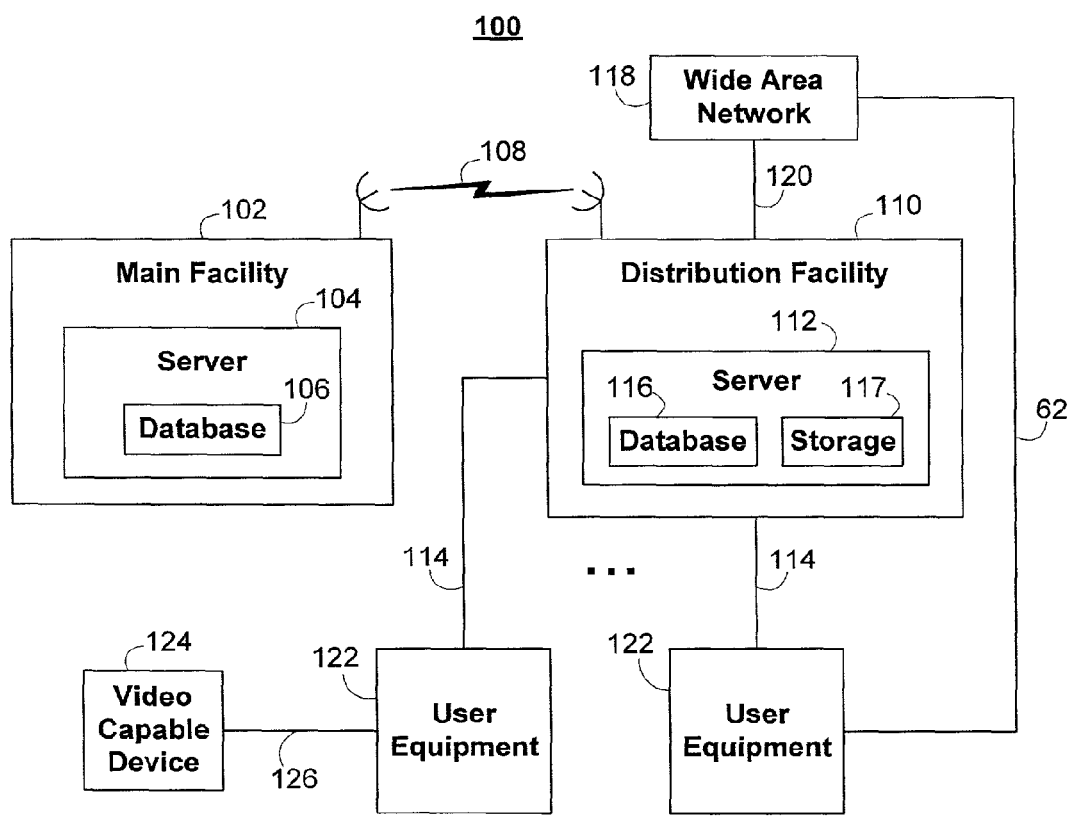
FIG. 1 shows a diagram of an illustrative interactive television program guide system in accordance with one embodiment of the present invention.

An illustrative interactive television system in accordance with the present invention is shown in FIG. 1. For clarity and brevity, the interactive television system of FIG. 1 is sometimes primarily discussed in the context of an interactive television program guide system. With reference now to FIG. 1, illustrative interactive television program guide system 100 may include main facility 102, distribution facility 110, and user equipment 122. Illustrative interactive television program guide system 100 may include multiple main facilities 102. Only one main facility 102, however, is illustrated in FIG. 1 to avoid over-complicating the drawing.

Main facility 102 may include server 104 for storing and distributing interactive television program guide information from program guide database 106. Program guide database 106 may store program guide information such as television program listings information, service listings information, program-related information, pay-per-view ordering information, promotional information, or any other suitable program guide information. Main facility 102 may distribute the program guide information to distribution facility 110 via communications path 108.

Communications path 108 may be any suitable communications path, such as a satellite link, a cable link, a fiber-optic link, a microwave link, a telephone network link, an Internet link, or a combination of such links. If it is desired to transmit video signals (e.g., television programs) over communications path 108 in addition to data signals, a relatively high bandwidth link such as a satellite link may be preferable to a relatively low bandwidth link such as a telephone line. Only one distribution facility 110 is shown in FIG. 1 to avoid over-complicating the drawing. Multiple distribution facilities may be involved in implementing interactive services.

The program guide information or content transmitted by main facility 102 to distribution facility 110 may include television program listings data (such as program times, channels, titles, descriptions, program type, genre, actors) or any other suitable data.

The promotional information transmitted by main facility 102 to distribution facility 110 may include various promotional banners, promotional ads, promotional slogans, promotional advertisements, or any other suitable promotional material.

Distribution facility 110 may be a television distribution facility for broadcast television, a cable system headend, a satellite distribution facility, or any other suitable distribution facility for distributing signals to viewers. Distribution facility 110 may distribute program guide information (or content) to user equipment 122 via communications paths 114. Distribution facility 110 may include server 112 for distributing program guide information. Server 112 may also handle communications for distributing television programming, music, or any other suitable type of media. Server 112 may include a local database 116 for storing various program guide information. Server 112 may include storage 117 for storing recorded programs remotely. Programs and/or related information may be recorded and/or stored remotely or locally at user equipment 122. A combination of local and remote storage and/or recording may also be used. Client-server based interactive television program guide systems with remote recording features are illustratively described, for example, in Ellis et al., U.S. patent application Ser. No. 09/332,244, filed Jun. 11, 1999, which is hereby incorporated herein by reference in its entirety. Additional techniques for storing programs and program information are illustratively described, for example, in Hassell et al., U.S. patent application Ser. No. 09/157,256, Sep. 17, 1998, which is hereby incorporated herein by reference in its entirety. In addition, server 112 may be capable of providing other interactive services such as near video-on-demand and video-on-demand. Server 112 may include one or more computers.

If desired, some or all of the information distributed to distribution facility 110 may be provided using information sources other than main facility 102. For example, distribution facility 110 may receive information from wide area network 118 (e.g., the Internet) via communications path 120. Communications path 120 may be a T1 link, a digital subscriber line (DSL) link, a cable modem link, an analog modem link, or any other suitable link.

If desired, data may be provided to user equipment 122 using facilities other than main facility 102 and distribution facility 110. For example, user equipment 122 may receive data directly from wide area network 118 via communications path 62. Communications path 62 may be a T1 link, a digital subscriber line (DSL) link, a cable modem link, an analog modem link, a radio frequency link such as radio frequencies in a paging system, or any other suitable link. In another example, a separate facility such as a satellite broadcasting system (not shown) may transmit data to user equipment 122, which may receive data via a satellite receiving system (not shown).

Communications path 114 may be any suitable type of link that allows distribution facility 110 to distribute program guide information, television programming, and any other suitable information, data, or media to user equipment 122. There may be more than one communications path 114 that couples each user equipment 122 to distribution facility 110. For example, if distribution facility 110 is a cable headend, user equipment 122 may receive information via a cable link and may transmit information to distribution facility 110 via a digital serial link, a dial-up modem connection, or any other suitable link. Each of communication paths 114 may be uni-directional or bi-directional.

User equipment 122 may be configured to send or receive e-mails via communication path 62, communications path 114, or communications path 120. User equipment 122 may receive e-mails that were sent by distribution facility 110 or by some other facility.

An interactive television application, in accordance with the embodiments described herein, may be implemented on user equipment 122 to provide interactive services to a user. Interactive services may enable a user to interact with television applications, for example, by setting particular channels as favorites, by changing channels, by ordering PPV movies, by selecting programs to be recorded, by playing recorded programs, etc. An interactive television application may be an interactive television program guide application, or an interactive personal video recorder application that may be used to provide interactive services to users.

Video capable device 124 may be video equipment that is capable of generating or storing video such as a video camera, a portable computer, or other suitable device. Video capable device 124 may be connected to user equipment 122 through communications connection 126 (e.g., a firewire connection, an RS-232 connection, etc.) or may be integrated into user equipment 122. The interactive television application may provide the user with the ability to transfer and store video from video capable device 124 to user equipment 122. Transferred video may be stored in a PVR that is part of user equipment 122. Video from video capable device 124 may be stored on user equipment 122 and presented to a user at a later time.

User equipment 122 may be based on a television platform and/or a computer platform. For example, user equipment 122 may include user television equipment (e.g., a television set, a PVR, and a set-top box), may include user computer equipment (e.g., a desktop computer, a laptop computer, a handheld computing device such as a personal digital assistant or any other small personal computing device, etc.), or may include any other suitable user equipment for implementing an interactive television program guide. User computer equipment may include a computer based receiver having integrated set-top box circuitry or a personal computer television (PC/TV). If desired, user television equipment may include computer equipment for receiving e-mails.

Figure 2A:
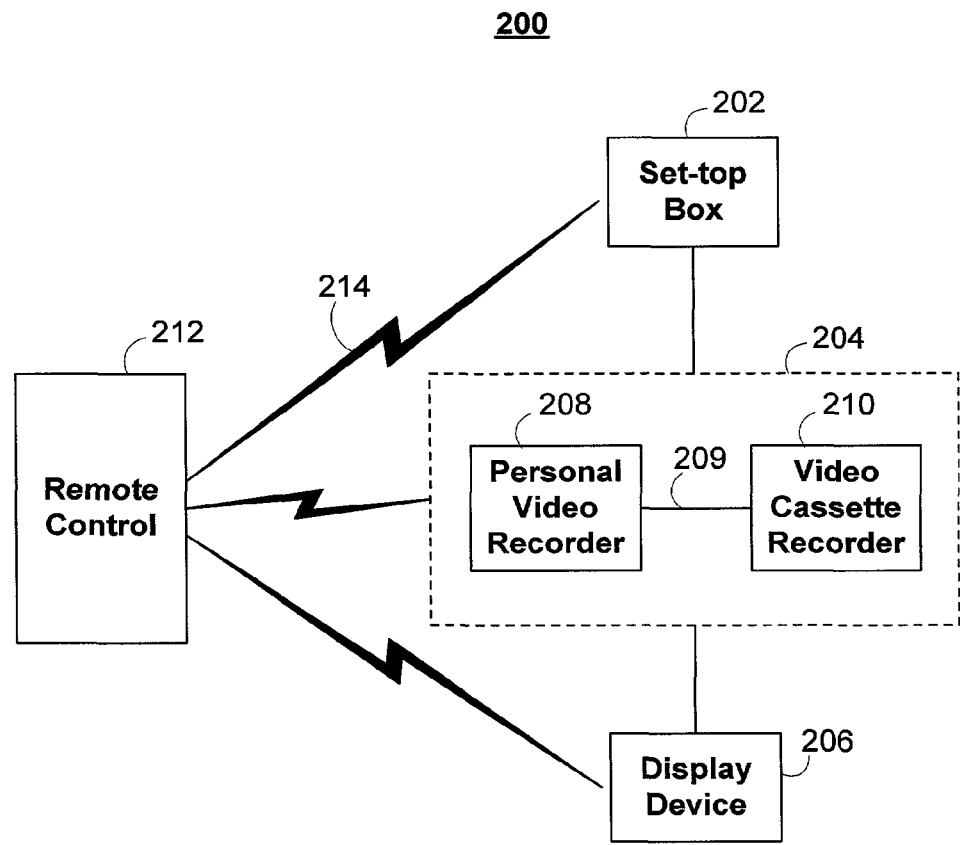
FIG. 2A shows a diagram of illustrative user television equipment in accordance with the present invention.

FIG. 2A shows illustrative user television equipment 200 that is based on a set-top box arrangement. User television equipment 200 may include set-top box 202, recording equipment 204, display device 206, and remote control 212. FIG. 2A illustrates that set-top box 202 is connected to recording equipment 204 and that recording equipment 204 is connected to display device 206. These connections may be wired or wireless connections. FIG. 2A also shows that remote control 212 may be able to communicate with set-top box 202, recording equipment 204, and display device 206 via a wireless link 214. Persons skilled in the art will appreciate that set-top box 202, recording equipment 204, remote control 212, and display device 206 may be interconnected differently than that shown in FIG. 2A and that components can be added or removed. For example, recording equipment 204 may be integrated with set-top box 202 in a single device (see for example FIG. 2B).

Set-top box 202 may receive signals transmitted by distribution facility 110 (FIG. 1) (e.g., audio, video, or interactive television application data). Set-top box 202 may include a storage device (e.g., a hard drive) or memory for storing personal user preferences settings, for storing user-selected reminders, or for storing other information. For illustrative purposes, the present invention will be described in the context of user television equipment 200, which uses set-top box 202 as its receiver or tuner. If desired, user television equipment 200 may include multiple tuners which may be used for simultaneously watching one program and recording another. Illustrative interactive television program guides with simultaneous watch and record capabilities are illustratively described, for example in Lemmons et al., U.S. patent application Ser. No. 09/329,850, filed Jun. 11, 1999, which is hereby incorporated herein by reference in its entirety.

Set top box 202 may be connected to recording equipment 204. Recording equipment 204 may include PVR 208, VCR 210, or any other suitable recording device. Recording equipment 204 may include one or both of PVR 208 and VCR 210.

If the user desires to record a program, set-top box 202 may be manually or automatically tuned to a particular channel and control signals may be sent to recording equipment 204 to record that program.

Data link 209 may connect PVR 208 and VCR 210, and may be a cable link or any other suitable data link. Data link 209 may be used to transfer audio/video signals for programs between PVR 208 and VCR 210.

Set-top box 202 may send audio/video signals and signals that are representative of graphics to display device 206 for presentation to the user. If desired, set-top box 202 may route signals to display device 206 through recording equipment 204. If desired, set-top box 202, recording equipment 204, and display device 206 may be configured in such a way that graphics generated by set-top box 202 and volume changes that occur when recording equipment 204 is recording are not saved as part of the recording. Display device 206 may be a television, a computer monitor, a computer system with a monitor and speakers, a flat panel display, or any other suitable display device.

Set-top box 202 may be arranged in a client/server relationship with PVR 208. In one embodiment of the present invention, set-top box 202 may function as a server and PVR 208 may function as a client. All requests for information received from remote control 212 or other input devices may be routed first through set-top box 202. If, for example, a user requests PVR information or a PVR recording, the request may first be processed by set-top box 202 which may communicate with PVR 208 to obtain the information or recording. Set-top box 202 may send audio/video signals and signals that are representative of graphics to display device 206 based on communications with PVR 208. Other arrangements for establishing communications and operations between PVR 208 and set-top box 202 may also be used. Other arrangements for establishing communications and operations with display device 206 may also be used.

Personalization information for one or more users may be stored on set-top box 202, on personal video recorder 208, on server 112 of FIG. 1, on combinations thereof, or on any other suitable equipment. Personalization information may include user profiles, preferences, viewing history, recording history, etc. Personalization information may be used to automatically record programs that match the personalization information. Programs may be recorded when information related to an upcoming program matches personalization information for a user such as a user's preferences or may be recorded when information related to an upcoming program compares well with stored personalization information. Illustrative interactive television program guides having personalization features are shown in Thomas et al., U.S. patent application Ser. No. 09/974,646, filed Oct. 9, 2001, which is hereby incorporated herein by reference in its entirety.

A user may interact with any of the components in user television equipment 200 and with an interactive television application using one or more input devices, such as remote control 212. Remote control 212 may have various buttons that may be pressed by the user to interact with portions of an interactive television application such as an interactive television program guide. For illustrative purposes, many aspects of the present invention are discussed primarily in the context of an input device that is a remote control. Other suitable input devices such as a conventional keyboard, a wireless keyboard, a touch screen display remote, a handheld computer, a mouse, a trackball, or a touch pad may also be used.

An interactive television application such as an interactive television program guide application may be implemented locally on user equipment 200 or may be implemented using a client-server or distributed architecture where some of the program guide application is implemented locally on user equipment 200. Client-server program guides are illustratively described, for example, in Ellis et al., U.S. patent application Ser. No. 09/374,043, filed Aug. 13, 1999, which is hereby incorporated herein by reference in its entirety. If desired, an interactive television application for providing the features and functionality discussed herein may be partly implemented on PVR 208 and/or set-top box 202.

Figure 2B:
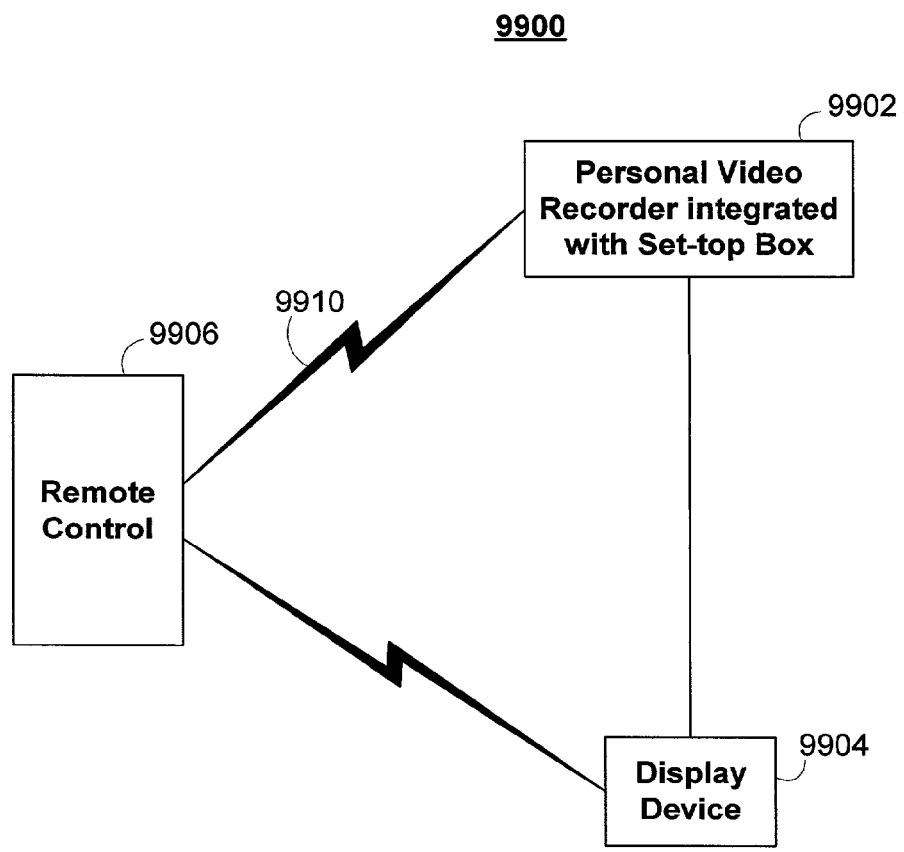
FIG. 2B shows a diagram of illustrative user equipment that includes a set-top box with an integrated personal video recorder in accordance with one embodiment of the present invention.

FIG. 2B shows another embodiment of user television equipment 9900 in which a personal video recorder is integrated with a set-top box. With reference now to FIG. 2B, user equipment 9900 may include PVR integrated set-top box 9902, display device 9904, and remote control 9906. PVR integrated set-top box 9902 may be connected to display device 9904. If desired, user television equipment 9900 may include a recording device such as a VCR that is arranged in between set-top box 9902 and display device 9904. Other arrangements for connecting set-top box 9902, display device 9904, and a recording device may also be used.

PVR integrated set-top box 9902 may receive signals transmitted by distribution facility 110 (FIG. 1). PVR integrated set-top box 9902 may include a storage device or memory for storing personal user preferences settings, user-selected reminders, recordings, program information, or other information. If desired, the PVR that is part of set-top box 9902 may be used to store such information. PVR hardware and/or software may be integrated with set-top box hardware and/or software to provide set-top box 9902. If the user desires to record a program, set-top box 9902 may tune to a particular channel and may record that program using the integrated PVR. If desired, the interactive television application may provide the user with the ability to transfer PVR recorded audio/visual signals between set-top box 9902 and a recording device that is external to set-top box 9902.

A user may interact with the components in user television equipment 9900 and with an interactive television application using one or more input devices, such as remote control 9906 through wireless link 9910.

Figure 2C:
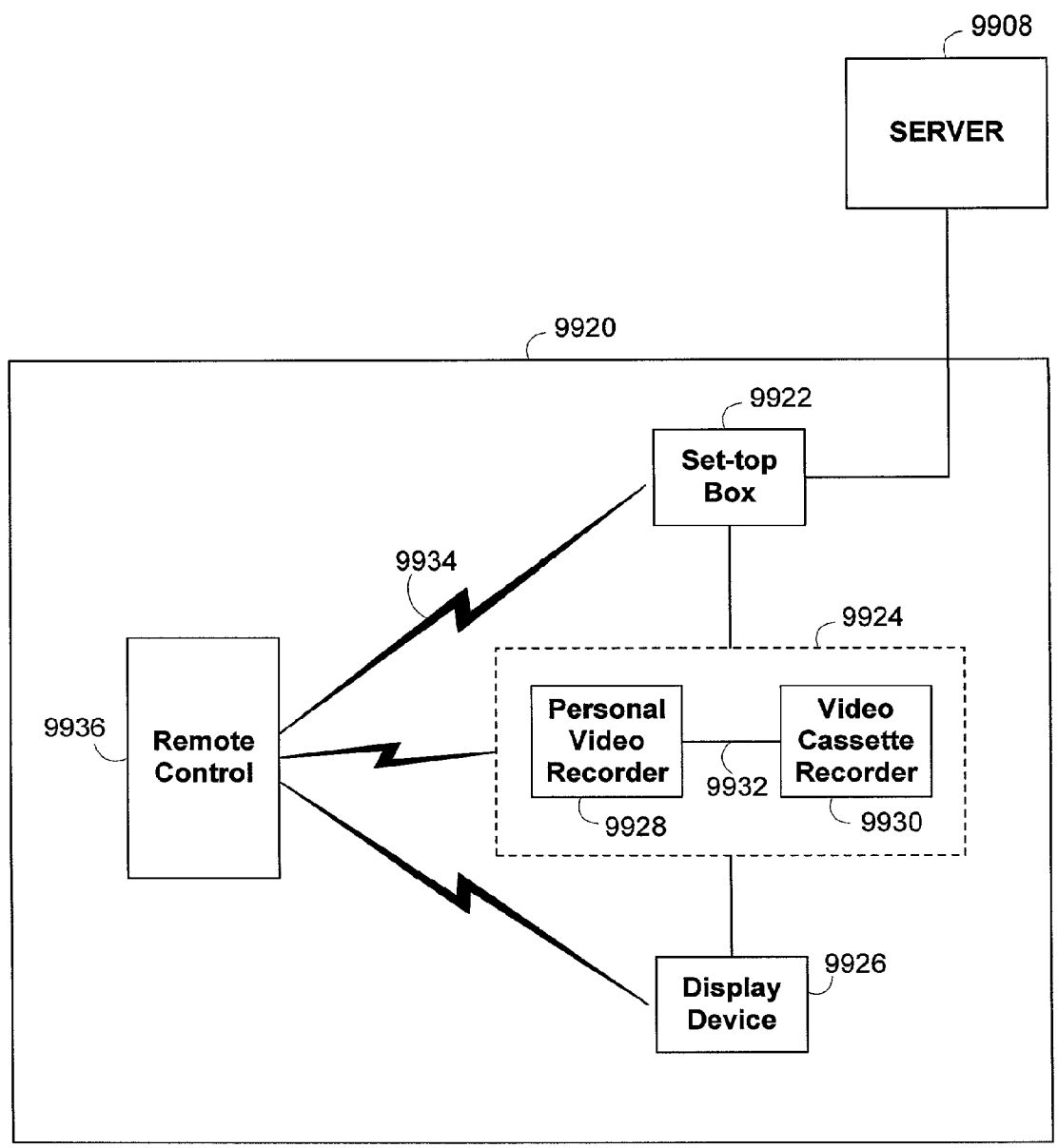
FIG. 2C shows a diagram of illustrative user equipment with a remote server for storing recorded content in accordance with one embodiment of the present invention.

FIG. 2C shows another arrangement for providing personal video recorder services in which a remote server is used to provide personal video recorder services. With reference now to FIG. 2C, user equipment 9920 may include set-top box 9922, display device 9926, and remote control 9936. User equipment 9920 may include equipment such as set-top box 9922 for communicating with server 9908. Server 9908 may be configured to provide personal video recorder services to user equipment 9920. Server 9908 may for example automatically record programs for user equipment 9920 or may record programs based on user selections. Server 9908 may playback recordings for display on display device 9926. Other PVR related features may also be provided. Server 9908 may be a server located at a distribution facility such as distribution facility 110 of FIG. 1 or may be located at some other suitable location.

If desired, user equipment may include recording equipment 9924 which may include one or more recording devices such as personal video recorder 9928 and videocassette recorder 9930. Recording equipment 9924 may, if desired, provide additional recording features and/or capabilities to a user. For example, recording equipment 9924 may be used to record or transfer programs that are playing from or stored on server 9908. Set-top box 9922 may receive signals transmitted by distribution facility 110 (FIG. 1). Set-top box 9922 may include a storage device or memory for storing personal user preferences settings, user-selected reminders, or other information. If desired, server 9908 or recording device 9924 may also be used for storing such information.

Set-top box 9922 may send audio/video signal and signals that are representative of graphics through recording equipment 9924 to display device 9926 for presentation to the user. A user may interact with any of the components in user equipment 9920 and with an interactive television application using one or more input devices, such as remote control 9936 through wireless link 9934. Remote control 9936 may be used interact with server 9908 through set-top box 9922. Examples of these and other options are illustratively shown in Rudnick et al., U.S. patent application Ser. No. 09/330,860, filed Jun. 16, 1998, which is hereby incorporated by reference herein in its entirety.

Figure 3:
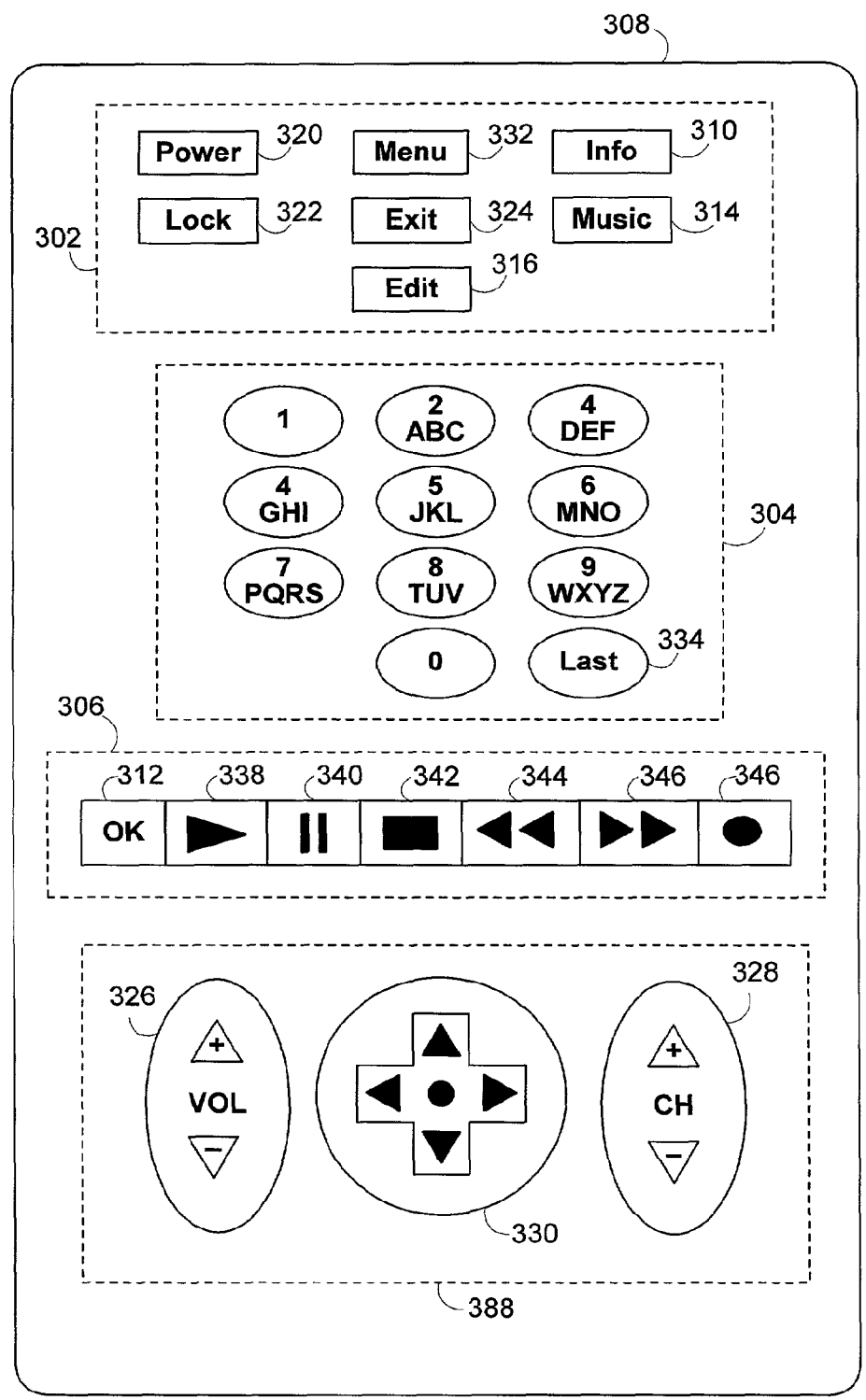
FIG. 3 shows a diagram of a remote control in accordance with one embodiment of the present invention.

FIG. 3 shows illustrative remote control 308 that may include various function buttons. Remote control 308 may include primary option buttons 302 that may provide a user with access to frequently used actions in an interactive television application. Primary option buttons 302 may include power button 320, menu button 332, info button 310, lock button 322, exit button 324, music button 314, and edit button 316. Menu button 332 may provide the user with the ability to cause a menu display screen to be displayed. Info button 310 may provide the user with the ability to display an information display screen. Lock button 322 may provide the user with the ability to modify access privileges to certain programs, channels, or other television content. Exit button 324 may provide the user with the ability to exit a program guide or other application. Music button 314 may provide the user with the ability to listen to music channels that carry audio. Edit button 316 may provide the user with the ability to edit stored program content, such as to remove commercials, remove pieces of a program, or perform other editing functions.

Remote control 308 may include alphanumeric buttons 304 that may be used for entry of alphanumeric characters. Alphanumeric buttons 304 may further include last button 334 which may provide the user with the ability to return to the last channel that was watched or the last screen that was displayed.

Remote control 308 may include task buttons 306 that may provide means for directing a task to be performed by user equipment (e.g., user equipment 200 of FIG. 2A). Task buttons 306 may include, for example, play button 338, pause button 340, stop button 342, rewind button 344, fast-forward button 346, record button 336, "OK" button 312, or any other suitable task button.

Remote control 308 may include control buttons 388 that may include volume control buttons 326, navigation buttons 330, and channel control buttons 328. Navigation buttons 330 may provide the user with the ability to adjust or move a desired element (e.g., a cursor, a highlight window, etc.) vertically or horizontally in a display screen. For example, if the desired element is a cursor in an interactive television application display screen, navigation buttons 330 may be used to move the cursor in the display screen. "OK" button 312 in task buttons 306, in combination with navigation buttons 330, may provide the user with the ability to make on-screen selections. Remote control buttons are also sometimes referred to herein as remote control keys.

Figure 4:
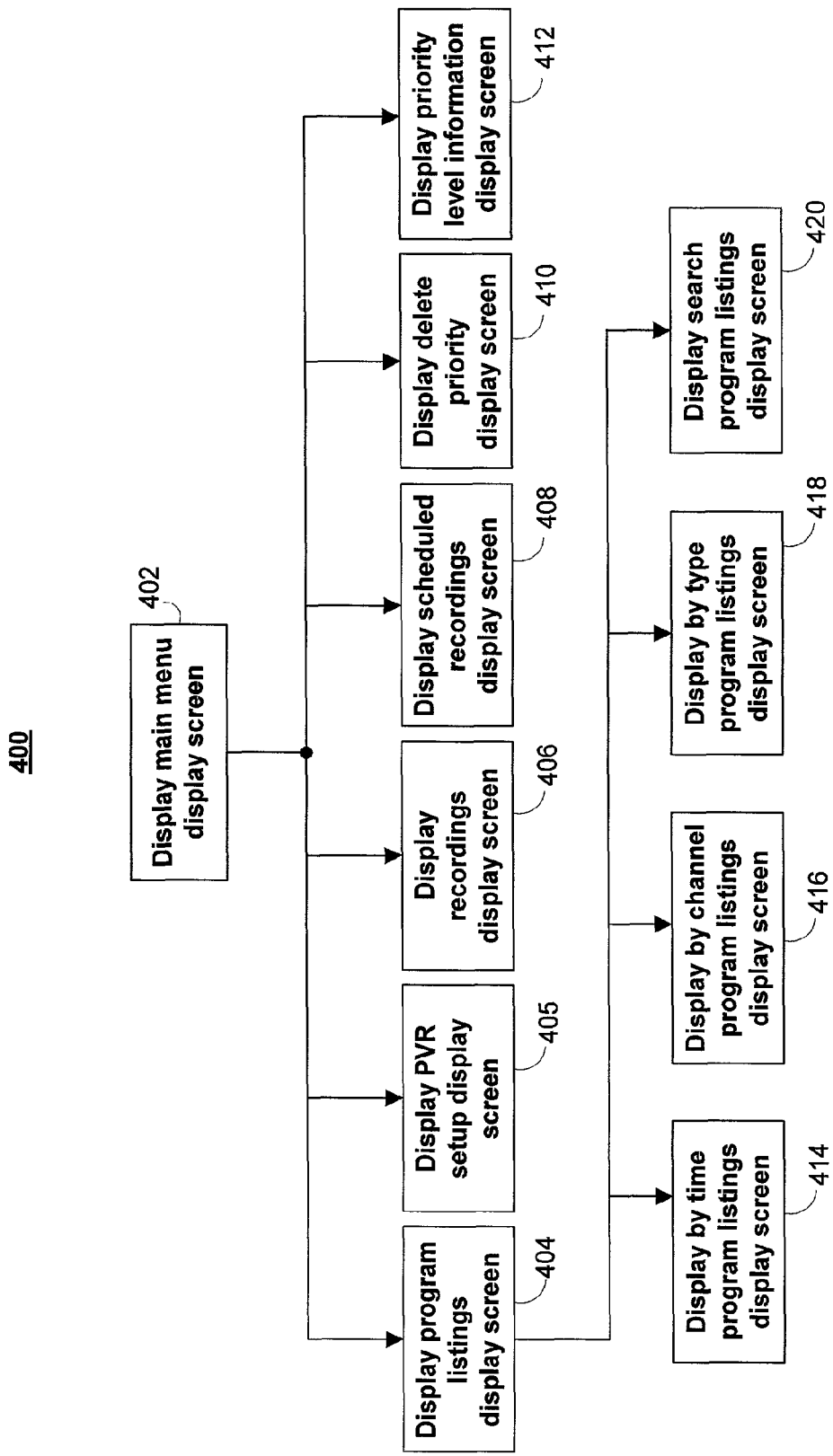
FIG. 4 shows an illustrative process including steps that may be used in accessing PVR-related program guide functions from a main menu display screen in accordance with one embodiment of the present invention.
Figure 5:
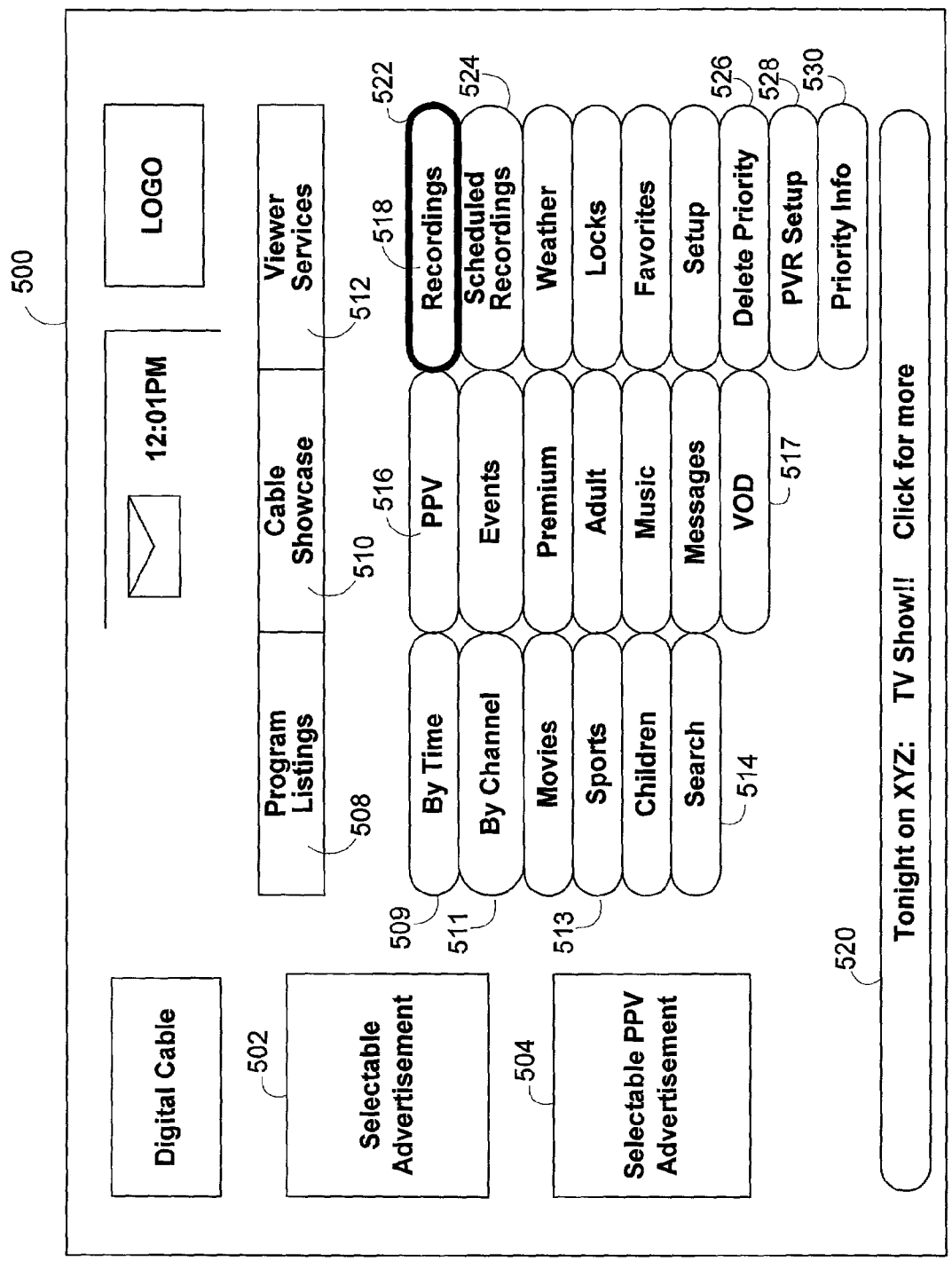
FIG. 5 shows an illustrative main menu display screen in accordance with one embodiment of the present invention.

Personal video recorder features may, for example, be accessed through a main menu of an interactive television program guide. FIG. 4 shows illustrative process 400 for accessing PVR-related functions from a main menu display screen. With reference now to FIG. 4, at step 402, the interactive television application may display a main menu display screen (one example of which is shown in FIG. 5). Step

402 may be performed for example when a user presses a remote control menu button or when the user takes other suitable actions. At step 402, the IPG application may provide the user with the ability to access a program listings display screen, a recordings display screen, a scheduled recordings display screen, or any other suitable screens or options from a main menu display screen.

At step 404, the interactive television application may display a program listings display screen when a user for example selects a program listings option that is displayed in a main menu display screen.

Different types of program listings display screens may be displayed. At step 414, the interactive television application may display a by time program listings display screen when a user, for example, selects a by time program listings option. At step 416, the interactive television application may display a by channel program listings display screen when a user, for example, selects a by channel program listings option. At step 418, the interactive television application may display a by type program listings display screen when a user, for example, selects a by type program listings option. At step 420, the interactive television application may display a search program listings display screen when, for example, search results from a search selected by a user are displayed. Illustrative display screens that may be provided based on steps 414, 416, 418, and 420 are shown in FIGS. 7 and 13-15.

Figure 17:
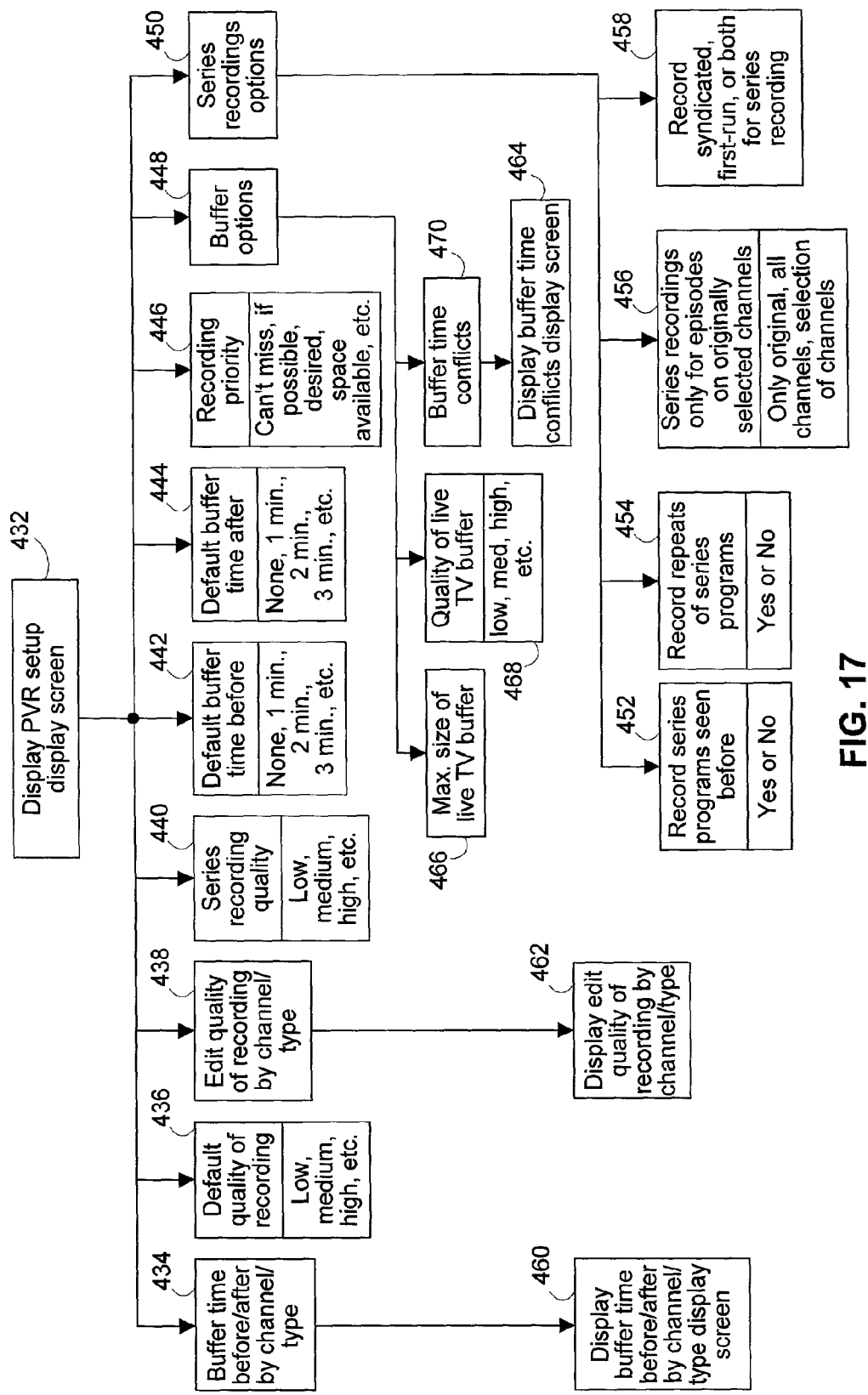
FIG. 17 shows an illustrative process that may be used for setting PVR default setup options in accordance with one embodiment of the present invention.
Figure 35:
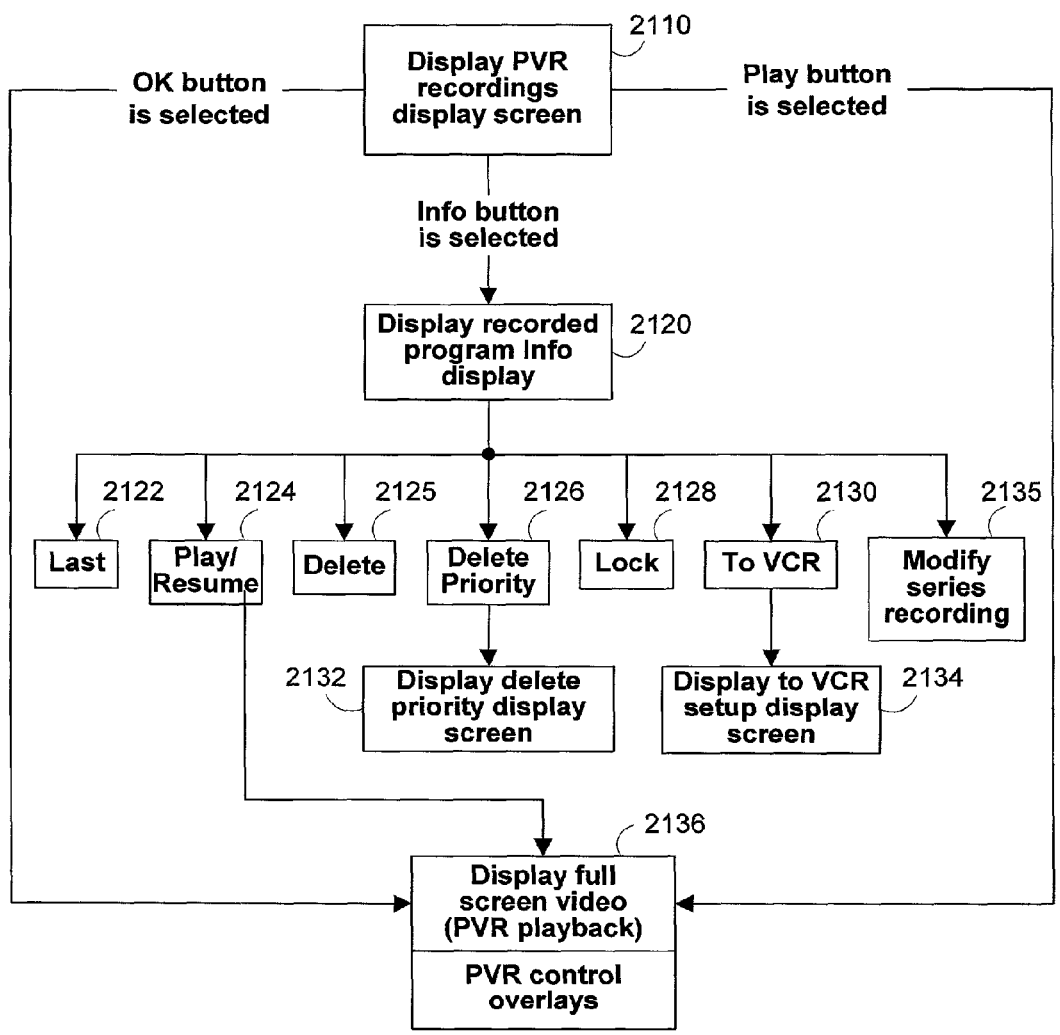
FIG. 35 shows an illustrative process that may be used in displaying a recording information display screen in accordance with one embodiment of the present invention.
Figure 42:
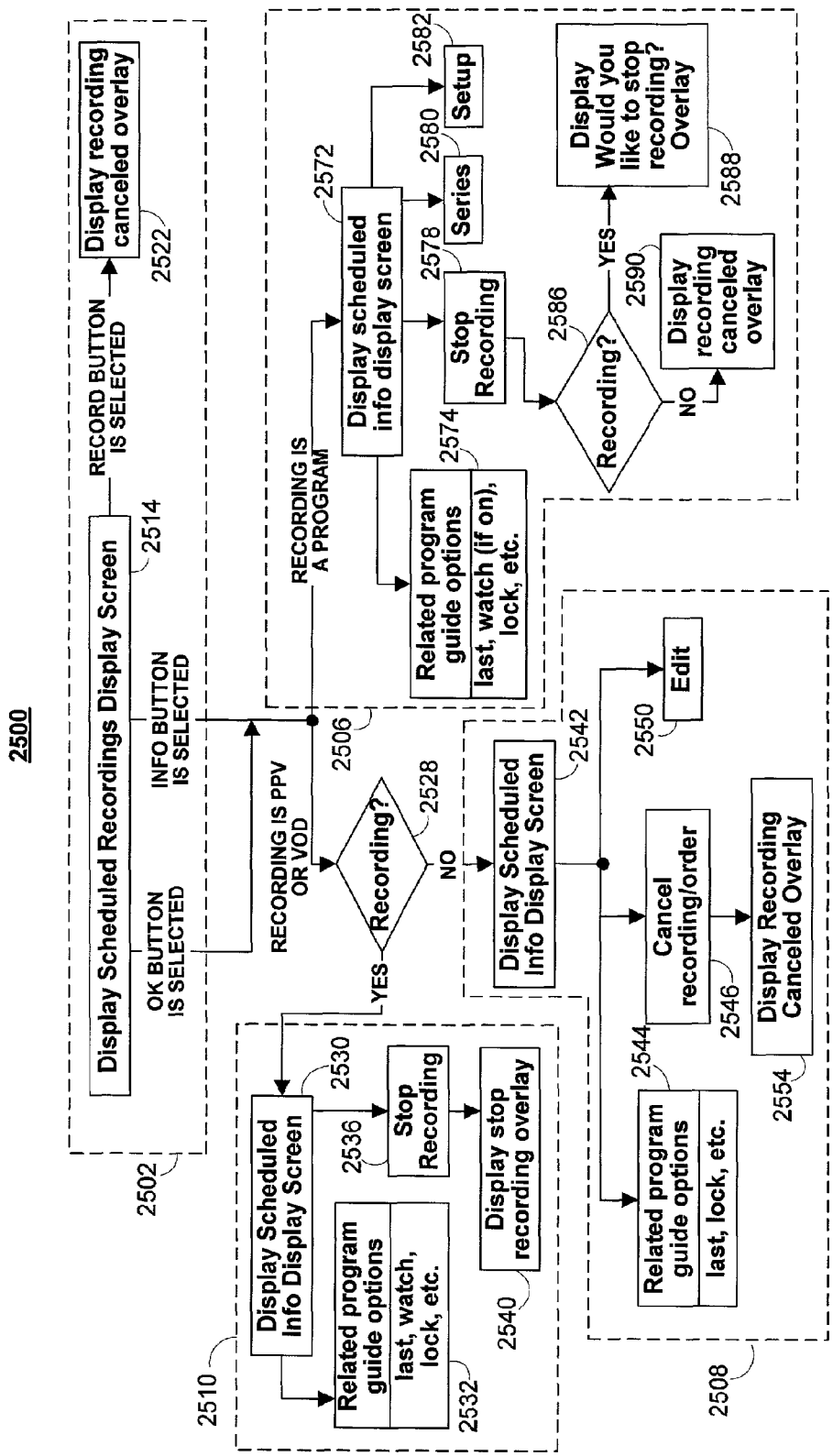
FIG. 42 shows an illustrative process that may be used in displaying a scheduled recording information display screen in accordance with one embodiment of the present invention.

At step 405, the interactive television application may display a PVR setup display screen when a user, for example, selects a PVR setup option that is displayed in a main menu display screen. Illustrative steps involved in providing step 405 are shown in FIG. 17. At step 406, the interactive television application may display a recordings display screen when a user for example selects a recordings option that is displayed in the main menu display screen. Illustrative steps involved in providing step 406 are shown in FIG. 35. At step 408, the interactive television application may display a scheduled recordings display screen when a user for example selects a scheduled recordings option that is displayed in the main menu display screen. Illustrative steps involved in providing step 408 are shown in FIG. 42. At step 410, the interactive television application may display a delete priority display screen when a user for example selects a delete priority option that is displayed in the main menu display screen. At step 412, the interactive television application may display a priority level information display screen when a user for example selects a priority information option that is displayed in the main menu display screen.

FIG. 5 shows illustrative main menu display screen 500 that may be provided by an interactive television application. Display screen 500 may include selectable advertisement 502, selectable PPV advertisement 504, and selectable horizontal bar advertisement 520. Display screen 500 may also include various menu headings, such as program listings heading 508, cable showcase heading 510, and viewer services heading 512. Program listings heading 508 may be a heading for options for displaying program listings such as by time option 509, by channel option 511, sports option 513, and search option 514. Cable showcase heading 510 may be a heading for options that are showcased by the cable provider such as PPV option 516 and VOD option 517. Viewer services heading 512 may be a heading for options for providing various interactive services such as PVR services to a user. Such options may include recordings option 518, scheduled recordings option 524, delete priority option 526, PVR setup option 528, and priority information option 530.

Display screen 500 may include highlight window 522. An interactive television application may provide a user with the ability to move highlight window 522 within display screen 500 using remote control navigation buttons. A user may be provided with the ability to select an item on display screen 500 by pressing a data entry button, such as a remote control "OK" button when highlight window 522 is positioned over that item.

If desired, the interactive features that are provided in display screen 500 may be accessed through other means.

Figure 6:
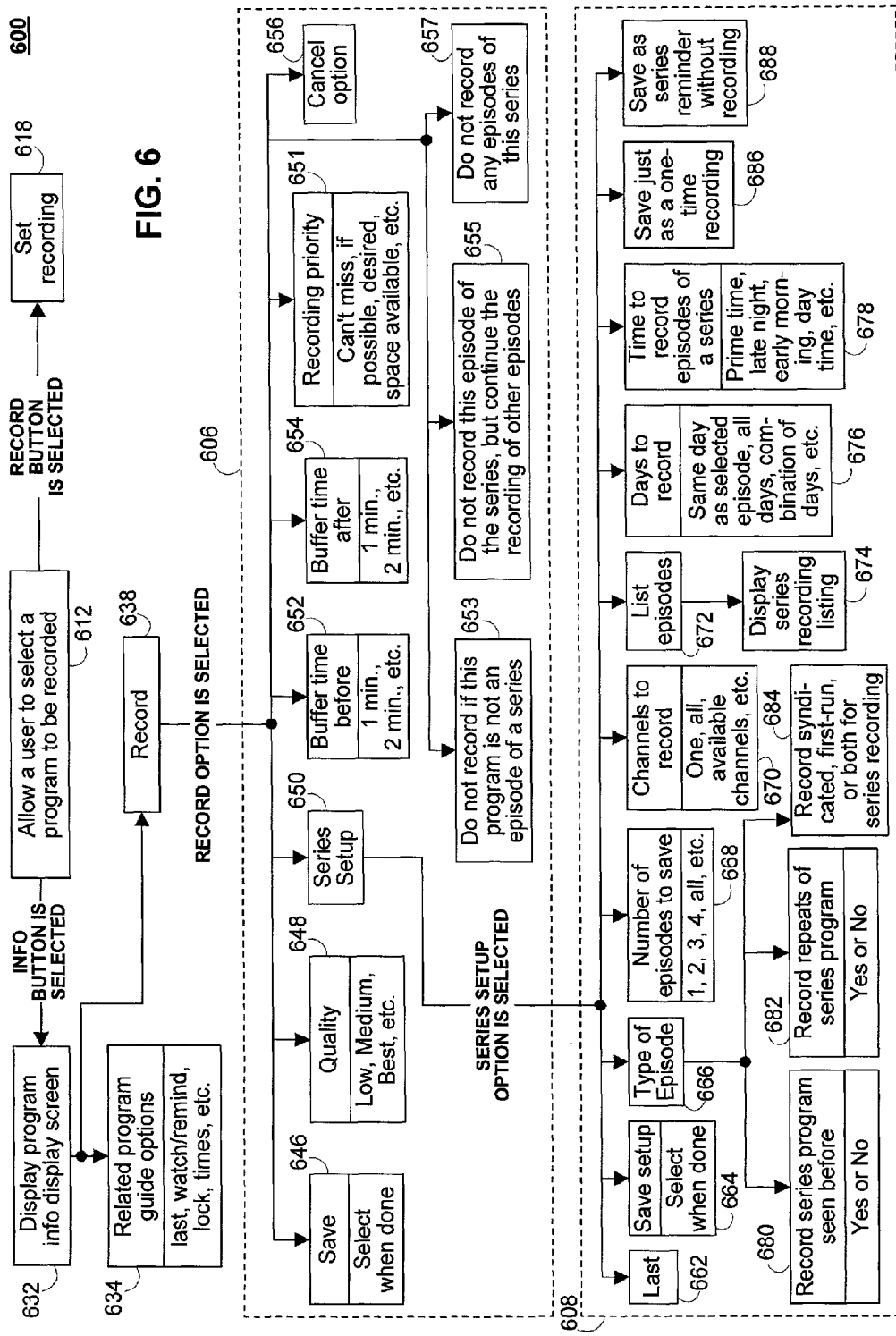
FIG. 6 shows an illustrative process that may be used in selecting and configuring a recording of a program in accordance with one embodiment of the present invention.

An interactive television application may permit users to schedule and configure recordings for PPV and non-PPV programs from a listings screen, a browse overlay, a flip overlay, program video, an advertisement, or any other suitable location. FIG. 6 shows illustrative process 600 for selecting and configuring a non-PPV and non-VOD program to be recorded. At step 612, an interactive television application may allow a user to select a program to be recorded by selecting a record button for a program. The record button may be selected from practically any suitable display screen, overlay, or video that a user is watching. The record button may be pressed for a program listed in a program listings display screen, in a browse overlay, in a flip overlay, in a grid, in an advertisement, or in any other suitable video or graphic. A user may select a program to be recorded by pressing a record button when a user is watching that program. A user may highlight a program in an overlay or display screen and press a record button to select that program to be recorded. In a display screen that does not support the use of highlight windows, a user may simply press a record or "OK" button to select the record feature. An information option may be selected for example by moving a highlight window over a program listing and pressing a remote control info button. At step 618, in response to the user pressing a remote control record button for a particular program, the interactive television application may schedule that program for a one-time recording with default settings.

At step 632, a program information display screen may be displayed when a user selects an information option for a particular program. The program information display screen may include information describing that program. The interactive television application may provide a user with related program guide options at step 634. Related program guide options may include last, watch/remind, lock, other air times, and other suitable program guide options. Examples of these and other options are illustratively shown in Rudnick et al., U.S. patent application Ser. No. 09/356,268, filed Jul. 16, 1999, which is hereby incorporated by reference herein in its entirety. At step 638, a record option may be displayed in the program information display screen to provide the user with the ability to select a record option for the program that is described in the information display screen.

If the user selects a record option, the interactive television application may proceed to step 606. At step 606, the interactive television application may provide the user with the ability to setup a recording. Step 606 may include steps 646, 648, 650, 651, 652, 653, 654, 655, 656, and 657. At step 648, the interactive television application may provide the user with the ability to select the recording quality that will be used for the recording. For example, the user may select low quality, medium quality, high quality, or any other suitable recording quality. At steps 652 and 654, the interactive television application may provide the user with the ability to respectively set the length of the recording buffers that will be used before and after the scheduled broadcast time of a program that is to be recorded. The length of a recording buffer may, for example, be set to one minute, two minutes, or any other suitable length of time. Examples of interactive television program guides that have features for setting recording buffers are shown in Ellis et al., U.S. patent application Ser. No. 09/821,005, filed Mar. 29, 2001, which is hereby incorporated by reference herein in its entirety. Other examples of interactive television program guides that have features for setting recording buffers are shown in Ellis et al., U.S. patent application Ser. No. 08/924,239, filed Sep. 5, 1997 which is hereby incorporated by reference herein in its entirety.

At step 651, the interactive television application may provide the user with the ability to set the recording priority for a program. The recording priority options may, for example, include a can't miss priority, an if possible priority, a desired priority, an if space available priority, or any other suitable recording priority. A can't miss recording priority may indicate that the program must be recorded, in preference to all other programs airing simultaneously, and recordings may be deleted to clear space for the program. An if possible priority may indicate that the program should be recorded if at all possible, unless there are conflicts with can't miss programs airing simultaneously, or unless any can't miss programs that are recorded would have to be deleted. A desired priority may indicate that the user would like the program to be recorded, unless there are conflicts with can't miss priority programs or with if possible priority programs, or unless any can't miss priority programs or if possible priority programs that are recorded would have to be deleted. An if space available priority may indicate that the program should be recorded if there is space to do so and if it does not conflict with any higher priority programs.

At step 650, the interactive television application may provide the user with the ability to select a series setup option. A series setup option may only be available if the selected program is part of a series. At step 646, the interactive television application may provide the user with the ability to select a save option to schedule the currently selected program to be recorded and to save the recording settings to be used for that recording. In response to a selection of a save option at step 646, the interactive television application may also set a reminder for the scheduled recording.

At step 656, the interactive television application may provide the user with the ability to cancel and exit to the previous display screen. At step 653, the interactive television application may provide the user with the ability to select an option to not record a program if that program is not actually an episode of a series that has been selected for a series recording. At step 655, the interactive television application may provide the user with the ability to select an option to not record a particular episode of a series that has been selected for series recording, but to continue to record other episodes of the series. At step 657, the interactive television application may provide the user with the ability to select to not record any further episodes of a series that was selected to be series recorded.

If the user selects the series setup option, the interactive television application may proceed to step 608. At step 608, the interactive television application may provide the user with the ability to setup a series recording based on a currently selected program. A series recording allows the user to record a series of episodes in a particular program series. Step 608 may include steps 662, 664, 666, 668, 670, 672, 674, 676, 678, 680, 682, 684, 686, and 688. At step 664, the interactive television application may provide the user with the ability to select a save option to have the interactive television application schedule a series of recordings and to save the series setup settings that the user selected. At step 666, the interactive television application may provide type of episode options that may include steps 680, 682, and 684. At step 680, the interactive television application may provide the user with the ability to select whether the interactive television application should record programs seen before. At step 682, the interactive television application may provide the user with the ability to select whether the interactive television application should record series programs that are repeats. At step 684, the interactive television application may provide the user with the ability to select to record syndicated episodes, first-run episodes, or both syndicated and first-run episodes for a series recording.

At step 668, the interactive television application may provide the user with the ability to choose the maximum number of series episodes to save on a PVR. For example, the user may choose to save one episode, two episodes, three episodes, all episodes, or any other suitable number of episodes. If the user selects a specific number of episodes to save, the interactive television application may automatically delete a previously recorded episode when a new episode is recorded to maintain the total number of saved episodes at the number selected by the user. Previously recorded episodes may be deleted based on the age of a recording, based on the viewing status with respect to one or more users, or based on other criteria. If the user selects the total number of episodes to be all recorded episodes, programs other than episodes in that series may be deleted first in order to free storage space for recordings.

At step 670, the interactive television application may provide the user with the ability to limit the channels on which programs in a series will be recorded. For example, the user may choose the recording channel(s) for a series recording to be the original channel from which the current series recording was scheduled, to be all possible channels, to be a user-selected selection of channels, or to be any other suitable selection of channels. At step 672, the interactive television application may provide the user with the ability to select to view a list of episodes or programs in the series. If the user selects to view the list of programs in the series, the interactive television application may proceed to step 674 to have the list of programs displayed.

At step 676, the interactive television application may provide the user with the ability to limit on which days the program may be recorded. For example, the user may choose to record episodes that air on the same day of the week as the selected episode, that air on any day of the week, or that air on some other combination of days. At step 678, the interactive television application may provide the user with the ability to select at which time of day a program may be recorded. For example, the user may choose to have a program recorded at prime time, late night, early morning, day time, same time of day as the selected episode (i.e., episode for which record option was selected), or any other time, or combination of times. At step 686, the interactive television application may provide the user with the ability to exit a series recording setup display screen and schedule the program as a one-time recording. At step 688, the interactive television application may provide the user with the ability to save the settings for a series recording as a series reminder without scheduling any recordings.

Figure 7:
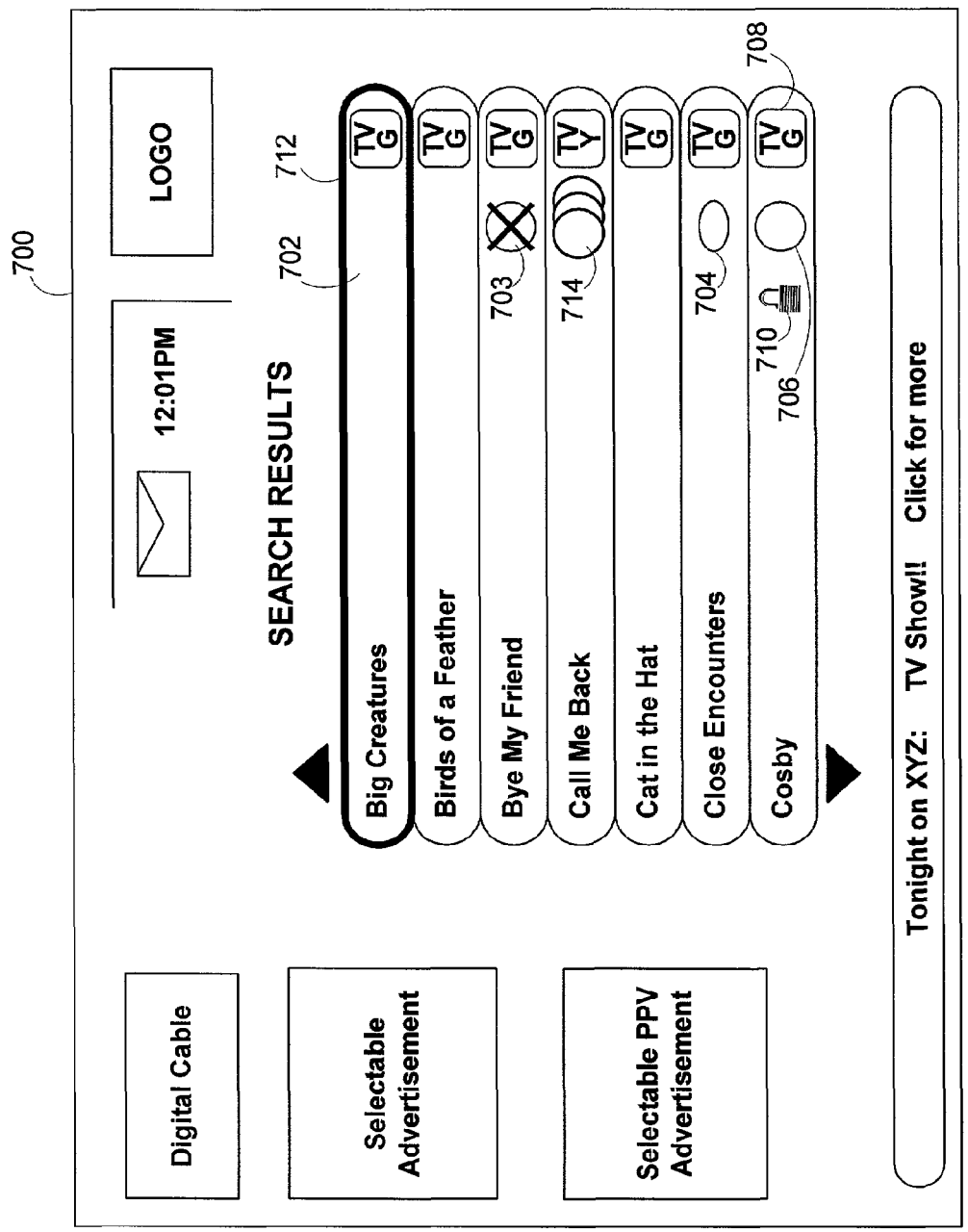
FIG. 7 shows an illustrative search program listings display screen in accordance with one embodiment of the present invention.

PVR related functionality may be integrated into a program listings display screen or any screen that shows one or more programs or information about one or more programs. FIG. 7 shows illustrative program listings display screen 700 that may be provided by the interactive television application. Display screen 700 may be displayed in response to the use of a search option. Display screen 700 may include a list of program titles that are presented in listing bars 702. A program listing in listing bars 702 may include recorded content icon 704 that indicates that a recording for that listing is currently available for playback. Recorded content icon 704 may permit users to distinguish between programs that are available for playback from a PVR and programs that will be airing in the future. Future programs may include VOD programs, PPV programs, broadcast television programs, or other programming that is available through a source other than a PVR.

A program listing may include scheduled recording icon 706 to indicate that a program that is identified in that listing is scheduled to be recorded. Scheduled recording icon 706 may be displayed for a particular program for example, when a user has selected a record option for that program, or when an interactive television application schedules that program to be recorded based on user profile information. A program listing may include a cancelled recording priority icon 703 to indicate that a program that was scheduled to be recorded may not be recorded due to a conflict that the interactive television application resolved by canceling the scheduled recording based on recording priorities. Priorities are discussed in more detail in connection with FIG. 9. Display screen 700 may include content rating icon 708 to indicate program content ratings.

Display screen 700 may include parental control icon 710 to indicate that a program is parentally locked. In display screen 700, the program Cosby may be parentally locked and may also be scheduled for recording. A listing for Cosby includes both parental lock icon 710 and scheduled recording icon 706. Despite the lock status of the program, the interactive television application may still record the program. If a user desires to watch a locked program while it is being recorded, the user may be required to enter a parental control code. Parental locks may always be enforced on playback, in that the parental control code may be required for playback of any program that has a locked title, rating, or channel. Examples of parental control locks and other related options are illustratively shown in Herrington et al., U.S. patent application Ser. No. 09/635,596, filed Aug. 9, 2000, which is hereby incorporated by reference herein in its entirety.

Series recording icon 714 may be included in a listing to indicate that a series recording has been set for that particular listing. Scheduled recordings and series recordings may be intermixed with other listings in display screen 700. If there are recorded episodes or upcoming episodes for a particular program or series that is listed in display screen 700, only one listing for that program or series may be included in display screen 700. Selecting that program in display screen 700 may cause the display of an information display screen for an oldest recorded episode of that program and may cause the display of a times option in the information display screen that may allow a user to access information on other recorded and upcoming episodes of that program.

The interactive television application may provide the user with the ability to select a record option for a particular program by moving highlight window 712 over a listing bar such as listing bar 702 for a particular program and pressing remote control record button. In response to the selection of the record option, the interactive television application may set a particular program to be recorded. The interactive television application may schedule a one-time recording for that program using default recording configuration settings. If a user presses a record button a second time, the interactive television application may schedule a series recording based on a currently highlighted program when the currently highlighted program is part of a series. If a user presses a remote control record button a third time, the interactive television application may cancel a series recording. If a currently highlighted program is not part of a series, pressing a remote control record button may toggle the record setting for that program.

The interactive television application may provide the user with the ability to select an information option for a particular listing by moving highlight window 712 over a listing bar such as listing bar 702 and pressing a remote control info button. Program information display screen 800 of FIG. 8 may be displayed in response to the selection of an information option for a particular listing.

Figure 8:
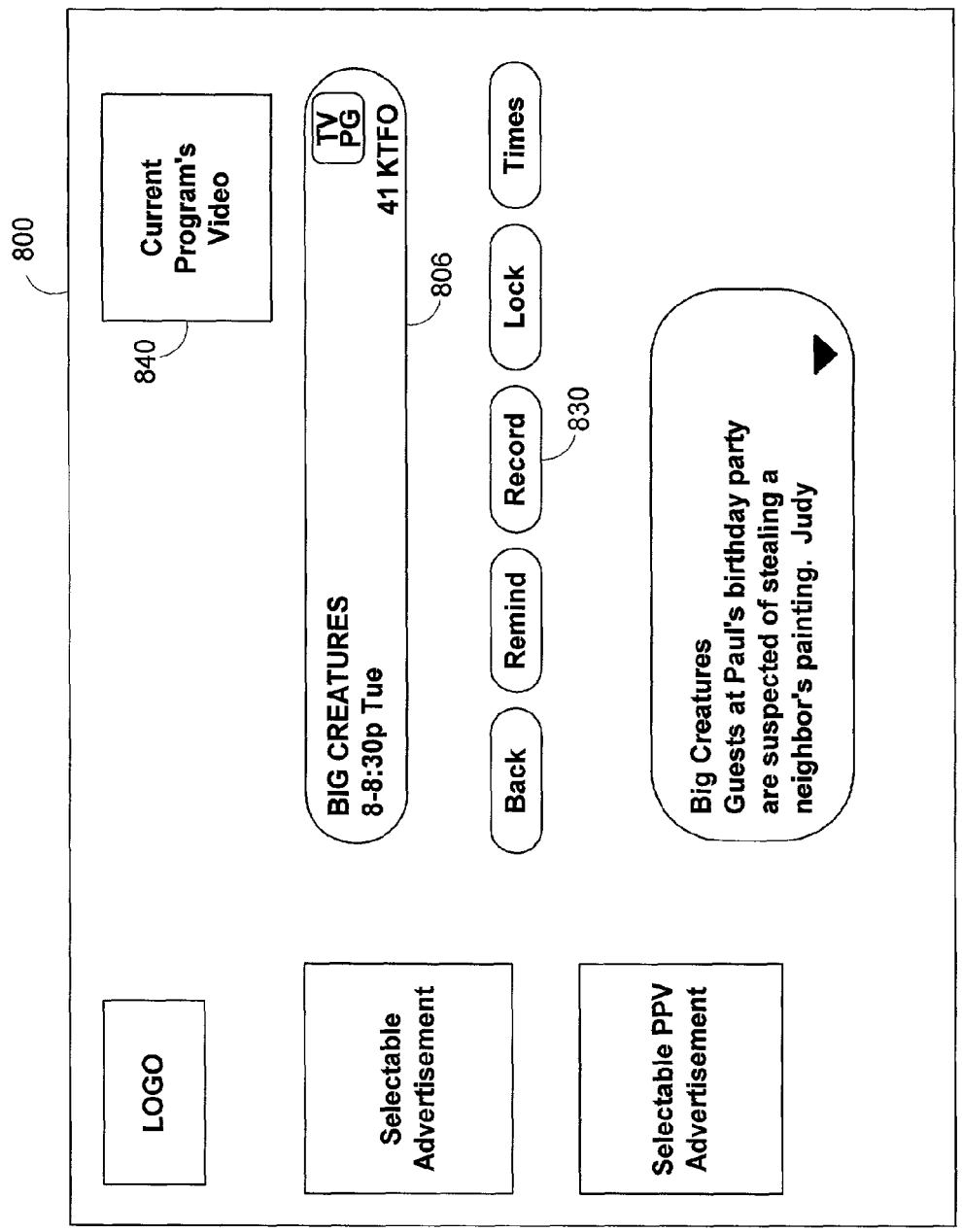
FIG. 8 shows an illustrative program information display screen for a non-PPV and non-VOD program that a user selected to be recorded in accordance with one embodiment of the present invention.

An interactive television application may display program information display screens that are configured differently for different programs based on whether programs are PPV programs, whether programs are available for playback from a PVR, whether programs are programs that are scheduled to be recorded, whether programs are currently airing, whether programs are VOD programs, etc. FIG. 8 shows illustrative program information display screen 800 for a non-PPV program that may be provided by the interactive television application. With reference now to FIG. 8, display screen 800 may include title display bar 806 and may include program video 840 for a program that is currently airing on a tuned channel.

Display screen 800 may include record option 830. In response to a selection of record option 830 or a user pressing a remote control record button, the interactive television application may display program recording setup display screen 900 shown in FIG. 9.

Figure 9:
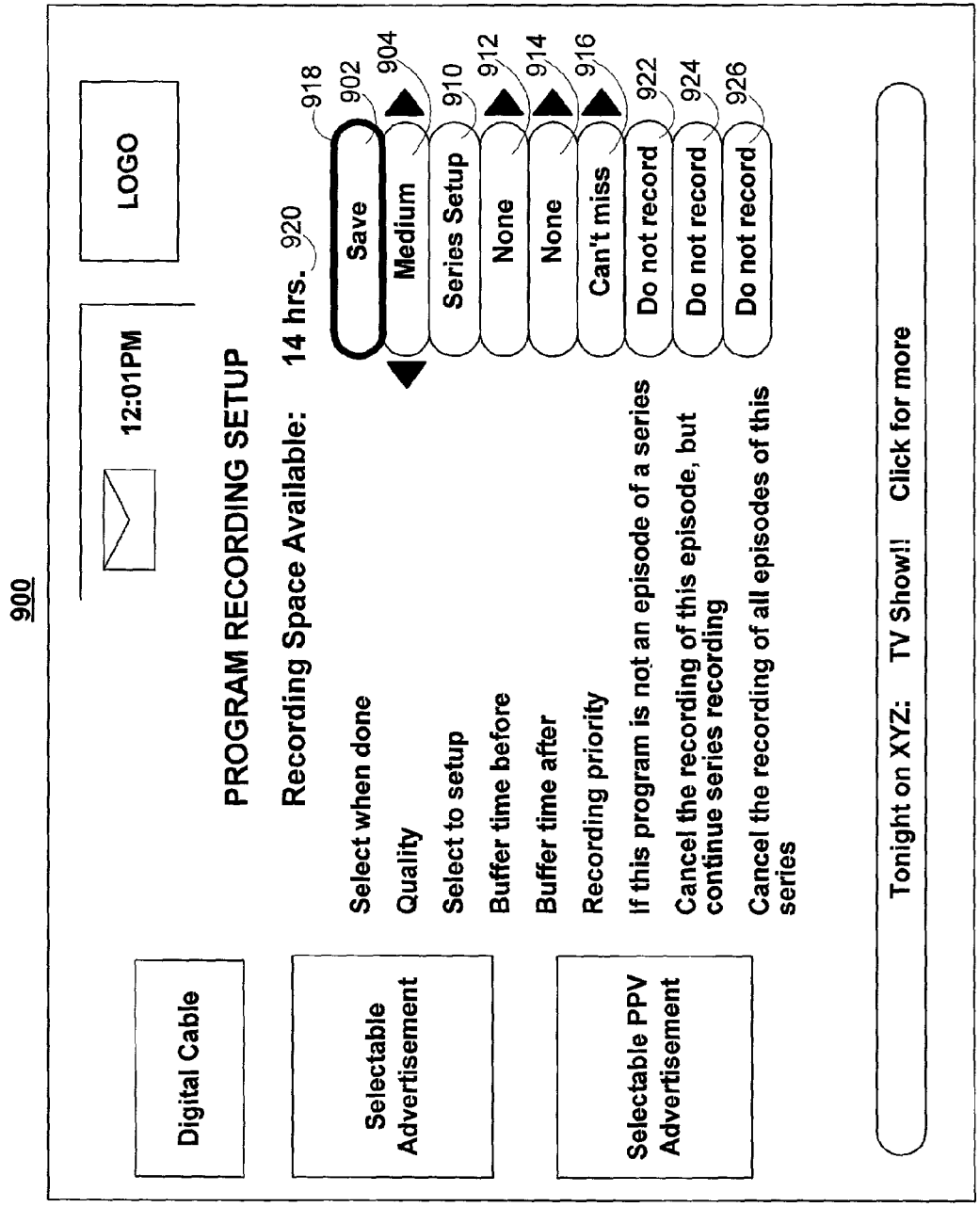
FIG. 9 shows an illustrative program recording setup display screen for a non-PPV and non-VOD program in accordance with one embodiment of the present invention.

FIG. 9 shows illustrative program recording setup display screen 900 that may be provided by the interactive television application. Display screen 900 may provide the user with the ability to set or modify various recording settings, including the ability to schedule one-time and series recordings. Save option 902, quality option 904, series setup option 910, buffer time before option 912, buffer time after option 914, recording priority option 916, not an episode option 922, cancel this episode option 924, and cancel all episodes option 926 may be provided based on illustrative steps 646, 648, 650, 651, 652, 653, 654, 655, and 657, shown in FIG. 6. Other options may be shown if desired. Series setup option 910, not an episode option 922, cancel this episode option 924, and cancel all episodes option 926 may be displayed when display screen 900 is displayed for a program that is part of a series or part of a series recording. To schedule a recording for the program for which record option 830 of FIG. 8 was selected, a user may select save option 902, which will schedule the recording with the default recording settings or with any recording settings that are selected by the user in display screen 900. If desired, the application may allow a user to select a record option for a program that already has a recording scheduled. In this case, the application may display a screen such as display screen 900 to allow the user to modify or cancel the recording.

If desired, the interactive television application may provide the user with the ability to schedule a manual recording by specifying a channel, date, time, and duration. Recordings may be scheduled for example for at least two weeks in advance by entering the channel, date, time, and duration. When the interactive television application identifies data matching the manual recording, the manual recording may be converted to a program-based recording (a one-time recording).

An interactive television application may also save content that is related to a program that is being recorded. Related content may include program information, Advanced Television Forum ("ATVEF") content, Wink Content, Advanced Compatible Television ("ACTV") streams, or other video, graphics, software, or text content. The interactive television application may allow a user to record a digital music channel when a user is listening to a channel or to record a digital music channel by manually selecting a date, time, channel, and duration for a recording. The interactive television application may record the title, track, artist and other music information related to the digital music recording.

Series setup option 910 may only be available if the selected program is an episode of a series. The interactive television application may not present a series setup option for PPV programs, and may not allow a user to configure series recordings for PPV programs. However, if a PPV program is part of a package (e.g., a recurring PPV program), the interactive television application may allow a user to configure a series recording for all programs in a package. To configure a series recording for a PPV package, the interactive television application may require a user to purchase a package before a series recording may be configured. If desired a package purchase option may be provided to a user as part of a recording setup screens.

The interactive television application may provide the user with the ability to move highlight window 918 over quality option 904 and to scroll through quality settings to set the recording quality to be used for a recording. The quality level may be set to low quality, medium quality, high quality, or some other suitable quality. The interactive television application may provide the user with the ability to move highlight window 918 over buffer time before option 912 or buffer time after option 914 and to use remote control navigation buttons to set the recording buffer time before and after to be used for a scheduled broadcast time of a program that is to be recorded. The recording buffer time may be set to no buffer time, one minute, two minutes, or any other suitable duration.

The interactive television application may provide the user with the ability to select not an episode option 922 by moving highlight window 918 over not an episode option 922 and pressing a remote control "OK" button. In response to a selection of not an episode option 922, the interactive television application records programs that are episodes in a series but does not record programs that actually are not episodes in that series. For example, in situations where a particular program has a title that matches a particular series, that program may not be recorded because that program may not actually be part of that series. The interactive television application may provide the user with the ability to select cancel this episode option 924 by moving highlight window 918 over cancel this episode option 924 and pressing a remote control "OK" button. In response to a selection of cancel this episode option 924, the interactive television application may provide the user with the ability to select to not record this episode of a series, but to continue to record other episodes of a series. The interactive television application may provide the user with the ability to select cancel all episodes option 926 by moving highlight window 918 over cancel all episodes option 926 and pressing a remote control "OK" button. In response to a selection of cancel all episodes option 926, the interactive television application may cancel the recording of any further episodes in a series and may cancel the series recording. Save option 902 may be used to schedule a recording and save the recording settings that were selected by that user.

The interactive television application may provide the user with the ability to select series setup option 910 by moving highlight window 918 over series setup option 910 and pressing a remote control "OK" button. The interactive television application may display a series recording setup display screen in response to the selection of series setup option 910. Space available indicator 920 may be shown, and may be updated as options are changed on this screen. Indicator 920 may indicate or estimate how much recording time is available for future programs. If desired, it may be based on the priority of the selected program. For example, it may indicate how much space is available for recording programs that have the currently specified priority (e.g., a can't miss priority, an if possible priority, a desired priority, an if space available priority, etc.) in recording priority option 916.

The interactive television application may provide the user with the ability to move highlight window 918 over recording priority option 916 and to scroll through recording priority settings to set the recording priority for a recording. Recording priority may be set to can't miss priority, if possible priority, desired priority, if space available priority, or any other suitable priority. Recording priority option 916 may be used to set the recording priority for a specific recording or a series recording.

Figure 10:
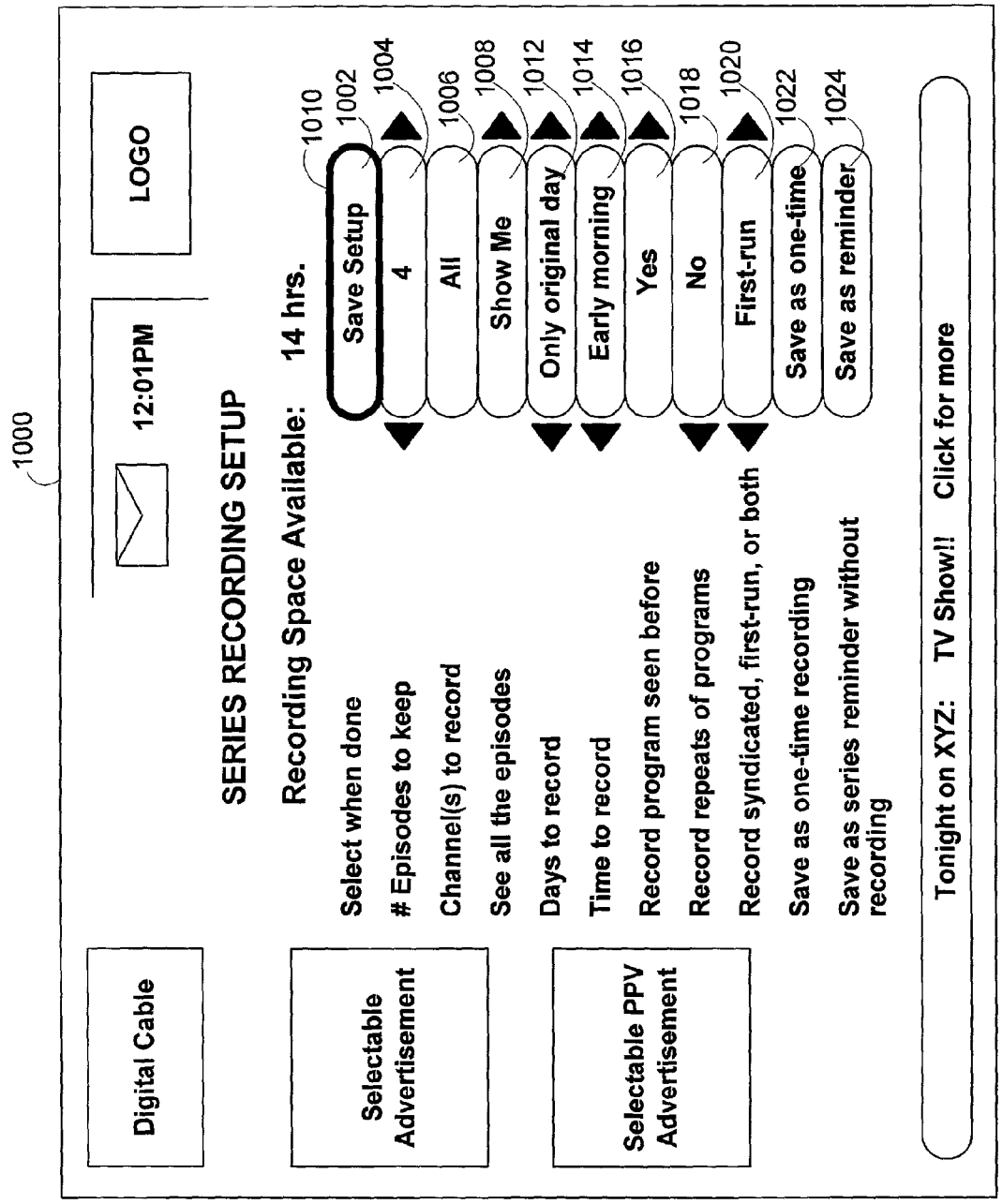
FIG. 10 shows an illustrative series recording setup display screen in accordance with one embodiment of the present invention.

The interactive television application may provide the user with the ability to select series setup option 910 by moving highlight window 918 over series setup option 910 and pressing a remote control "OK" button. The interactive television application may display a series recording setup display screen in response to the selection of series setup option 910. A series setup option may only be included in display screen 900 when the selected program is part of a series. FIG. 10 shows illustrative series recording setup display screen 1000 that may be provided by the interactive television application. Display screen 1000 may provide the user with the ability to set or modify settings for series recordings. Save setup option 1002, number of episodes option 1004, channels to record option 1006, see all episodes option 1008, days to record option 1012, time to record option 1014, record programs seen before option 1016, record repeats of programs option 1018, episode type option 1020, save as one-time option 1022, and save as reminder option 1024 may be provided based on illustrative steps 664, 668, 670, 672, 676, 678, 680, 682, 684, 686, and 688 shown in FIG. 6. Other options may be shown if desired.

A user may be permitted to configure a series recording using display screen 1000. The interactive television application may provide the user with the ability to move highlight window 1010 over number of episodes option 1004 and to scroll through the numbers to set the number of episodes for the series recording to be saved on the PVR at one time. The interactive television application may provide the user with the ability to move highlight window 1010 over channels to record option 1006 and to use remote control navigation buttons to scroll through to select which channels are to be used for the series recording. The series recording channel selections may include for example the original channel for a program that was used to set a series recording, all possible channels, a user-selected selection of channels, a specific type of channel such as broadcast or premium channel, or any other suitable selection of channels. In response to a selection of see all episodes option 1008 (e.g., by moving a highlight window over option 1008 and pressing a remote control "OK" key), the interactive television application may display a series recording listings display screen. The interactive television application may provide the user with the ability to move highlight window 1010 over days to record option 1012 and to use remote control navigation buttons to scroll to select on which days programs in the series are to be recorded. A user may select a specific day, all days, or any other suitable combination of days. The interactive television application may provide the user with the ability to move highlight window 1010 over time to record option 1014 and to use remote control navigation buttons to scroll to select at what time programs in a series recording will be recorded. A user may select to record the program during prime time, late night, early morning, day time, same time of day as the selected episode, or any other time or combination of times. By default if a user does not select a time, the interactive television application may choose to only record episodes that air during the same time of day as the selected program.

The interactive television application may provide the user with the ability to move highlight window 1010 over record programs seen before option 1016 and scroll between yes or no to select whether the interactive television application should record programs seen by the user before. The interactive television application may maintain a log of all programs viewed by a particular user in order to make this determination. The interactive television application may provide the user with the ability to move highlight window 1010 over record repeat programs option 1018 and scroll between yes or no to select if the interactive television application should record programs that are repeats. The interactive television application may provide the user with the ability to move highlight window 1010 over episode type option 1020 and scroll through episode type settings to select which episode types should be recorded. The types for episodes in a series recording may include syndicated episodes, first-run episodes, both syndicated episodes and first-run episodes, or any other suitable type of episode. The episode type may also include a specification indicating during which season or seasons the desired episodes originally aired.

The interactive television application may provide the user with the ability to move highlight window 1010 over save as one-time option 1022 to exit display screen 1000 and schedule the program as a one-time recording only. This switch from a series recording to a one-time recording may deselect the series recording feature for this program. The interactive television application may provide the user with the ability to move highlight window 1010 over save as reminder option 1024 to exit display screen 1000 and save the configured settings as a series reminder without scheduling recordings. A user may select save setup option 1002 to save the settings that the user selects in display screen 1000.

Figure 11:
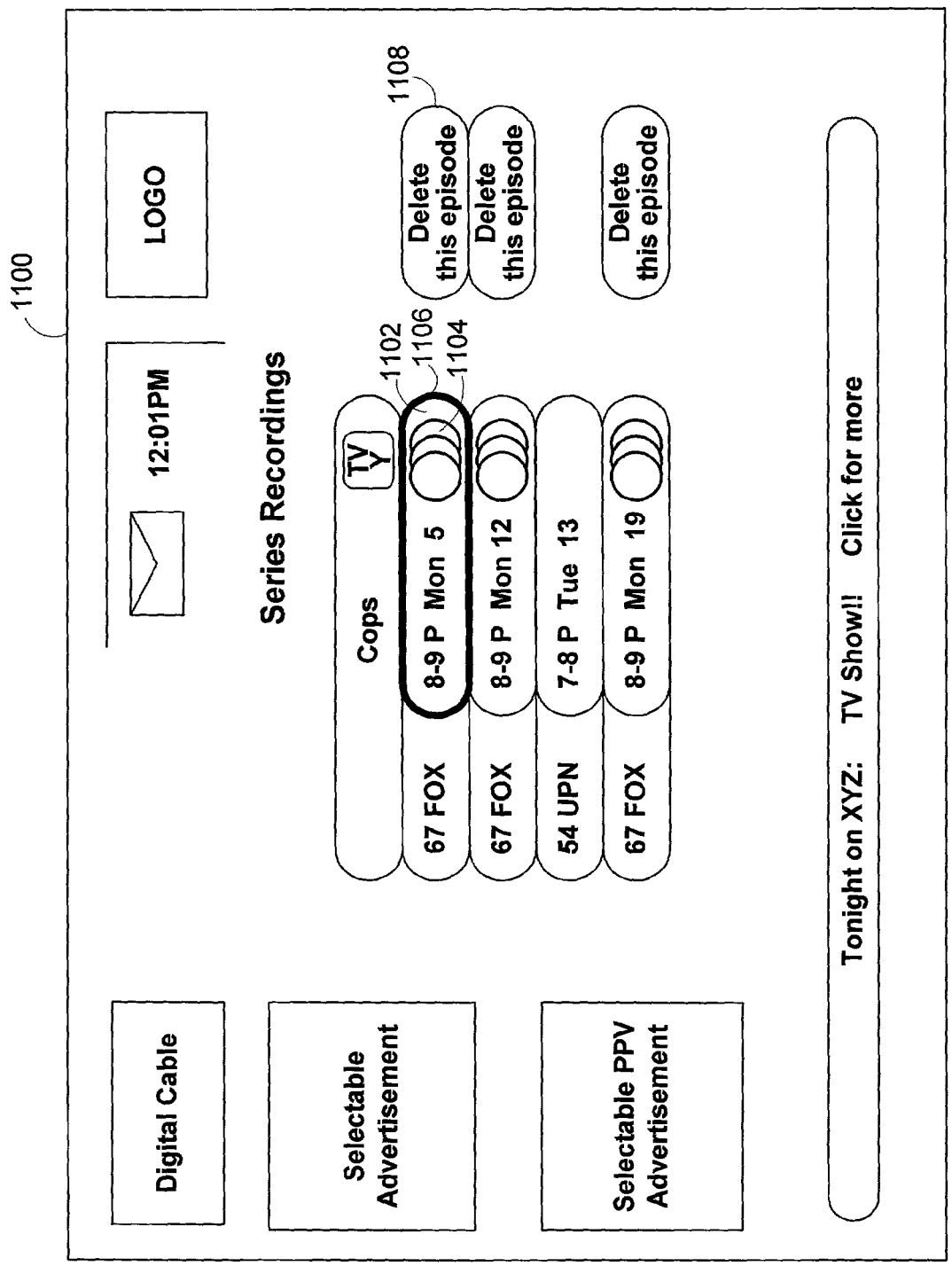
FIG. 11 shows an illustrative series recording listings display screen in accordance with one embodiment of the present invention.

An interactive television application may display a list of all scheduled programs that may be episodes in this series. FIG. 11 shows illustrative series listings display screen 1100 that may be provided by the interactive television application. Display screen 1100 may be displayed in response to a selection of see all episodes option 1008 in display screen 1000 of FIG. 10. With reference now to FIG. 11, display screen 1100 may list all programs that are in this series and may include upcoming programs, recorded programs, or programs that are scheduled to be recorded. Programs in the list that are scheduled to be recorded may have been scheduled for recording based on the recording options and series options selected by a user in FIGS. 9 and 10. Examples of interactive television program guides that have series recording features are illustratively shown in Knudson et al., U.S. patent application Ser. No. 09/330,792, filed Jun. 11, 1999, which is hereby incorporated by reference herein in its entirety. Display screen 1100 may include listing bars such as bar 1102, that may include dates, times, and channels for scheduled recordings for episodes in a programs series. Icon 1104 may be included in listing bar 1102 to indicate that a particular program may have been scheduled to be recorded as a series recording. Display screen 1100 may include delete this episode option 1108. The interactive television application may provide the user with the ability to move highlight window 1106 over delete this episode option 1108 to select to delete the particular listed episode that is associated with delete this episode option 1108. Following this selection, the scheduled recording for that episode may be deleted.

The user may also select an individual listing to see the program information screen for that episode. The individual episode may be deleted from the series recording from that screen. The user may also select episodes that are not scheduled to be recorded, and the user may cause the interactive television application to schedule them to be recorded as well. The interactive television application may also display additional information on this screen about the highlighted episode, or about all episodes on this screen. The information may include a series episode title, an episodic description, guest actors, or any other information of interest.

Figure 12:
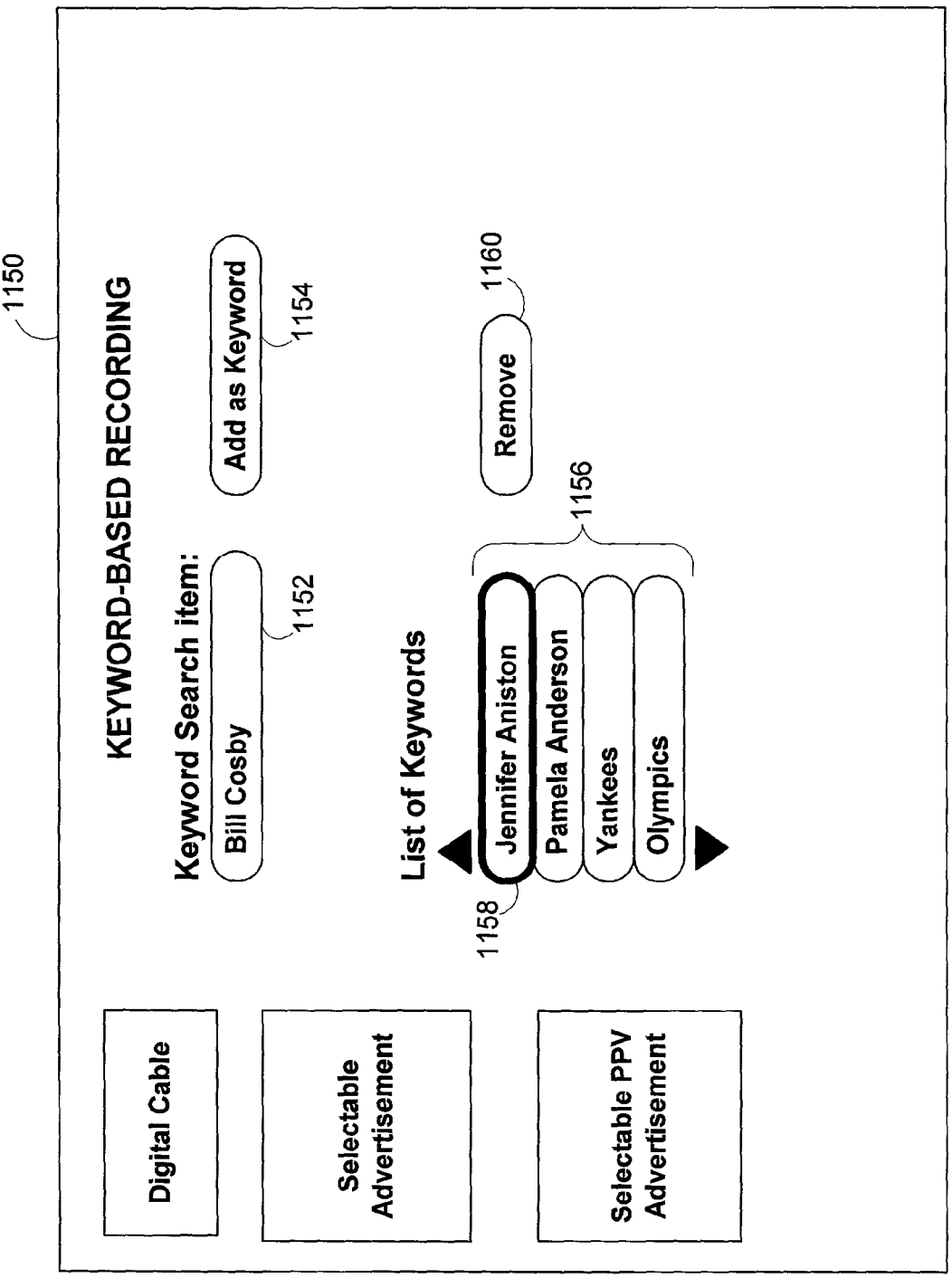
FIG. 12 shows an illustrative keyword-based recording display screen in accordance with one embodiment of the present invention.

FIG. 12 shows illustrative keyword-based recording display screen 1150 that may be provided by the interactive television application. Display screen 1150 may provide the user with the ability to add and remove keyword-based recordings. Display screen 1150 may include search parameter 1152, add keyword option 1154, list of keywords 1156, and remove option 1160. The interactive television application may provide the user with the ability to use remote control alpha-numeric buttons to enter a keyword into search parameter 1152.

Display screen 1150 may provide the user with the ability to select add keyword option 1154 to setup a keyword-based recording based on search parameter 1152. In response to an addition of a keyword, the interactive television application may automatically schedule recordings based on that keyword. The interactive television application may provide the user with the ability to scroll keywords in list 1156 so that keywords are positioned in highlight window 1158. Highlight window 1158 may be held stationary while listings in list 1156 are scrolled. To remove a current keyword in highlight window 1158, a user may press a remote control right navigation button to position highlight window 1158 over remove option 1160 and then press remote control "OK" button. The interactive television application may also allow the user to select a keyword from the keyword list and view a list of matching programs from a database of upcoming programs or from a database of recorded programs.

Figure 13:
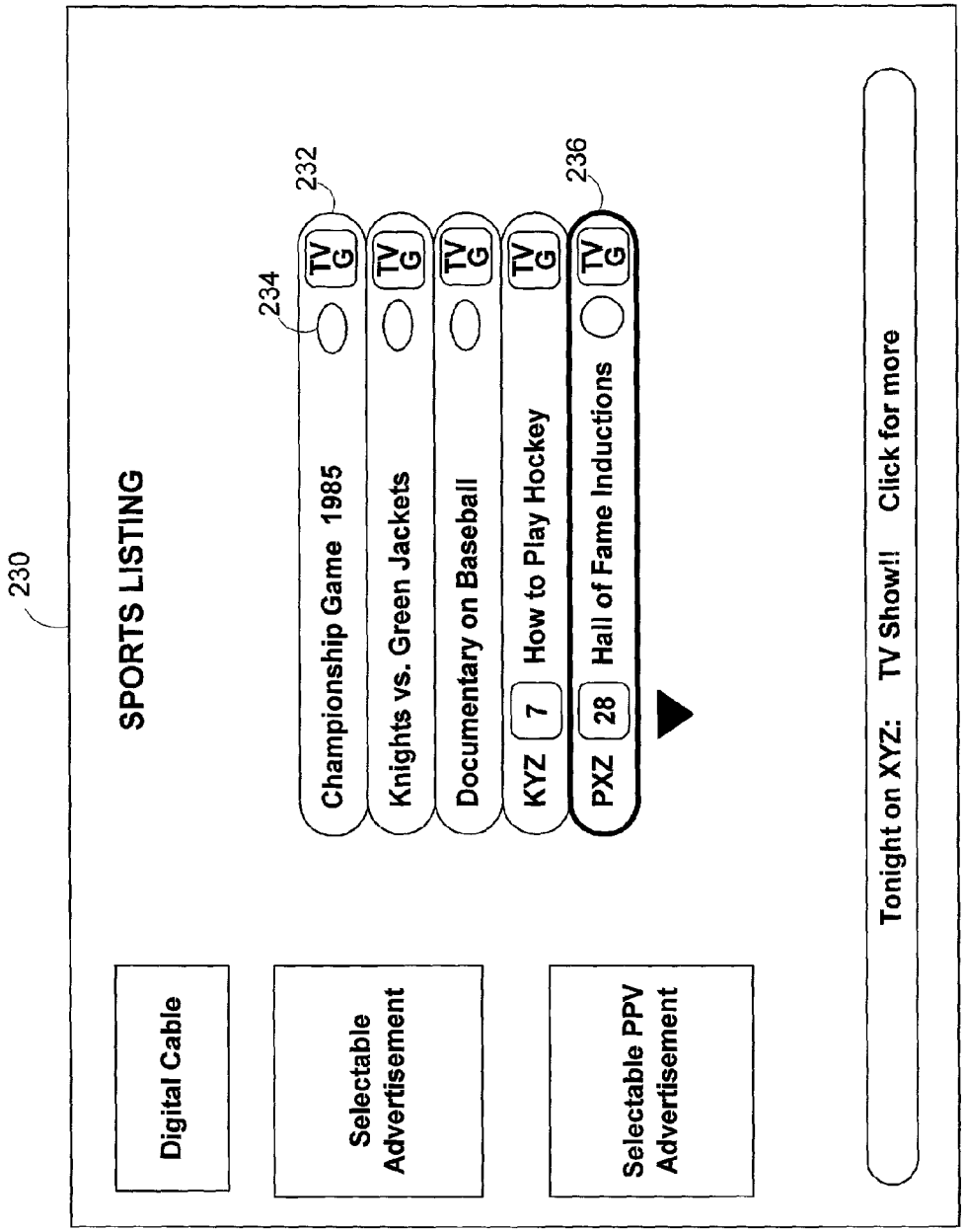
FIG. 13 shows an illustrative sports listings display screen in accordance with one embodiment of the present invention.

FIG. 13 shows illustrative sports listings display screen 230 that may be provided by the interactive television application. Display screen 230 may be displayed in response to a selection of sports option 513 of FIG. 5. Display screen 230 may be a display screen for a sports program type, but the characteristics described below with respect to display screen 230 may also be for listings display screens that are displayed for other program types, such as movies, children, comedy, PPV, and any other types. If desired, a similar screen may be displayed for a subcategory of programs, such as comedy movies. Display screen 230 may include listing bars, such as listing bar 232. Highlight window 236 may be used to make selections in display screen 230. Listing bar 232 may include recorded content icon 234 to indicate that the program identified in listing bar 232 may be available from a PVR. In listing by type display screen 230, recorded programs may be included on the list before other programs (e.g., before listing upcoming programs). If desired, the recorded programs in the list may be sorted first by priority and then by the date recorded.

Figure 14:
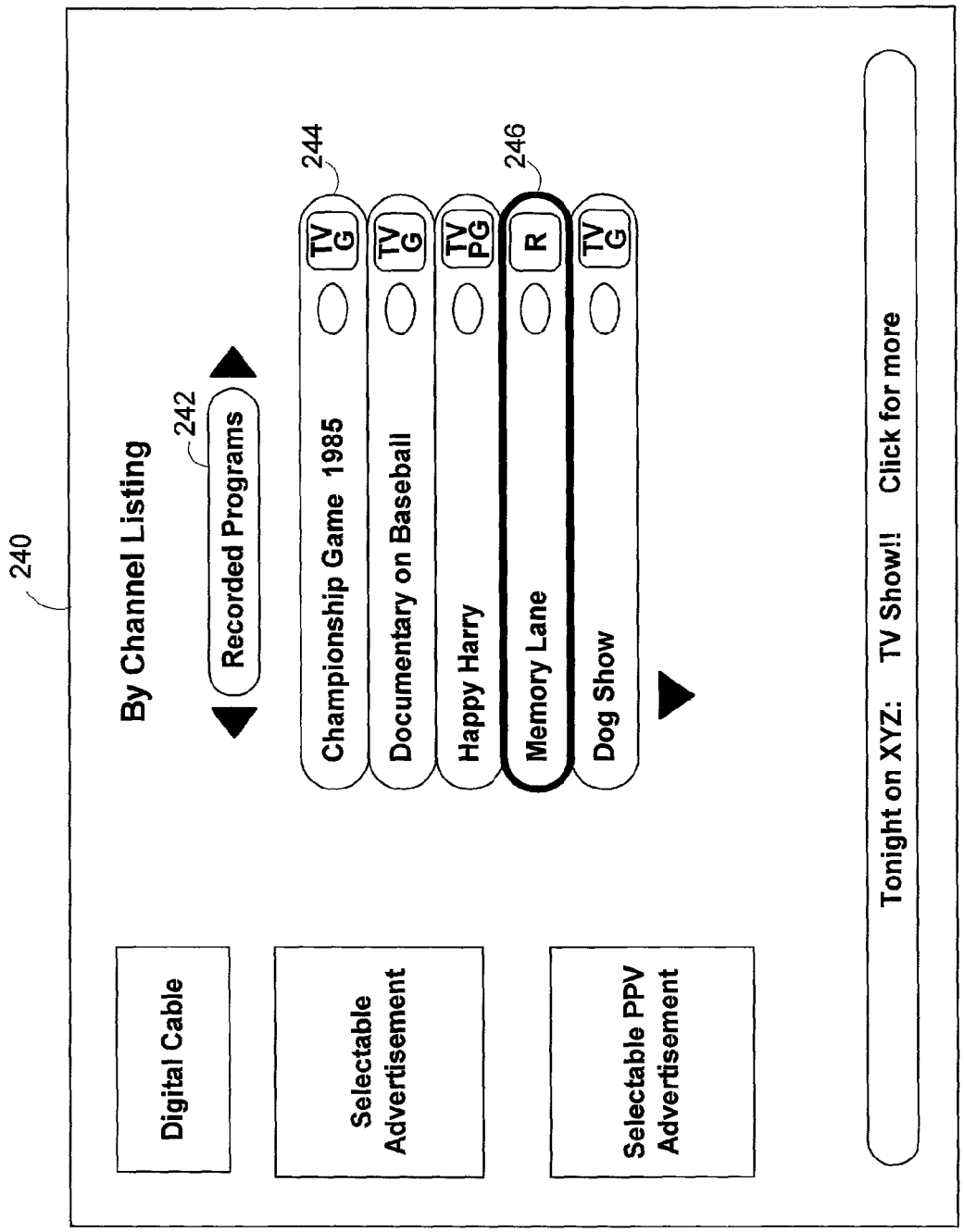
FIG. 14 shows an illustrative by channel listings display screen in accordance with one embodiment of the present invention.

FIG. 14 shows illustrative by channel listings display screen 240 that may be provided by the interactive television application. Display screen 240 may be displayed in response to a selection of by channel option 511 of FIG. 5. Display screen 240 may display a list of programs that are on a particular channel. Display screen 240 may include change channel option 242 that may provide the user with the ability to scroll through the different channels provided by a user's television service provider to view listings on those channels. A list of recorded programs may be a particular channel choice that is in the list of channels available using channel change option 242. The list of recorded programs may be positioned as a channel choice between the highest number channel and the lowest numbered channel. Display screen 240 may list recorded programs within listing bars, such as listing bar 244. The recorded programs may be sorted by priority and then by date and time.

In another embodiment, recorded programs may be listed with the listings for the channel that the program was recorded from. Recorded programs may be listed first, followed by current and upcoming programs. Highlight window 246 may be used to make selections in display screen 240.

Figure 15:
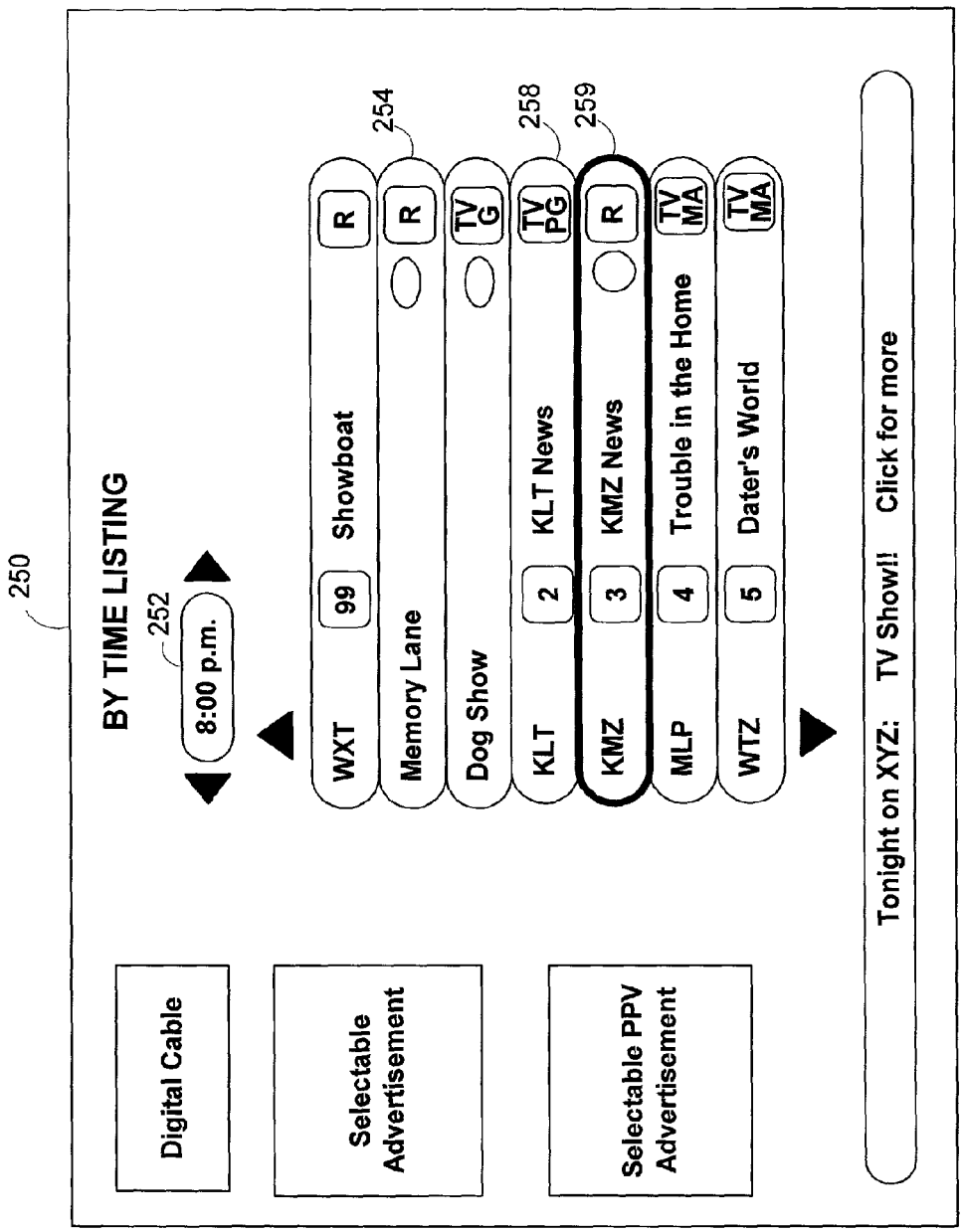
FIG. 15 shows an illustrative by time listings display screen in accordance with one embodiment of the present invention.

FIG. 15 shows illustrative by time listings display screen 250 that may be provided by the interactive television application. Display screen 250 may be displayed in response to a selection of by time option 509 of FIG. 5. Display screen 250 may display a list of programs available to be viewed by the user at a particular time. Recorded programs may also be included in this list of programs. Recorded programs may be included in this list between the highest and lowest numbered channels.

Display screen 250 may include change time option 252 that may be provide the user with the ability to scroll through listings by time. Display screen 250 may include listing bars for recorded programs, such as listing bar 254. Highlight window 259 may be used to make selections in display screen 250. If desired, as the user scrolls through different times using change time option 252, the recorded program or programs listed may be changed. Display screen 250 may also include listing bars for current or upcoming programs, such as program listing bar 258. As shown in display screen 250, the recorded programs are listed between the highest and lowest numbered channels. If desired, channel zero may be designated for accessing listings of recorded programs. For example, in response to a selection of channel zero, the interactive television application may quickly show listings for recorded programs in display screen 250. If desired, there may be a quick access option to provide access to a complete list of all recorded programs. If desired, the by time display screen may show multiple half hours of programming, for example in a grid format.

Figure 16:
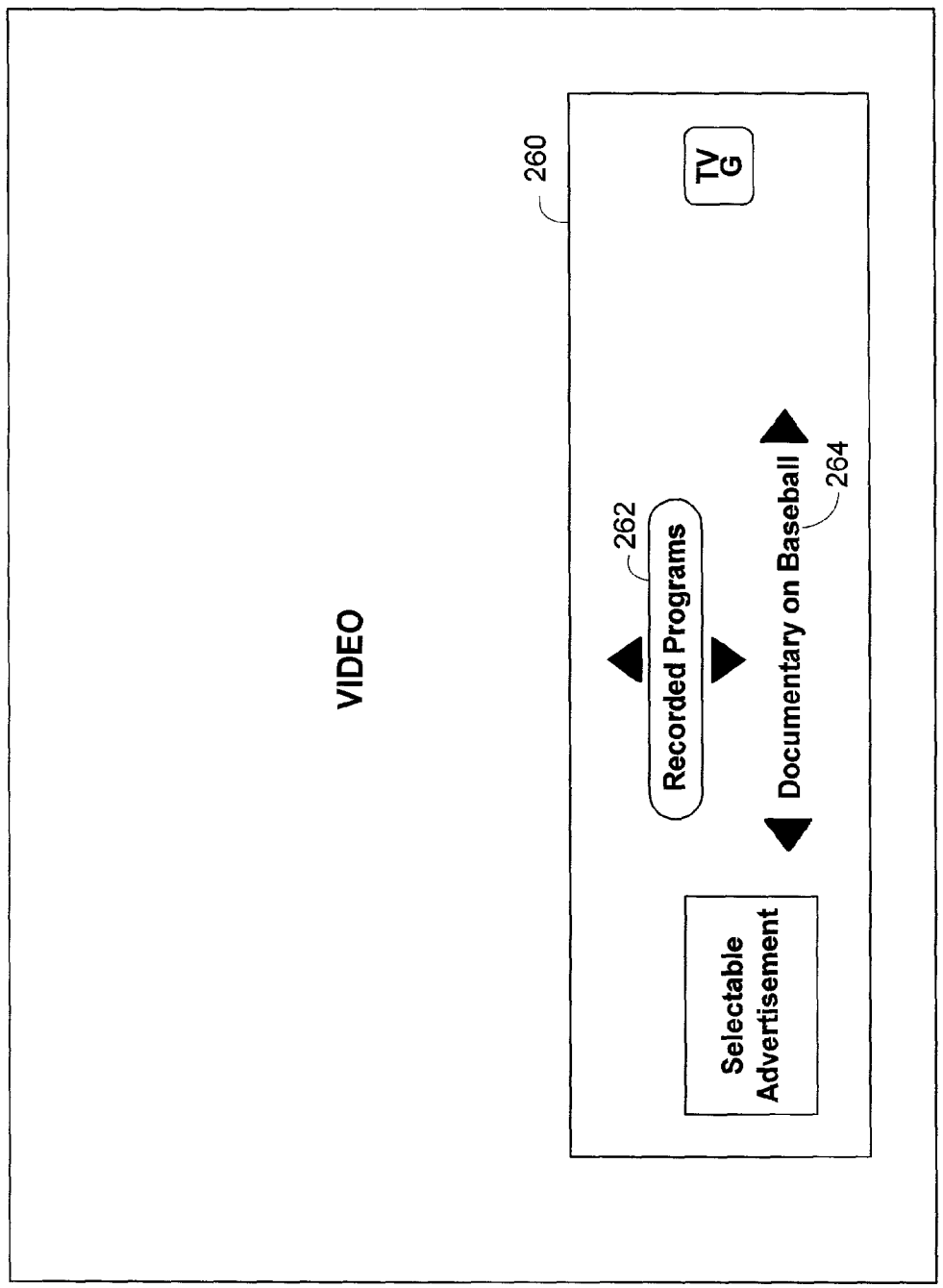
FIG. 16 shows an illustrative browse or flip overlay that is displayed over current video in accordance with one embodiment of the present invention.

FIG. 16 shows illustrative browse or flip overlay 260 that may be provided by the interactive television application. Examples of interactive television program guides with browse and flip features are illustratively shown in Boyer et al., U.S. patent application Ser. No. 09/330,793, filed Jun. 11, 1999, which is hereby incorporated by reference herein in its entirety. Overlay 260 may include change channel option 262. When the interactive television application is in a browse mode, the interactive television application may provide the user with the ability to scroll through channels using change channel option 262. In response to a change of a channel, title 264 may change to be the title of the current program on the new channel. A title for a recorded program may be displayed when a user changes the channel to a channel choice that has been designated for recorded programs. Recorded programs may be designated between the highest and lowest numbered channel.

In response to pressing a remote control right or left arrow keys, the interactive television application may display titles, in title 264, for later or earlier programs on a currently selected channel when the currently selected channel is a regular television channel. In response to pressing a remote control right or left arrow key, when a title of a recorded program is being displayed, the interactive television application may display the title of other recorded programs. Titles of recorded programs may be sorted by priority, date, or any other suitable criteria. In response to pressing a remote control "OK" button, when the title of a current program on a different channel is displayed, the interactive television application may change to that channel. In response to pressing a remote control "OK" button, when the title of a recorded program is displayed in title 264, the interactive television application may play that recorded program. In response to pressing a remote control info key, the interactive television application may display an information display screen for a program that is identified in title 264. The information display screen may be displayed for a program that is currently airing, upcoming, or recorded.

When the interactive television application is in a flip mode, a user may change the channel to change the current channel that is being displayed and to change title 264 of the current program on that channel in overlay 260. A channel choice for recorded programs may not be available in flip mode. Alternatively, a channel may be available during flip mode to view recorded program. The interactive television application may start to play a recorded program when a user flips to the recorded program. If the program had previously been partially viewed, flipping to the recorded program may the interactive television application to start to play the program from the point at which viewing most recently ended. Flip mode may be made to be available when a user is watching a live television program that is playing from a buffer for that program. As used herein, a live television program refers to a program that is being viewed at the same time it is broadcast.

An interactive television application may permit users to set PVR setup options. FIG. 17 shows illustrative process 430 that may be used for setting PVR setup options. At step 432, the interactive television application may display a PVR setup display screen. At step 432, PVR setup options may be provided to the user and may include steps 434, 436, 438, 440, 442, 444, 446, 448, 450, 452, 454, 456, 458, 466, 468, and 470.

At step 434, the interactive television application may provide the user with the ability to edit the recording buffer time that is to be used before and after programs that are scheduled to be recorded on a particular channel or programs that have a particular program type. If the user selects to edit the recording buffer time before and after, the interactive television application may display a recording buffer time before/after by channel/type display screen at step 460. At step 436, the interactive television application may provide the user with the ability to set the default quality for a recording. At step 438, the interactive television application may provide the user with the ability to edit the quality of a recording based on the program channel or program type. If the user selects to edit the quality of a recording by channel or type, the interactive television application may display an edit quality of recording by channel/type display screen at step 462. At step 440, the interactive television application may provide the user with the ability to set the quality of a series recording. At steps 442 and 444, the interactive television application may respectively provide the user with the ability to set a default for the recording buffer time before and the recording buffer time after to be used for scheduled recordings.

At step 446, the interactive television application may provide the user with the ability to set the default recording priority for a program. The recording priority option may, for example, include a can't miss priority, an if possible priority, a desired priority, an if space available priority, or any other suitable priority. At step 448, the interactive television application may provide the user with the ability to set buffer options, which may include steps 466, 468, and 470. It is to be understood that the word buffer is sometimes used herein to refer to a recording buffer that will be used to record television content before or after a scheduled recording to prevent cutoffs due to schedule variations and at some other times to refer to buffering live television to allow for features such as pause of live television.

At step 466, the interactive television application may provide the user with the ability to set the maximum size (or maximum time) to be used for buffering live television. At step 468, the interactive television application may provide the user with the ability to set the quality of a buffer for live television. If desired, the user may choose different buffer qualities for different channels, different channel types, or different program types. At step 470, the interactive television application may provide the user with the ability to select an option to resolve recording buffer time conflicts. If the user selects to resolve recording buffer time conflicts, the interactive television application may display a buffer time conflicts display screen at step 464.

At step 450, the interactive television application may provide default series recordings options that may include steps 452, 454, 456, and 458. At step 452, the interactive television application may provide the user with the ability to select whether, by default, the interactive television application should record programs that a user has seen before. At step 454, the interactive television application may provide the user with the ability to select whether the interactive television application should, by default, record programs that are reruns. At step 456, the interactive television application may provide the user with the ability to select which channels the interactive television application should use, by default, to record series episodes. At step 458, the interactive television application may provide the user with the ability to select, by default, to record syndicated episodes, first-run episodes, or both syndicated and first-run episodes for a series recording. All of the options set in this process may be stored in memory, and used as defaults when a new recording is scheduled. Any of these settings may be overridden when a recording is scheduled. If desired, individual settings of PVR defaults may be entered for each user.

Figure 18:
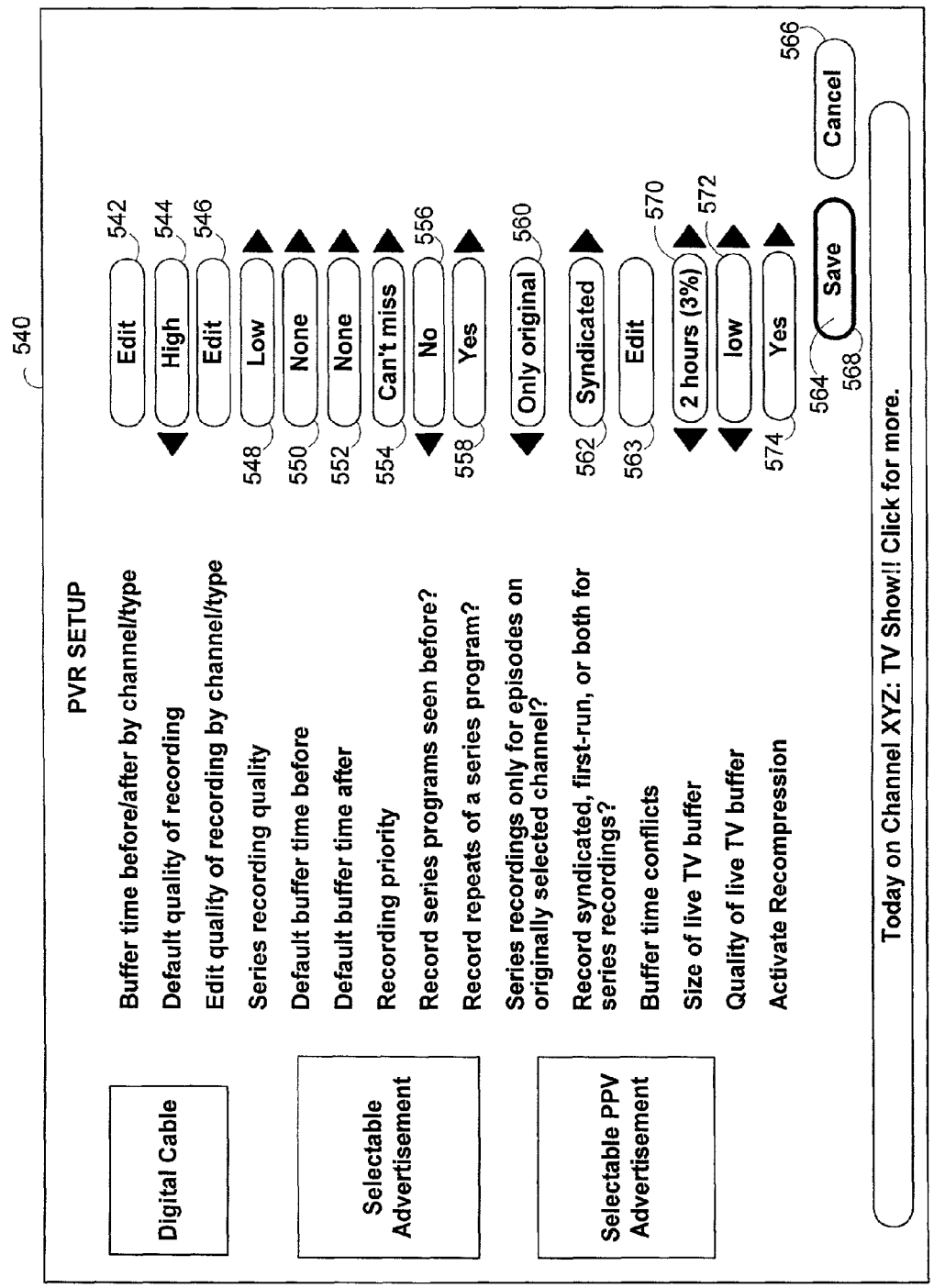
FIG. 18 shows an illustrative PVR setup display screen in accordance with one embodiment of the present invention.

FIG. 18 shows illustrative PVR setup display screen 540 that may be provided by the interactive television application. PVR setup display screen 540 may be displayed when a user selects to configure a specific recording or when a user selects to configure default recording settings. Display screen 540 may provide the user with the ability to set various settings for a PVR. If desired, PVR setup display screen 540 may be displayed to include options for configuring a specific recording without including options for setting system defaults. Conversely, PVR setup display screen 540 may be displayed to include options for configuring system defaults without including options for configuring a specific recording.

Display screen 540 may include buffer time before/after by channel/type option 542, default quality option 544, quality by channel/type option 546, series recording quality option 548, default buffer time before option 550, default buffer time after option 552, recording priority option 554, record programs seen before option 556, record repeated programs option 558, series recording channel selection option 560, series recording type option 562, buffer time conflicts option 563, size of live TV buffer option 570, and quality of live TV buffer option 572, which may be provided based on illustrative steps 434, 436, 438, 440, 442, 444, 446, 452, 454, 456, 458, 466, 468, and 470 as shown in FIG. 17. Other setup options may be provided if desired.

The interactive television application may provide the user with the ability to select buffer time before/after by channel/type option 542 by moving highlight window 568 over buffer time before/after by channel/type option 542 and pressing a remote control "OK" button. The interactive television application may display a buffer time before/after by channel/type display screen in response to a selection of buffer time before/after by channel/type option 542. The interactive television application may provide the user with the ability to move highlight window 568 over default quality option 544 and to scroll through quality settings to select a default recording quality that may be used for all recordings except recordings that have been specifically configured by a user to have a particular quality setting, or unless overridden by options such as options 546 and 548. Display screen 1400 of FIG. 25 may, for example, be used to set a recording quality for a specific recording. If desired, display screen 540 may include an option for setting a recording quality for a specific recording.

The interactive television application may provide the user with the ability to select quality by channel/type option 546 by moving highlight window 568 over quality by channel/type option 546 and pressing a remote control "OK" button. The interactive television application may display an edit quality of recording by channel/type display screen in response to a selection of quality by channel/type option 546.

The interactive television application may provide the user with the ability to move highlight window 568 over series recording quality option 548 and to scroll through the default quality setting to be used for series recordings. The interactive television application may provide the user with the ability to move highlight window 568 over default buffer time before option 550 or default buffer time after option 552 and to scroll through available buffer time settings to respectively set the default recording buffer time before a scheduled recording and the default recording buffer time after a scheduled recording. The interactive television application may provide the user with the ability to move highlight window 568 over recording priority option 554 and scroll through the priority settings to set the default recording priority to be used for recordings. The recording priority options may include, a can't miss priority, an if possible priority, a desired priority, an if space available priority, and other suitable recording priority settings.

If desired, a recording priority that has been set for a program may be converted to be a delete priority for a recording of that program. An example of this conversion may be that a program whose recording priority was set to be a can't miss priority may be converted to a delete priority of never delete when that program is recorded. The remaining recording priority options may also have corresponding delete priority options.

The interactive television application may provide the user with the ability to move highlight window 568 over record programs seen before option 556 and scroll between yes or no to set a default value for whether the interactive television application may record programs seen by the user before. The interactive television application may provide the user with the ability to move highlight window 568 over record repeated programs option 558 and scroll between yes or no to set a default value for whether the interactive television application should record programs that are reruns. The interactive television application may provide the user with the ability to move highlight window 568 over series recording channel selection option 560 and scroll through series recording channel selection settings to select which channels may be used by default for performing series recordings. The channel selections may include only the original channel, all possible channels, a user-selected selection of channels, or any other suitable selection of channels.

The interactive television application may provide the user with the ability to move highlight window 568 over series recording type option 562 and to scroll through series episode type settings to set which type of episodes of a program may be recorded by default. The series recording types for episodes may include syndicated episodes, first-run episodes, both syndicated episodes and first-run episodes, or any other suitable type of episode, such as whether to record all seasons, current season only, or other types of episodes. The interactive television application may provide the user with the ability to select buffer time conflict option 563 by moving highlight window 568 over buffer time conflict option 563 and pressing a remote control "OK" button. The interactive television application may display a buffer time conflict display screen in response to a selection of buffer time conflict option 563. Buffer time conflict option 563 may be used to resolve conflicts in recording buffer times. Save option 564 may be used to save any PVR settings that may have been selected by the user in display screen 540. In response to a selection of cancel option 566, the interactive television application may exit display screen 540 without saving any of the selections made by the user and may return the user to a previous display screen.

The interactive television application may provide the user with the ability to move highlight window 568 over size of live TV buffer option 570 and scroll through size options to set how many hours of storage space on a PVR may be used to record live television. Size of live TV buffer option 570 may include a time element and a percent element that may indicate how much storage space on a PVR will be designated for buffering live television. The interactive television application may provide the user with the ability to move highlight window 568 over quality of live TV buffer option 572 and scroll through quality options to set the quality of the live television buffer that may be used by the PVR to buffer live television.

The interactive television application may provide the user with the ability to move highlight window 568 over activate recompression option 574 and scroll between yes or no to set whether to activate recompression for recorded programs. When option 574 is selected by a user, the interactive television application may recompress recorded programs again through background processing using a more efficient digital video compression technique, such as MPEG-4. Recompressing a recording may reduce the storage space that is consumed for that particular recording.

If desired, the application may allow the user to choose different buffer sizes based on channel, channel type, program type, or other factors. For example, one or more display screens or overlays may be displayed that include an option to assign different live television buffer sizes to different channels, an option to assign different live television buffer sizes to different programs types (e.g., movies, sports, documentary, talk show, new, or other program category or genre), an option to assign different live television buffer sizes to different channels types (e.g., cable channel, network, broadcast, or other channel type), or an option to assign different buffer sizes to other factors. The interactive television application may allow a user to move a highlight window within these display screens or overlays to make selections for the default settings (e.g. buffer size) for the live television buffer. A display screen, such as that shown in FIG. 19 for setting default recording buffer time before/after, may be used to implement these live television buffer settings. These options may be accessed by a user through a PVR setup display screen or through other suitable means.

If desired, the application may allow the user to choose different buffer qualities based on channel, channel type, program type, or other factors. For example, one or more display screens or overlays may be displayed that include an option to assign different live television buffer qualities to different channels, an option to assign different live television buffer qualities to different programs types (e.g., movies, sports, documentary, talk show, new, or other program category or genre), an option to assign different live television buffer qualities to different channels types (e.g., cable channel, network, broadcast, or other channel type), or an option to assign different buffer qualities to other factors. The interactive television application may allow a user to move a highlight window within these display screens or overlays to make selections for the default settings (e.g. buffer quality) for the live television buffer. A display screen such as that shown in FIG. 20 for setting default recording quality by content type may be used to implement these live television buffer settings. These options may be accessed by a user through a PVR setup display screen or through other suitable means.

Figure 19:
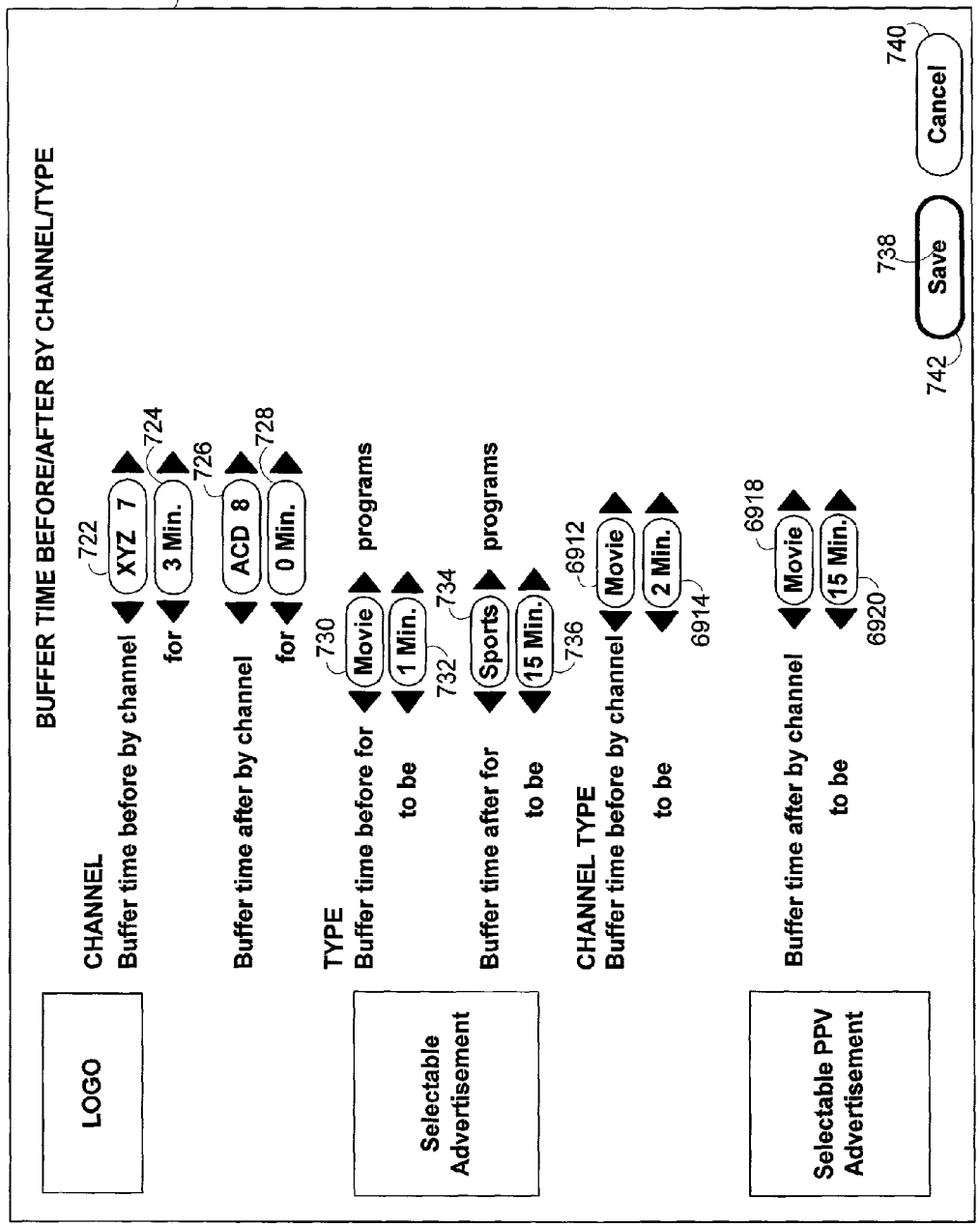
FIG. 19 shows an illustrative buffer time before/after by channel/type display screen in accordance with one embodiment of the present invention.

FIG. 19 shows illustrative buffer time before/after by channel/type display screen 720 that may be provided by the interactive television application. Display screen 720 may provide the user with the ability to set default recording buffer times before and after scheduled recordings of programs on a particular channel or programs of a particular type. Examples of interactive television program guides that may have features for reducing recording cut-offs are illustratively shown in Ellis et al., U.S. patent application Ser. No. 09/881,005, filed Mar. 29, 2001, which is hereby incorporated by reference herein in its entirety.

Until a user manually sets the default recording buffer before and after a scheduled recording by channel or by program type, the interactive television application may set the recording buffer time for a program based on options 550 and 552 of FIG. 18 that are used to set the recording default buffer time before and after programs that are to be recorded. In display screen 720, a user, for example, may set the recording buffer time after sports programs to be 15 minutes to account for the tendency of sports program to run longer than scheduled.

The interactive television application may provide the user with the ability to move highlight window 742 over recording buffer time before by channel option 722 and to scroll through channels and to select a particular channel of interest. Highlight window 742 may be moved over buffer time before time option 724 to scroll through a selection of times and to set the recording buffer time to be used before programs on that channel. The interactive television application may provide the user with the ability to move highlight window 742 over recording buffer time after by channel option 726 and to scroll through channels and to select a particular channel of interest. Highlight window 742 may be moved over buffer time after time option 728 to scroll through a selection of times and to set the recording buffer time to be used after programs on that channel.

The interactive television application may provide the user with the ability to move highlight window 742 over recording buffer time before by program type option 730 and to scroll through program types to select a particular program type of interest. Highlight window 742 may be moved over buffer time before time option 732 to scroll through a selection of times and to set the buffer time before to be used for programs of a particular program type. The interactive television application may provide the user with the ability to move highlight window 742 over buffer time after program type option 734 and to scroll through program types to select a particular program type of interest. Highlight window 742 may be moved over buffer time after time option 736 to scroll through a selection of times and to set the buffer time after to be used for all programs of a particular program type. If desired, options 724, 728, 732, and 736 may each include a "default" setting that will set that feature to use a related default setting chosen in options 550 and 552 of FIG. 18.

The interactive television application may allow a user to define the default buffer time before and buffer time after based on channel type. The interactive television application may provide the user with the ability to move highlight window 742 over buffer time before by channel type option 6912 and to scroll through channel types to select a particular channel type of interest. Highlight window 742 may be moved over buffer time before time option 6914 to scroll through a selection of times and to set the default buffer time before to be used for programs on a particular type of channel.

The interactive television application may provide the user with the ability to move highlight window 742 over buffer time after by channel type option 6918 and to scroll through channel types to select a particular channel type of interest. Highlight window 742 may be moved over buffer time after time option 6920 to scroll through a selection of times and to set the default buffer time after to be used for programs on a particular type of channel.

Save option 738 may be used to save the settings for buffer time before and buffer time after that were selected by a user in display screen 720. In response to a selection of cancel option 740, the interactive television application may exit display screen 720 without saving any of the user selections and may return the user to a previous display screen.

Figure 20:
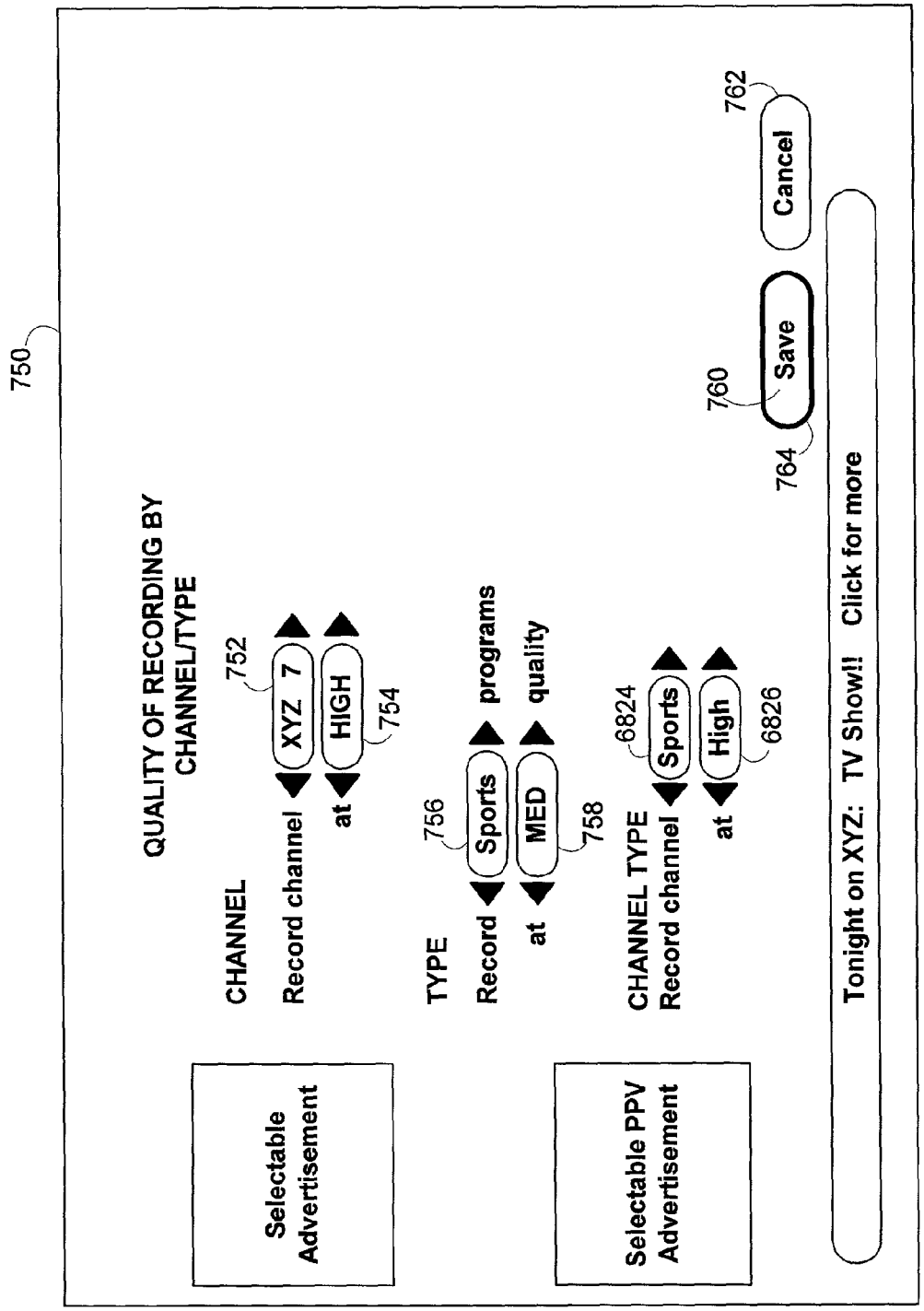
FIG. 20 shows an illustrative quality of recording by channel/type display screen in accordance with one embodiment of the present invention.

FIG. 20 shows illustrative quality of recording by channel/type display screen 750 that may be provided by the interactive television application. Display screen 750 may provide the user with the ability to set default recording qualities for programs on a particular channel or program type. Until a user manually sets the default recording quality for programs on a particular channel or for a particular program type, the interactive television application may set each recording quality based on option 544 of FIG. 18, which is a general default recording quality option.

The interactive television application may provide the user with the ability to move highlight window 764 over channel option 752 and to scroll through channels to select a particular channel of interest. Highlight window 764 may be moved over channel quality option 754 to scroll through the recording quality options and to select a recording quality for that channel. The interactive television application may provide the user with the ability to move highlight window 764 over program type option 756 and to scroll through program types to select a particular program type of interest. Highlight window 764 may be moved over program type quality option 758 to scroll through the recording quality options and to set the recording quality for that program type. If desired, the default quality for any channel or program type may be set to "default" in which case programs of that type or on that channel will by default use the settings chosen in option 544 of FIG. 18. If desired, the default recording quality for series recordings (option 548 of FIG. 18) may also be set on screen 750 by setting program type option 756 to "series" and using program type quality option 758 to select a desired recording quality.

If desired, the interactive television application may allow a user to define the default recording quality based on channel type. The interactive television application may provide the user with the ability to move highlight window 764 over channel type option 6824 and to scroll through channels types (e.g., sports, movie, network, public access, premium, news, etc.) to select a particular channel type of interest. Highlight window 764 may be moved over channel type quality option 6826 to scroll through the recording quality options and to set the default recording quality that will be used based on channel type.

Save option 760 may be used to save the settings for the recording quality that are selected by a user. In response to a selection of cancel option 762, the interactive television application may exit display screen 750 without saving any of the selections made by the user and may return the user to a previous display screen.

Figure 21:
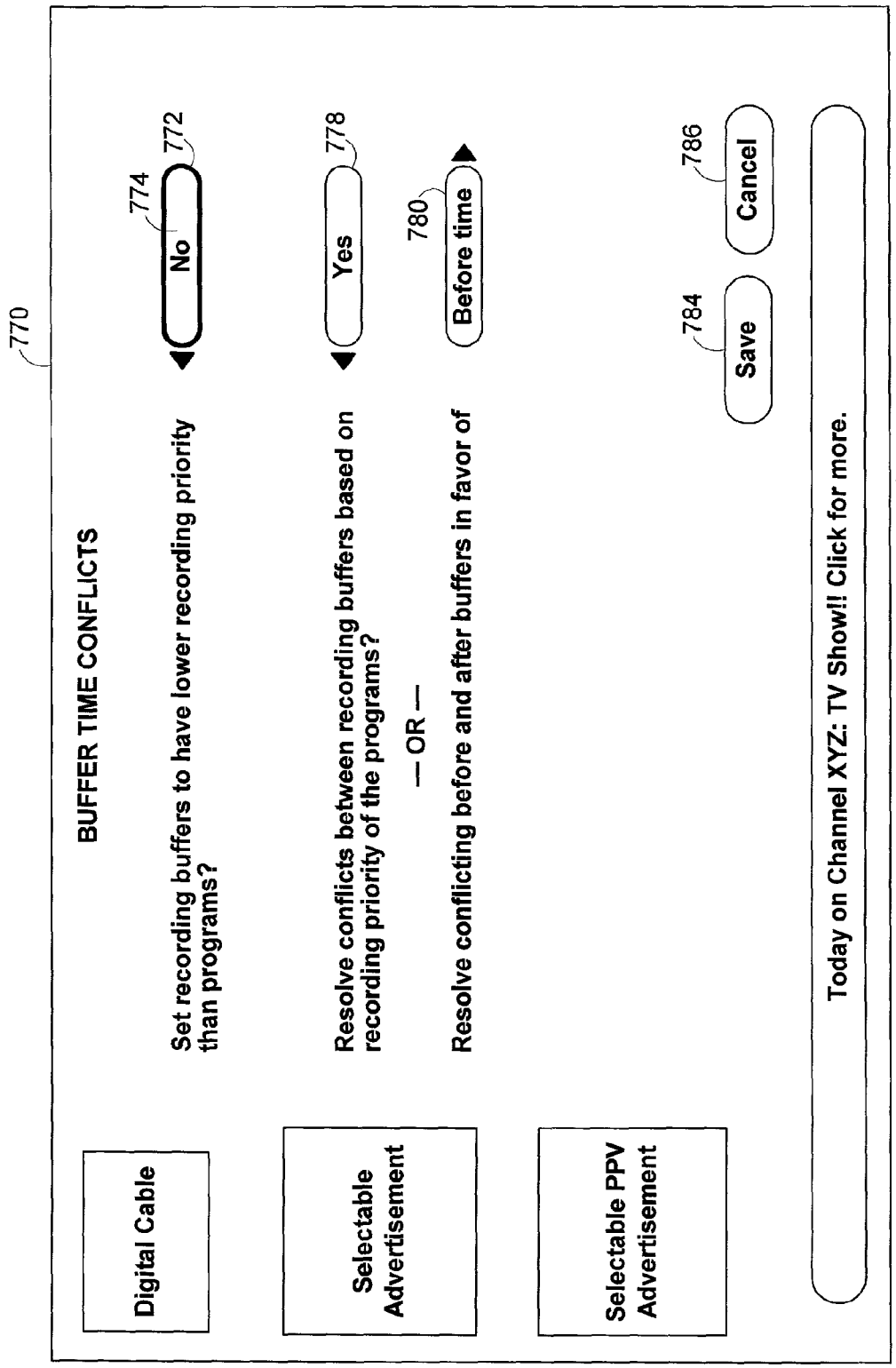
FIG. 21 shows an illustrative buffer time conflicts display screen in accordance with one embodiment of the present invention.

FIG. 21 shows illustrative buffer time conflicts display screen 770 that may be provided by the interactive television application. Display screen 770 may provide the user with the ability to select settings for resolving recording conflicts between recording buffers and programs and also resolve conflicts between different recording buffers. The interactive television application may provide the user with the ability to move highlight window 772 over recording buffer priority option 774 and to scroll between yes or no to select whether recording buffers before and after should have a lower priority than programs that are to be recorded. If the user selects yes for option 774, conflicts between programs and recording buffers may be resolved in favor of programs.

The interactive television application may also provide the user with the ability to select option 778 and option 780 to resolve recording conflicts between buffers. If the user selects "yes" for option 778, the interactive television application may resolve conflicts between buffers based on the recording priority of a scheduled recording that is associated with each buffer.

If the user selects "no" for option 778, option 780 may be used to assign different priorities to buffer times before and buffer times after. For example, option 780 may be used to assign buffer times after to have a higher priority than buffer times before. Save option 784 and cancel option 786 may be used to either save settings selected by a user or to exit without saving the settings.

FIG. 22 shows illustrative priority level information display screen 870 that may be provided by the interactive television application. Display screen 870 may display the amount of free memory (total hours) remaining on a PVR. Display screen 870 may also display a list of how much memory remains for use for each priority level and indicate when free memory for recordings will run out based on recordings that are currently scheduled.

Display screen 870 may include memory usage information section 872. Memory usage information section 872 indicates the total PVR memory space, the total memory used, and how much memory remains. The hours available and hours remaining numbers may be based on any suitable assumptions about recording quality, such as average recording quality of current recordings, the default recording quality, the recording quality for upcoming recordings, or any other suitable method. Display screen 870 may include priority level information list 874. Priority level information list 874 may include a list of each priority level, an indicator of how much memory is currently used for each priority level, and information on when the guide may start deleting programs to make room for new scheduled recordings that have a particular priority level.

Figure 23:
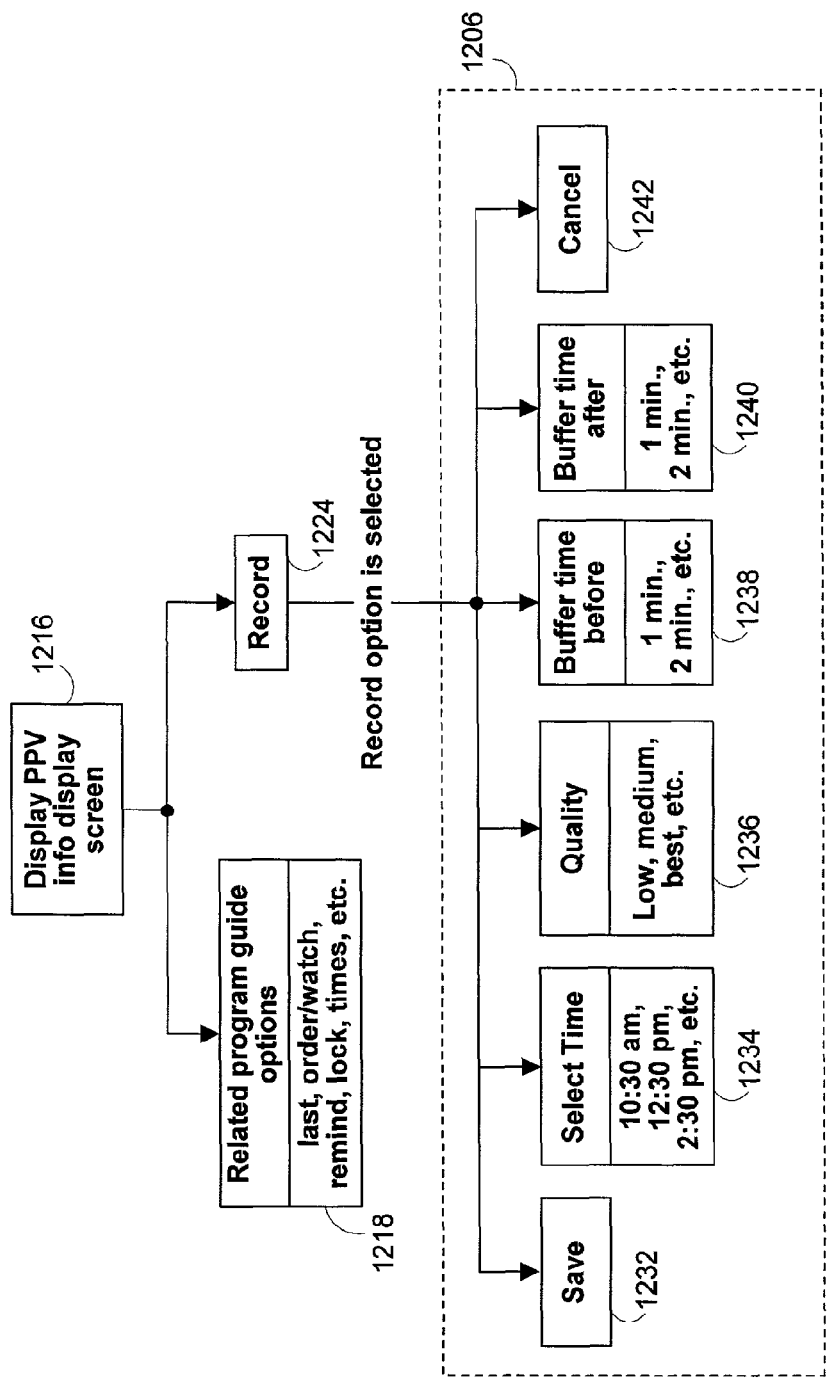
FIG. 23 shows an illustrative process that may be used in selecting and configuring a recording of a PPV program in accordance with one embodiment of the present invention.

An interactive television application may be implemented to provide PVR features for PPV programming. FIG. 23 shows illustrative process 1200 that may be used in selecting and configuring a PPV program. At step 1216, the interactive television application may display a PPV information display screen for example when a user selects an information option for a particular PPV program from a listing screen or from any other location at which a user may be allowed to indicate an interest in a particular PPV program. The interactive television application may provide related program guide options at step 1218. Related program guide options may include last, order/watch, remind, lock, times, and any other suitable program guide options. At step 1224, the interactive television application may provide the user with the ability to select a record option to set and/or configure a PPV recording. A record key on a remote control may also be used to set a PPV program to be recorded.

If the PPV program has not previously been ordered, the interactive television application may walk the user through the ordering process before scheduling the recording. The user may set a recording priority for the PPV program. A step for setting a recording priority such as step 651 of FIG. 6 may also be included in process 1200. Options or steps that are related to series recordings such as steps 608, 653, 655, and 657 may also be included in process 1200 for example when a PPV program that is scheduled to be recorded is part of a package. If desired, some of the series setup options may not be offered for PPV packages, such as first-run/syndicated.

If the user chooses to record a PPV program, the interactive television application may require the user to order the PPV program before scheduling a recording for that program. If desired, the interactive television application may automatically order a PPV program when the user selects to record the PPV program. In another embodiment, the interactive television application may automatically display the PPV order screens as part of the recording setup process. A recording may not be scheduled if the user does not complete the order for a desired PPV program. If the PPV program is not an impulse order PPV program (e.g., an Automatic Number Identification PPV program), the interactive television application may allow the user to schedule a recording before placing an order for the program.

If the user selects a record option for a PPV program, the interactive television application may proceed to step 1206. At step 1206, PPV record related options may be provided to the user. Step 1206 may include steps 1232, 1234, 1236, 1238, 1240, and 1242. At step 1234, the interactive television application may provide the user with the ability to select when the PPV program should be recorded. For example, the user may select a particular broadcast from a list of PPV broadcast times. At step 1236, the interactive television application may provide the user with the ability to select the recording quality for the PPV program. At steps 1238 and 1240, the interactive television application may respectively provide the user with the ability to set a recording buffer time before and a recording buffer time after the scheduled broadcast of a desired PPV program. At step 1232, the interactive television application may provide the user with the ability to select a save option to schedule the PPV program to be recorded and to save the settings that have been selected by the user. At step 1242, the interactive television application may provide the user with the ability to cancel and exit to a previous display screen without scheduling a recording.

Figure 24:
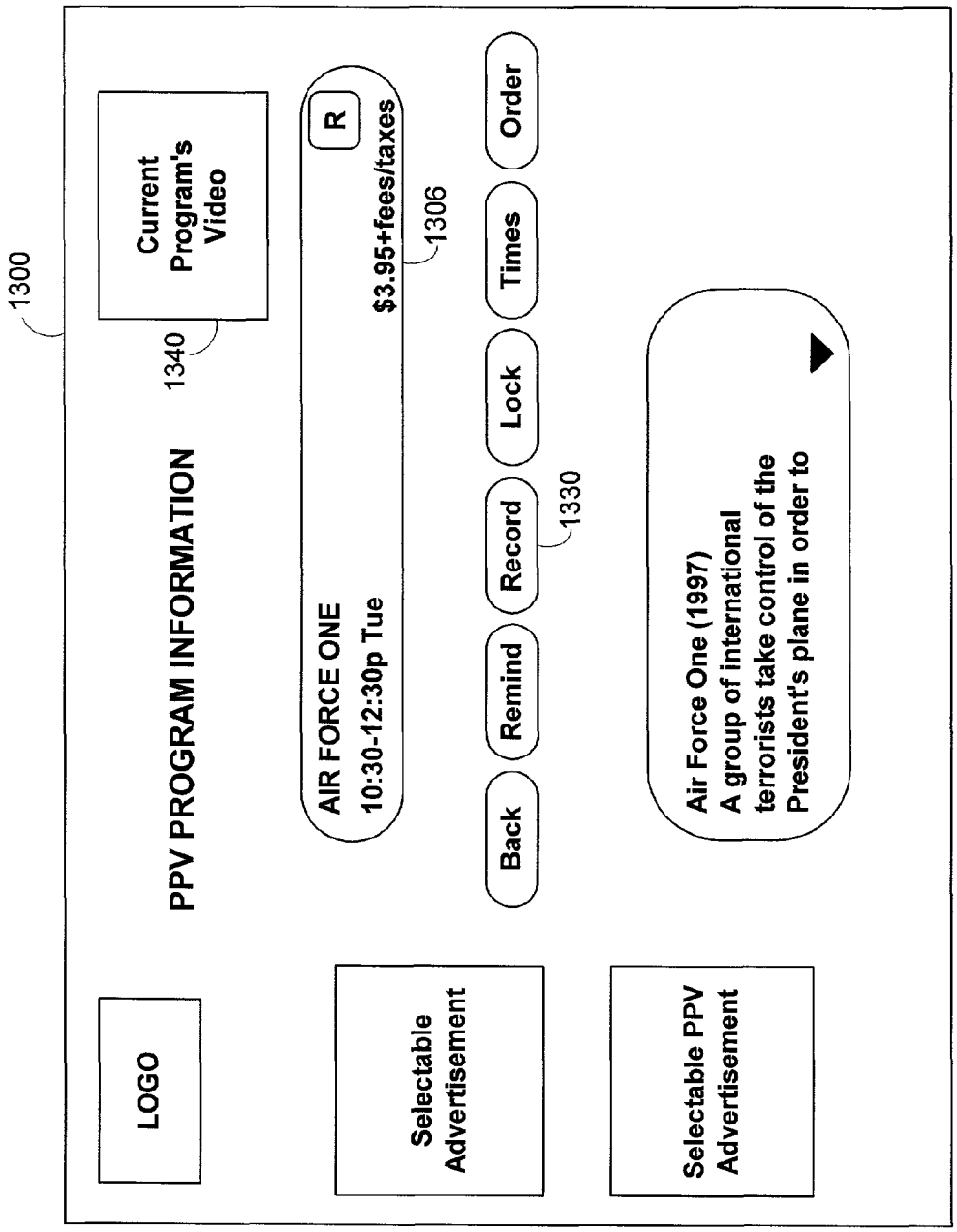
FIG. 24 shows an illustrative information display screen for a PPV program in accordance with one embodiment of the present invention.

FIG. 24 shows illustrative program information display screen 1300 for a PPV program that has not yet been scheduled to be recorded. Display screen 1300 may be displayed in response to a selection of a remote control info button when, for example, listing bar 702 of display screen 700 of FIG. 7 is positioned over a PPV program. With reference now to FIG. 24, display screen 1300 may include title display bar 1306. Display screen 1300 may include program video 1340 for a program that is currently airing on a tuned channel. Display screen 1300 may include information on a PPV program that is listed in display bar 1306 and may include PPV program related program guide options.

Display screen 1300 may include record option 1330. In response to a user selecting record option 1330, the interactive television application may display PPV recording setup display screen 1400 as shown in FIG. 25.

Figure 25:
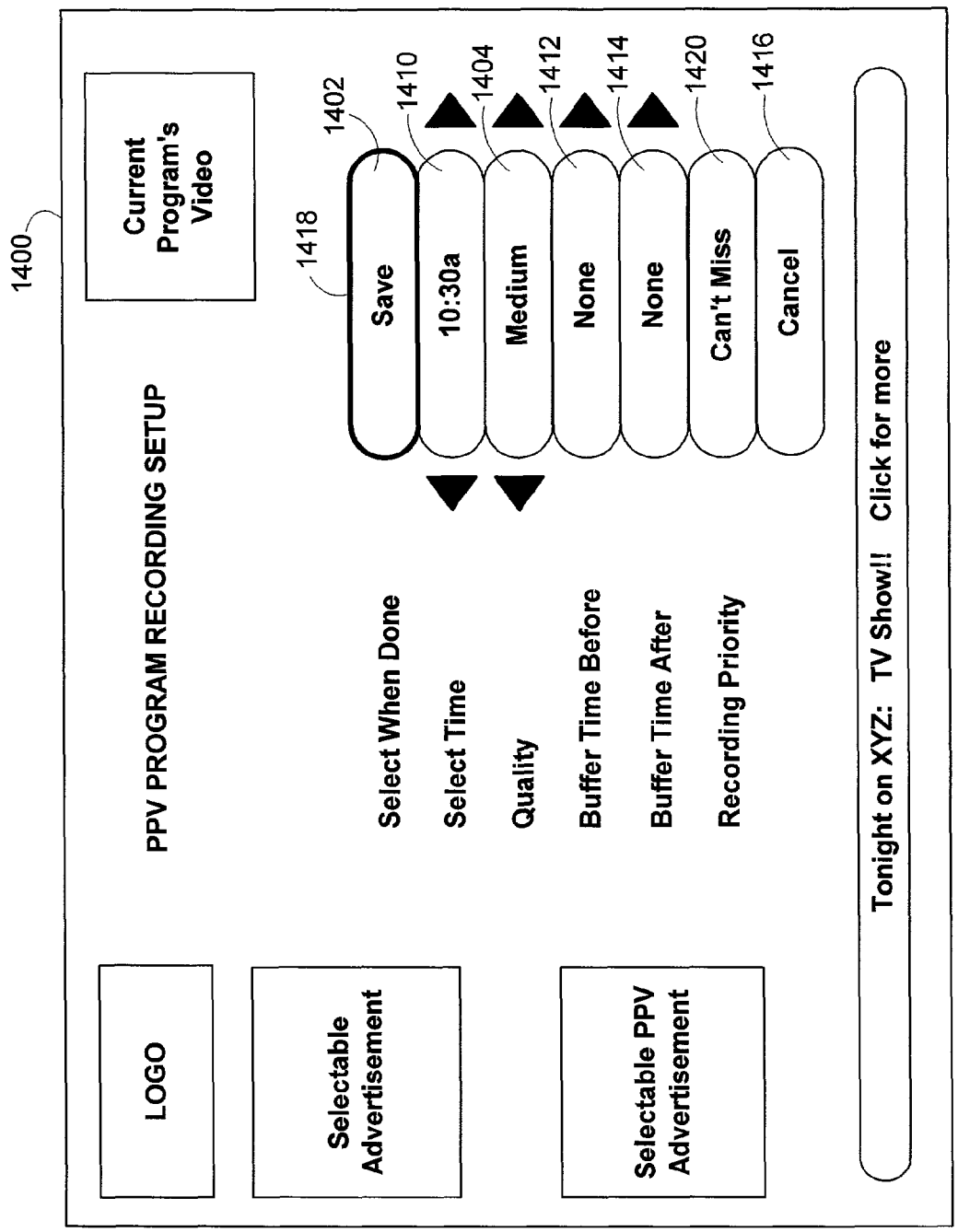
FIG. 25 shows an illustrative PPV recording setup display screen for configuring a recording of a PPV program to be scheduled in accordance with one embodiment of the present invention.

With reference now to FIG. 25, PPV recording setup display screen 1400 may include save option 1402, select time option 1410, quality option 1404, buffer time before option 1412, buffer time after option 1414, cancel recording option 1416, and recording priority option 1420. These options may be provided based on illustrative steps 1232, 1234, 1236, 1238, 1240, and 1242 shown in FIG. 23. The interactive television application may provide the user with the ability to move highlight window 1418 over select time option 1410 and to use remote control navigation buttons to scroll through scheduled times of a particular PPV program to select a recording time. The interactive television application may provide the user with the ability to move highlight window 1418 over quality option 1404 and to use remote control navigation buttons to scroll through recording quality settings to select a quality for the recording. The interactive television application may provide the user with the ability to move highlight window 1418 over buffer time before option 1412 or buffer time after option 1414 and to use remote control navigation buttons to set the buffer time before and after to be used for a recording. The interactive television application may provide the user with the ability to move highlight window 1418 over recording priority option 1420 and to use remote control navigation buttons to set the recording priority for a recording. The selection of save option 1402 may schedule the desired recording and related recording settings. In response to the selection of cancel option 1416, the interactive television application may exit the current display screen and return to a previous display screen without scheduling the PPV program to be recorded, or if desired, cancel option 1416 may cancel the scheduled recording of the PPV program. Other suitable options may be provided. If desired, the application may allow a user to select a record option for a PPV program that already has a recording scheduled. In this case, the application may display a screen such as display screen 1400 to allow the user to modify the recording settings or cancel the scheduled recording. Thus, PVR functionality may be provided for PPV programs.

Figure 26:
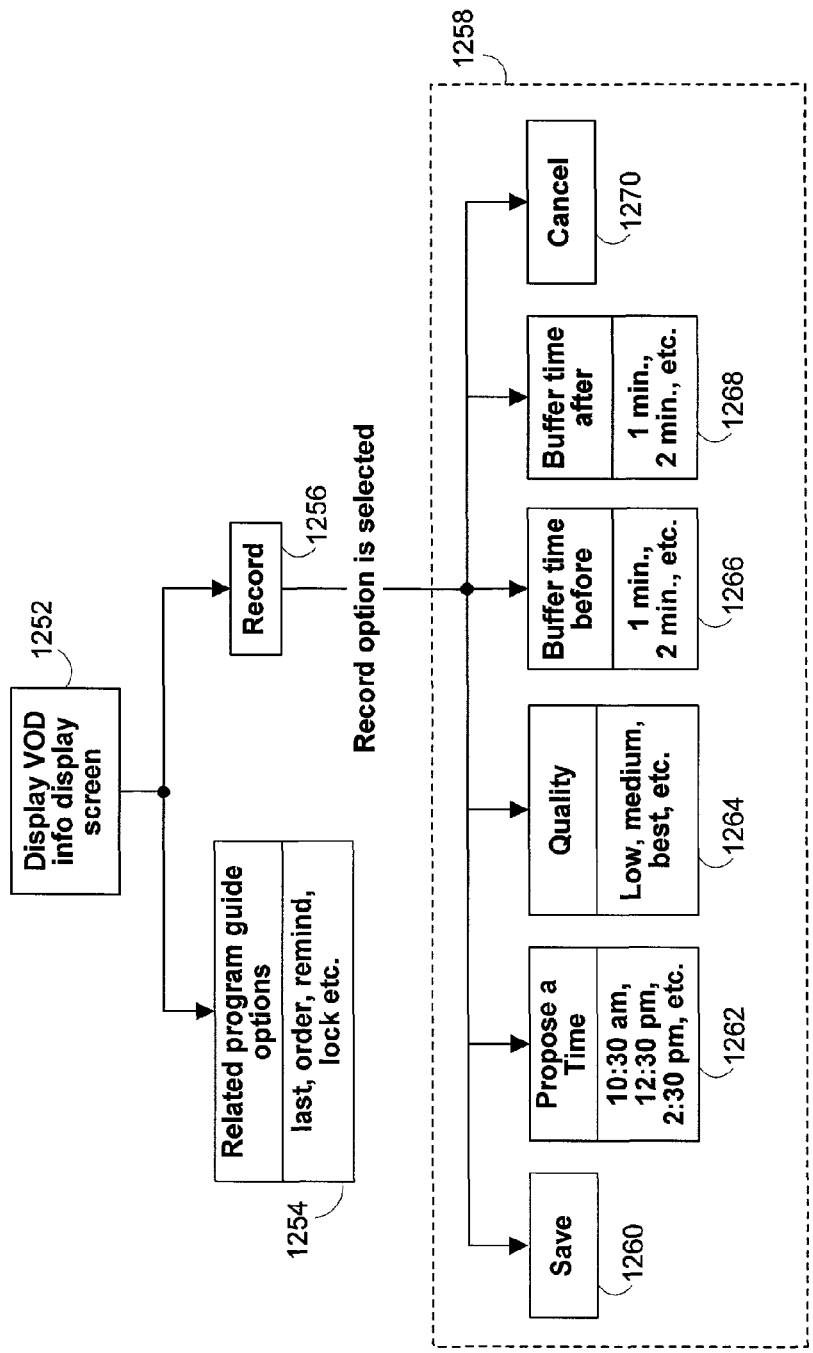
FIG. 26 shows an illustrative process that may be used in selecting and configuring a recording of a VOD program in accordance with one embodiment of the present invention.

An interactive television application may be implemented to provide PVR features for VOD programming. FIG. 26 shows illustrative process 1250 that may be used in selecting and configuring a recording of VOD program. At step 1252, the interactive television application may display a VOD information display screen for example when a user selects an information option for a particular VOD program from a listing screen or any other suitable location in which a user may indicate an interest in a VOD program. The interactive television application may provide related program guide options at step 1254. Related program guide options may include last, order, remind, lock, and any other suitable program guide options. At step 1256, the interactive television application may provide the user with the ability to select a record option, a remote control record button, or a record option from a live control overlay to set and/or configure a VOD recording.

If the user chooses to record a VOD program, the interactive television application may require the user to order the VOD program before scheduling a recording for that program. If desired, the interactive television application may automatically order the VOD program when the user selects to record the VOD program. In another embodiment, the interactive television application may automatically display VOD order screens as part of the recording setup process. If desired, the recording may not be setup if the user does not complete an order for a VOD program.

If the user selects a record option for a VOD program, the interactive television application may proceed to step 1258. At step 1258, VOD record related options may be provided to the user. Step 1258 and may include steps 1260, 1262, 1264, 1266, 1268, and 1270. At step 1262, the interactive television application may propose a selection of times at which the VOD program may be recorded. The interactive television application may propose a time based on currently scheduled recordings and reminders to avoid conflicts in recordings. The interactive television application may propose a recording time and allow a user to scroll to other possible recording times. At step 1264, the interactive television application may provide the user with the ability to select a recording quality for the VOD program. At steps 1266 and 1268, the interactive television application may respectively provide the user with the ability to set a recording buffer time before and a recording buffer time after the scheduled recording time of a VOD program. Selecting a buffer time before or buffer time after for a recording of a VOD program may be beneficial for example in situations where the playback of a VOD program extends beyond the specified duration for that program. The playback of a VOD program may for example extend beyond a specified duration when there are interruptions in the delivery of the VOD program. However, a recording buffer time before or after a VOD program should not typically be necessary. At step 1260, the interactive television application may provide the user with the ability to select a save option to schedule the VOD program to be recorded and to save the settings that have been selected by the user. The user may set a recording priority for the VOD program. A step for setting a recording priority such as step 651 of FIG. 6 may also be included in process 1250 to allow a user to set a recording priority for a VOD program. Other options from process 600 of FIG. 6 may also be included as appropriate. At step 1270, the interactive television application may provide the user with the ability to cancel and exit to a previous display screen without scheduling a recording.

If a VOD or PPV program is marked as copy-protected, the interactive television application may restrict whether a user can schedule a recording for the copyrighted program. If desired, the interactive television application may not automatically buffer live video of PPV or VOD programs that are copy-protected.

VOD and PPV programs may be priced to have different prices depending on the usage. For example, one price may be for watching a program and another price may be for recording a program. The price for recording a program may be displayed when the user selects to record a program. If desired, VOD and PPV programs may be marked with three different prices—the first two prices being the same type of prices as the two prices described above and a third price that is for each playback of a recording. The interactive television application may also support pay-per-recording and pay-per-playback of ordinary content. The interactive television application may also support a system in which the user pays for recording space by the amount of storage space used on a remote server (e.g., pay for the amount of storage in a remote server that stores personal video of a user).

Figure 27:
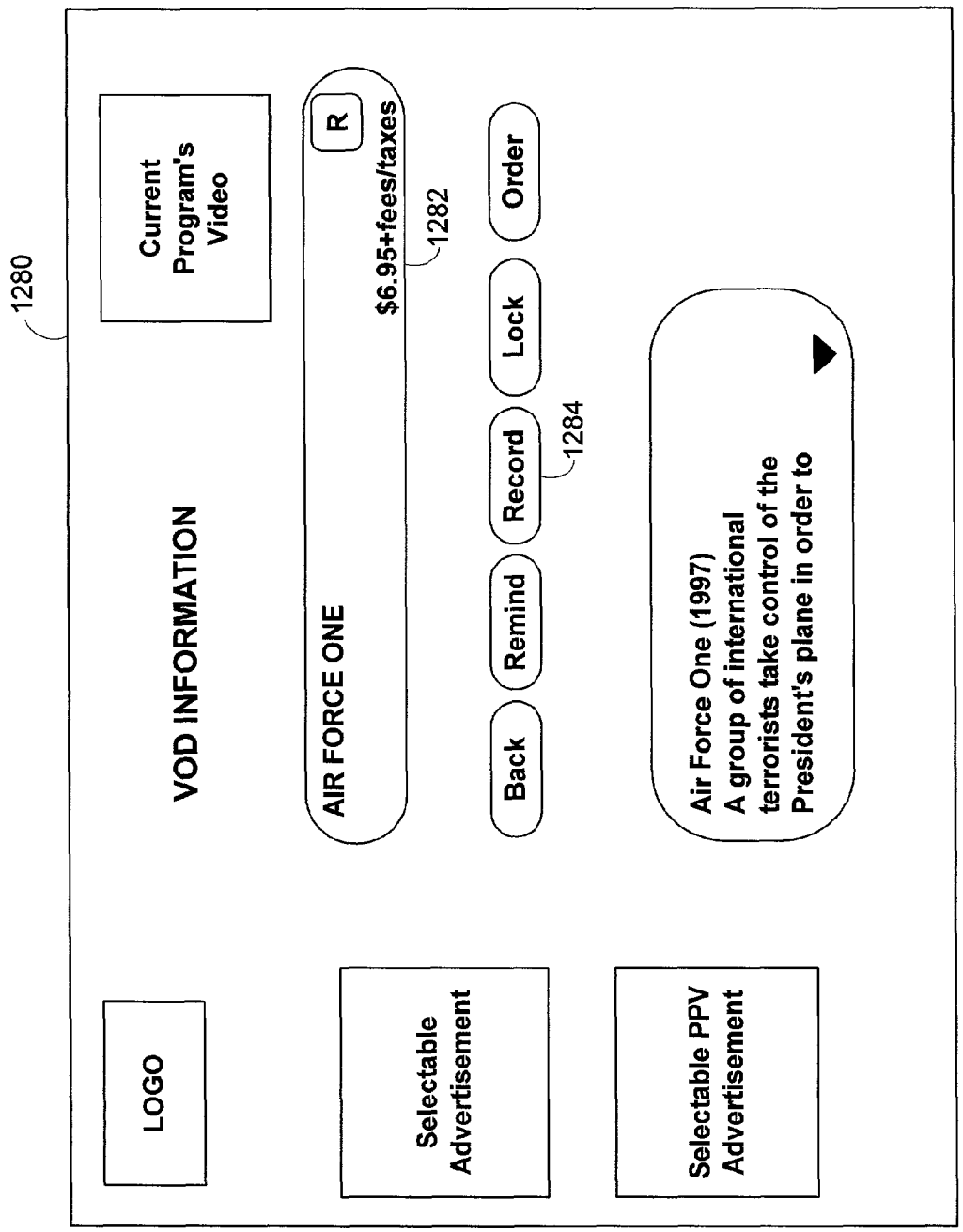
FIG. 27 shows an illustrative information display screen for a VOD program in accordance with one embodiment of the present invention.

FIG. 27 shows illustrative program information display screen 1280 for a VOD program that has not yet been scheduled to be recorded. Display screen 1280 may be displayed in response to a selection of a remote control info button when, for example, listing bar 702 of display screen 700 of FIG. 7 is positioned over a VOD program. With reference now to FIG. 27, display screen 1280 may include title display bar 1282. Display screen 1280 may include information on a VOD program that is listed in display bar 1282 and may include VOD program related program guide options.

Display screen 1280 may include record option 1284. In response to a user selecting record option 1284, the interactive television application may display VOD recording setup display screen 1350 as shown in FIG. 28.

Figure 28:
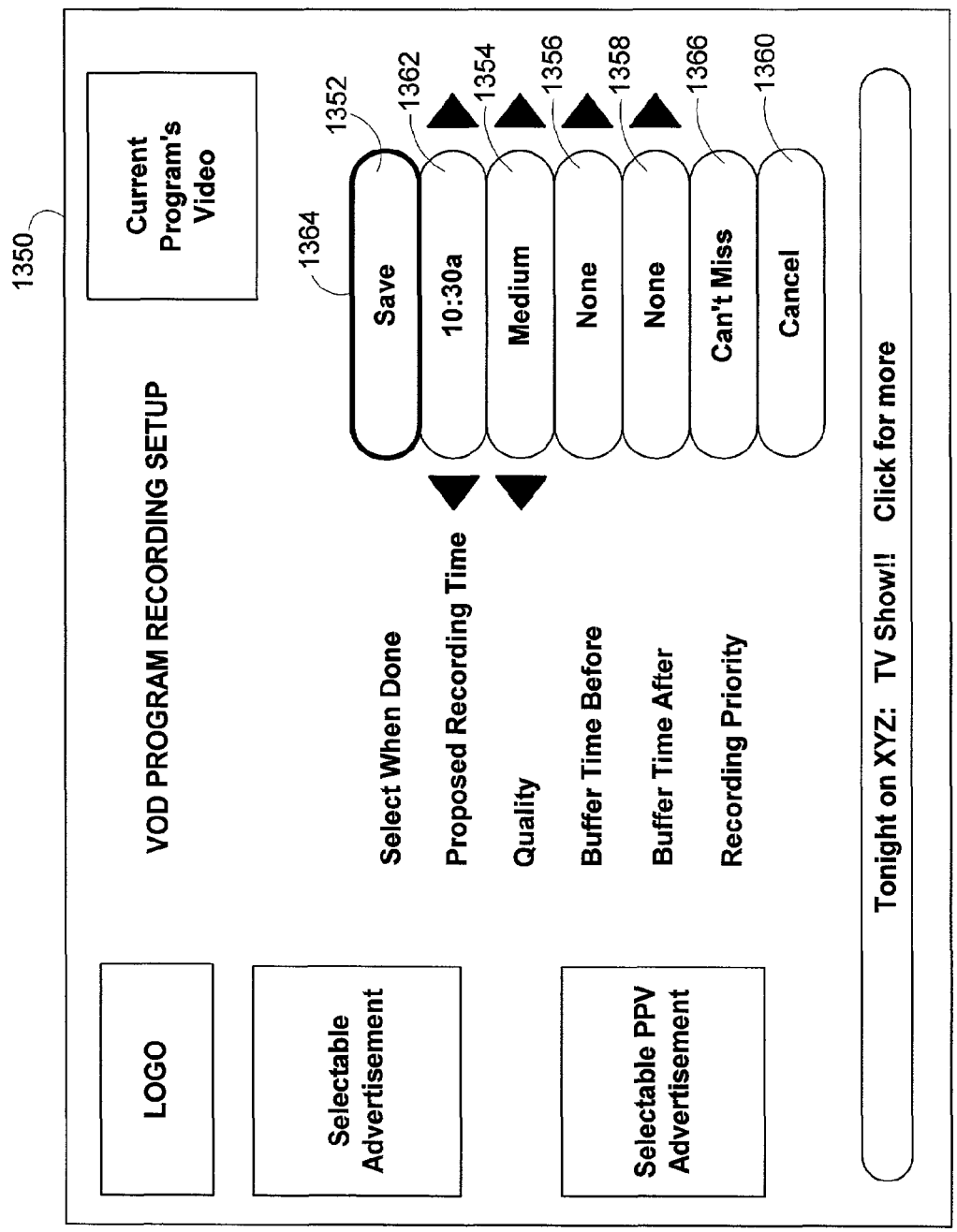
FIG. 28 shows an illustrative VOD recording setup display screen for configuring a recording of a VOD program to be scheduled in accordance with one embodiment of the present invention.

With reference now to FIG. 28, VOD recording setup display screen 1350 may include save option 1352, proposed recording times option 1362, quality option 1354, buffer time before option 1356, buffer time after option 1358, cancel recording option 1360, and recording priority 1366. These options may be provided based on illustrative steps 1260, 1262, 1264, 1266, 1268, and 1270 shown in FIG. 26.

As mentioned above, buffer time before option 1356 and buffer time after option 1358 may not be necessary for recording VOD programs and may not be selectable by the user.

The interactive television application may propose a recording time for a VOD program based on currently scheduled recordings and reminders. The interactive television application may also determine what recording times are available to record the VOD program and may create a list of proposed recording times.

The interactive television application may provide the user with the ability to move highlight window 1364 over proposed recording times option 1362 and to use remote control navigation buttons to scroll through proposed times to select a recording time. The proposed times may include the current time in order to allow the user to immediately record the VOD program. The interactive television application may provide the user with the ability to move highlight window 1364 over quality option 1354 and to use remote control navigation buttons to scroll through recording quality settings to select the quality for a recording. The interactive television application may provide the user with the ability to move highlight window 1364 over recording priority option 1366 and to use remote control navigation buttons to set the recording priority for a recording. The selection of save option 1352 may schedule the desired recording based on the related recording settings that have been set by the user. In response to the selection of cancel option 1360, the interactive television application may exit the current display screen and return to a previous display screen without scheduling the VOD program to be recorded, or if desired, cancel option 1360 may be used to cancel the scheduled recording of the VOD program. If desired, display screen 1350 may be shown if the user selects a record option for a VOD program that already has a recording scheduled, in which case the application may allow the user to modify recording settings or cancel the scheduled recording.

While a VOD program is being recorded, the interactive television application may provide the user with the ability to only control the playback of the VOD program locally using typical PVR flow control options. For example, the user may not be permitted to control playback from a VOD server when the VOD program is being recorded. However, the user may be permitted to control the playback of the VOD program through the user's local PVR. User playback control for a VOD program may be available up to the point in the VOD program that has been recorded by the PVR.

Figure 29:
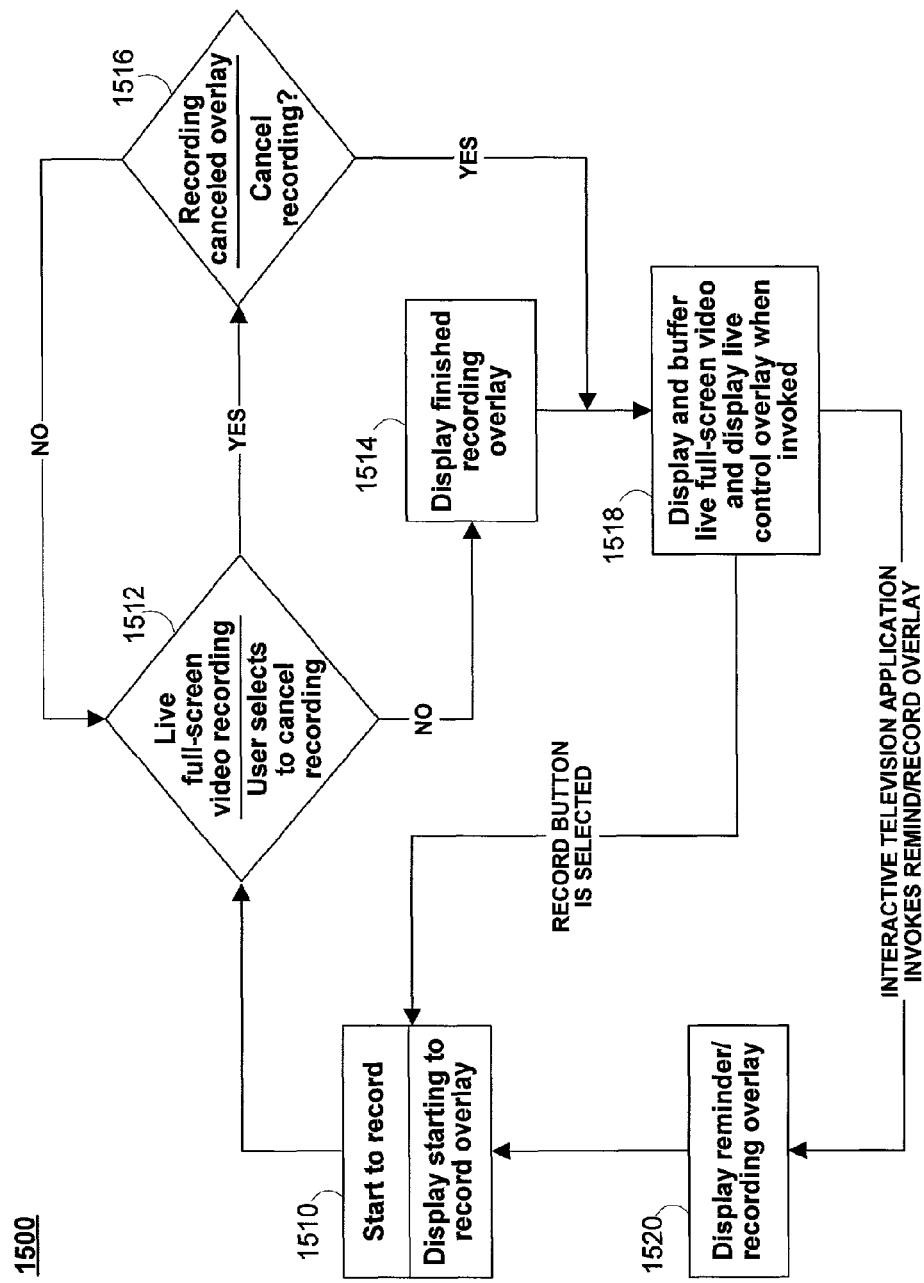
FIG. 29 shows an illustrative process that may be used when recording a program in accordance with one embodiment of the present invention.

A PVR may be used to record, play, or buffer television content. FIG. 29 shows illustrative process 1500 that may be involved in using a PVR. At step 1520, the interactive television application may display a reminder overlay for a scheduled recording that is displayed shortly before the scheduled recording. The recording may have been scheduled by the user or by the interactive television application. The reminder overlay may include one or more options. The overlay may allow the user to cancel the recording (if a series recording is configured this would only cancel the recording of a single episode). The overlay may provide the user with the ability hide the overlay so that the user may finish watching the current program and start the recording at the scheduled time. The overlay may allow the user to end viewing of the current program and start recording the program immediately. The overlay may allow the user to tune to the program but cancel the recording, which allows the user to watch the program, but not save a copy. In response to no activity by the user, the overlay may be removed after a predetermined amount of time and the interactive television application may tune the channel airing the scheduled program, and recording may begin. At step 1510, the interactive television application may start to record a program and may display a starting to record overlay.

At step 1512, following step 1510, the interactive television application may display live video of a program that is being recorded and may monitor user activity to determine if the user has selected to cancel the recording. For example, the user may be permitted to select to cancel a recording by pressing a remote control record button or by pressing a different remote control button to change the current channel (the channel that is be used for the recording) when the recording is in progress. If the user does not select to cancel the recording, the interactive television application may continue to step 1514. Otherwise, step 1516 may be performed when the user selects to cancel the recording. At step 1516, the interactive television application may display a cancel recording overlay. If desired, the cancel recording overlay may provide the user with the ability to select to confirm that the recording should be canceled. If the user chooses not to cancel the recording, then the interactive television application may return to step 1512. If the user chooses to cancel the recording, then the interactive television application may continue to step 1518. During a recording, a user may select to pause, rewind, fast-forward, or take some other playback control action without affecting the recording of the program. The user may fast-forward to the "live" point in the program, the time at which new content is currently being recorded. If desired, the application may allow a user to watch a previously recorded program while a current program is being recorded.

The interactive television application may continue to step 1518 following step 1514. At step 1514, the interactive television application may display a finished recording overlay, which may show a message indicating that a recording is complete. The recording, whether completed or partly completed (e.g., partly completed because the user canceled the recording), may be available to the user for playback for example, from a recording listings display screen (see FIG. 36).

Live television programming may be buffered when a recording is canceled or completed. For example, a tuner that was being used for the recording may be used for buffering live television program on a PVR when the recording is canceled or completed. If desired, the system may use multiple tuners to allow multiple programs to be recorded simultaneously, or to allow a user to watch one program while one or more programs are being recorded. At step 1518, the interactive television application may display and buffer live full screen video. Also, at step 1518, the interactive television application may display a live control overlay when the user invokes the overlay. The live control overlay may be invoked, for example, by pressing particular remote control buttons such as a play button, a rewind button, a pause button, a fast-forward button, or a stop button. A dedicated button for invoking the overlay may also be used. The live control overlay may include PVR-related task options such as play, pause, rewind, fast-forward, record, and other suitable task options. Options in the live control overlay may be used to play, rewind, pause, or fast-forward live television programming. The live control may be automatically removed if left unused for a certain period of time. The interactive television application may remain at step 1518 until a record option is selected for a live television program or until step 1520.

Step 1520 may be repeated to start process 1500 when the interactive television application displays another remind/record overlay for a scheduled recording. Step 1510 may be repeated to start process 1500 when for example a record option is selected when a user is watching a live television program.

If desired, a recording may be made without displaying any overlays. For example, a set-top box may be turned off when a recording is scheduled to begin. The application may tune to the selected program and begin recording to local storage without turning on user equipment. Alternatively, a program may be recorded on a remote server without any user notification.

Figure 30:
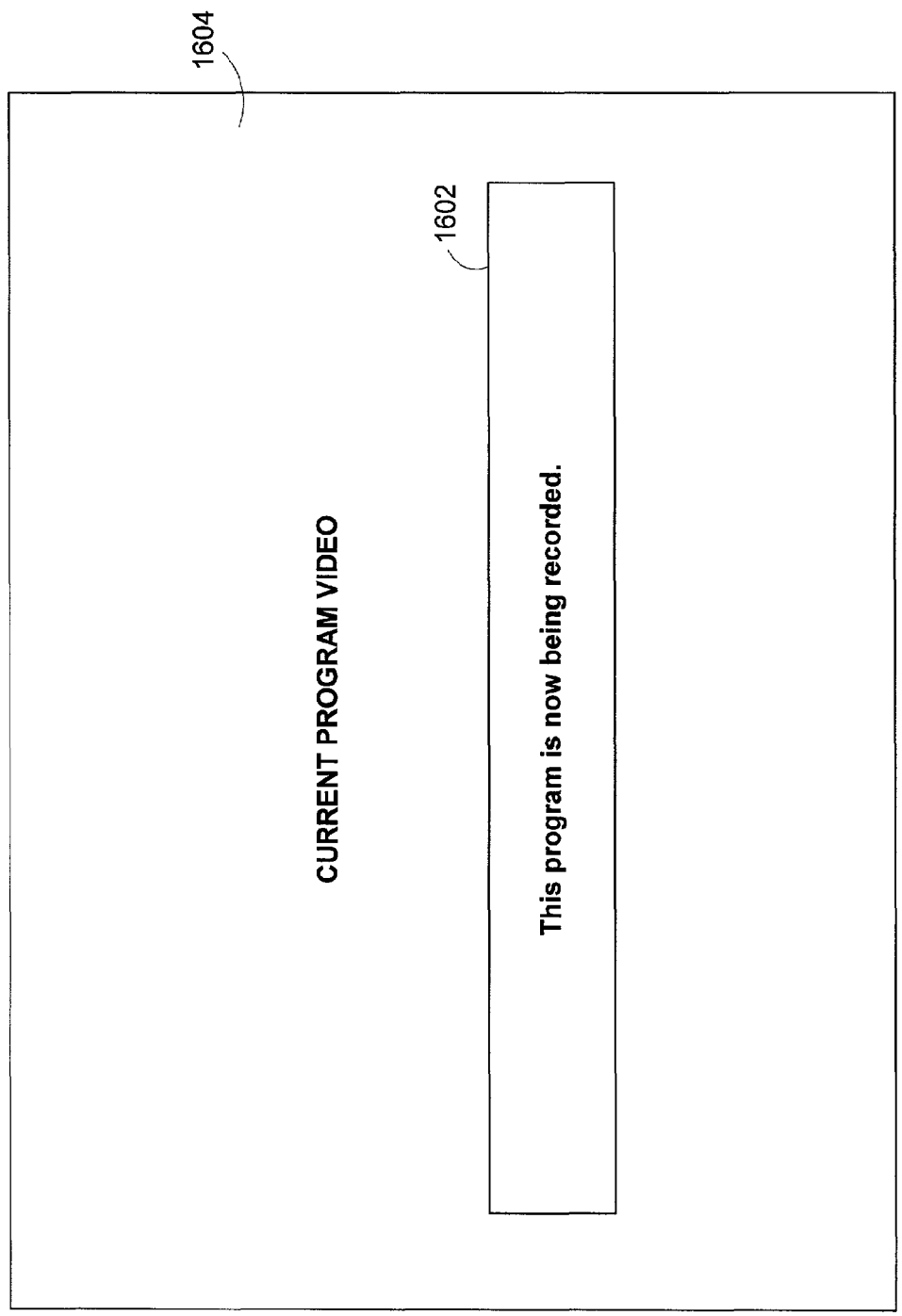
FIG. 30 shows an illustrative starting to record overlay that is displayed over a video of a current program in accordance with one embodiment of the present invention.

A starting to record overlay may be displayed when a PVR starts to record a program. FIG. 30 shows illustrative starting to record overlay 1602 that may be provided by the interactive television application. Overlay 1602 may be displayed by the interactive television application when the interactive television application starts to record a program (e.g. starts to record a program at step 1510 of FIG. 29). Overlay 1602 may indicate that a current program is now being recorded. Overlay 1602 may be displayed over video 1604 for the current program playing in the background. Overlay 1602 may be removed from view after a specified period of time or when the user selects a remote control exit button. The interactive television application may record the current program without including overlay 1602 as part of the recording. If desired, television programming may be recorded without including display screens and overlays as part of the recording.

A user may also be allowed to take other actions when a program is being watched and recorded without those interactions being reflected in the recording. For example, a user may be permitted to mute or change the volume of a program that is being recorded without such changes being included as part of the audio of the recorded program. A user may be permitted to pause, rewind, or perform other program flow control options as a program is being recorded, without affecting the recording of the program. A user may be allowed to watch a previously recorded program when a new program is being recorded, without affecting the recording of the new program.

Figure 31:
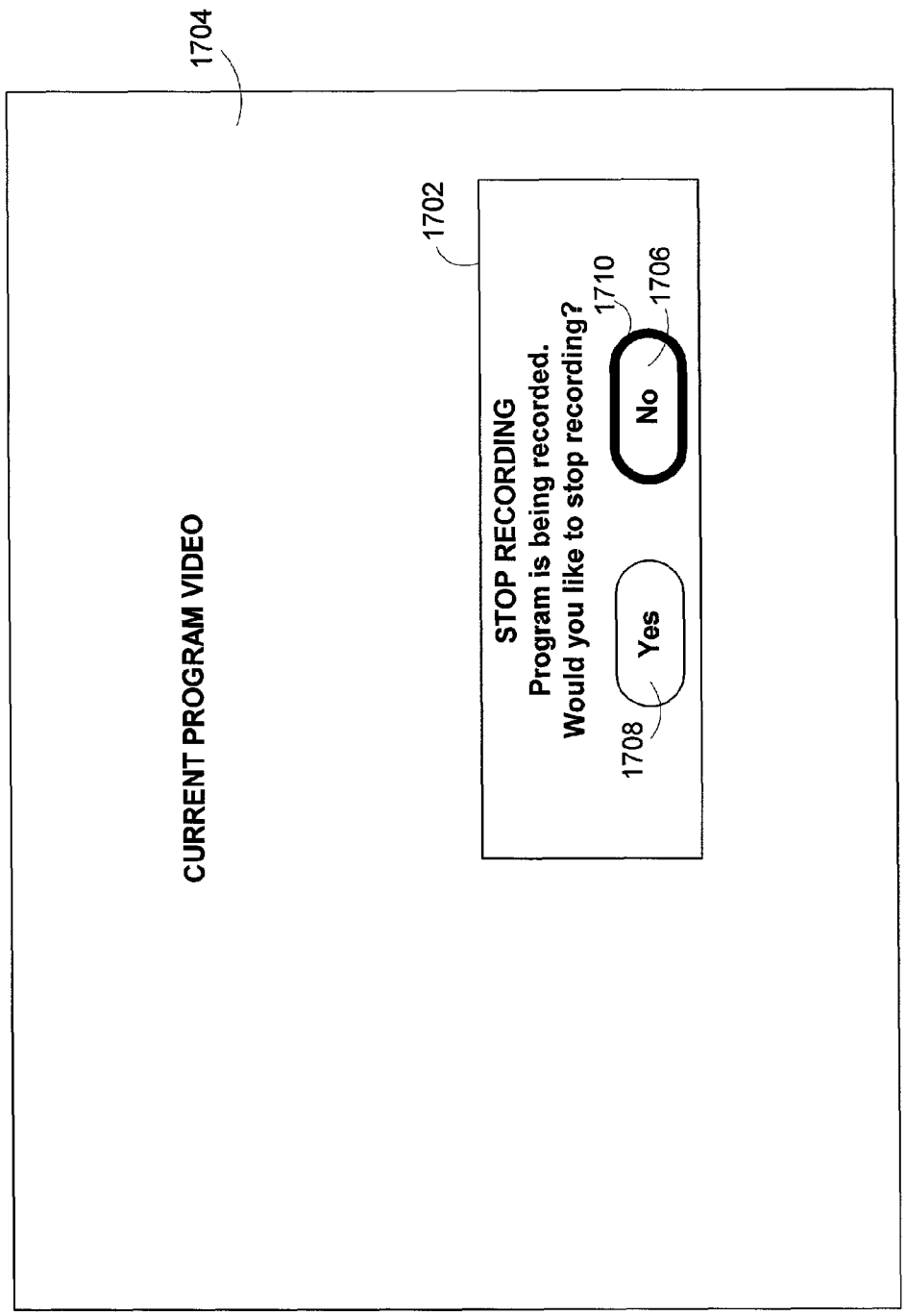
FIG. 31 shows an illustrative cancel recording overlay that is displayed over a video of a current program in accordance with one embodiment of the present invention.

FIG. 31 shows illustrative stop recording overlay 1702 that may be provided by the interactive television application. Overlay 1702 may be displayed over current video 1704 for a program in response to the user attempting to change a current channel while video 1704 is being recorded. Overlay 1702 may be an example of step 1516 of process 1500 of FIG. 29. If desired, the application may allow the user to change channels without affecting a recording that is in progress, if, for example, the system includes multiple tuners or if the program is being recorded on a remote server.

Overlay 1702 may include "no" option 1706 and "yes" option 1708. The interactive television application may provide the user with the ability to use highlight window 1710 to select "no" option 1706 or "yes" option 1708. In response to a selection of "no" option 1706, the interactive television application may continue to record and display current video 1704 for the current program. In response to a selection of "yes" option 1708, the interactive television application may stop the recording and allow the user to change the channel. If there is no response to overlay 1702, the interactive television application may remove overlay 1702 and continue the recording. If desired, a passive stop recording overlay or cancel recording overlay may be displayed when a user selects to cancel a current recording.

Figure 32:
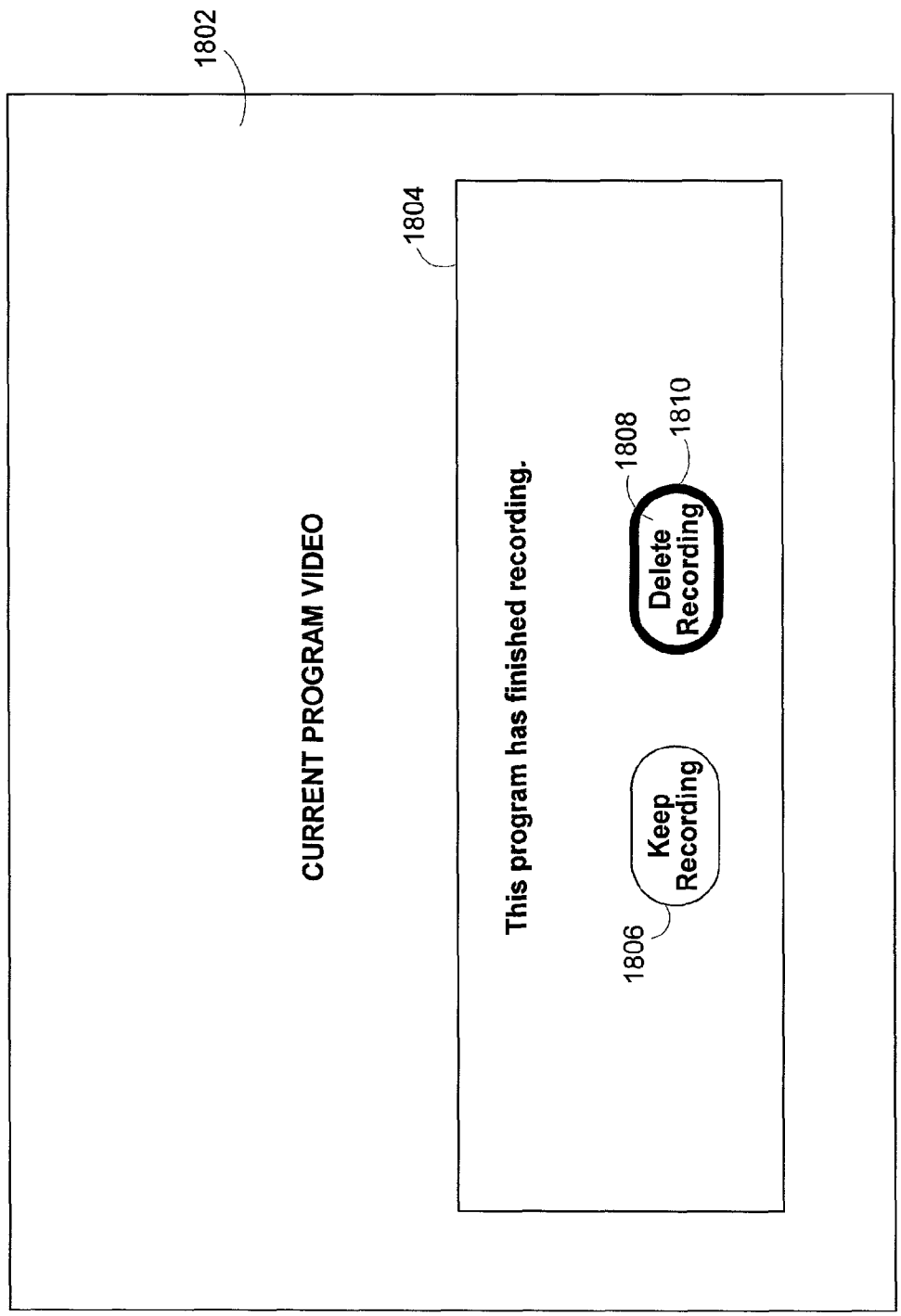
FIG. 32 shows an illustrative finished recording overlay that is displayed over a video of a current program in accordance with one embodiment of the present invention.

FIG. 32 shows illustrative finished recording overlay 1804 that may be provided by the interactive television application. Overlay 1804 may be displayed when a scheduled recording is completed. Overlay 1804 may include keep recording option 1806 and delete recording option 1808. The interactive television application may provide the user with the ability to move highlight window 1810 over keep recording option 1806 to select that option. A user may select option 1806 to remove overlay 1804 and keep the recording of the program on the PVR. The interactive television application may provide the user with the ability to move highlight window 1810 over delete recording option 1808 to select that option (e.g., by pressing a remote control "OK" button). A user may select option 1808 to remove overlay 1804 and delete the recording of the program from the PVR. In response to inactivity by a user after a specified period of time the interactive television application may automatically select to keep the recording and remove overlay 1804. Overlay 1804 may be displayed over current video 1802 for a particular program. If desired, overlay 1804 may not be displayed if, for example, a recording or reminder is scheduled immediately following the recording that just completed.

Figure 33:
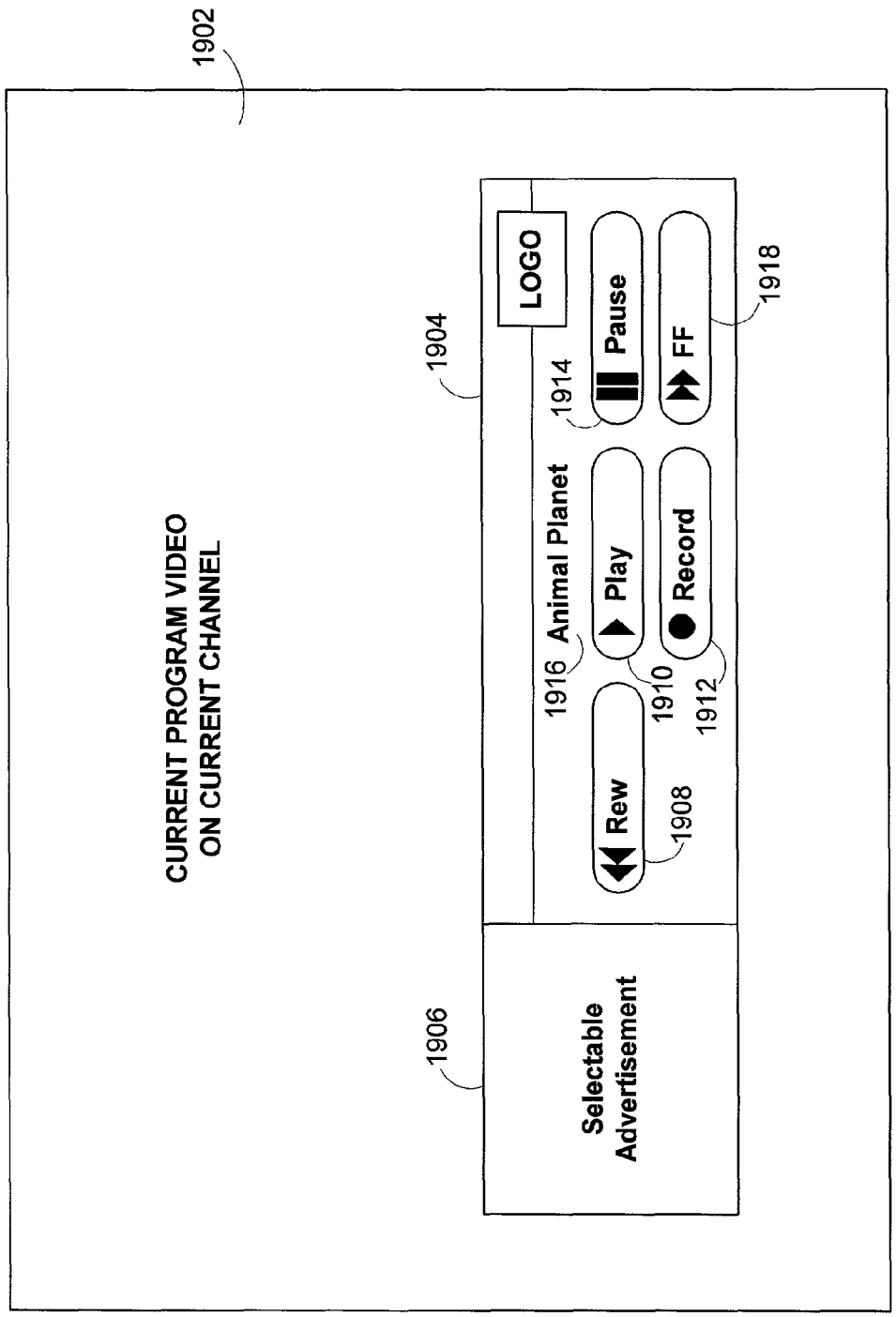
FIG. 33 shows an illustrative live controls overlay that is displayed over a video of a current program on a current channel in accordance with one embodiment of the present invention.

A PVR may be used to buffer live television program and to control the flow of live television programming (e.g., to pause a live program). FIG. 33 shows illustrative live control overlay 1904 that may be provided by the interactive television application. Overlay 1904 may be displayed when a user invokes program flow control options, for example, by pressing a particular remote control button such as a pause button, a rewind button, a dedicated button for invoking the overlay, or another suitable remote control button. Overlay 1904 may include options for controlling the flow of a live television program. Overlay 1904 may be provided based on step 1518 of process 1500 of FIG. 29. Overlay 1904 may be displayed over current video 1902 for a particular program. Overlay 1904 may include selectable advertisement 1906, rewind option 1908, play option 1910, record option 1912, pause option 1914, program title 1916, and fast-forward option 1918.

In response to a user selecting rewind option 1908, the interactive television application may display buffered video 1902 that is rewinding. In response to the selection of pause option 1914, the interactive television application may display buffered video 1902 of the current program that is paused. In response to the selection of play option 1910, buffered video 1902 may resume playing at normal speed. Overlay 1904 may also provide an option to advance video 1902 frame-by-frame (e.g., by repeatedly selecting pause option 1914). In response to the selection of fast-forward option 1918, the interactive television application may display buffered video 1902 of the current program in fast-forward. In response to the selection of record option 1912, the interactive television application may record the current program. Rewind option 1908 and fast-forward option 1918 may be used to fast-forward and rewind a program at different speeds. The range of different speeds may include a range from different slow motion speeds to different fast-forward speeds. Switching between different speeds may be performed through successive selections of the same option (e.g., successive selections of fast-forward option 1908 or successive selections of rewind option 1908). To stop recording a current program or to stop playback of a recording, the interactive television application may require the user to press a remote control stop button once or more than once to confirm the desired action. Stopping a PVR from recording may cancel that scheduled recording. If desired, a stop option may be displayed in overlay 1904 when appropriate.

A remote control stop button may further function in the same way as a pause option when a user is watching live television (i.e., live television of a program that is not being recorded is being buffered.)

Techniques for buffering and recording programs are further discussed below. Overlay 1904 may also be displayed to allow a user to control the flow of a recording that is playing from a PVR. Overlay 1904 may be displayed without including record option 1912 when overlay 1904 is being used to control a recording. See for example FIG. 39.

Figure 34:
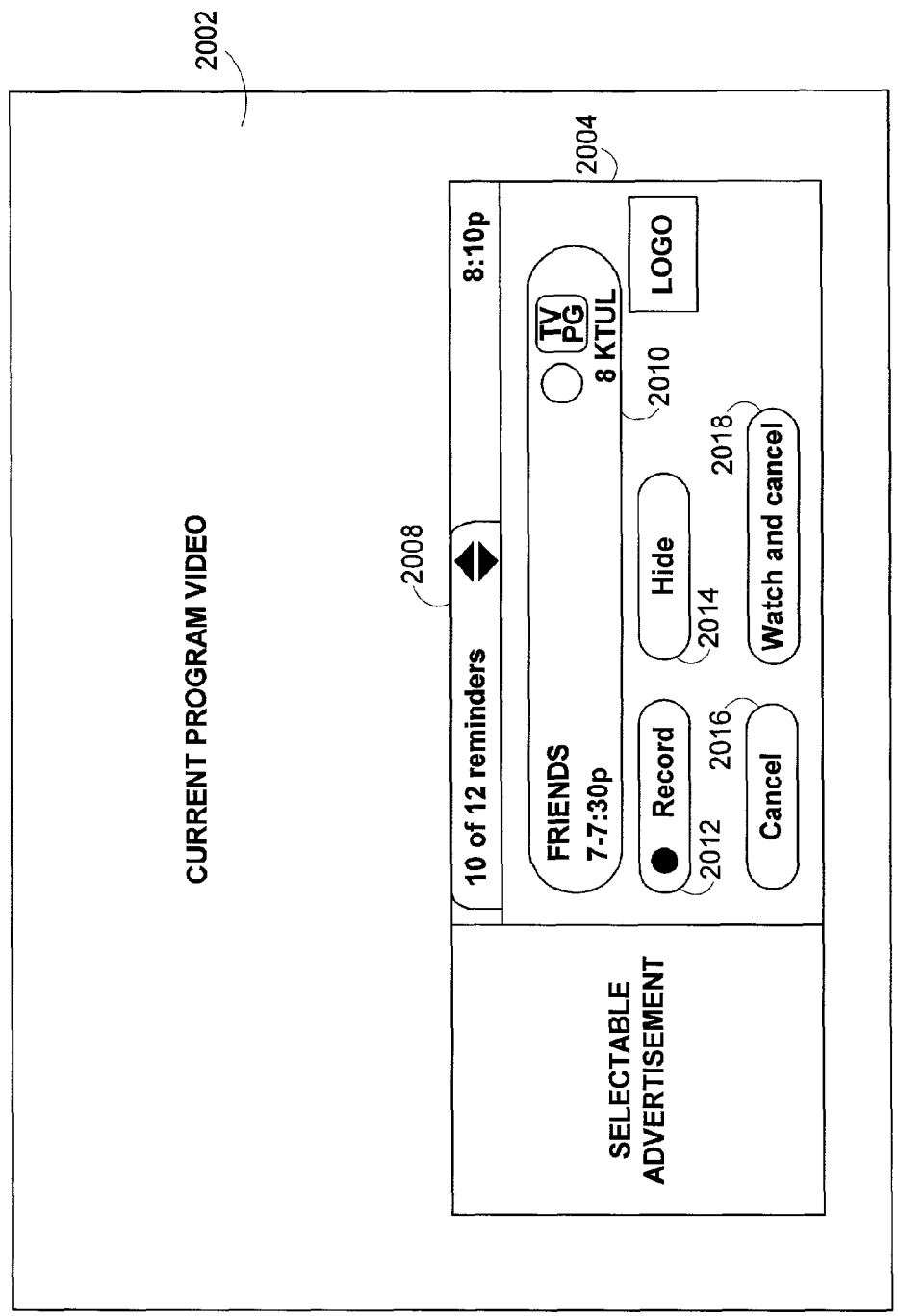
FIG. 34 shows an illustrative recording reminder overlay that is displayed over a video of a current program in accordance with one embodiment of the present invention.

FIG. 34 shows illustrative recording reminder overlay 2004 that may be provided by the interactive television application. Overlay 2004 may be provided based on step 1520 of process 1500 of FIG. 29. Overlay 2004 may be displayed over current video 2002 for a particular program. Overlay 2004 may include reminder tab 2008, reminder information 2010, record option 2012, hide option 2014, cancel option 2016, and watch and cancel option 2018.

Overlay 2004 may be displayed at a specified period of time before a scheduled recording. The specified period of time may be fixed by the application, may be defined by a user in a setup screen, or may be configured by the user for an individual recording when that recording is scheduled. Reminder tab 2008 may include a list of other reminders for scheduled recordings. In response to a selection of record option 2012 the interactive television application may end viewing of the current program and may start to record the scheduled recording immediately. The interactive television application may dismiss reminder overlay 2004 and maintain the recording at the scheduled time in response to a selection of hide option 2014. If desired, after hiding reminder overlay 2004 using hide option 2014, a user may press a remote control button to cause the application to redisplay reminder overlay 2004. The interactive television application may cancel the recording in response to a selection of cancel option 2016. In response to a selection of watch and cancel option 2018 the interactive television application may tune to the program but cancel the recording, allowing the user to watch the program, but not save a copy. In response to no activity by the user, overlay 2004 may be automatically removed and the interactive television application may tune the channel for the scheduled recording and begin recording. Once a recording that is scheduled starts, starting to record overlay 1602 of FIG. 30 may be displayed to indicate that the program is being recorded.

The interactive television application may display a particular program information display screen for programs that are available for playback from a PVR. FIG. 35 shows illustrative process 2100 that may be used in displaying a PVR recording information display screen. At step 2110, the interactive television application may display a PVR recording listings display screen and provide a user with the ability to select to play a recording that is listed in the listings display screen or select an information option for a particular listing. If desired, the user may select to play a recording or view information about a recorded program from any location in which the program is listed such as a program type listings display screen, a search listings display screen, a by time listings display screen, a by channel listings display screen, a browse overlay, a flip overlay, or any other suitable screen. If the user selects to play a recording for example by pressing a remote control "OK" button or a remote control play button, the interactive television application may proceed to step 2136. If the user selects an information option for a recording, the interactive television application may proceed to step 2120.

At step 2120, the interactive television application may provide the user with the ability to view information on a particular recording. At step 2122, the interactive television application may provide the user with the ability to return to the last screen that was displayed. At step 2124, the interactive television application may provide the user with the ability to play a recording (e.g., a recorded program). If the user selects to play the recording, the interactive television application may play the recording at step 2136. If desired, there may be multiple play options, for example to resume playing from the most recent point at which playing ended, or to restart playing from the beginning of the recorded program. At step 2125, the interactive television application may provide the user with the ability to delete a PVR recording. At step 2126, the interactive television application may provide the user with the ability to edit delete priority settings for a recording. If the user selects to edit delete priority settings, the interactive television application may proceed to step 2132. At step 2132, the interactive television application may display a delete priority display screen for configuring delete priority settings for a PVR recording.

At step 2128, the interactive television application may provide the user with the ability to modify access privileges to a recording (e.g., lock a recording). At step 2130, a user may be provided with an opportunity to select to have a recording copied to a VCR or other external recording device. The interactive television application may display a VCR setup display screen at step 2134 when a user selects to copy a PVR recording to a VCR. If desired, at step 2134, the interactive television application may copy a PVR recording to a VCR based on user selections in a VCR setup display screen. At step 2135, the interactive television application may provide the user with the ability to modify series recordings settings if the PVR recording is part of an active series recording. If the PVR recording was not recorded as part of a series recording or is not part of a currently active series recording, the interactive television application may allow a user to schedule a new recording or new series recordings based on the PVR recording. A recorded program information display screen may also include a preview option. Selecting this option may display a partial-screen scaled video version of the program that is embedded in the program information display screen.

At step 2136, the interactive television application may display full screen video of a recording that a user has selected to play. A PVR control overlay may also be displayed that includes PVR playback-related task options.

Figure 36:
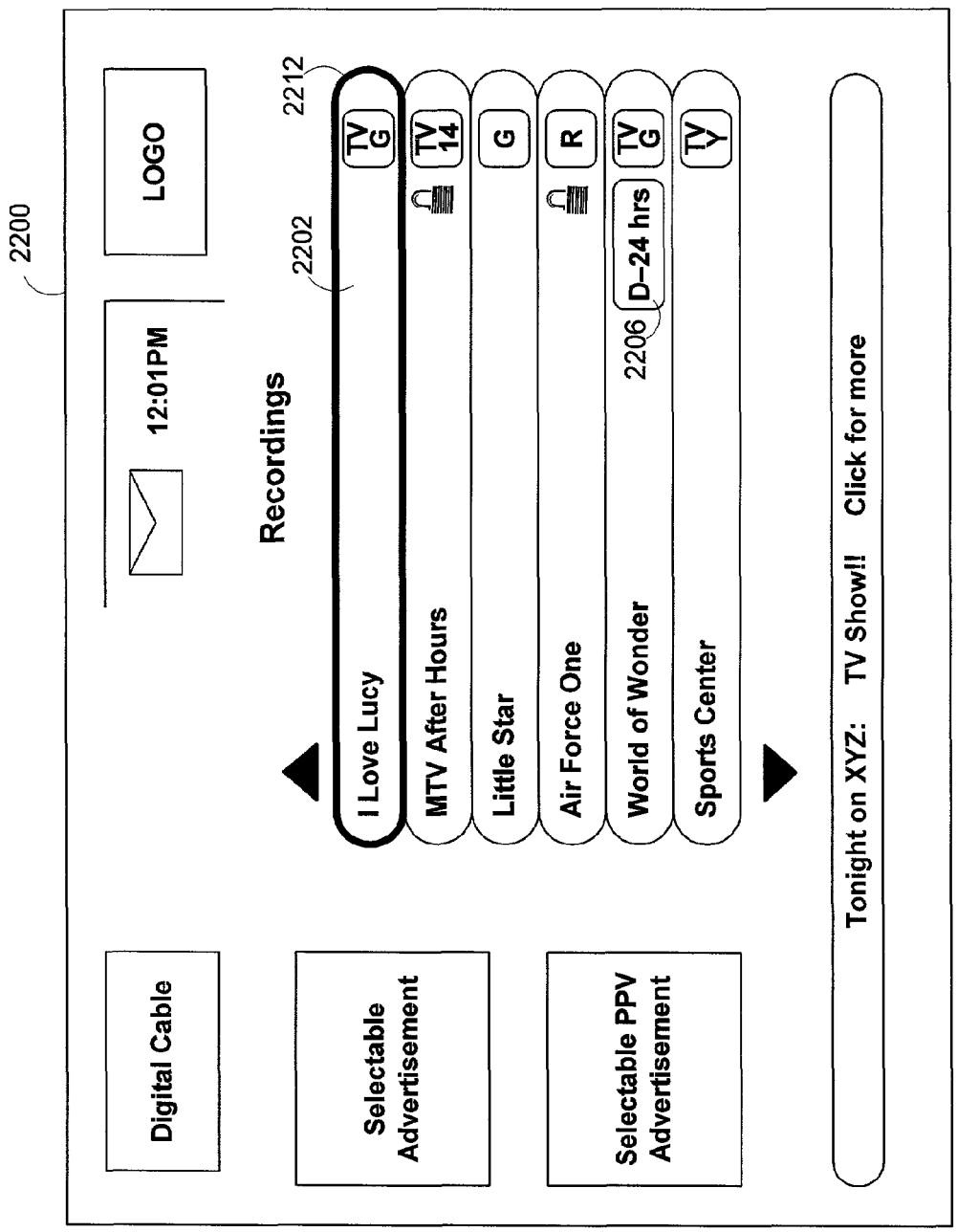
FIG. 36 shows an illustrative PVR recording listings display screen in accordance with one embodiment of the present invention.

FIG. 36 shows illustrative PVR recording listings display screen 2200 that may be provided by the interactive television application. Display screen 2200 may be displayed in response to a selection of recordings option 518 in display screen 500 of FIG. 5. Display screen 2200 may include program titles within listing bars such as listing bar 2202. Display screen 2200 may include delete icon 2206 in a listing bar indicating that the program related to delete icon 2206 may be deleted in the amount of time specified in icon 2206. Delete icon 2206 may appear in display screen 2200 or in any other suitable display screen or overlay. If desired, listing bar 2202 may explicitly include a recorded content icon (e.g., recorded content icon 704 of FIG. 7) that may explicitly indicate that a PVR recording is associated with the program listed in listing bar 2202.

A user may select to play a recording by moving highlight window 2212 over listing bar 2202 and pressing a remote control "OK" button or remote control play button. The interactive television application may play the recorded program from the beginning or from a current playback location, if desired. In response to the selection of a remote control "OK" button or a remote control play button, the interactive television application may display a PVR playback video overlay. See for example FIG. 39.

In response to a user moving highlight window 2212 over a particular listing of a recording and pressing a remote control info button, the interactive television application may display a recording information display screen.

A recording, such as the recording in listing bar 2202, may have been automatically recorded as part of a series recording or as a keyword recording. If a particular recording has been scheduled for recording by both a series recording and a keyword recording, the interactive television application may only save one copy of the recording.

Recordings on this screen may be sorted based on any suitable criteria. This may include, for example, alphabetical, by recording date, by recording priority, by delete priority, by viewing status, whether recorded automatically or as specified by a user, or any other criteria or combination of criteria.

Figure 37:
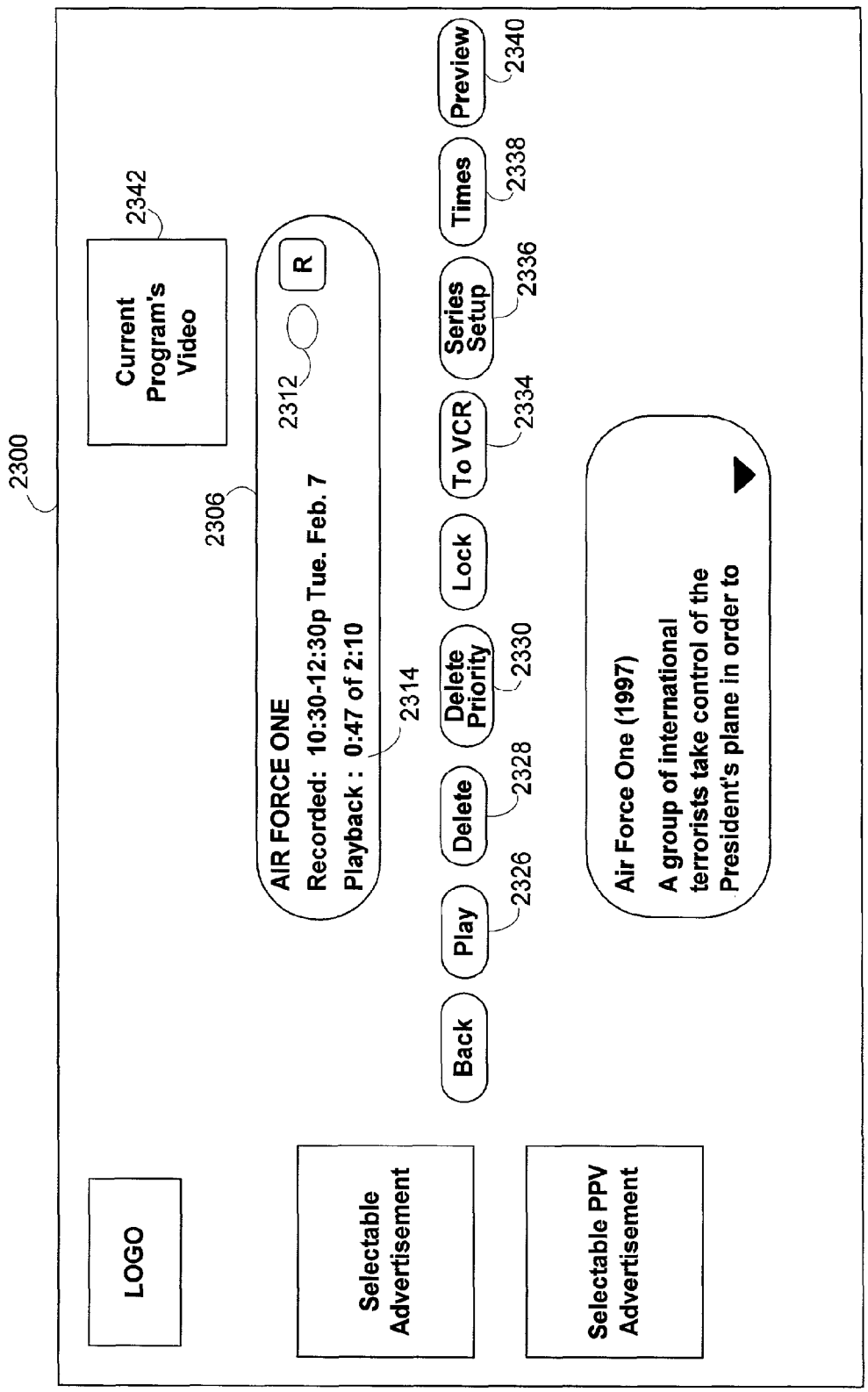
FIG. 37 shows an illustrative recorded program information display screen for a particular recording of a program in accordance with one embodiment of the present invention.

FIG. 37 shows illustrative recorded program information display screen 2300 that may be provided by the interactive television application. Display screen 2300 may include title display bar 2306 that may contain recorded content icon 2312. Recorded content icon 2312 may indicate that a PVR recording is available for the program that is identified in title display bar 2306. Playback counter 2314 may indicate up to what position in the program a user has viewed.

Display screen 2300 may include play option 2326, delete option 2328, delete priority option 2330, to VCR option 2334, series setup option 2336, and times option 2338. These options may have been provided based on illustrative steps 2124, 2125, 2126, 2130, and 2135, shown in FIG. 35. In response to a selection of play option 2326, the interactive television application may play a recording of the program that is identified in title display bar 2306. If desired, there may be more than one play option to allow a user to play a recording from the beginning of the recorded program or to play the recording from the position of playback counter 2314. In response to a selection of delete option 2328, the interactive television application may delete the recording of the program and/or delete information about that particular recording. In response to a selection of delete priority option 2330, the interactive television application may display a delete priority display screen and may provide the user with options for configuring delete priority settings.

In response to a selection of to VCR option 2334, the interactive television application may display a to VCR setup display screen and may allow the user to transfer the recorded program from the PVR to a VCR or other devices. A to VCR setup display screen may provide a user with options for configuring the transfer of the recorded program from the PVR to a VCR. In response to a selection of series setup option 2336, the interactive television application may display a series setup display screen, such as that shown in FIG. 10. A series setup display screen may provide the user with the ability to modify recording settings for an active series recording corresponding to the selected program or create a new series recording if one does not exist for the selected program. In response to a selection of times option 2338, the interactive television application may display a list of other recordings of that program and list upcoming episodes of that program. Examples of interactive television program guides with interactive information display screens are illustratively shown in Rudnick et al. U.S. patent application Ser. No. 09/356,268, filed Jul. 16, 1999, which is mentioned above.

Display screen 2300 may include preview option 2340. In response to a selection of preview button 2340, the interactive television application may play scaled video of the recorded program in video window 2342. If desired, the application may display a control panel with control keys to stop, fast-forward, pause, rewind, etc., or the user may control the video using keys on the remote control. The control panel may displayed in or over display screen 2300. If desired, a current program that was playing in video window 2342 may be automatically paused when the recorded program is being previewed.

Figure 38:
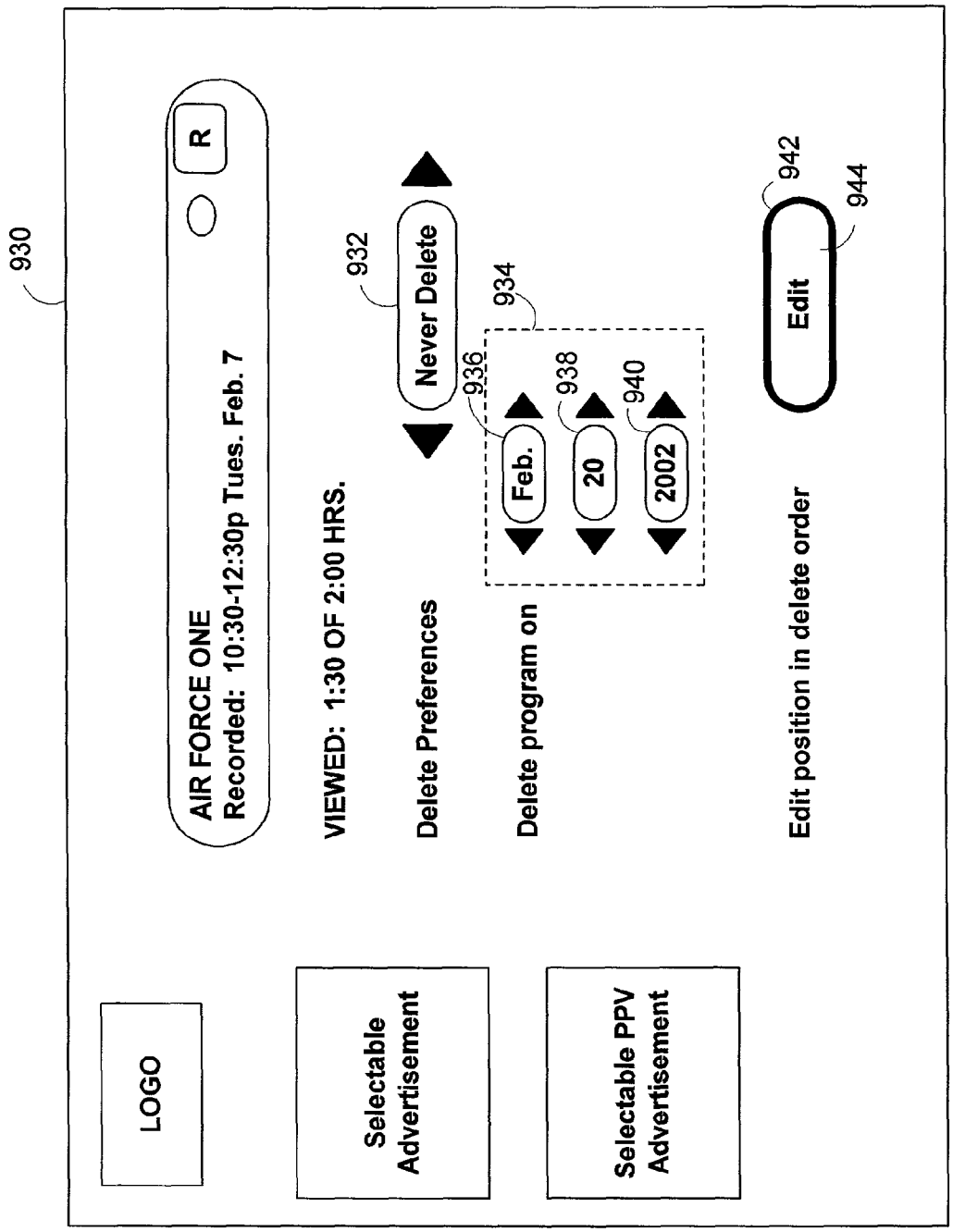
FIG. 38 shows an illustrative program delete priority setup display screen in accordance with one embodiment of the present invention.

An interactive television application may automatically delete programs to manage storage space. Delete priority settings may be used to manage which recordings are deleted by an interactive television application. FIG. 38 shows illustrative program delete priority setup display screen 930 that may be provided by the interactive television application. Display screen 930 may provide the user with the ability to set delete priority settings for a program. Display screen 930 may be displayed in response to a user selecting delete priority option 2330 of FIG. 37. Display screen 930 may include delete preferences option 932 and edit delete order option 942.

The interactive television application may provide the user with the ability to select a delete preference for a recording using delete preferences option 932. A user may scroll through different delete preference setting using option 932. A delete preference setting that may be set for a recording may include a setting to never delete, a setting to make a recording a preferred recording, a setting to delete a recording when space is needed, a setting to delete the program after it has been viewed, or other settings. If a never delete setting is selected, the interactive television application may delete a recording only when a user specifically requests that recording to be deleted. If a preferred recording setting is selected, the interactive television application may delete recordings that do not have preferred recording settings before deleting recordings that have preferred recording settings. If a delete a recording when space is needed setting is selected, the interactive television application may delete the program when space to record a program is needed. If desired, the interactive television application may first check the priority of recordings and then the age of the recording to determine which programs to delete. If desired, a program may have two delete priorities, one that is used before the program has been viewed and one that is used after the program has been viewed.

Delete program on date option 934 may be made available to a user when a delete preference other than a never delete setting has been selected for the current program. Delete program on date option 934 may include delete on month option 936, delete on day option 938, and delete on year option 940. The interactive television application may provide the user with the ability to move highlight window 942 over delete on month option 936, delete on day option 938, and delete on year option 940 and respectively scroll through month, day, and year to select the date to delete the program.

When a user selects edit delete order option 944, the interactive television application may display a list that shows the order in which currently stored recordings may be deleted. See for example display screen 3600 of FIG. 53.

Figure 39:
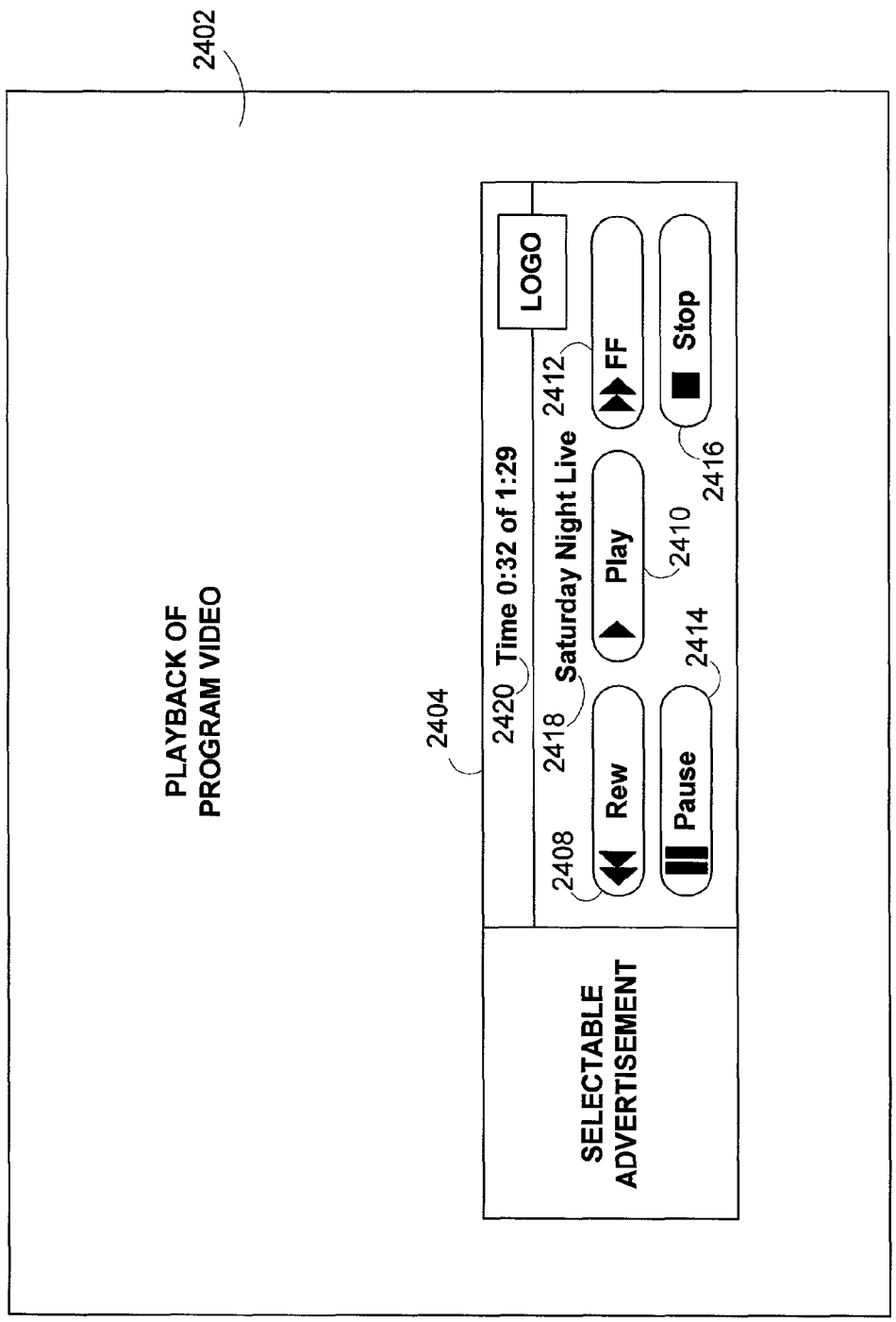
FIG. 39 shows an illustrative PVR playback video overlay that is displayed over a video of a recorded program in accordance with one embodiment of the present invention.

FIG. 39 shows illustrative PVR playback video overlay 2404 displayed over video 2402 of a program that the interactive television application is playing from a recording on a PVR. Overlay 2404 may be an example of step 2136 of process 2100 of FIG. 35.

Overlay 2404 may be used to control the flow of video 2402. Overlay 2404 may include rewind option 2408, play option 2410, fast-forward option 2412, pause option 2414, stop option 2416, program title 2418, and playback time 2420. Playback time 2420 may inform the user of the length of the recording and inform the user how much video 2402 has been viewed. Playback video overlay 2404 and the flow control options contained therein are similar to live controls overlay 1904 of FIG. 33 and options contained therein. Stop option 2416 may function in the same way as a pause option while watching live television that is not being recorded. If a recording has been scheduled and is being recorded, stop option 2416 may function to cancel the scheduled recording.

If desired, the interactive television application may also allow the user to skip video 2402 forward or back a specified period of time in a recording or buffered television program by pressing particular remote control buttons such as page up or down buttons that are typically included in remote controls.

Figure 40:
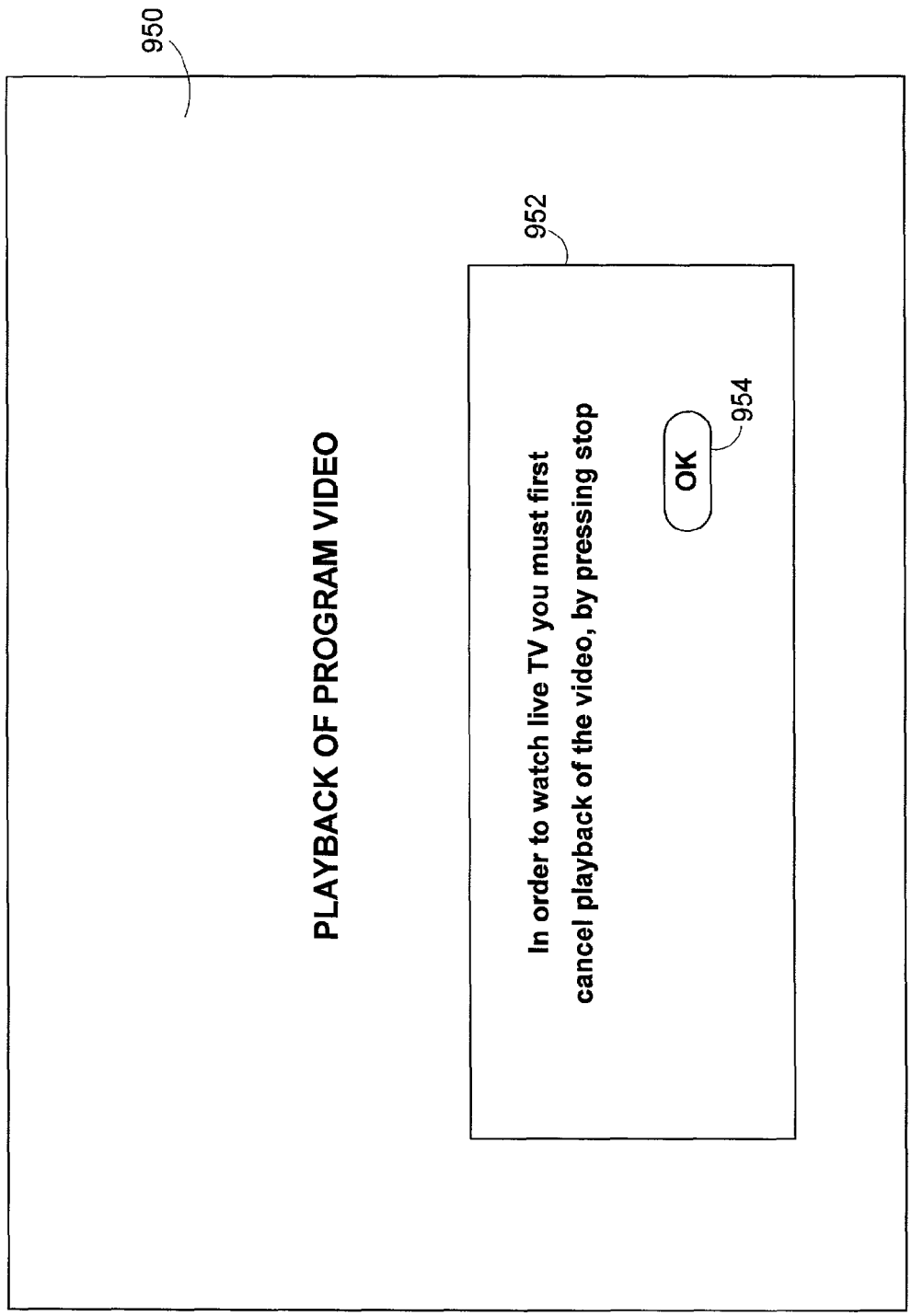
FIG. 40 shows an illustrative message overlay displayed over a video of a program in accordance with one embodiment of the present invention.

If during the playback of video 2402, a user attempts to change the channel, an overlay with a message may appear. FIG. 40 shows illustrative message overlay 952 displayed over video 950 of a program that the interactive television application may be playing from a recording on a PVR. Overlay 952 may include an "OK" option 954 for selecting to remove overlay 952. Overlay 952 may also be removed automatically by the interactive television application after a specified period of time. The message within overlay 952 indicates that the user should press a remote control stop button to cancel the playback of the video so that the user can change the channel. If desired, video 950 may be automatically paused when the user decides to watch another recorded program or change to live television. Video 950 may be paused to be resumed at a later time without including an overlay in video 950.

Figure 41:
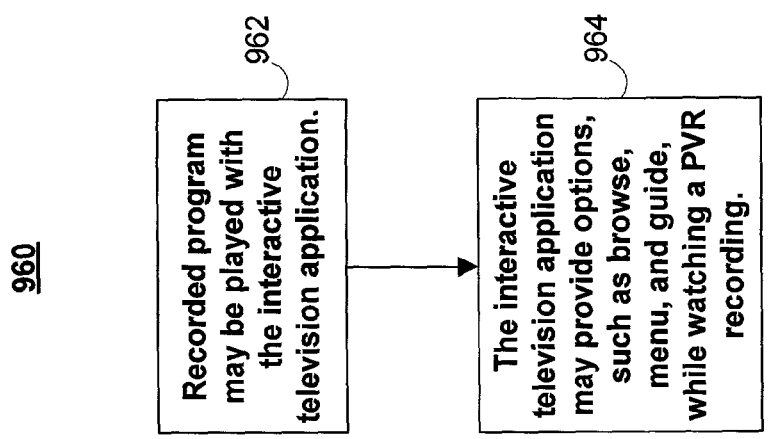
FIG. 41 shows an illustrative process that may be used in accessing program guide options during playback of a recorded program in accordance with one embodiment of the present invention.

FIG. 41 shows illustrative process 960 that includes steps that may be involved in accessing interactive television application options while watching a recording. At step 962, the interactive television application may play a recorded program. At step 964, the interactive television application may provide program guide functions, such as browse, menu, guide, or other options while a user is watching a recording. For example, the interactive television application may provide a user with the ability to press a remote control menu button when video for a recorded program is playing in order to view a main menu display screen. If desired, the interactive television application may automatically pause the playback of the recording when a user accesses a main menu display screen or when other display screens or overlays are displayed.

A user may be permitted to access or modify settings for recording programs that have been scheduled to be recorded. FIG. 42 shows illustrative process 2500 that shows illustrative steps that may be involved in displaying information display screens for programs that are scheduled to be recorded. Step 2502 shows illustrative steps involved in providing a user with the ability to perform a task with respect to a listing in a scheduled recordings display screen.

At step 2514, the interactive television application may display a scheduled recordings display screen or other graphic that includes a listing such as a browse overlay, a by time listings display screen, a by channel listings display screen, a by type listings display screen, or a search listings display screen. The interactive television application may provide the user with the ability to view information on a listing by selecting an information option for a listing. At step 2514, the interactive television application may also allow the user to cancel a scheduled recording of a program by pressing a remote control record button in connection with a listing of that program. In response, a recording canceled overlay may be displayed at step 2522. If desired, pressing a record button may convert a one-time recording to a series recording with default settings if the program is an episode in a series. An overlay may be displayed to inform the user of the conversion.

If the user selects an information option, for example by using a remote control "OK" button or a remote control info button, the interactive television application may display an information display screen for a program that is scheduled to be recorded.

If an information option is selected for a program that is a PPV or VOD program, the interactive television application may determine at step 2528 if that program is currently being recorded. If the program is a PPV or VOD program, which is currently being recorded, the interactive television application may proceed to step 2510. A VOD program that is scheduled to be recorded may be currently recording because a user may have scheduled the recording for the VOD program to be at the current time. If the program is a PPV or VOD program, which is not currently being recorded, the interactive television application may proceed to step 2508. If the program is not a PPV or VOD program, the interactive television application may proceed to step 2506.

Step 2510 may be performed for a PPV or VOD' program when the PPV or VOD program is being recorded. Step 2510 may include steps 2530, 2532, 2536, and 2540 for providing a scheduled program information display screen for a PPV or VOD program that is currently being recorded. At step 2530, the interactive television application may display a scheduled program information display screen. The interactive television application may provide related program guide options at step 2532. Related program guide options may include last, watch, lock, and other suitable program guide options. At step 2536, the interactive television application may provide the user with the ability to select stop recording option. In response to the selection of stop recording button, the interactive television application may stop recording the PPV or VOD program and display a stop recording overlay at step 2540.

Step 2508 may include steps 2542, 2544, 2546, 2550, and 2554 for providing a scheduled program information display screen for a PPV or VOD program that is not currently being recorded. At step 2542, a scheduled program information display screen for a PPV or VOD program that is not currently being recorded may be displayed. The interactive television application may provide related program guide options at step 2544. Related program guide options may include last, lock, and any other suitable program guide options. At step 2546, the interactive television application may provide the user with the ability to select a cancel order option. In response to the selection of a cancel order option, the interactive television application may exit the current scheduled program display screen and may display a recording canceled overlay at step 2554. If desired, an order for a PPV or VOD program may be automatically canceled when a user selects to cancel a scheduled PPV or VOD recording at step 2546. At step 2550, the interactive television application may provide the user with the ability to select to edit recording settings.

Step 2506 may include steps 2572, 2574, 2578, 2580, 2582, 2586, 2588, and 2590 for providing a program information display screen for a non-PPV and non-VOD program that is scheduled to be recorded.

At step 2572, a scheduled program information display screen for the non-PPV and non-VOD program may be displayed. The interactive television application may provide related program guide options at step 2574. Related program guide options may include last, watch (if the program is currently on), lock, and other suitable program guide options. At step 2578, the interactive television application may provide the user with the ability to select a stop recording option. In response to the selection of a stop recording option, the interactive television application may determine if the scheduled recording is currently being recorded at step 2586. If the program is being recorded, the interactive television application may display an overlay to request whether the user wants to stop recording the program at step 2588. If the program is not currently being recorded, the interactive television application may cancel the scheduled recording and display a recording canceled overlay at step 2590. At step 2580, a user may be provided with an opportunity to select and configure a series recording. At step 2582, a user may be provided with an opportunity to edit recording settings that will be used for the scheduled recording. Step 2582 may be the same as step 606 of process 600.

Figure 43:
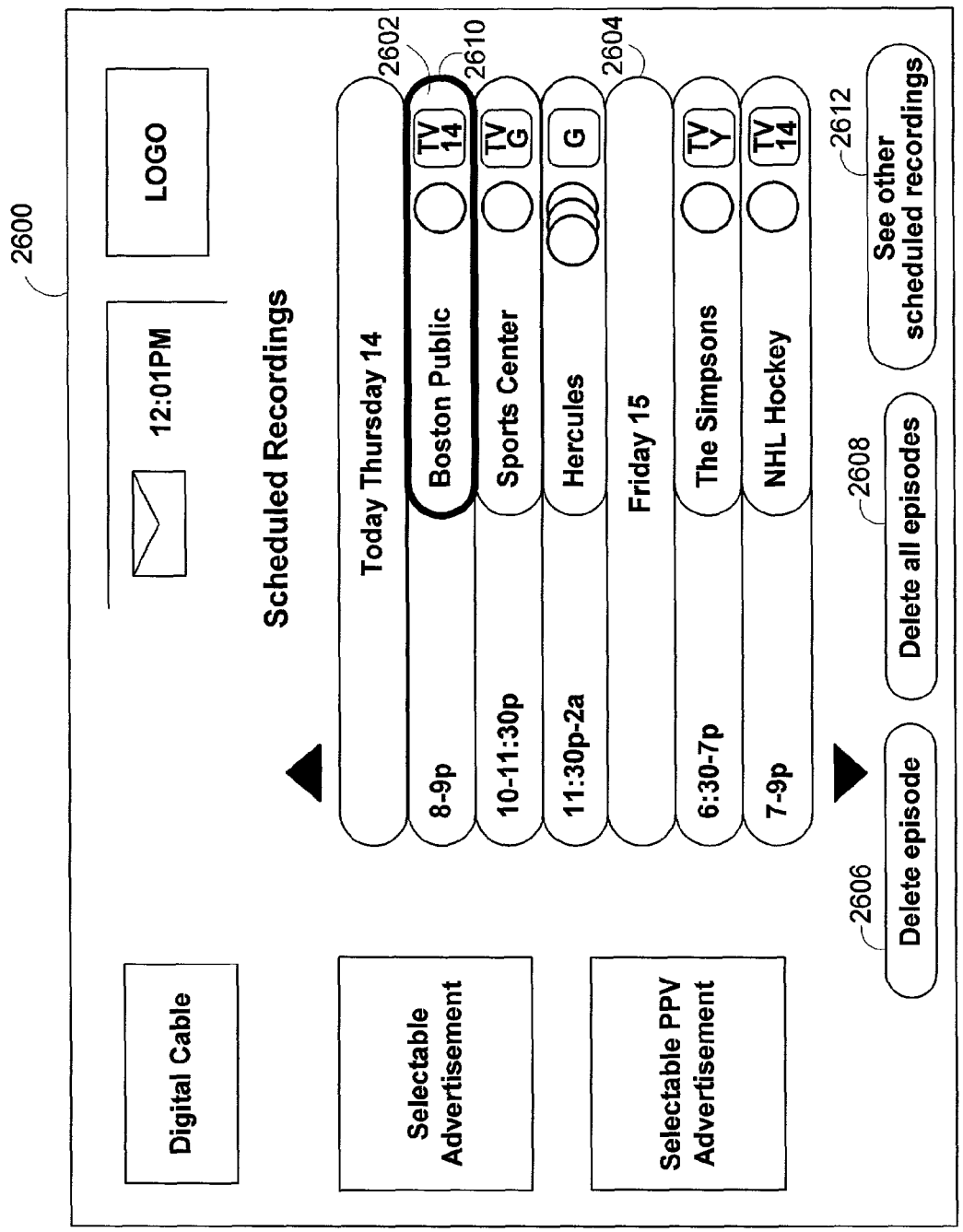
FIG. 43 shows an illustrative scheduled recording listings display screen in accordance with one embodiment of the present invention.

An interactive television application may display a list of scheduled recordings in a scheduled recording listings display screen. FIG. 43 shows illustrative scheduled recording listings display screen 2600 that may be provided by the interactive television application. Display screen 2600 may be displayed in response to the selection of scheduled recordings option 524 in display screen 500 of FIG. 5. Display screen 2600 may be an example of step 2514 of process 2500 of FIG. 42.

Display screen 2600 may include listing bars such as listing bar 2602 and date bars such as date bar 2604. Display screen 2600 may display a list of the titles of programs scheduled for recording. Display screen 2600 may list scheduled programs based on their scheduled start times with date bar 2604 separating programs that are scheduled on different days. Display screen 2600 may be used to list each program that is currently scheduled to be recorded. The list may include one-time recordings as well as recordings that are part of a series recording. Multiple listing bars may be included for series recordings. If desired, episodes for programs that are scheduled to have reminders may also be listed in display screen 2600.

The interactive television application may provide the user with the ability to move highlight window 2610 over listing bar 2602 and select a remote control info button, a remote control "OK" button, a remote control record button, or any other suitable remote control button in order to modify the recording/reminder settings for the program. Display screen 2600 may include delete episode option 2606, delete all episodes option 2608, and see other scheduled recordings option 2612. A user may be permitted to scroll through scheduled recordings listings using remote control up and down navigation keys and permitted to move between the listings and options 2606, 2608, and 2612 using remote control right and left navigation keys. For example, the interactive television application may provide the user with the ability to move highlight window 2610 over listing bar 2602 and to mark that listing by pressing a predetermined remote control button.

Remote control right/left navigation keys may then be used to move highlight window 2610 over delete episode option 2606. The marked listing may then be removed from display screen 2600 and the scheduled recording for that listing may be canceled by pressing a remote control "OK" button. A delete episode function may also be available for example by pressing a remote control record key to convert a one-time recording to a series recording and then by pressing a remote control record key again to delete a scheduled recording. A delete episode or delete series recording option may also be available from a program information display screen. The interactive television application may provide the user with the ability to move highlight window 2610 over delete all episodes option 2608 (e.g., using right/left arrow buttons) to delete all scheduled episodes by pressing remote control "OK" button.

The interactive television application may provide the user with the ability to move highlight window 2610 over see other scheduled recordings option 2612 (e.g., using remote control right/left navigation keys). In response to a user selecting see other scheduled recordings option 2612 in connection with a marked listing, the interactive television application may display a list of other scheduled recordings that match the program name in the marked listing. The list of other recordings may include series recordings, keyword-based recordings, or recordings defined using time and channel on an on-going basis. A list of episodes in a series may also be available from the see all episodes option 1008 of series recording setup display screen of FIG. 10.

If a scheduled recording is a VOD program, display screen 2600 may display a listing for the VOD program in the scheduled recordings list in the same manner as a regularly scheduled program with an associated time and day that the VOD program is to be recorded. Display screen 2600 may provide the user with the ability to select a scheduled VOD recording. In response to a selection of a scheduled VOD recording, the interactive television application may provide the user with the ability to view program information and to edit recording information using a display screen such as that shown in FIG. 28.

Figure 44:
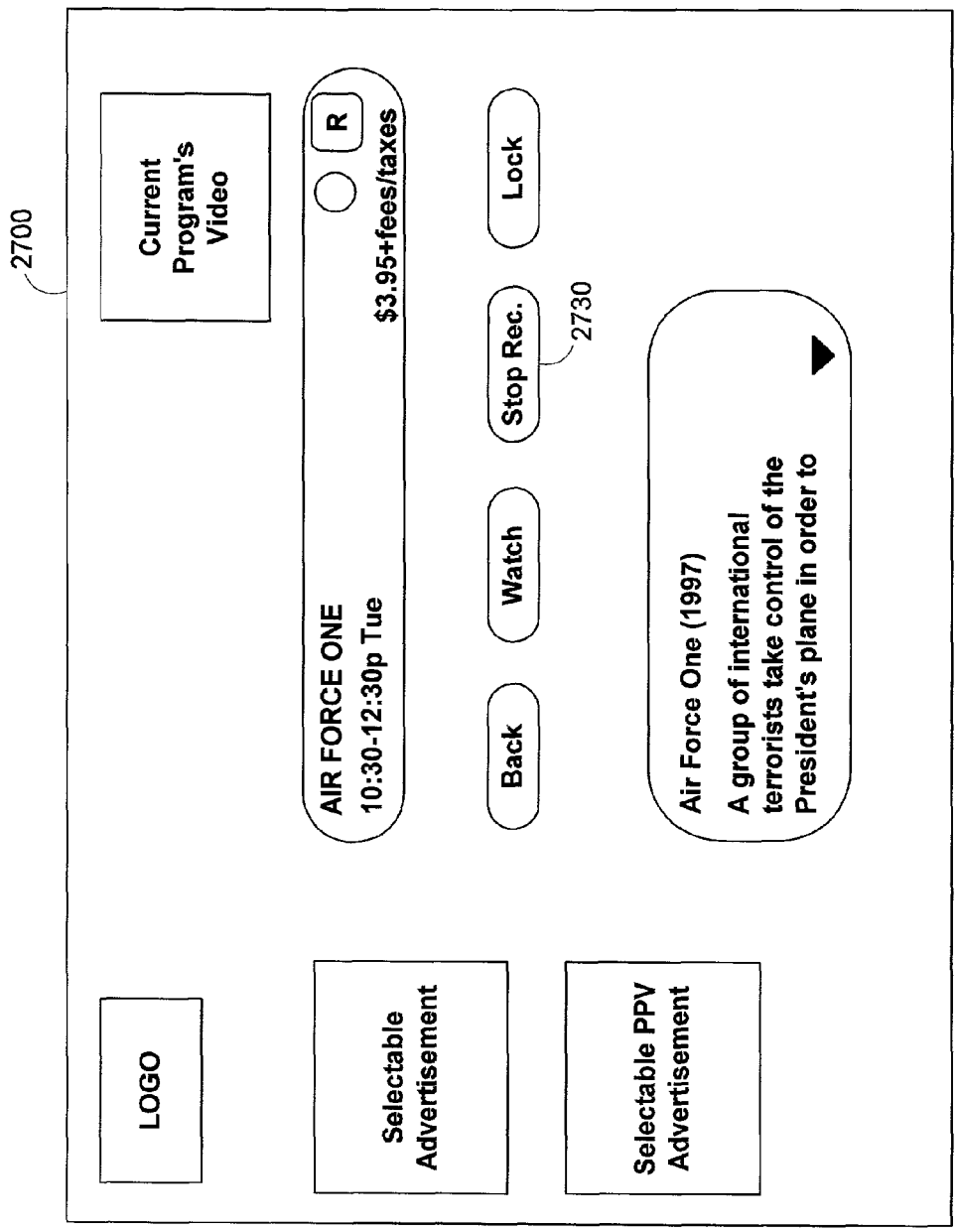
FIG. 44 shows an illustrative PPV program information display screen for a current PPV program that is being recorded in accordance with one embodiment of the present invention.

FIG. 44 shows illustrative information display screen 2700 for a PPV program that is currently being recorded. Display screen 2700 may be displayed in response to a user pressing a remote control info button or a remote control "OK" button for a PPV listing in FIG. 43 or on any other screen from which the PPV program may be accessed. Display screen 2700 may be provided based on step 2510 of process 2500 of FIG. 42.

Display screen 2700 may include stop recording option 2730 that may be provided based on step 2536 shown in FIG. 42. In response to a user selecting stop recording option 2730, the interactive television application may show stop recording overlay 1702 of FIG. 31.

Figure 45:
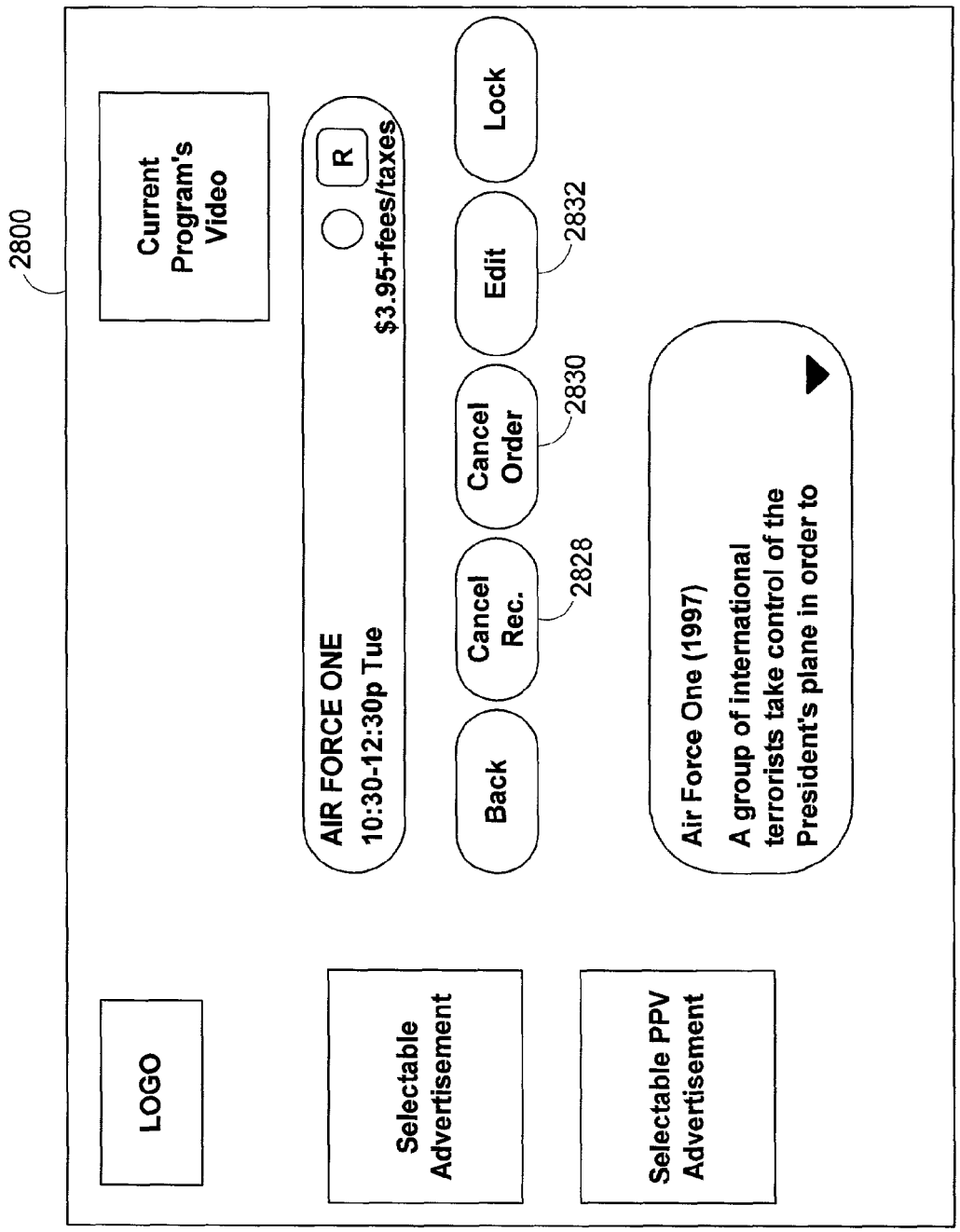
FIG. 45 shows an illustrative PPV program information display screen for a future PPV program that has been scheduled to be recorded in accordance with one embodiment of the present invention.

FIG. 45 shows illustrative information display screen 2800 for a PPV program that is not currently being recorded. Display screen 2800 may be displayed in response to a user pressing a remote control info button or a remote control "OK" button for a listing of a PPV program that is scheduled to be recorded, but is not yet airing. Display screen 2800 may be provided based on step 2508 of process 2500 of FIG. 42.

Display screen 2800 may include cancel recording option 2828, cancel order option 2830, and edit option 2832 that may be provided based on steps 2546 and 2550 shown in FIG. 42. In response to a selection of cancel recording option 2828, the interactive television application may show cancel recording overlay 3110 of FIG. 48. In response to a selection of cancel order option 2830, the interactive television application may cancel the PPV order. If desired, the canceling of a PPV order may also cancel the recording. Edit option 2832 may be used to access a display screen to allow a user to modify a recording that is already scheduled.

Figure 46:
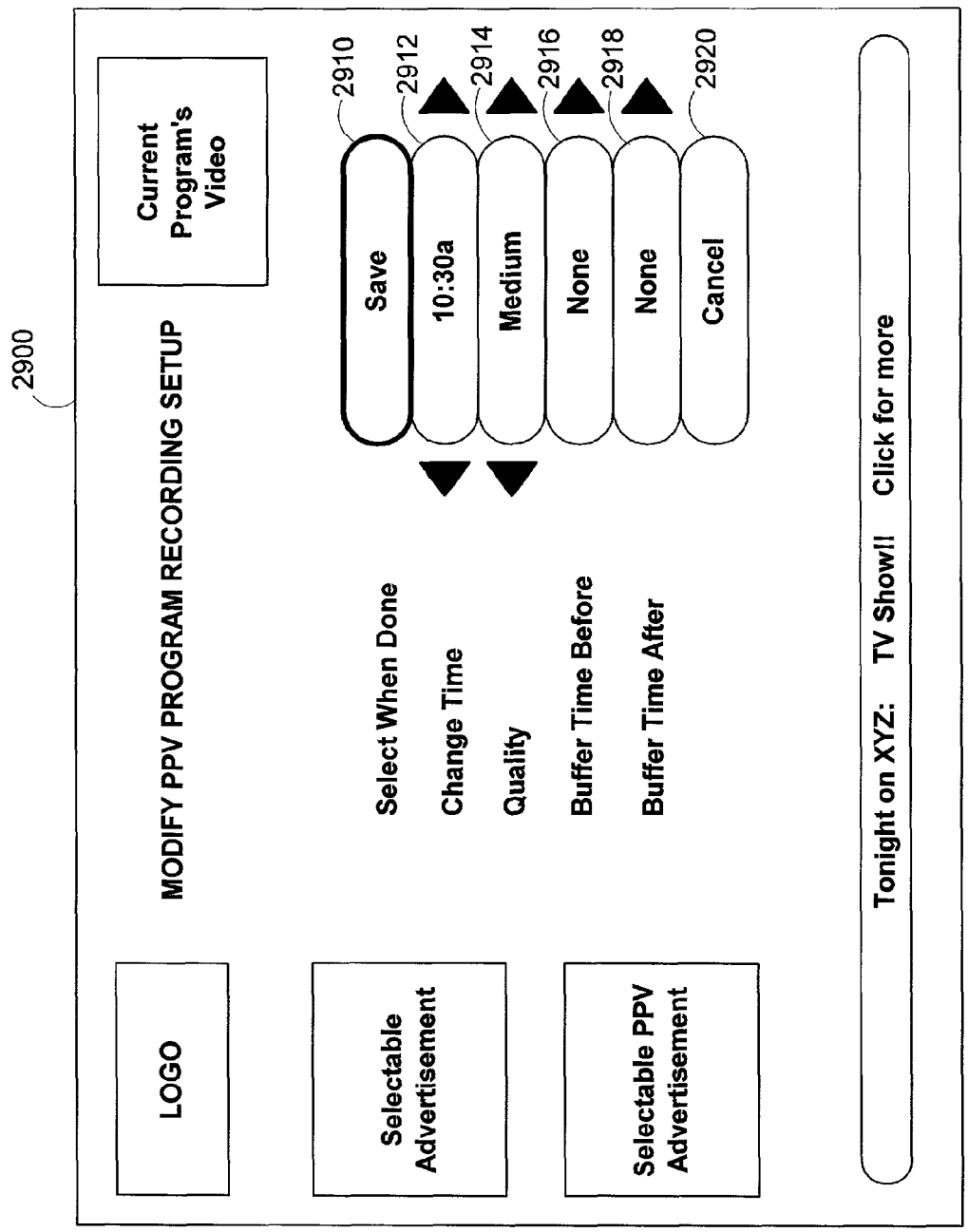
FIG. 46 shows an illustrative recording setup display screen for changing the configuration of a scheduled recording of a PPV in accordance with one embodiment of the present invention.

In response to a selection of edit option 2832, the interactive television application may display PPV recording setup display screen 2900 of FIG. 46. FIG. 46 shows illustrative modify PPV recording setup display screen 2900 that may be provided by the interactive television application. Display screen 2900 may provide the user with the ability to edit recording options for a particular scheduled recording. Display screen 2900 may include save option 2910, time option 2912, quality option 2916, buffer time before option 2916, buffer time after option 2918, and cancel option 2920. Change time option 2912 may allow the user to select a different airing of the PPV program to be used for the scheduled recording. These options may have been provided based on illustrative steps 1232, 1234, 1236, 1238, 1240, and 1242 shown in FIG. 23. Save option 2910 may be selected to save the new settings that are selected by the user. If the changes that were selected by a user included changing the time of the PPV program, the selection of save option 2910 may cause the recording to be scheduled for that new time and may cause the PPV program that is airing at that new time to be ordered. Options 2912, 2914, 2916, 2918, and 2920 may operate in the same way as options 1410, 1404, 1412, 1414, and 1416 of FIG. 25, respectively. If desired, display screen 1400 of FIG. 25 may be shown instead of display screen 2900.

Illustrative display screens and options that have described in connection with PPV programs such as display screen 2900 of FIG. 46 may be used for VOD programs.

Figure 47:
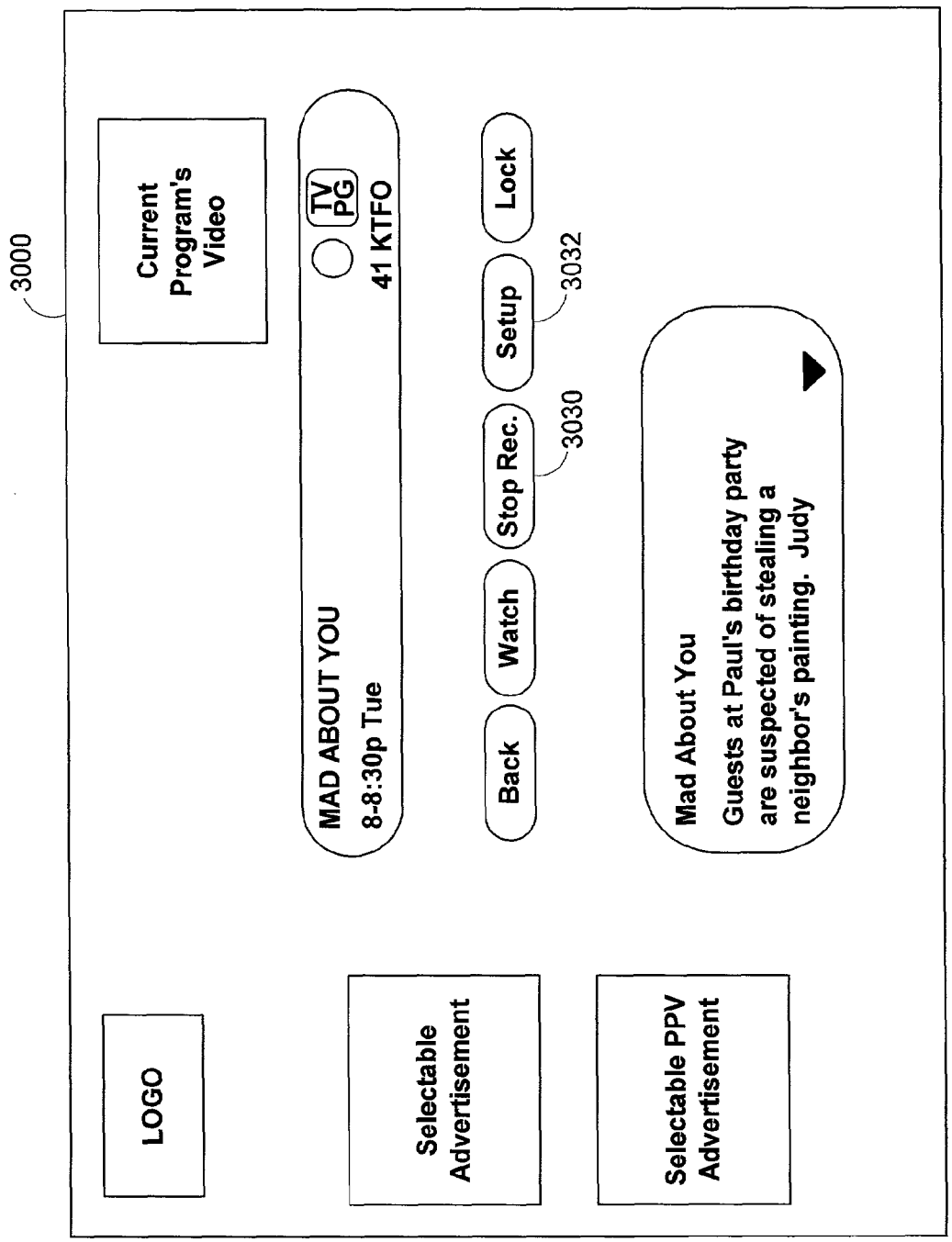
FIG. 47 shows an illustrative program information display screen for a current non-PPV and non-VOD program that is being recorded in accordance with one embodiment of the present invention.

FIG. 47 shows illustrative scheduled recording program information display screen 3000 that may be provided by the interactive television application. Display screen 3000 may be displayed in response to a user pressing a remote control info button for a listing in FIG. 43 (or on any other screen from which the program may be accessed) of a scheduled recording of a non-PPV and non-VOD program. Display screen 3000 may be provided based on step 2572 of process 2500 of FIG. 42.

Stop recording option 3030, setup option 3032, and series option 3028 may be provided based on illustrative steps 2578, 2582, and 2580 shown in FIG. 42. In response to the selection of stop recording option 3030, the interactive television application may display a stop recording overlay if the program is currently being recorded. The stop recording overlay may request whether a user wants to stop the recording of the program. In response to a selection of setup option 3032, the interactive television application may display program recording display screen 900 of FIG. 9.

Figure 48:
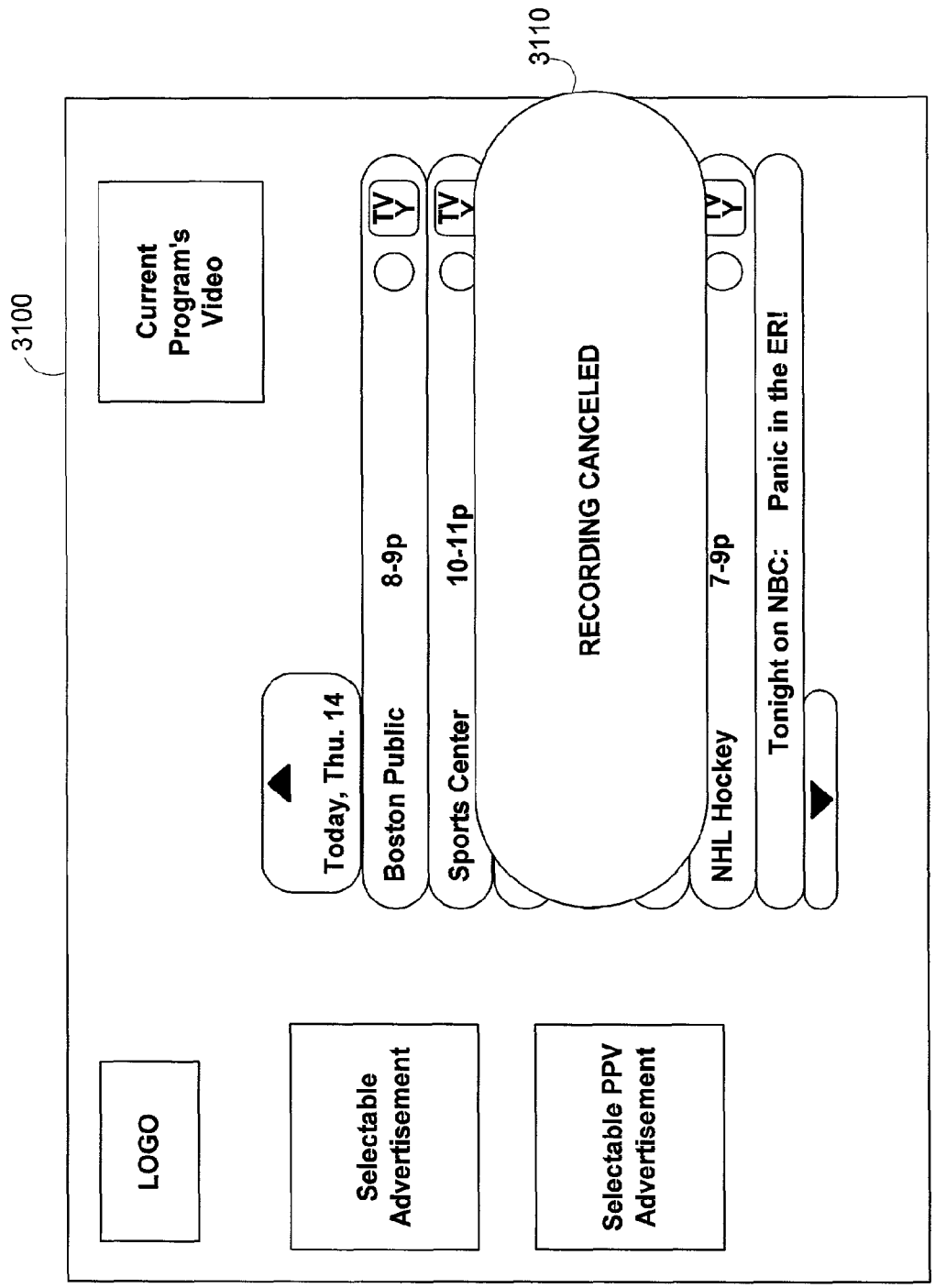
FIG. 48 shows an illustrative recording canceled overlay that is displayed on a display screen in accordance with one embodiment of the present invention.

FIG. 48 shows illustrative cancel recording overlay 3110 that may be provided by the interactive television application. Overlay 3110 may be displayed when a user selects to cancel a scheduled recording. Recording canceled overlay 3110 may appear over display screen 3100.

Figure 49:
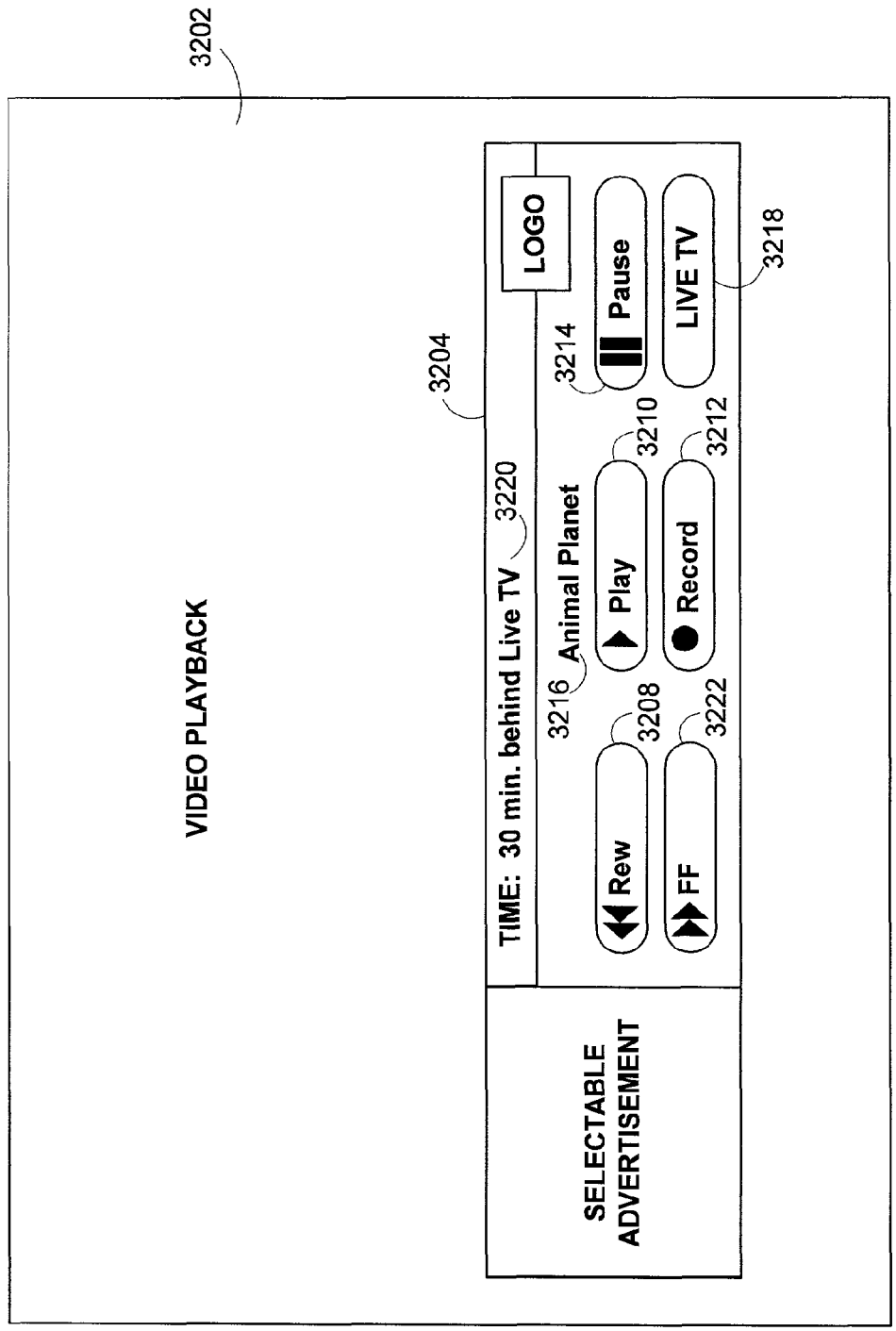
FIG. 49 shows an illustrative flow control overlay that has a live TV option that is displayed over a video of a program playing from a PVR in accordance with one embodiment of the present invention.

FIG. 49 shows illustrative live controls overlay 3204 displayed over a video of a program that may be provided by the interactive television application. Overlay 3204 may be displayed while buffered video 3202 for a program is playing in the background. As in live control overlay 1904 of FIG. 19, overlay 3204 may also include rewind option 3208, play option 3210, record option 3212, pause option 3214, fast-forward option 3222, and program title 3216. Overlay 3204 may further include live TV option 3218 and time behind live TV indicator 3220.

Time behind live TV indicator 3220 may indicate how far back buffered video 3202 is behind live television. The interactive television application may allow the user to select live TV option 3218 to return the user to watching live video that is currently airing.

Figure 50:
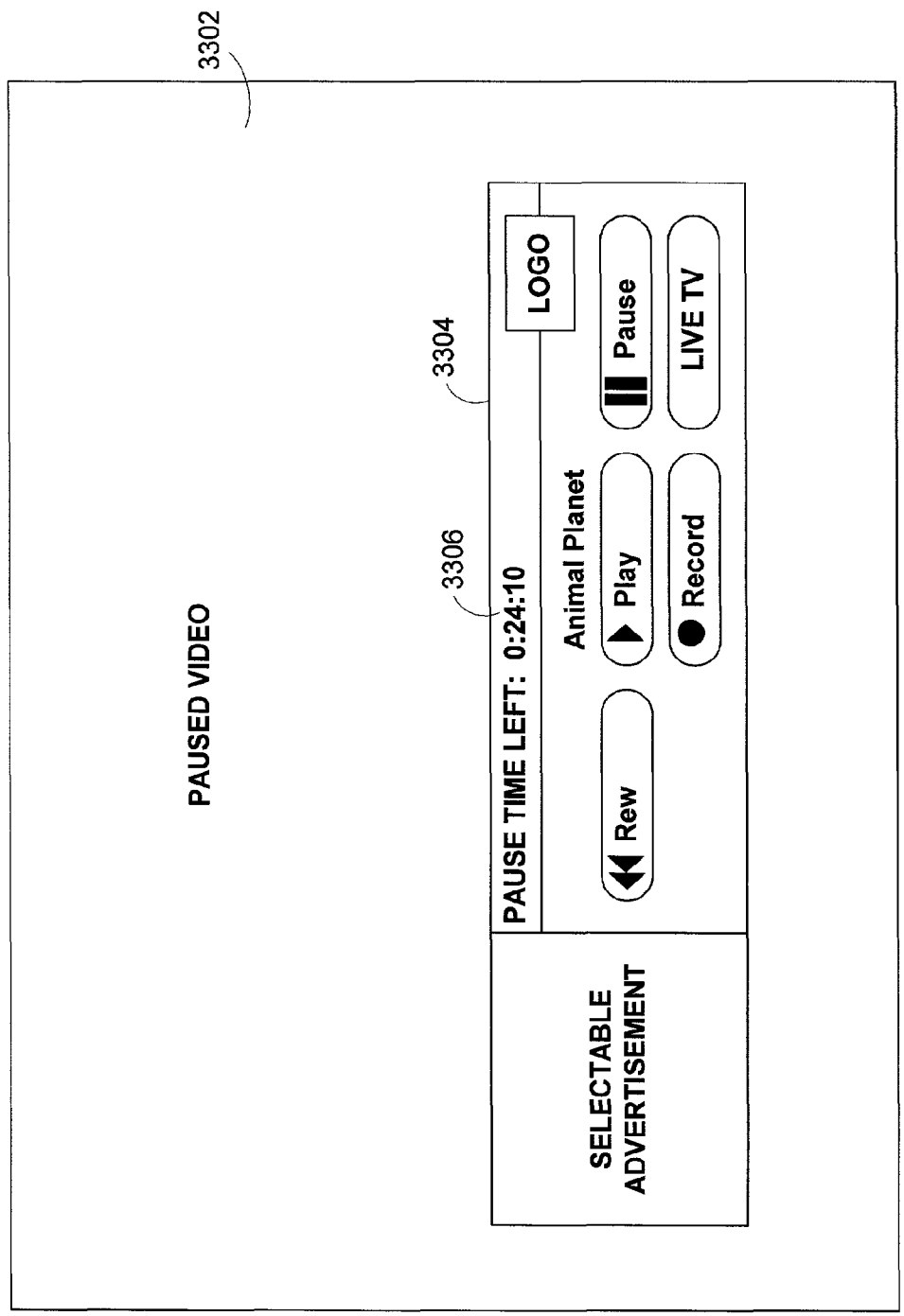
FIG. 50 shows an illustrative live controls overlay with pause time left indicator displayed over a paused video of a program in accordance with one embodiment of the present invention.

The interactive television application may allow the user to set the size of the buffer for pausing live television in size of live TV buffer option 570 of FIG. 18. If desired, the application may allow the user to set different buffer sizes and record qualities for different channels, channel types, and program types. FIG. 50 shows illustrative live controls overlay 3304 with pause time left indicator 3306 displayed over a paused video of a program that may be provided by the interactive television application. Overlay 3304 may be displayed over paused video 3302 for a current program. Overlay 3304 may include pause time left indicator 3306 which may indicate how much time is left in the buffer for pausing live television. If desired, pause time left indicator 3306 may not be displayed if the size of the buffer is large enough to hold the entire remainder of the current program.

Figure 51:
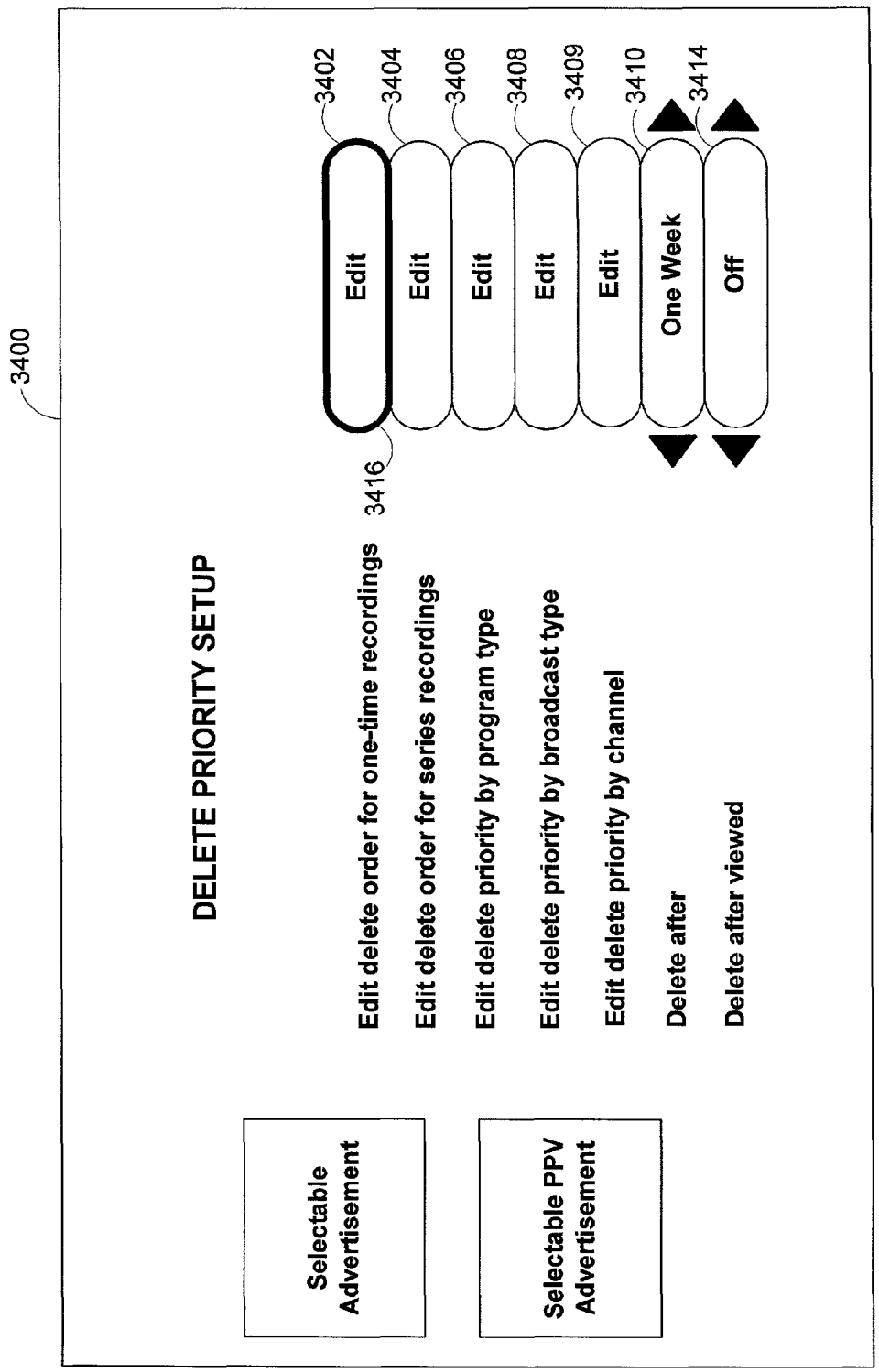
FIG. 51 shows an illustrative delete priority setup display screen in accordance with one embodiment of the present invention.

A user may be permitted to set delete priority settings for recordings in general. For example, with reference now to FIG. 51, illustrative delete priority setup display screen 3400 may be displayed by an interactive television application to allow a user to select delete priority settings. Display screen 3400 may be displayed when a user selects delete priority option 526 of main menu display screen 500 of FIG. 5. Alternatively, display screen 3400 may be accessible from PVR Setup screen 540 of FIG. 18. Display screen 3400 may provide the user with the ability to set various delete priority settings. Display screen 3400 may include edit one-time recording delete priority option 3402, edit series recording delete priority option 3404, delete by program type option 3406, delete by broadcast type option 3408, delete by channel option 3409, recording expiration option 3410, and delete after viewed option 3414.

The interactive television application may provide the user with the ability to select edit one-time recording delete priority option 3402. In response to such a selection, the interactive television application may display a one-time recording delete priority order display screen (see FIG. 53). A one-time recording delete priority display screen may allow a user to change the order in which individual recordings will be deleted.

Managing delete priority settings for individual recordings that are part of a series recording may be time consuming. A series recording delete priority order display screen (see FIG. 52) may be used to speed the process for setting delete priority for series recordings. A series recording delete priority order display screen may be displayed in response to a selection of edit series recording delete priority option 3404.

Other types of parameters may also be used to set delete priority settings. If the user selects program type delete by option 3406, the interactive television application may display a delete by program type display screen (see FIG. 54). If the user selects delete by broadcast type option 3408, the interactive television application may display a delete by broadcast type display screen (see FIG. 55A). If the user selects delete by channel option 3409, the interactive television application may display a delete by channel display screen (see FIG. 55B).

The interactive television application may provide the user with the ability to move highlight window 3416 over recording expiration option 3410, and the ability to use remote control navigation buttons to select the length of time that a recording will be stored on the PVR. The settings for this option may include never delete, one week, two weeks, or any other suitable duration.

The interactive television application may provide the user with the ability to move highlight window 3416 over delete after viewed option 3414 and to use remote control navigation buttons to select to have recordings deleted after they have been viewed. Selecting this option may cause recordings to be deleted immediately after being viewed. Alternatively, it may cause the priority of the viewed program to be reduced so that it may be deleted in preference to a program that has not yet been viewed.

Figure 52:
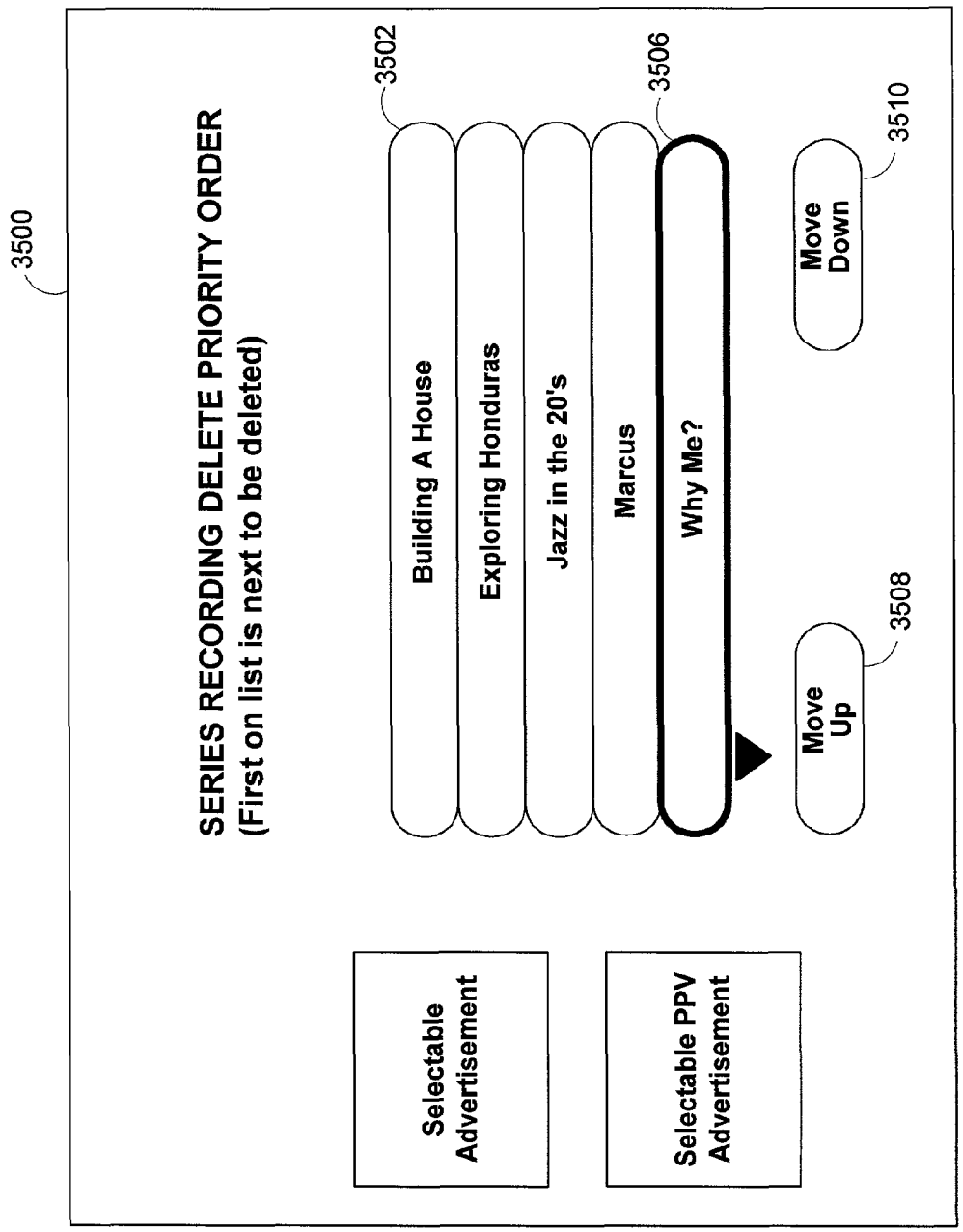
FIG. 52 shows an illustrative series recording delete priority display screen in accordance with one embodiment of the present invention.

FIG. 52 shows illustrative series recordings delete priority display screen 3500 that may be provided by the interactive television application. Display screen 3500 may be displayed in response to a selection of series recording delete priority option 3404 of FIG. 51. Other means for reaching display screen 3500 may also be implemented. With reference now to FIG. 52, display screen 3500 may display listing bars for recordings such as listing bar 3502 that are displayed in the priority order that recordings in one series are given over recordings in another series. One listing bar may be displayed for each scheduled series recording. If desired, keyword-based recordings may also be included on this screen. Display screen 3500 may include move up option 3508 and move down option 3510. The interactive television application may allow the user to use move up option 3508 or move down option 3510 to change the delete priority for a series. The delete priority order in display screen 3500 may be used by the interactive television application to determine the priority of individual series recordings with respect to all recordings.

In FIGS. 52-55B, a user may be permitted to switch between listings and move up/down options using remote control right/left navigation keys. For example, when a user has positioned a highlight window over a desired listing, the user may press right/left navigations keys to access move up or move down options, which may be selected by the user by, for example, pressing a remote control "OK" key. The listing from which move up or move down options are accessed may be moved up or down in priority in a delete priority list when a user selects move up or down options.

Screens similar to those shown in FIGS. 52-55B may be used to set relative default recording priorities for series, individual programs, program types, and channel types. If desired, recording priorities may be converted to delete priorities after a program has been recorded.

Figure 53:
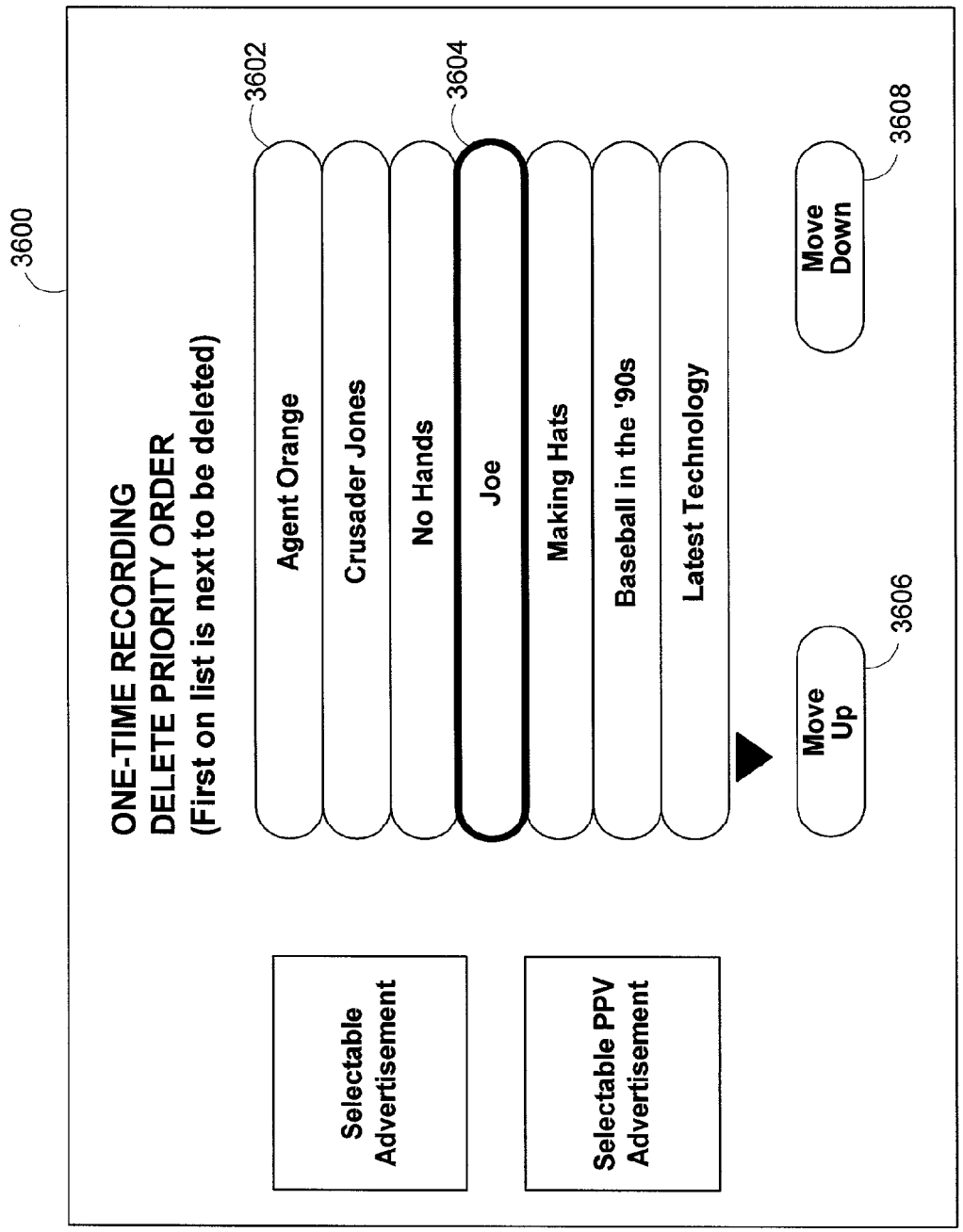
FIG. 53 shows an illustrative one-time recording delete priority display screen in accordance with one embodiment of the present invention.

FIG. 53 shows illustrative one-time recording delete priority display screen 3600 that may be provided by the interactive television application. Display screen 3600 may be displayed in response to a selection of edit one-time recording delete priority option 3402 of FIG. 51. With reference now to FIG. 53, display screen 3600 may display listing bars, such as listing bar 3602, which are displayed in the order that will be used to delete recordings. The delete order for the recordings may have been determined based on delete priority settings that a user selected for specific programs (e.g., never delete, preferred recording, etc.) or based on delete priority settings that a user selected for recordings in general (e.g., delete priority for series recordings, delete priority by program type, delete priority by broadcast type, etc.). This screen may include a listing bar for each scheduled one-time recording. Display screen 3600 may include move up option 3606 and move down option 3608. The interactive television application may provide the user with the ability to use move up option 3606 or move down option 3608 to change the order in which listed recordings will be deleted. By moving the position of a recording up or down, the user manually changes the delete priority of that recording with respect to the other recordings.

Figure 54:
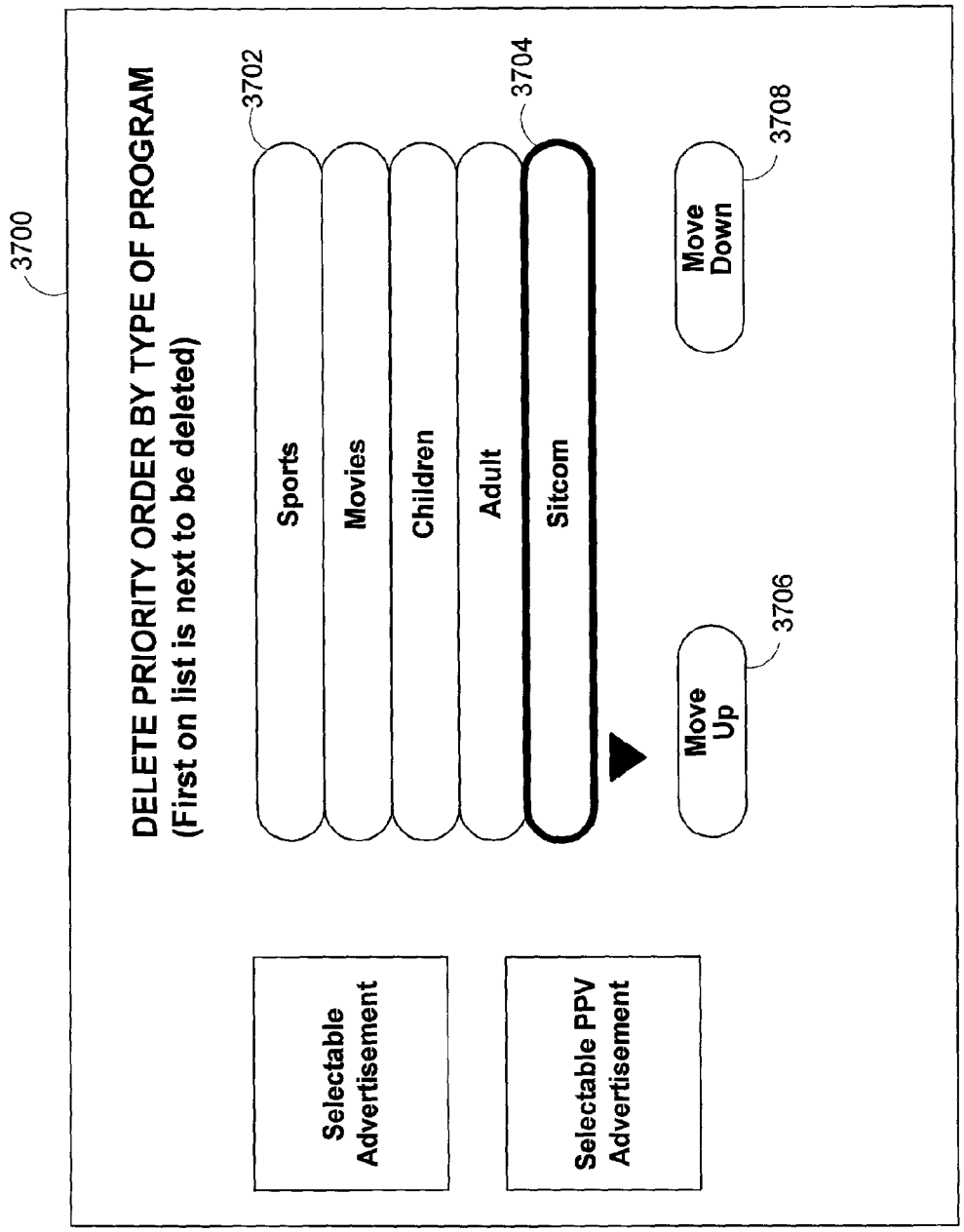
FIG. 54 shows an illustrative delete priority by program type display screen in accordance with one embodiment of the present invention.

FIG. 54 shows illustrative delete priority by program type display screen 3700 that may be provided by the interactive television application. Display screen 3700 may be displayed in response to a selection of delete by program type option 3406 of FIG. 51. With reference now to FIG. 54, display screen 3700 may display listing bars such as listing bar 3702. The order of the listing bars shows the priority that the interactive television application will give to different types of programs when the interactive television application selects programs to delete. Program types may include sports, movies, children, adult, sitcom, or other suitable program types. A listing bar may be included for each program type supported by the application. Display screen 3700 may include move up option 3706 and move down option 3708. The interactive television application may allow a user to select move up option 3706 or move down option 3708 to change the delete priority order of the program types. The interactive television application may use this delete priority order in specifying the order in which individual recordings will be deleted.

Figure 55A:
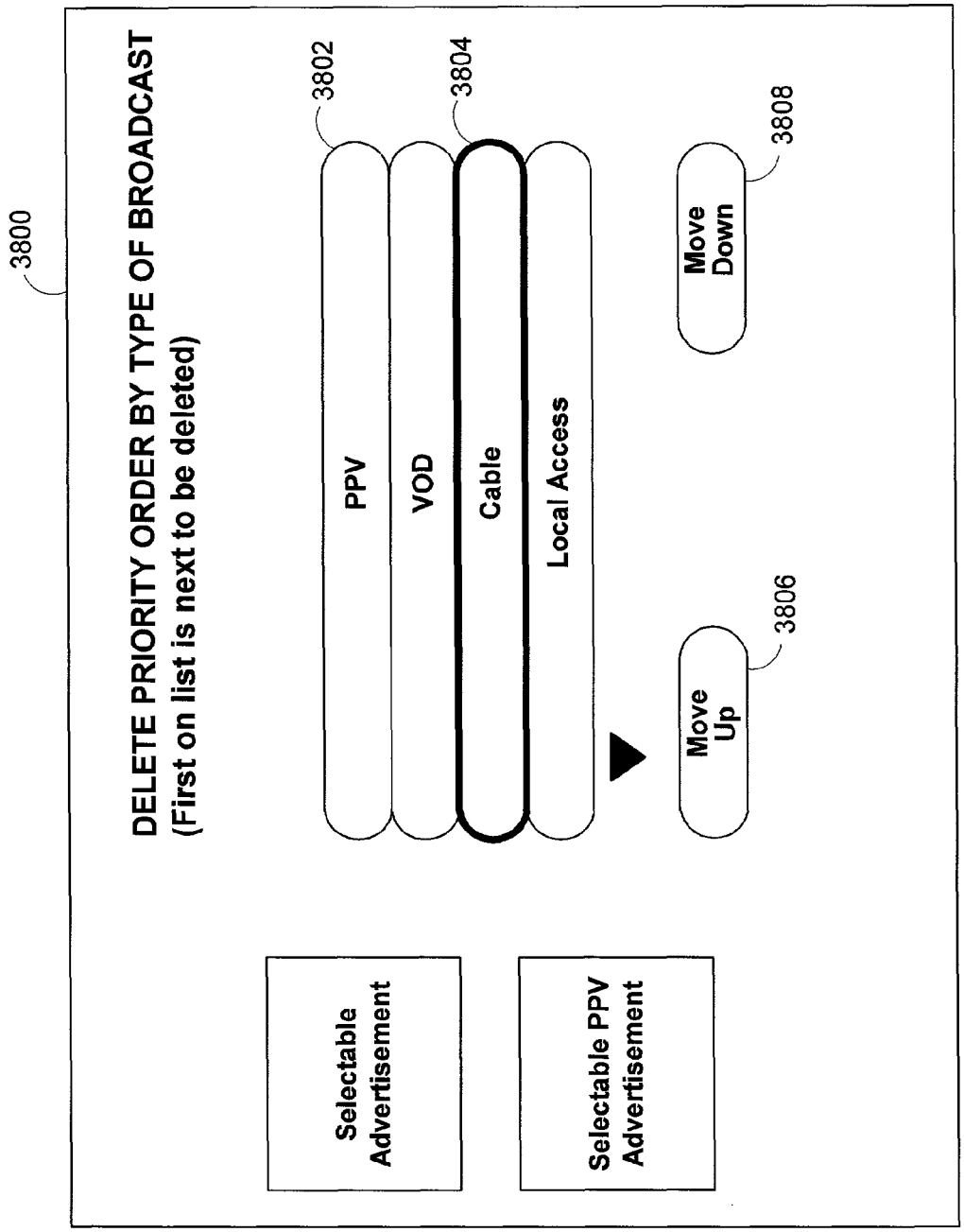
FIG. 55A shows an illustrative delete priority by broadcast type display screen in accordance with one embodiment of the present invention.

FIG. 55A shows illustrative delete priority by broadcast type display screen 3800 that may be provided by the interactive television application. Display screen 3800 may be displayed in response to a selection of delete by broadcast type option 3408 of FIG. 51. With reference now to FIG. 55A, display screen 3800 may display listing bars, such as listing bar 3802, that list the delete priority that will be given to recordings based on the broadcast type that was used for the recording. Types of broadcasts may include PPV, VOD, broadcast, cable, local access, and other suitable broadcast types. Display screen 3800 may include move up option 3806 and move down option 3808 that may be used to change the delete priority that is associated with broadcast types. This delete priority order may also be used in selecting the order in which individual recordings will be deleted.

Figure 55B:
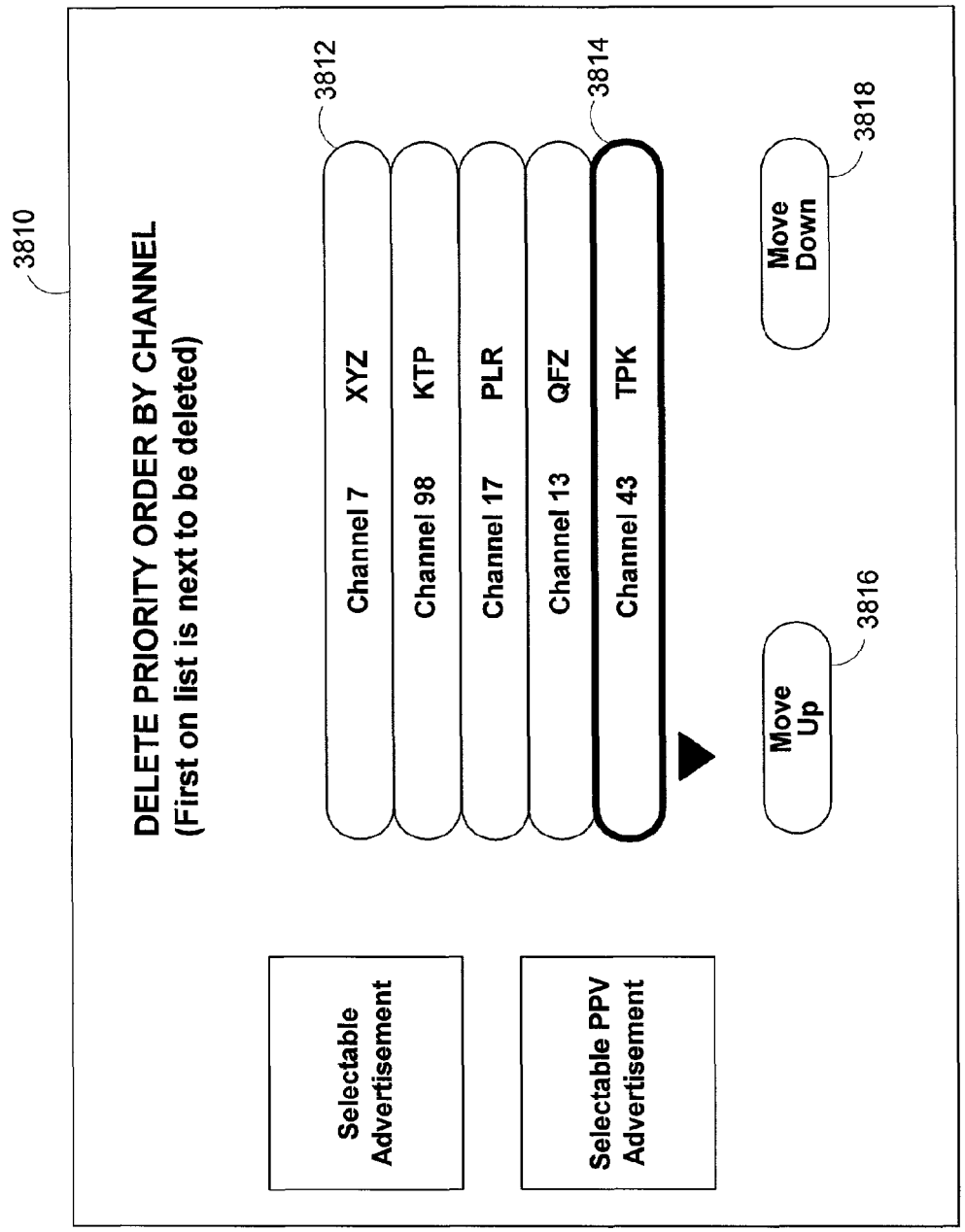
FIG. 55B shows an illustrative delete priority by channel display screen in accordance with one embodiment of the present invention.

FIG. 55B shows illustrative delete priority by channel display screen 3810 that may be provided by the interactive television application. Display screen 3810 may be displayed in response to a selection of delete by channel option 3409 of FIG. 51. With reference now to FIG. 55B, display screen 3810 may display listing bars, such as listing bar 3812, that list the delete priority that will be given to recordings based on the channel on which a program was recorded. Display screen 3800 may include move up option 3816 and move down option 3818 that may be used to change the delete priority of the channels. This delete priority order may also be used in selecting the order in which individual recordings will be deleted.

Figure 56:
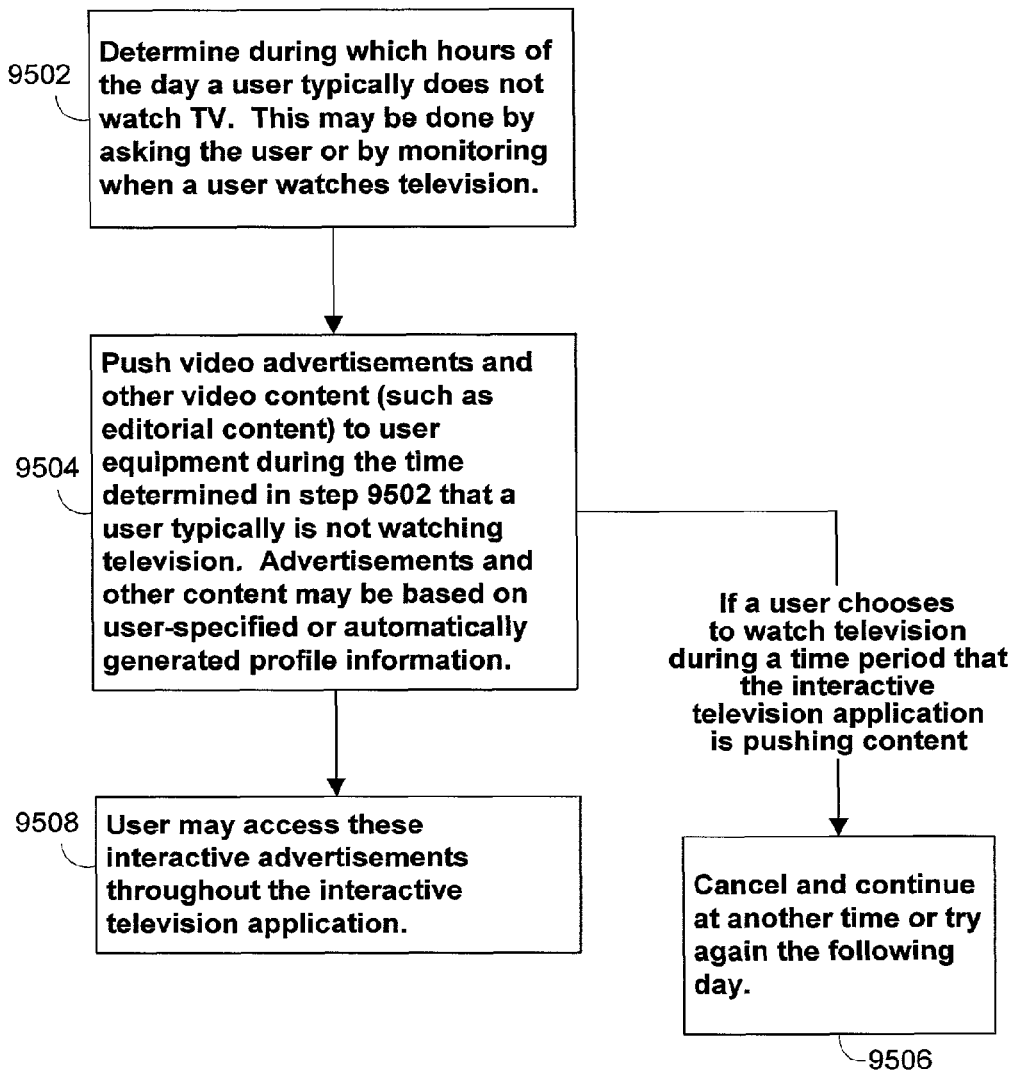
FIG. 56 shows an illustrative process that may be used for pushing video advertisements and other content to local television equipment of a user in accordance with one embodiment of the present invention.

An interactive television application may be implemented to push television advertisements and other content to be locally stored and displayed. FIG. 56 shows illustrative process 9500 involved in pushing television advertisements and other content to user equipment. An interactive television application may store a limited amount of program listing information or other information on a set-top box and/or a PVR. With reference now to FIG. 56, at step 9502 the interactive television application may determine during which hours of the day a user typically does not watch television. This may be performed by asking the user to specify time periods that the user does not typically watch television or by monitoring when a user watches television. At step 9504, the interactive television application may push video advertisements (e.g., short video advertisements) and other video content (such as editorial content) to a user's set-top box. The advertisements and other content may be based on user-specified or automatically generated profile information. The transfer of content may be performed during a time period in which a user typically does not watch television. In configurations in which multiple tuners are provided for user equipment, video content may be pushed when the equipment is not using all of the tuners.

If a user chooses to watch television during a time period in which the interactive television application is pushing content to user equipment, the interactive television application may proceed to step 9506. At step 9506, the interactive television application may cancel pushing content to the local equipment of the user. The interactive television application may then attempt to resume pushing content during another time period that the user does not typically watch television or may attempt to resume again during the same time period the following day. If desired, content that is fully or partially downloaded before the interactive television application cancels pushing content may be retained until the next attempt. After the advertisements and other content have been transferred to the local equipment of a user, the user may access these interactive advertisements from practically any location in the interactive television application at step 9508.

Figure 57:
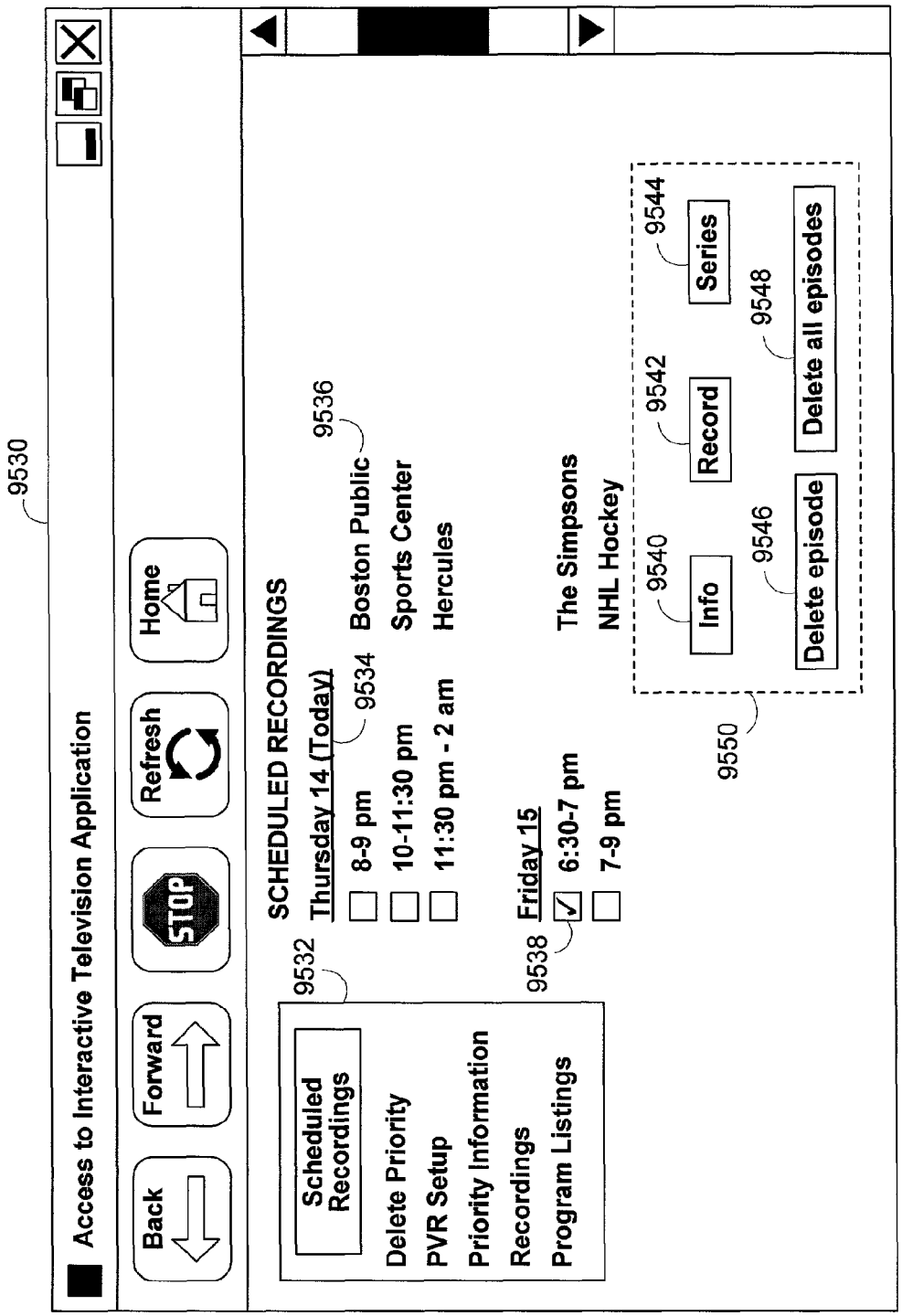
FIG. 57 shows an illustrative online scheduled recordings program guide window in accordance with one embodiment of the present invention.

FIG. 57 shows illustrative online scheduled recordings program guide window 9530 that may be provided by an interactive television application. Examples of online program guide systems are illustratively described in Boyer et al. U.S. patent application Ser. No. 08/938,028, filed Sep. 18, 1997, which is hereby incorporated by reference herein in its entirety. Window 9530 may be an online program guide window for accessing information relating to scheduled events and other system information for a user's PVR. If desired, an online program guide may provide the same functionality through the Internet as is illustratively described herein primarily in the context of cable television based program guides.

Online scheduled recordings program guide window 9530 may provide the user with the ability to have online access to that user's scheduled recordings. Window 9530 may include menu bar 9532 which may contain a menu of features available from the online program guide. Menu bar 9532 may have similar functionality to main menu display screen 500 of FIG. 5.

Window 9530 may also have all the same functionality as scheduled recordings display screen 2600 of FIG. 43. Online program guide window 9530 may include date region 9534, program listings 9536, and checkbox 9538. There may be one checkbox for each scheduled recording that is listed in window 9530. The online program guide may also include option buttons 9550, such as info button 9540, record button 9542, series button 9544, delete episode button 9546, and delete all episodes button 9548. Option buttons 9550 may perform the same functionality as remote control buttons or options that are available for listings in a scheduled recordings display screen such as scheduled recordings display screen 2600 of FIG. 43. The online program guide may provide the user with the ability to select a checkbox for a scheduled recording such as checkbox 9538 and to select an option button in option buttons 9550 to perform a particular function. The online guide may allow a user to select only one scheduled recording at a time to allow the selection of option buttons 9550 to be only for the currently selected scheduled recordings.

The online program guide may record a program to a server and provide the user with the ability to select to view the program after it has been recorded through the online program guide. The online program guide may provide the user with the ability to tune to a program through a tuner card in a personal computer. The online program guide may further provide the user with the ability to store the program on a hard disk connected to the personal computer. The online program guide may send instructions to user equipment, such as a set-top box or personal video recorder, to record a program. The online program guide may send programs recorded on a server or on a personal computer to user equipment, such as a set-top box or personal video recorder. Examples of interactive program guides that have remote access are illustratively described in Ellis et al., U.S. patent application Ser. No. 09/354,344, filed Jul. 16, 1999, which is hereby incorporated by reference herein in its entirety.

Figure 58:
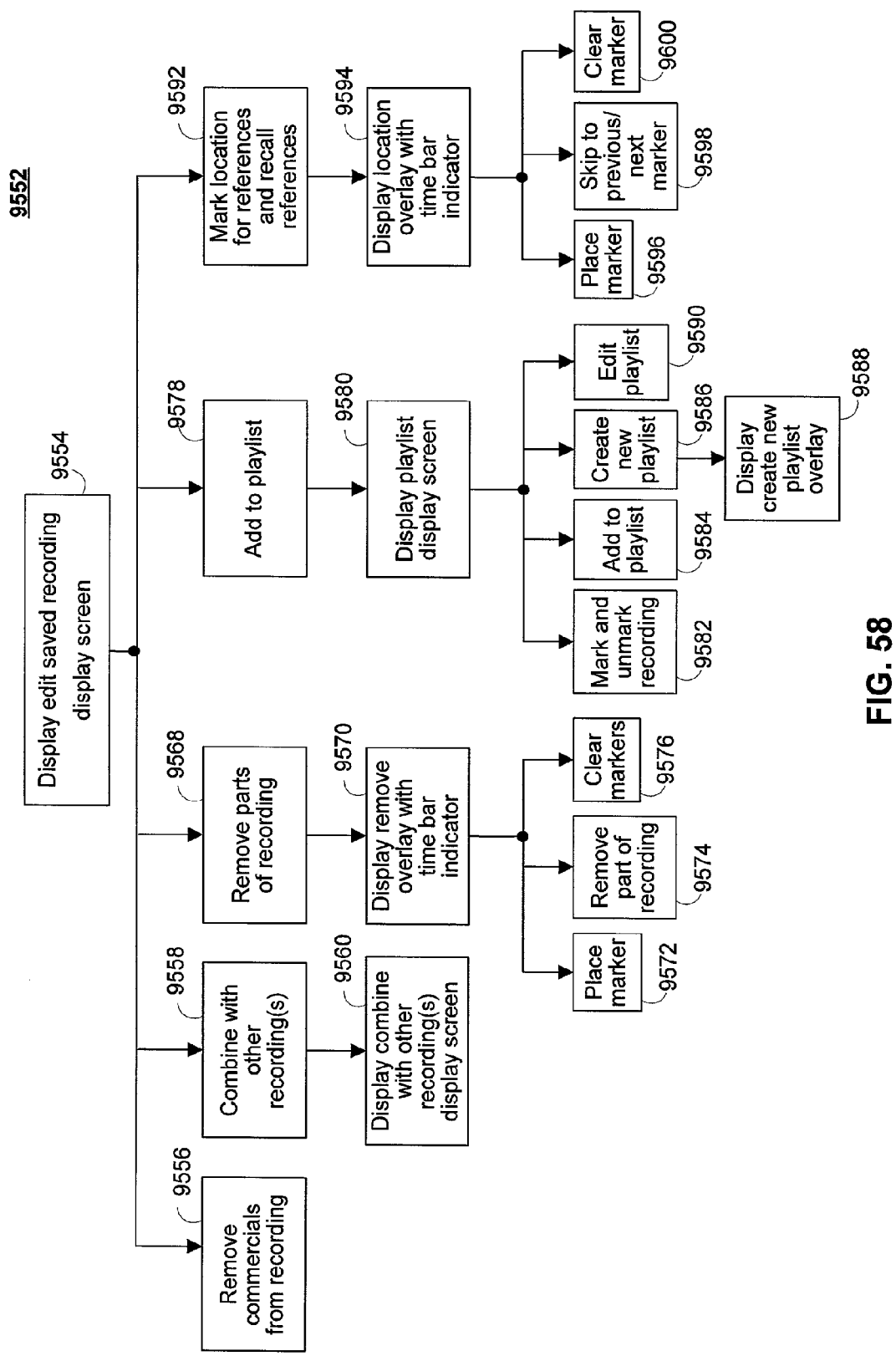
FIG. 58 shows an illustrative process that may be used to provide the user with the ability to edit saved programs in accordance with one embodiment of the present invention.

FIG. 58 shows illustrative process 9552 that, may be used to provide the user with the ability to edit saved programs. Examples of these and other options are illustratively shown in Rudnick et al., U.S. patent application Ser. No. 09/157,256, filed Sep. 17, 1998, which is hereby incorporated by reference herein in its entirety. At step 9554, the interactive television application may display an edit stored program display screen, for example, when a user selects a remote control edit button or an on-screen edit option in connection with a recording. The recording may be selected to be edited from practically any location in the interactive television application.

At step 9556, the interactive television application may provide the user with the ability to remove commercials from a recording. At step 9558, the interactive television application may provide the user with the ability to combine a selected recording with other recordings. If the user selects to combine recordings, the interactive television application may display a combine with other recordings display screen at step 9560.

At step 9568, the interactive television application may provide the user with the ability to remove parts of a selected recording. If the user selects to remove parts of a recording, the interactive television application may display a remove overlay with a time bar indicator over a video at step 9570. Step 9570 may include steps 9572, 9574 and 9576. At step 9572, the interactive television application may provide the user with the ability to place a marker in the time bar indicator. If the user selects to place one or more markers, the first marker may function as a beginning marker and the second marker may function as an end marker. At step 9574, the interactive television application may provide the user with the ability to remove a part of the recording that may be between a beginning marker and an end marker or before or after a single marker. At step 9576, the interactive television application may provide the user with the ability to clear any markers that may appear on a time bar indicator.

At step 9578, the interactive television application may provide the user with the ability to add a selected recording to a playlist. If the user selects to add a selected recording to a playlist, the interactive television application may display a playlist display screen at step 9580. Step 9580 may include steps 9582, 9584, 9586, 9588, and 9590. At step 9582, the interactive television application may provide the user with the ability to mark and unmark a recording that may be added to a playlist. At step 9584, the interactive television application may provide the user with the ability to add more recordings to a playlist. At step 9586, the interactive television application may provide the user with the ability to create a new playlist. If the user selects to create a new playlist, the interactive television application may display a create new playlist overlay in step 9588. At step 9590, the interactive television application may provide the user with the ability to order a playlist and remove a recording from a playlist.

At step 9592, the interactive television application may provide the user with the ability to mark locations for reference and to also recall references that may have been previously marked for a selected recording. If the user selects to mark locations for reference or to recall references that may have been previously marked, the interactive television application may display a location overlay with a time bar indicator at step 9594, which may include steps 9596, 9598, and 9600. At step 9596, the interactive television application may provide the user with the ability to place a marker in the time bar indicator. At step 9598 the interactive television application may provide the user with the ability to skip to the next marker or skip to the previous marker. At step 9600, the interactive television application may provide the user with the ability to clear all markers in the time bar indicator.

Figure 59:
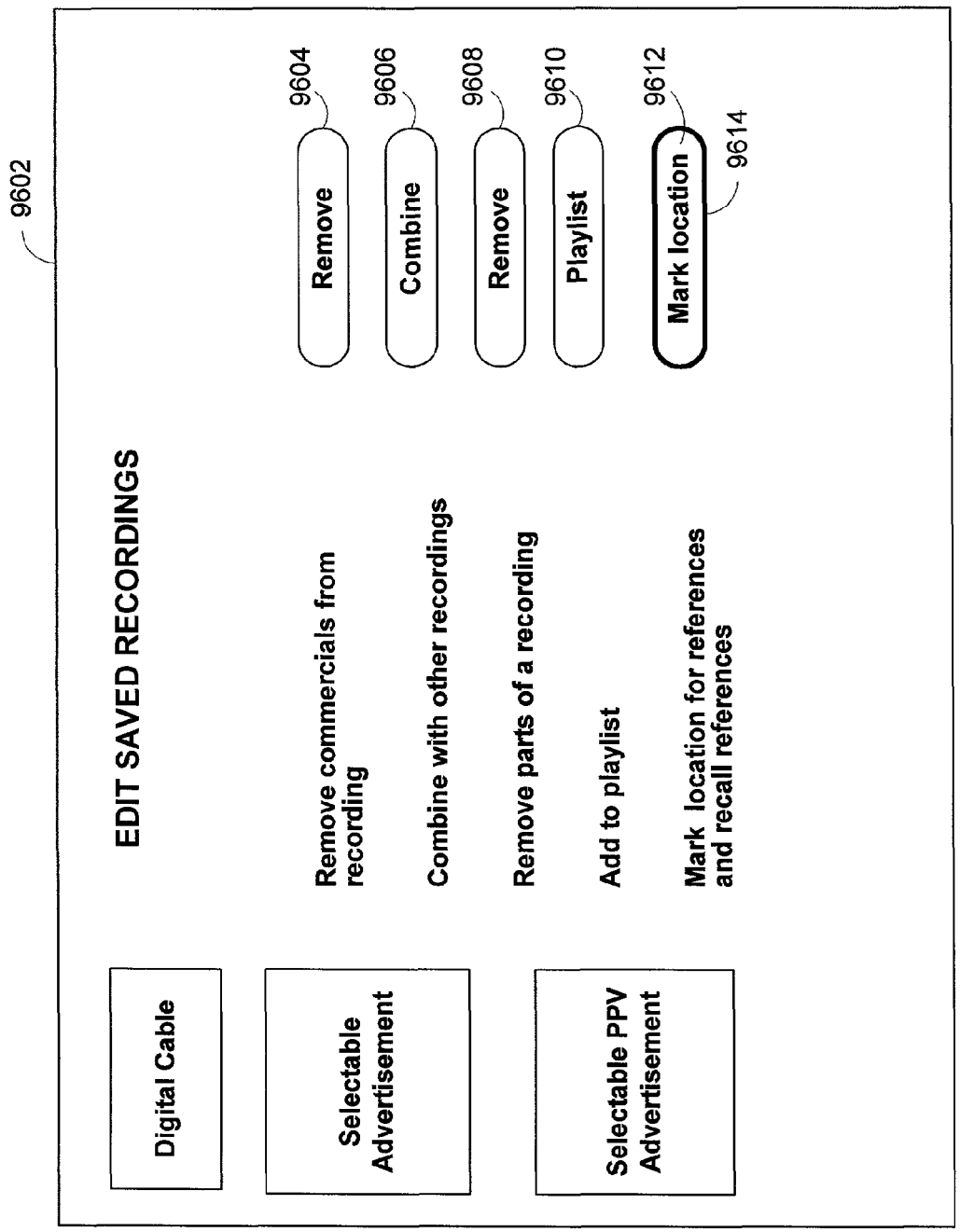
FIG. 59 shows an illustrative edit saved recordings display screen in accordance with one embodiment of the present invention.

FIG. 59 shows illustrative edit saved recordings display screen 9602 that may be provided by the interactive television application. Display screen 9602 may be displayed in response to a selection of a remote control edit button when a recording (referred to herein in this context as "selected recording") in a recordings display screen or some other suitable display screen or overlay is selected. Alternatively, display screen 9602 may be displayed in response to a selection of an edit option that may have been shown, for example, on a recorded program information screen. Display screen 9602 may include remove commercials from recording option 9604, combine with other recordings option 9606, remove parts of a recording option 9608, add to playlist option 9610, and mark and recall location option 9612, which may be provided based on illustrative steps 9556, 9558, 9568, 9578, and 9592 shown in FIG. 58.

With reference now to FIG. 59, the interactive television application may provide the user with the ability to move highlight window 9614 over remove commercials from recording option 9604 and to select that option to remove the commercials from the selected recording. The interactive television application may provide the user with the ability to move highlight window 9614 over combine with other recordings option 9606 to select that option (e.g., by pressing a remote control "OK" button). The interactive television application may display a combine with other recordings display screen in response to a selection of combine with other recordings option 9606. The interactive television application may provide the user with the ability to move highlight window 9614 over remove parts of a recording option 9608 to select that option (e.g., by pressing a remote control "OK" button). The interactive television application may display a remove parts of a recording overlay in response to a selection of remove parts of a recording option 9608. The interactive television application may provide the user with the ability to move highlight window 9614 over add to playlist option 9610 to select that option (e.g., by pressing a remote control "OK" button). The interactive television application may display an add to playlist display screen in response to a selection of add to playlist option 9610. The interactive television application may provide the user with the ability to move highlight window 9614 over mark and recall location option 9612 to select that option (e.g., by pressing a remote control "OK" button). The interactive television application may display a mark and recall location overlay in response to a selection of mark and recall location option 9612. Display screen 9602 may also include information about the selected program, such as its title and length. As the recording is edited, the displayed length may change accordingly.

Figure 60:
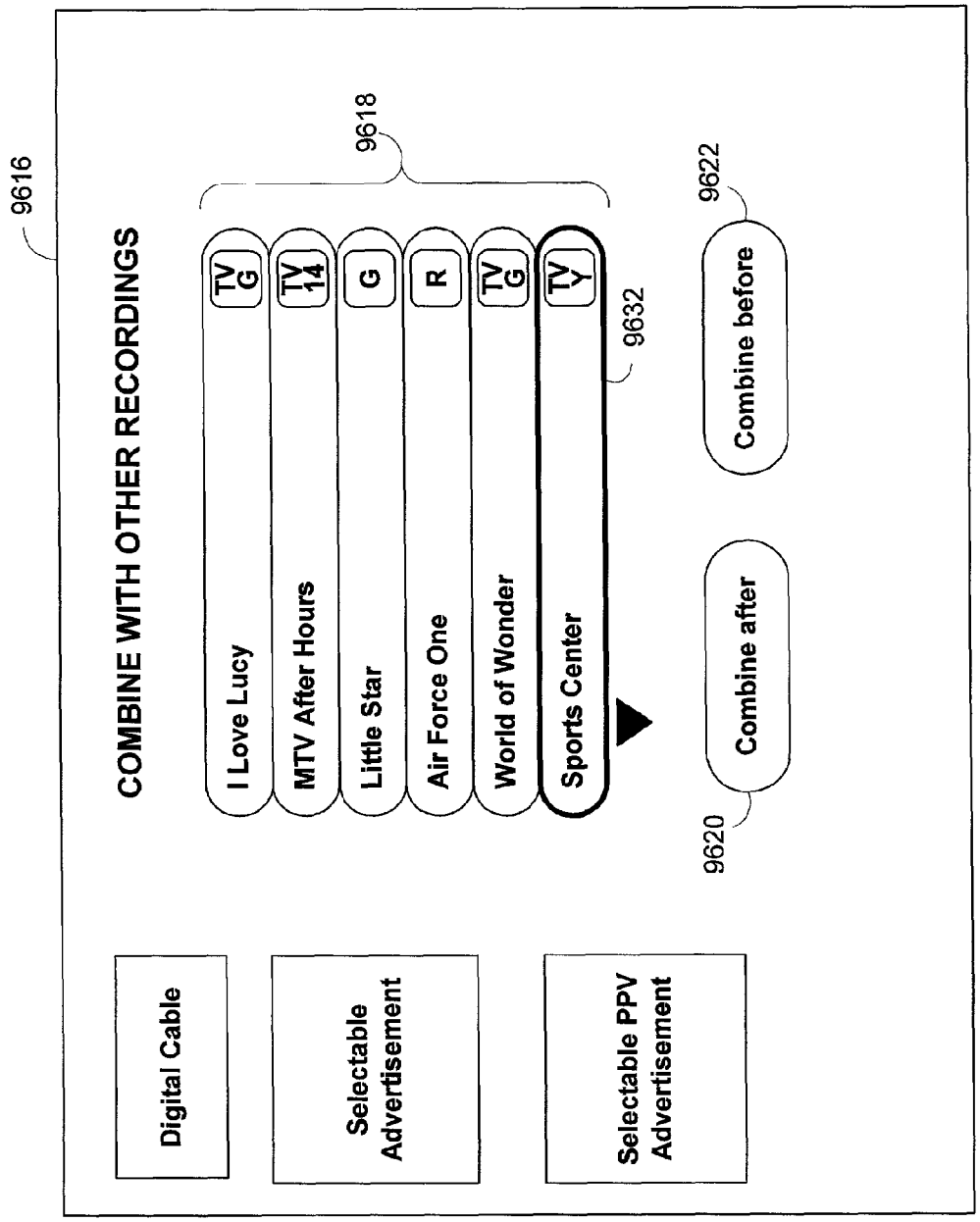
FIG. 60 shows an illustrative combine with other recordings display screen in accordance with one embodiment of the present invention.

FIG. 60 shows illustrative combine with other recordings display screen 9616 that may be provided by the interactive television application. Display screen 9616 may be displayed in response to a selection of combine with other recordings option 9606 of FIG. 59. With reference now to FIG. 60, display screen 9616 may provide the user with the ability to combine a selected recording with other recordings. Display screen 9616 may also provide the user with the ability to determine in what order recordings may be combined (e.g., whether program A may be positioned before or after program B).

Display screen 9616 may include recording listings 9618 which may contain a list of PVR recordings. Display screen 9616 may include combine after option 9620 and combine before option 9622. Display screen 9616 may provide the user with the ability to move highlight window 9632 over a listing bar in recording listings 9618 and to select combine after option 9620 or combine before option 9622 for the recording identified in that listing bar. A user may be permitted to move a highlight window between listings 9618 and options 9620 and 9622 using right and left remote control navigation keys. A user may be permitted to move highlight window 9632 over a particular listing (e.g., Sports Center) and to combine a recording of that particular listing with a currently selected recording by adding the recording of that particular listing before or after the currently selected recording. By using remote control right and left navigation keys, a user may access combine after option 9620 or combine before option 9622 for that particular listing. Pressing a remote control "OK" key will then cause the recording for that particular listing to be combined with currently selected recording. Display screen 9616 may also include the title, length, and other information related to the currently selected recording. The combined recording may have the name of the originally selected program, the name of the program selected to be combined with it, the user may be able to choose which name to use, or the user may be allowed to enter a new name for the combination. If desired, neither, either or both of the original recordings may be deleted when the combination is created.

Figure 61:
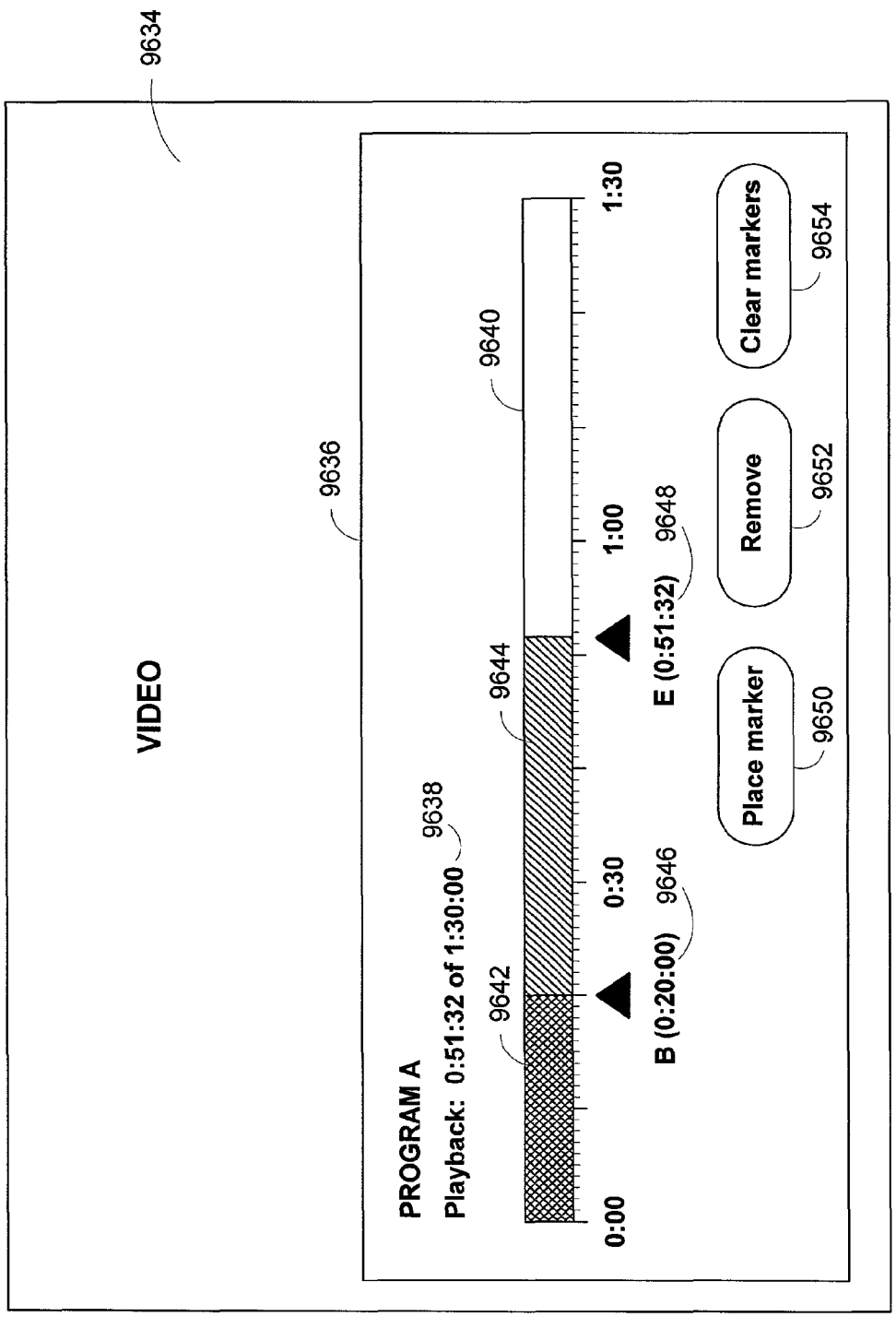
FIG. 61 shows an illustrative remove parts of a recording overlay displayed over video that is playing from a PVR in accordance with one embodiment of the present invention.

FIG. 61 shows illustrative remove parts of a recording overlay 9636 displayed over video 9634 that is playing from a PVR. Overlay 9636 may be displayed in response to a selection of remove parts of a recording option 9608 of FIG. 59 for a selected recording. With reference now to FIG. 61, overlay 9636 may provide the user with the ability to remove portions of a recording. Overlay 9636 may include program counter 9638 and time bar indicator 9640 which may provide a numerical and visual display of the playback position of the selected recording. The interactive television application may provide the user with the ability to move through a recording by using a remote control fast-forward button, a remote control rewind button, a remote control play button, a remote control pause button, a remote control stop button, a remote control skip forward or back button, an on-screen option to perform any of the above by selecting a marker, such as marker 9646 or 9648, or any other suitable remote control button or action. Program counter 9638 and time bar indicator 9640 may reflect a user's movements in the selected recording.

The interactive television application may provide the user with the ability to navigate to a location within a recording that the user may want to mark as a beginning point of a section of a recording to be removed. When the user reaches a desired location, the interactive television application may provide the user with the ability to select place marker option 9650. In response to a selection of place marker option 9650, the interactive television application may place beginning marker 9646 at the selected location with a time stamp indicating the exact time location of beginning marker 9646.

The interactive television application may fill time bar indicator 9640 with a criss-crossed fill pattern in playback section 9642 before beginning marker 9646. Playback section 9642 may be filled with a pattern to show the elapsed playback time. Once beginning marker 9646 is placed at a desired location, the interactive television application may modify time bar indicator 9640 to include a slashed fill pattern to show how much of the program may be removed by the user. The user may then use a remote control fast-forward button, a remote control play button, a remote control pause button, on-screen options, arrow keys, and any other suitable remote control buttons to navigate to another location in the recording where the user may place an end marker. In response to a selection of place marker option 9650, the interactive television application may place end marker 9648 at the selected location with a time stamp indicating the exact location of end marker 9648.

The placement of end marker 9648 would thus define section 9644 that a user may select to remove from the recording. In order to remove section 9644, the interactive television application may provide the user with the ability to select remove option 9652. If the user does not want to remove section 9644 or if the user wants to edit a section to be removed, the interactive television application may provide the user with the ability to select clear markers option 9654. The selection of clear markers option 9654 may cause beginning marker 9646 and end marker 9648 to be removed from overlay 9636.

If desired, a user may enter only a beginning marker, in which case all content after the marker may be removed. Similarly, a user may enter only an end marker, in which case all content prior to the marker may be removed.

Figure 62:
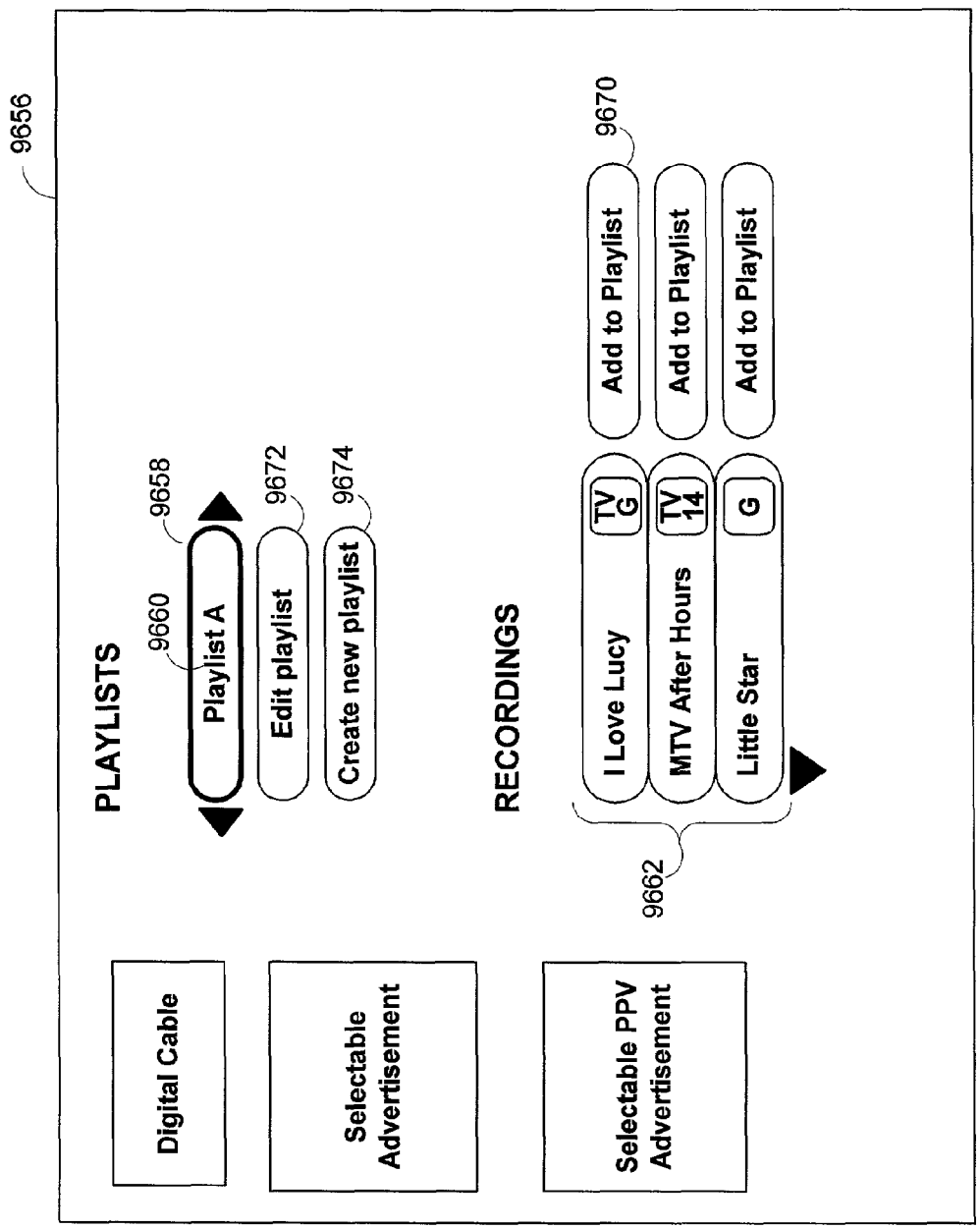
FIG. 62 shows an illustrative playlist display screen in accordance with one embodiment of the present invention.

A user may be provided with the ability to create a list of recordings in a desired order, such as a playlist. FIG. 62 shows illustrative playlist display screen 9656 that may be provided by the interactive television application.

Display screen 9656 may provide the user with the ability to move highlight window 9658 over playlist listing bar 9660 to select a playlist to which a recording may be added. Display screen 9656 may include recording listings 9662. A user may add a particular recording to a current playlist identified in playlist bar 9660 by moving highlight window 9658 over one of add to playlist options 9670 that is positioned adjacent to a listing of a recording that is desired to be added to the current playlist and by pressing a remote control "OK" button.

The interactive television application may provide the user with the ability to select edit playlist option 9672 to change the order of recordings within a playlist and remove recordings from a playlist. In response to a selection of edit playlist option 9672, the interactive television application may display an edit playlist display screen (see FIG. 63). The interactive television application may provide the user with the ability to select create new playlist option 9674 to create a new playlist. In response to a selection of create new playlist option 9674, the interactive television application may display a create new playlist overlay (see FIG. 64).

Figure 63:
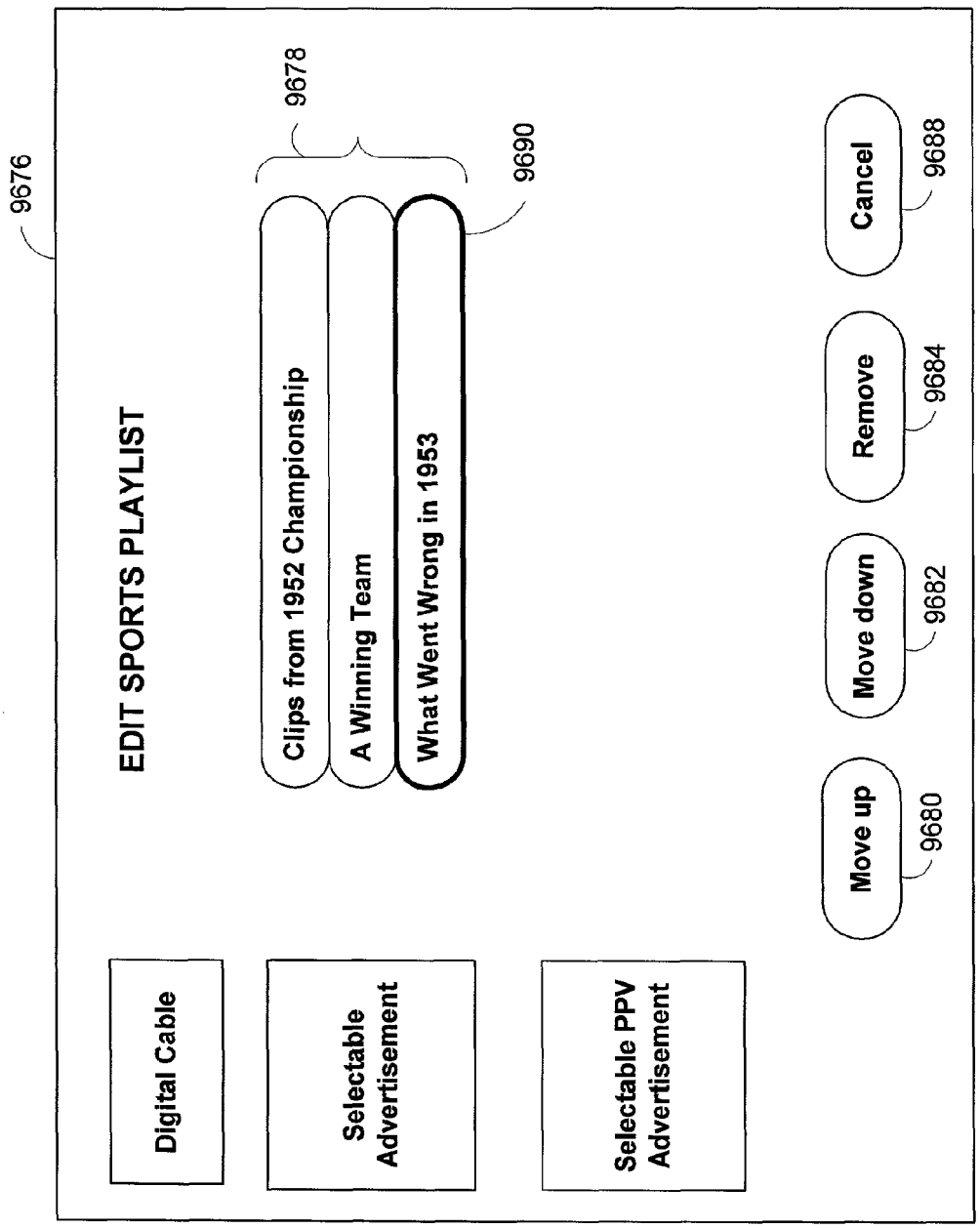
FIG. 63 shows an illustrative edit playlist display screen in accordance with one embodiment of the present invention.

FIG. 63 shows illustrative edit playlist display screen 9676 that may be provided by the interactive television application. Display screen 9676 may provide the user with the ability to change the order of recordings within a playlist and remove recordings from a playlist. Display screen 9676 may include playlist recording listings 9678, move up option 9680, move down option 9682, remove option 9684, and cancel option 9688. A user may access options 9680, 9682, and 9684 for a particular listing in listings 9678 by pressing a right or left remote control navigation buttons when highlight window 9690 is positioned over that particular listing. The right or left navigation buttons may move highlight window 9690 from that particular listing to options 9680, 9682, and 9684 to allow the user to select one of these options for the listing. The selection of move up option 9680 or move down option 9682 may move a recording up or down within a playlist. The selection of remove option 9684 for a particular listing may cause that recording to be removed from a playlist, although the recording itself may not be deleted. In response to a selection of cancel option 9688, the interactive television application may cancel changes made to a playlist and exit display screen 9676.

Figure 64:
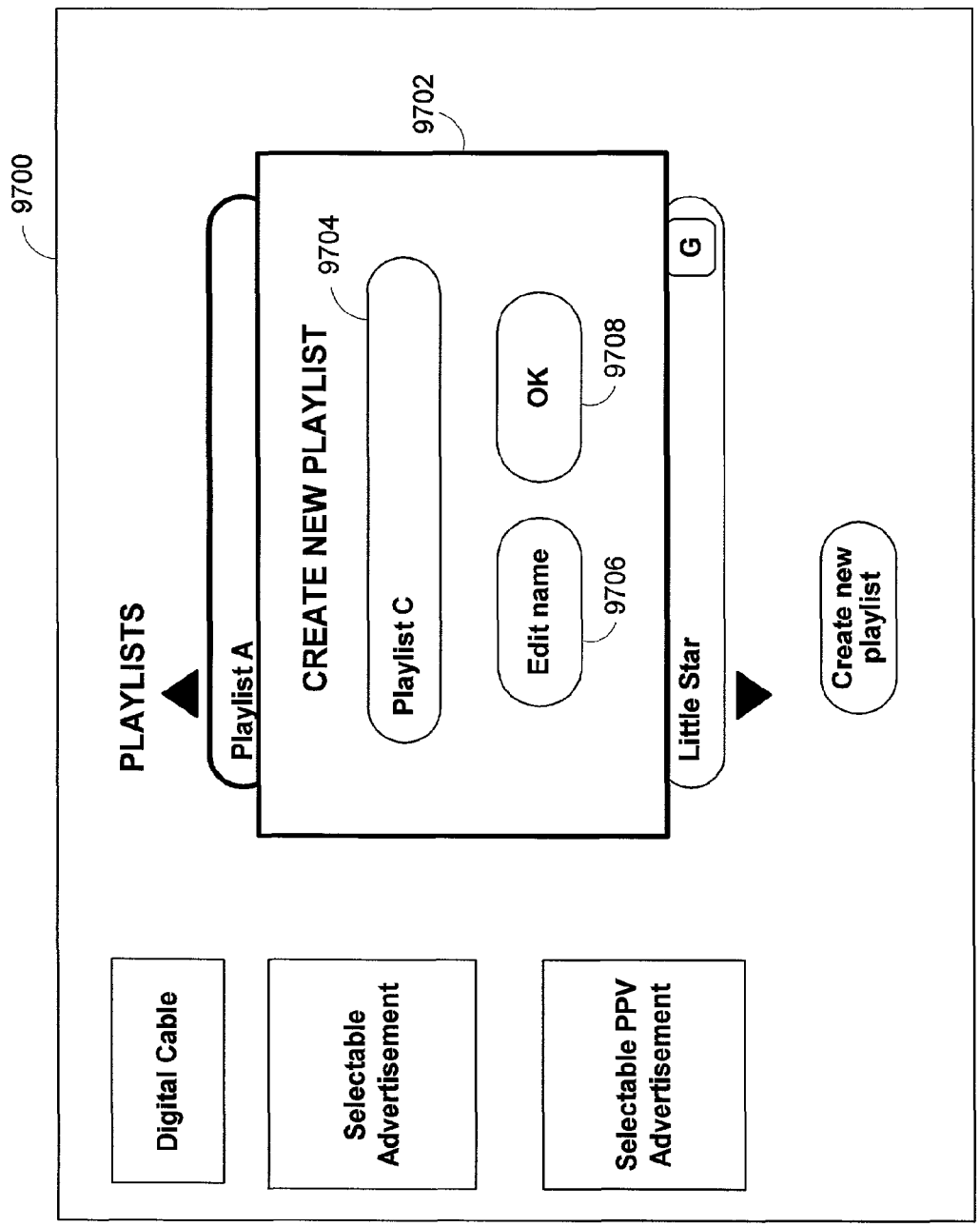
FIG. 64 shows an illustrative create new playlist overlay displayed over an illustrative playlist display screen in accordance with one embodiment of the present invention.

FIG. 64 shows illustrative create new playlist overlay 9702 displayed over playlist display screen 9700 that may be provided by the interactive television application. Overlay 9702 may provide the user with the ability to create a new playlist and to provide the user with the ability to edit the name of the playlist. Overlay 9702 may include playlist name 9704, edit name option 9706, and "OK" option 9708. Overlay 9702 may provide the user with the ability to select edit name option 9706 to edit the name of a new playlist. A user may use remote control alpha-numeric keys to edit the name of the playlist. Once the user is satisfied with playlist name 9704, the interactive television application may provide the user with the ability to select "OK" option 9708.

Figure 65:
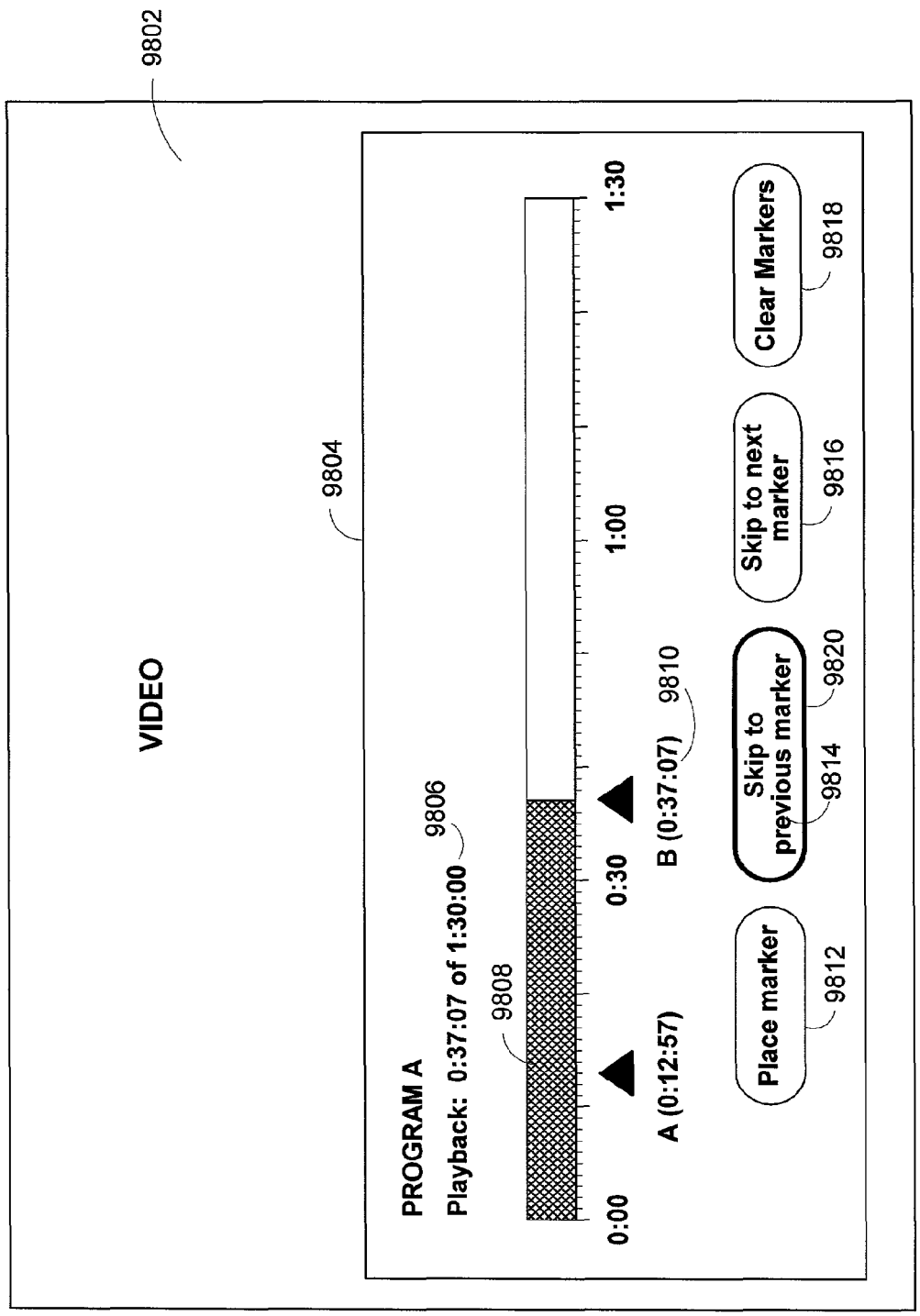
FIG. 65 shows an illustrative mark and recall overlay displayed over video of a selected recording in accordance with one embodiment of the present invention.

FIG. 65 shows illustrative mark and recall overlay 9804 displayed over video 9802 of a selected recording that the interactive television application may be playing from a PVR. Overlay 9804 may be displayed in response to a selection of mark location option 9612 of FIG. 59 for a selected recording. The functions of this overlay may also be available from a control overlay such as overlay 2404 of FIG. 39. With reference now to FIG. 65, overlay 9804 may provide the user with the ability to mark and recall locations within a recording. Overlay 9804 may include program counter 9806 and time bar indicator 9808.

The interactive television application may provide the user with the ability to navigate to a location within a recording that the user would like to mark to be a reference point. When the user reaches a desired location, the interactive television application may provide the user with the ability to select place marker option 9812. In response to a selection of place marker option 9812, the interactive television application may place marker 9810 at that particular location with a time stamp indicating the exact location of place marker 9810.

Overlay 9804 may include skip to previous marker option 9814, skip to next marker option 9816, and clear markers option 9818. The interactive television application may provide the user with the ability to move highlight window 9820 over skip to previous marker option 9814 and skip to next marker option 9816. In response to a selection of skip to previous marker option 9814, the current playback location in indicator 9808 may be moved to a previous marker (if one exists) and the application may play the corresponding video at that location in video 9802. In response to a selection of skip to next marker option 9816, the current playback location in indicator 9808 may be moved to a next marker (if one exists) and the application may play the corresponding video at that location in video 9802. The interactive television application may provide the user with the ability to select clear markers option 9818. In response to a selection of clear markers option 9818, the interactive television application may remove all markers associated with a selected recording. The interactive television application may save all existing markers when a user exits overlay 9804 and may recall the markers the next time a user accesses this option for the selected recording. If desired, the user may be given the opportunity to name or number the individual markers within a program, and to jump to a marker by name or number. If desired, keys on the remote control (such as page up and page down) may be used to quickly navigate to markers while watching a recording without having to display an overlay. Markers may be maintained when recordings are combined, when parts of a recording are removed, and when a playlist is created.

Figure 66:
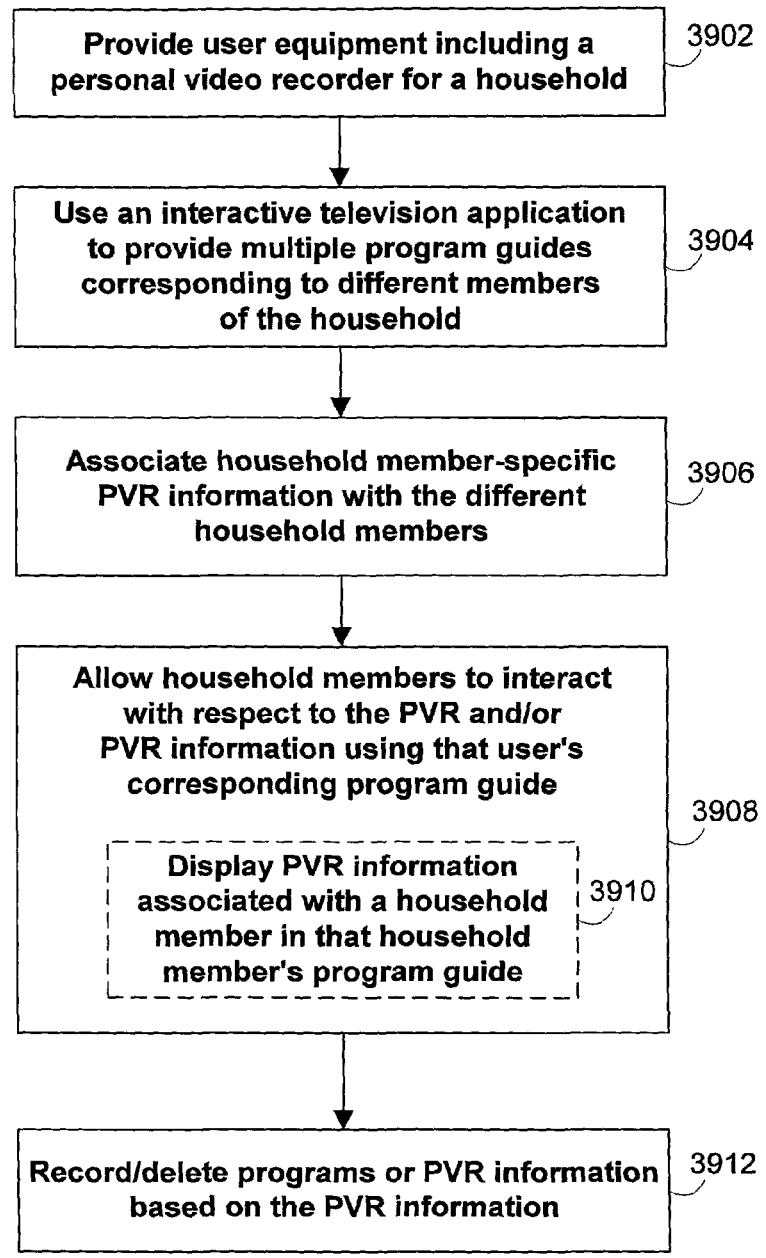
FIG. 66 shows an illustrative process for providing multiple program guides in accordance with one embodiment of the present invention.

An interactive television application may be implemented to provide a PVR with multiple user accounts. FIG. 66 shows illustrative steps involved in providing multiple program guides for PVR users in a household. With reference now to FIG. 66, at step 3902, user equipment that includes a PVR may be provided in a household. If desired, some of the functionality may be provided using equipment that is not in the user's home. For example, programs may be recorded to a server in a distribution facility. At step 3904, an interactive television application may be implemented on the user equipment to provide multiple program guides. Each program guide may correspond to one of the household members.

At step 3906, an interactive television application may associate different household member specific PVR information with different household members. The member specific PVR information of each household member may be associated with that user's program guide. PVR information may include configuration settings for recordings, user preference information, scheduled recordings information, recording information or other PVR related information. If desired, steps 3904 and 3906 may be combined. If desired, the size of the storage space to be used for configuration settings, user preferences, program information, buffers, stored programs, and other user-specific data may be specified for the multiple program guides. Alternatively, storage space may not be pre-allocated, and memory may be allocated from available memory as each user needs it. At step 3908, an interactive television application may allow household members to interact with respect to the PVR and/or with respect to their PVR information using their corresponding program guides. For example, a household member may use his or her program guide to record a program on a PVR, to schedule a PVR to perform a recording, or to view or manipulate his or her list of PVR recordings.

Step 3908 may include step 3910. At step 3910, the interactive television application may display PVR information that is associated with a particular household member when that household member uses their corresponding program guide. At step 3912, the interactive television application may cause the PVR to record or delete programs based on the PVR information that is associated with the household members. The PVR information may be updated when a program is recorded or deleted. Thus, the interactive television application may provide a unique program guide for each member of a household.

Figure 67:
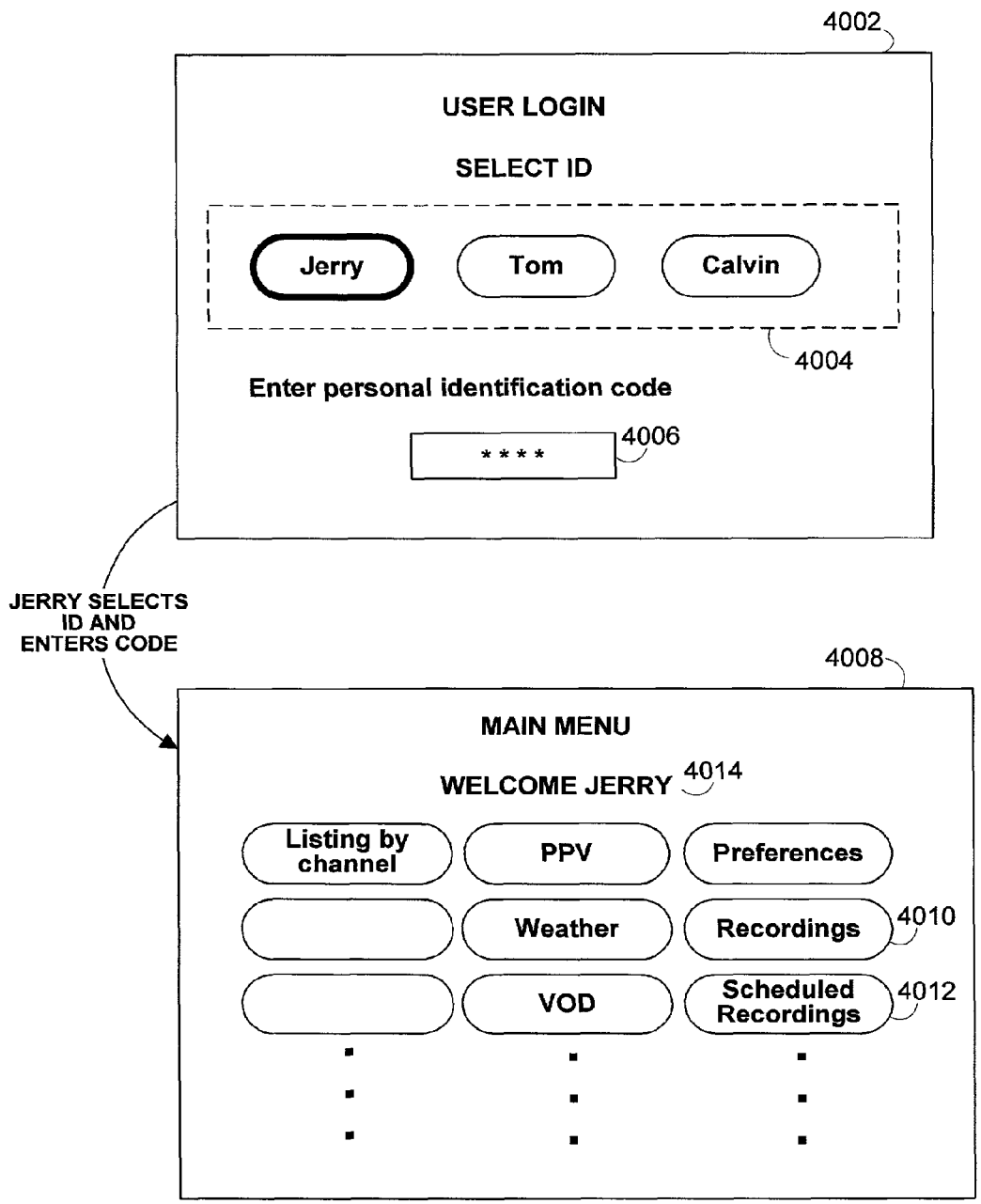
FIG. 67 shows an illustrative sequence of display screens that may be displayed to permit login into a program guide in accordance with one embodiment of the present invention.

A household member may begin to use his or her program guide by logging into his or her program guide. For example, with reference now to FIG. 67, the interactive television application may display user-login display screen 4002. User-login display screen 4002 may include options 4004 for allowing users to select their login identification. User-login display screen 4002 may also include data entry area 4006. Area 4006 may be used to enter a personal identification code that is associated with a login identification. Once a user has logged in to access one feature, the user may not be required to login to access additional features. For example, there may be a "change user" or "login" button on the main menu screen or a key on the remote control. If desired, a user may be automatically logged out after a period of inactivity, or when the system is turned off.

Personalized main menu display screen 4008 may be displayed when a user selects a particular login identification using options 4004 and enters a valid personal identification code. Main menu display screen 4008 may include text 4014 identifying the current user and may include options for providing interactive services. For example, main menu display screen 4008 may include recordings option 4010 and scheduled recordings option 4012 that the user may select to access PVR related information and features. User preferences and PVR setup options accessed from this main menu screen may be specific to the logged in user.

Figure 68:
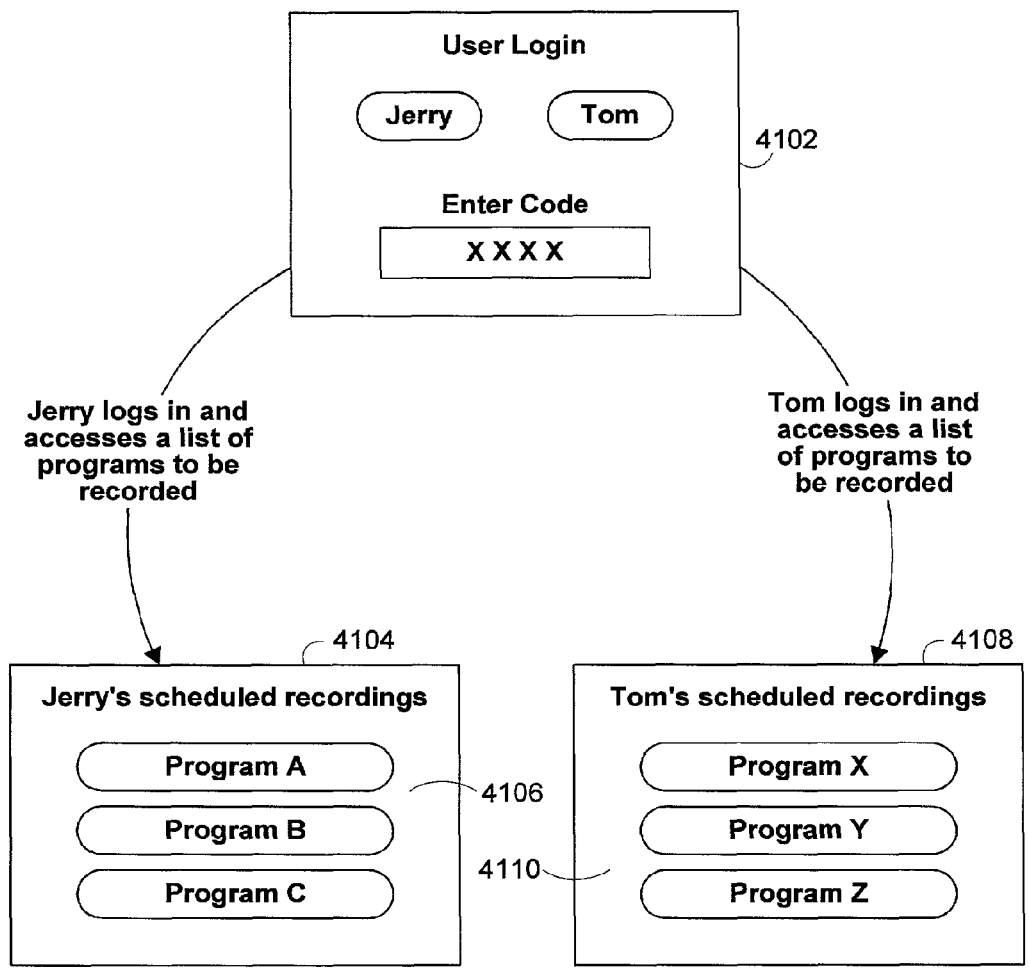
FIG. 68 shows an illustrative sequence of display screens that may be displayed to permit viewing of scheduled recordings in different program guides in accordance with one embodiment of the present invention.

A user may access his or her list of scheduled recordings when that user logs into their program guide. For example, with reference now to FIG. 68, user-login display screen 4102 may be displayed to provide users with an opportunity to login. In this instance, display screen 4102 identifies the users to be Tom and Jerry.

Scheduled recordings display screen 4104 may be displayed after a user logs into their program guide and selects to access his or her list of scheduled recordings. As mentioned above, a user may log in by selecting a user login and entering a personal identification code. Scheduled recordings display screen 4104 may include list 4106 containing listings for programs that Jerry selected to be recorded. Tom's list of scheduled recordings may be displayed in scheduled recordings display screen 4108 upon user request after Tom logs in to his program guide. Scheduled recordings display screen 4108 may include list 4110 containing listings for programs that Tom selected to be recorded. An interactive television application may associate different programs to be recorded with different users. For example, as shown, list 4110 that is displayed for Tom is different from list 4106 that is displayed for Jerry.

Figure 69:
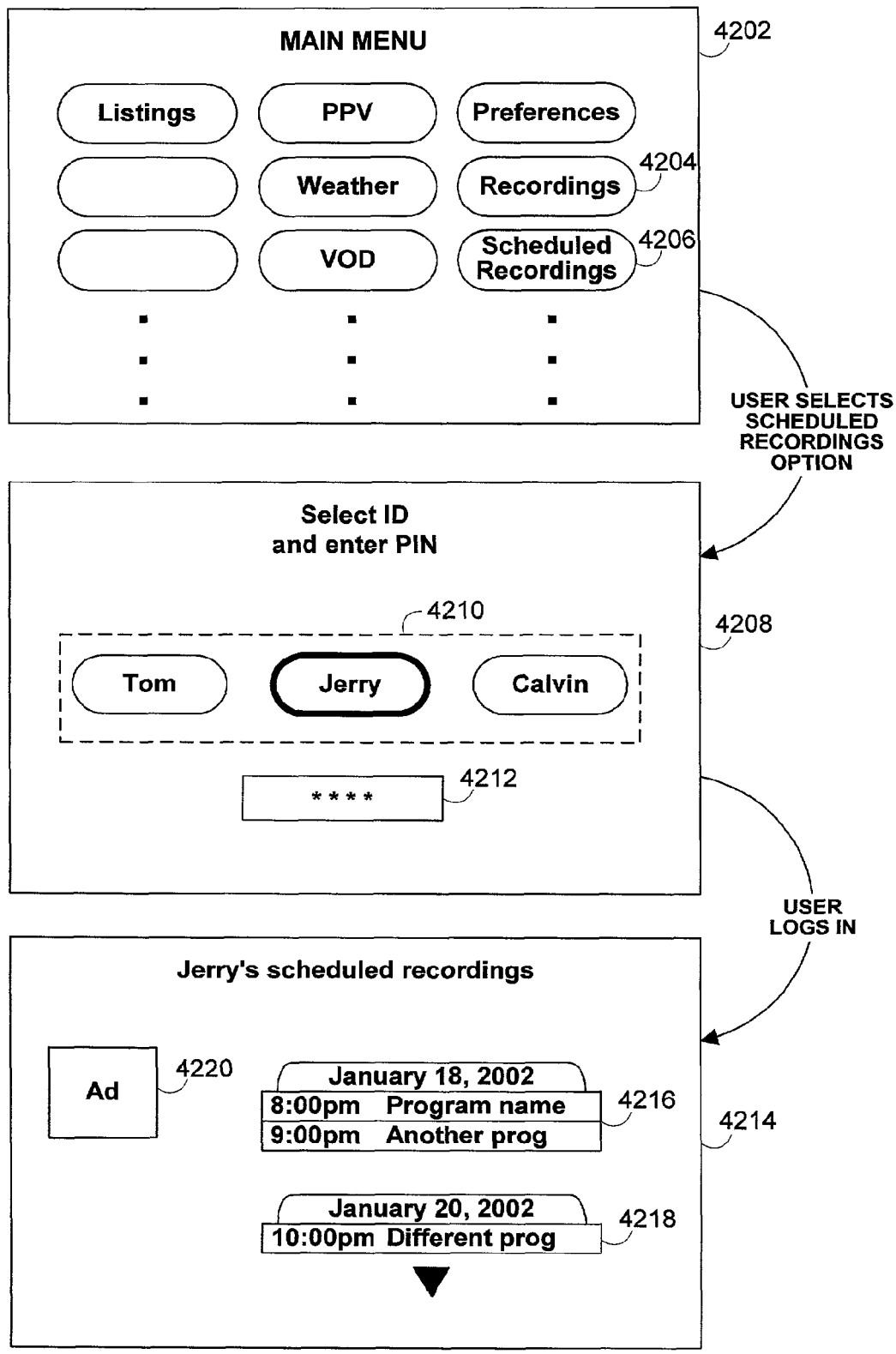
FIG. 69 shows an illustrative sequence of display screens that may be displayed to permit viewing of a user's scheduled recordings using his or her program guide in accordance with one embodiment of the present invention.

If desired, a user may be required to login when the user selects to access PVR related information and/or features. For example, with reference now to FIG. 69, main menu display screen 4202 may be displayed for example when a user presses a main menu remote control button. Access to main menu display screen 4202 may be provided without requiring user login. From main menu display screen 4202, a user may be permitted to access general program guide features such as program listings, weather information, etc.

Main menu display screen 4202 may contain recordings option 4204 and scheduled recordings option 4206. User-login display screen 4208 may be displayed when a user selects scheduled recordings option 4206 in main menu display screen 4202. If desired, user-login display screen 4208 may be presented as an overlay. User-login display screen 4208 may contain login identification options 4210 and data entry area 4212.

Personalized scheduled recordings display screen 4214 may be displayed when a particular user, in this case, Jerry logs into his program guide. Scheduled recordings display screen 4214 may contain list 4216 for Jerry's scheduled recordings list for Jan. 18, 2002, and list 4218 for Jerry's scheduled recordings for Jan. 20, 2002. Scheduled recordings display screen 4212 may contain interactive advertisement 4220. Examples of interactive television program guide systems with interactive advertisements are illustratively shown in Knudson, et al, which is mentioned below.

Figure 70:
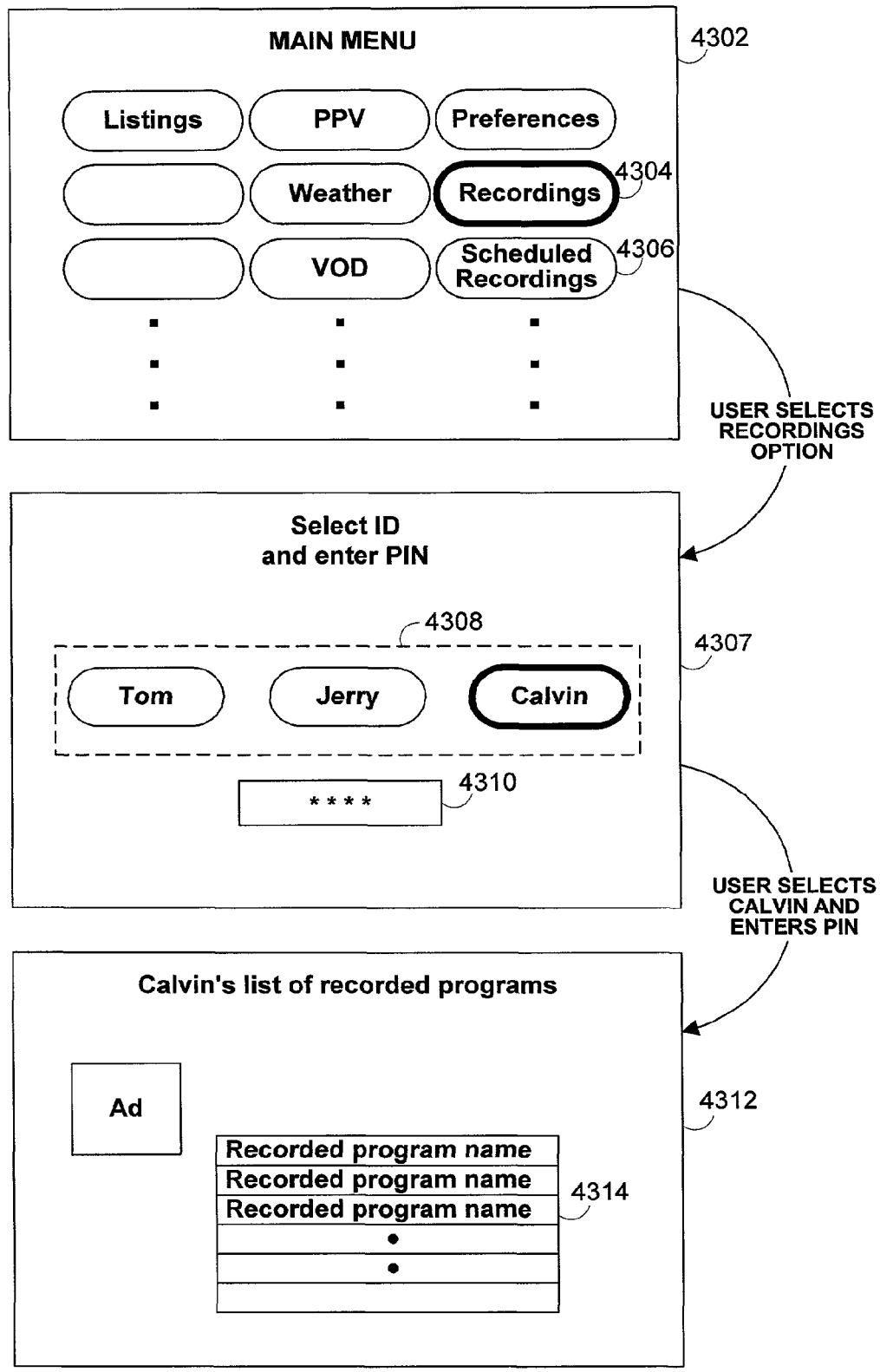
FIG. 70 shows an illustrative sequence of display screens that may be displayed to permit viewing of a user's list of recordings using his or her program guide in accordance with one embodiment of the present invention.

Features for managing recordings may be implemented in a similar way. For example, with reference now to FIG. 70, main menu display screen 4302 may be displayed for example when a user presses a remote control menu button. Main menu display screen 4302 may contain recordings option 4304. User-login display screen 4307 may be displayed when a user selects recordings option 4304. At user-login display screen 4306, a user may use options 4308 to select their login identification and may enter their personal identification code using data entry area 4310. Personalized recorded programs display screen 4312 may be displayed when a user, in this case Calvin, logs into the system using display screen 4307. Recorded programs display screen 4312 may contain list 4314 that lists programs that have been recorded for Calvin.

Figure 71:
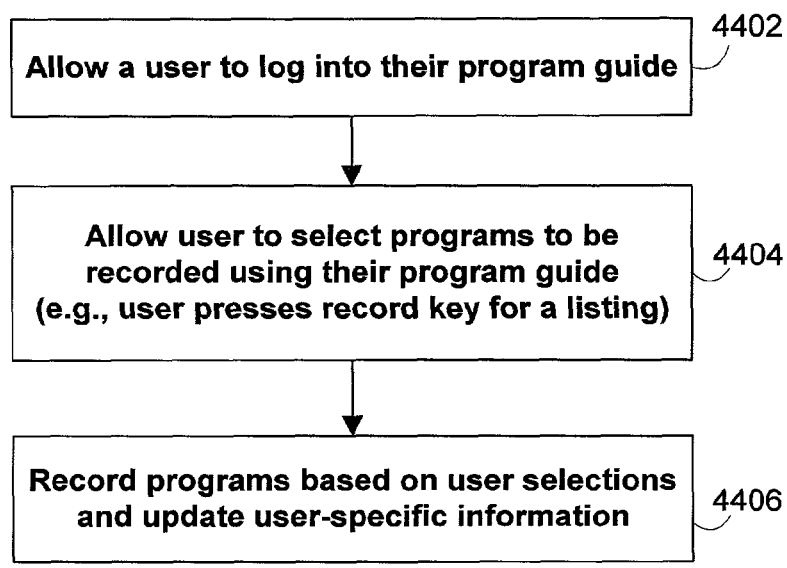
FIG. 71 shows an illustrative process for recording programs based on a user selection in accordance with one embodiment of the present invention.

Illustrative steps involved in recording programs in a multiple program guide environment are shown in FIG. 71. With reference now to FIG. 71, at step 4402, a user may be provided with an opportunity to log into his/her program guide. Multiple program guides may be provided that each correspond to a different user. The multiple program guides may be implemented to be available through local user equipment (e.g., user equipment used by members in a household) and may also be implemented using remote equipment, such as a remote server. The user equipment or server may include a storage device such as a PVR. A user may be permitted to log into their program guide to interact with respect to the storage device. At step 4404, a user who is currently logged into their program guide may be permitted to select programs to be recorded on the storage device (e.g., on a local recording device or on the server). At step 4406, the user equipment may record programs based on which programs were selected to be recorded by the users while they were in their program guides. The interactive television application that provides the multiple program guides may record programs based on the user-selections irrespective of which user is currently logged into their program. Therefore, a program may be recorded for one user when a program guide for another is in use. Step 4406 may include updating user-specific information regarding recordings so that the new information may be reflected when a user logs into the system. If multiple users select to record the same program, the system may only record one copy.

Figure 72:
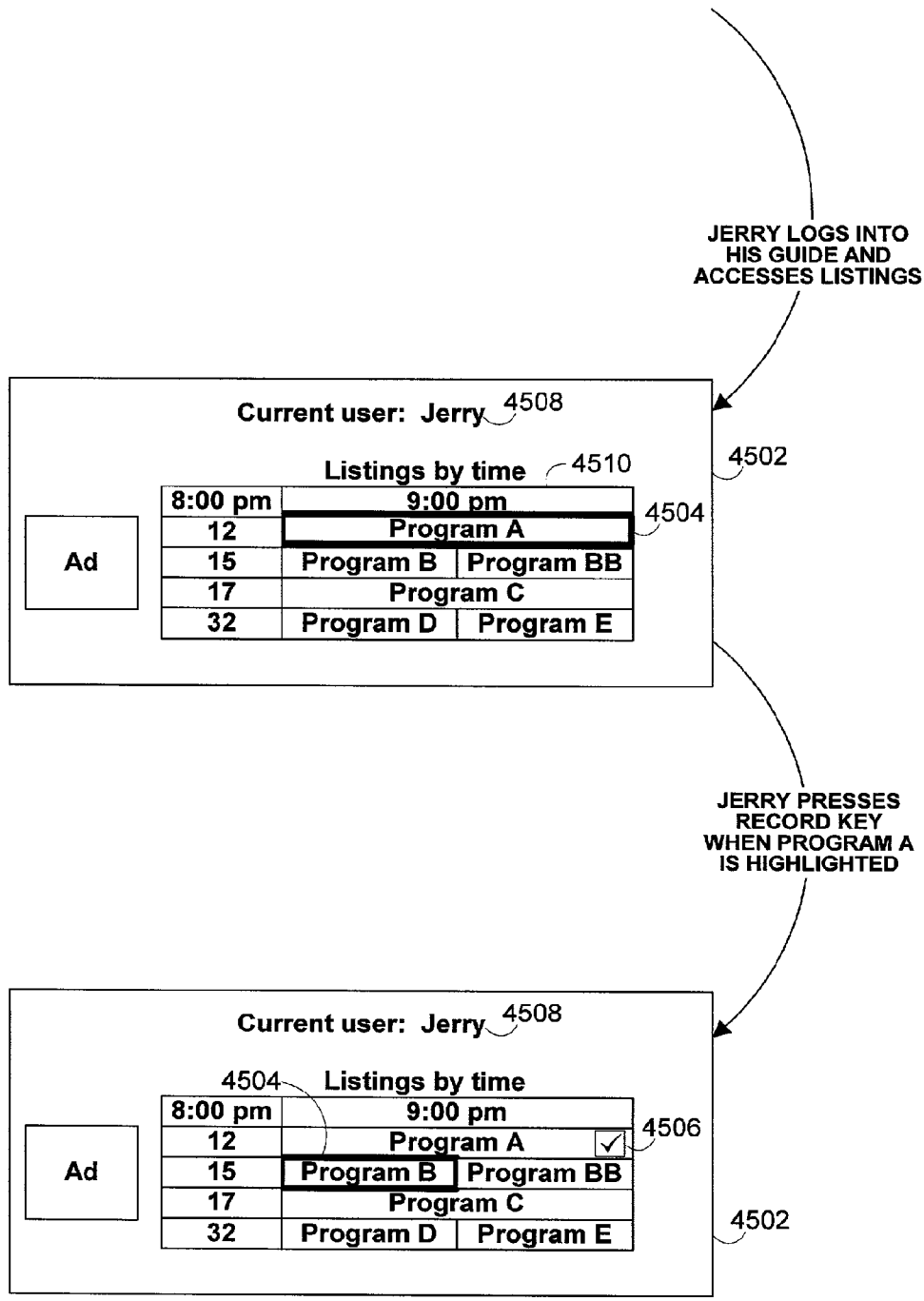
FIG. 72 shows an illustrative sequence of display screens that may be displayed when a user selects a program to be recorded in accordance with one embodiment of the present invention.

Different techniques may be implemented to allow users in a multiple program guide environment to select programs to be recorded. For example, with reference now to FIG. 72, program listings display screen 4502 may be displayed when a particular user logs into their program guide and selects to access program listings. If desired, program listings display screen 4502 may contain text identifying the current user, which in this case is Jerry. Display screen 4502 may contain program listings 4510. The current user may be permitted to select a program to be recorded by moving highlight window 4504 over a program listing such as the listing for program A and pressing a remote control record key. Icon 4506 may be displayed in association with program A when the user has selected to record program A. Thus, icon 4506 indicates that Jerry has selected to record program A, and program A is part of his list of scheduled recordings.

Figure 73:
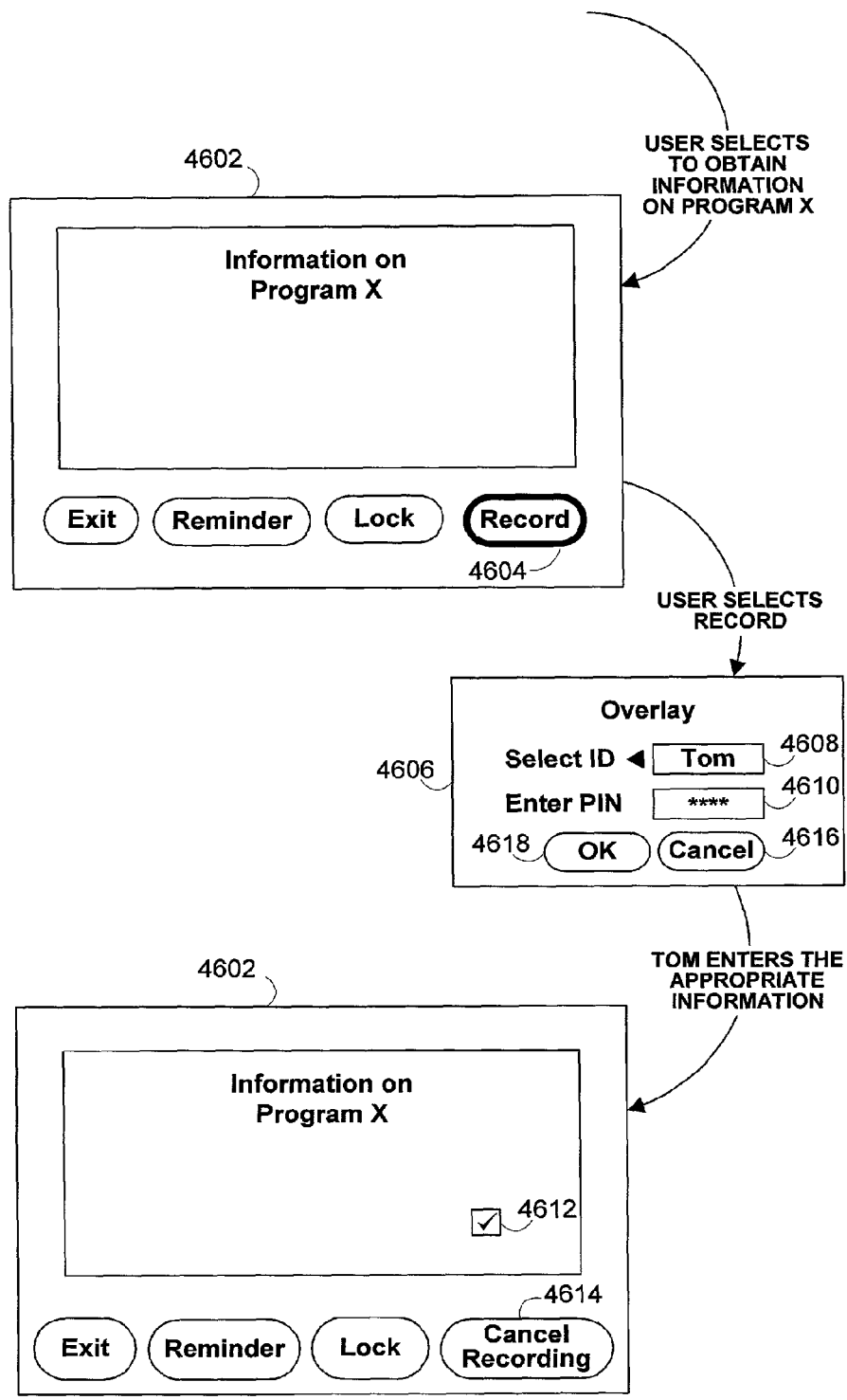
FIG. 73 shows an illustrative sequence of display screens that may be displayed when a user selects a program to be recorded from an information display screen in accordance with one embodiment of the present invention.

Another technique for selecting a program to be recorded may involve requesting user identification when a recording related action is sought to be taken by a current user. For example, with reference now to FIG. 73, program information display screen 4602 may be displayed when a user selects to obtain information on a particular program. A user may be permitted to access information display screen 4602 without having to log into their program guide. Information display screen 4602 may contain record option 4604 that a user may select to have the current program recorded (e.g., recorded using a PVR). Overlay 4606 may be displayed when the current user selects record option 4604. Overlay 4606 may include identification option 4608 that the user may scroll to select their login identification, may include data entry area 4610 that may be used to enter a personal identification number ("PIN"), OK option 4618 that may be used to log in, and cancel option 4616 that may be selected to cancel overlay 4606. Icon 4612 may be displayed in information display screen 4602 when the current user enters the appropriate information in overlay 4606. Icon 4612 may indicate that the program is now selected to be recorded. Information display screen 4602 may now contain cancel recording option 4614 that the user may select to cancel the scheduled recording. The cancellation of the recording may require that the user select a login identification and enter a PIN again.

Figure 74:
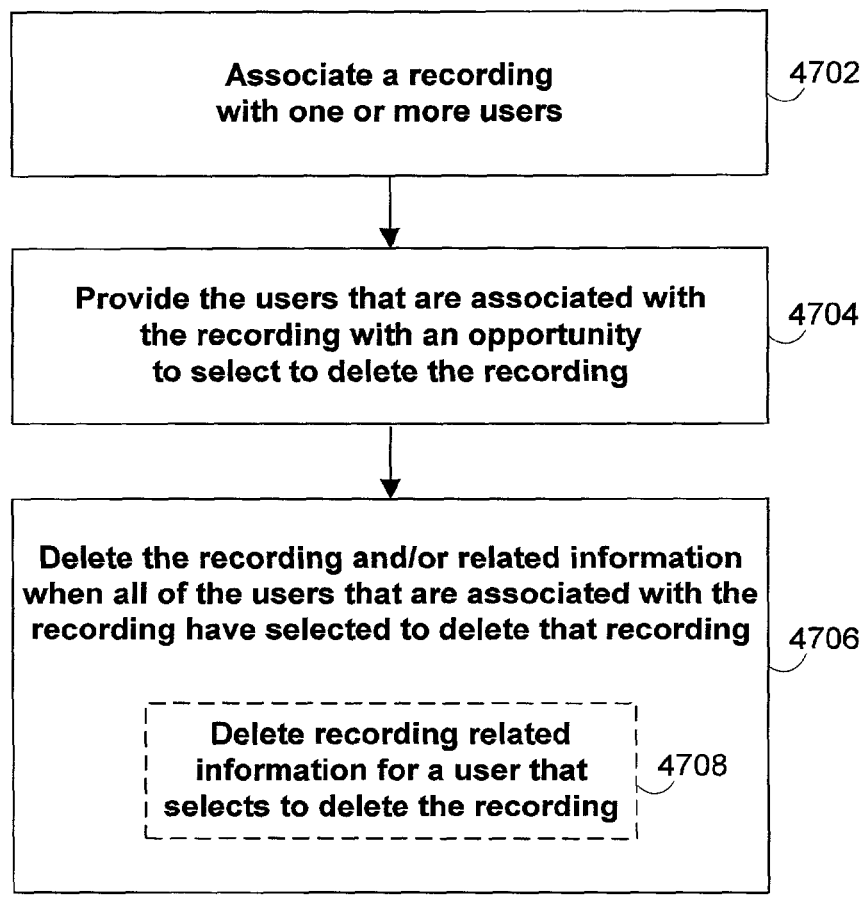
FIG. 74 shows an illustrative process for deleting recordings or recording related information in accordance with one embodiment of the present invention.

In a multiple program guide environment, recordings may be manually deleted by individual users. Illustrative steps involved in deleting recordings are shown in FIG. 74. With reference now to FIG. 74, at step 4702, an interactive television application may associate a recording with one or more users. More than one user may be associated with a particular recording when more than one user selects the same program to be recorded from within their guides. At step 4704, users who are associated with the recording may be provided with an opportunity to delete the recording when they are in their program guide. At step 4706, the recording may be deleted when all of the users that are associated with that recording have selected to delete the recording. Step 4706 may include step 4708. At step 4708, information that associates a recording with a user may be deleted when the user selects to delete the recording. Step 4708 may be used to remove the association of that user with the program that the user selected to delete (e.g., removes the program name for the recording from the user's list of recordings). Information on the program may be deleted without actually deleting the recording itself, e.g., if other users have selected the program for recording.

Figure 75:
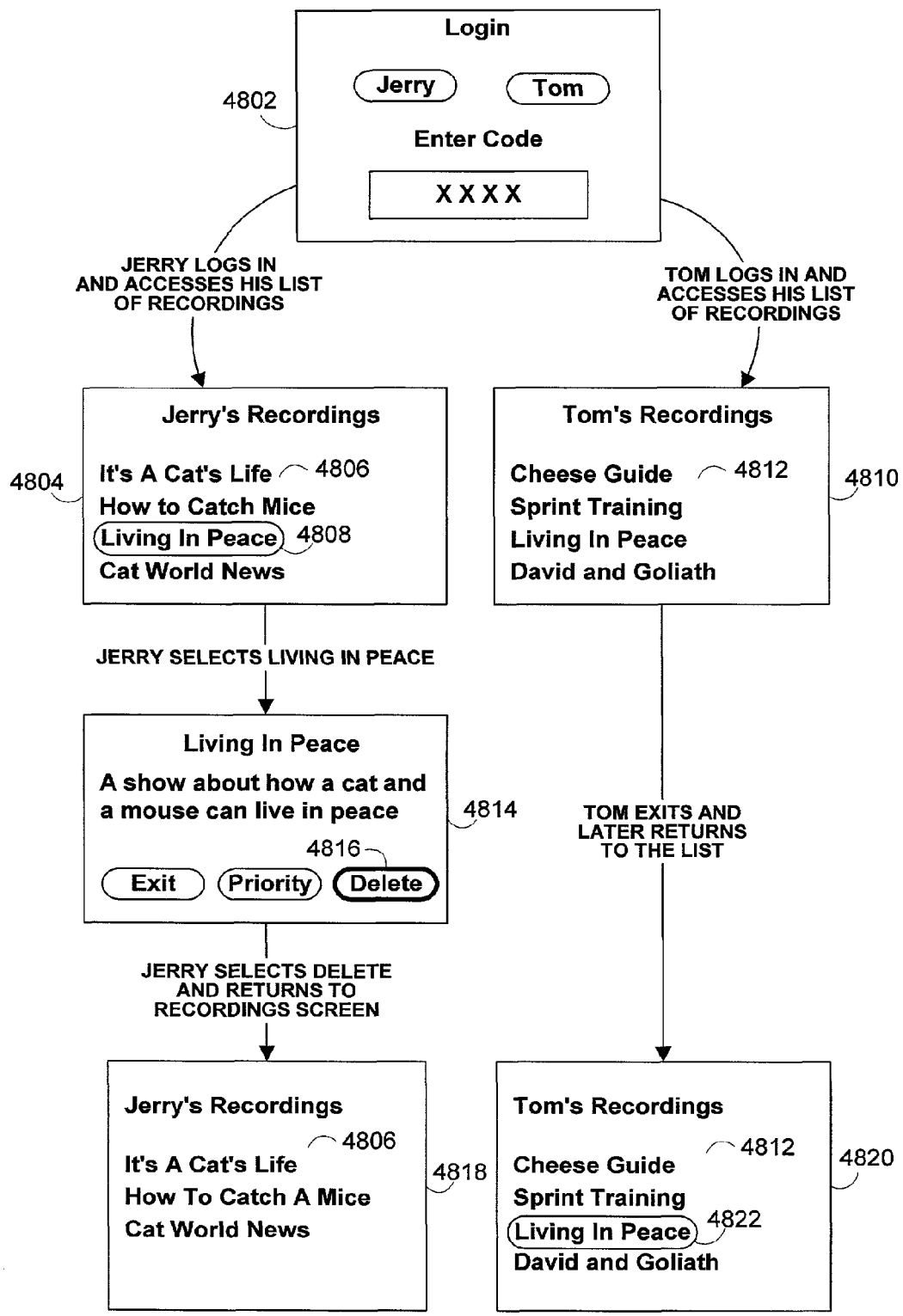
FIGS. 75-76 show illustrative sequences of display screens that may be displayed when two different users are accessing their program guides, which are local to the same user equipment, in accordance with one embodiment of the present invention.
Figure 76:
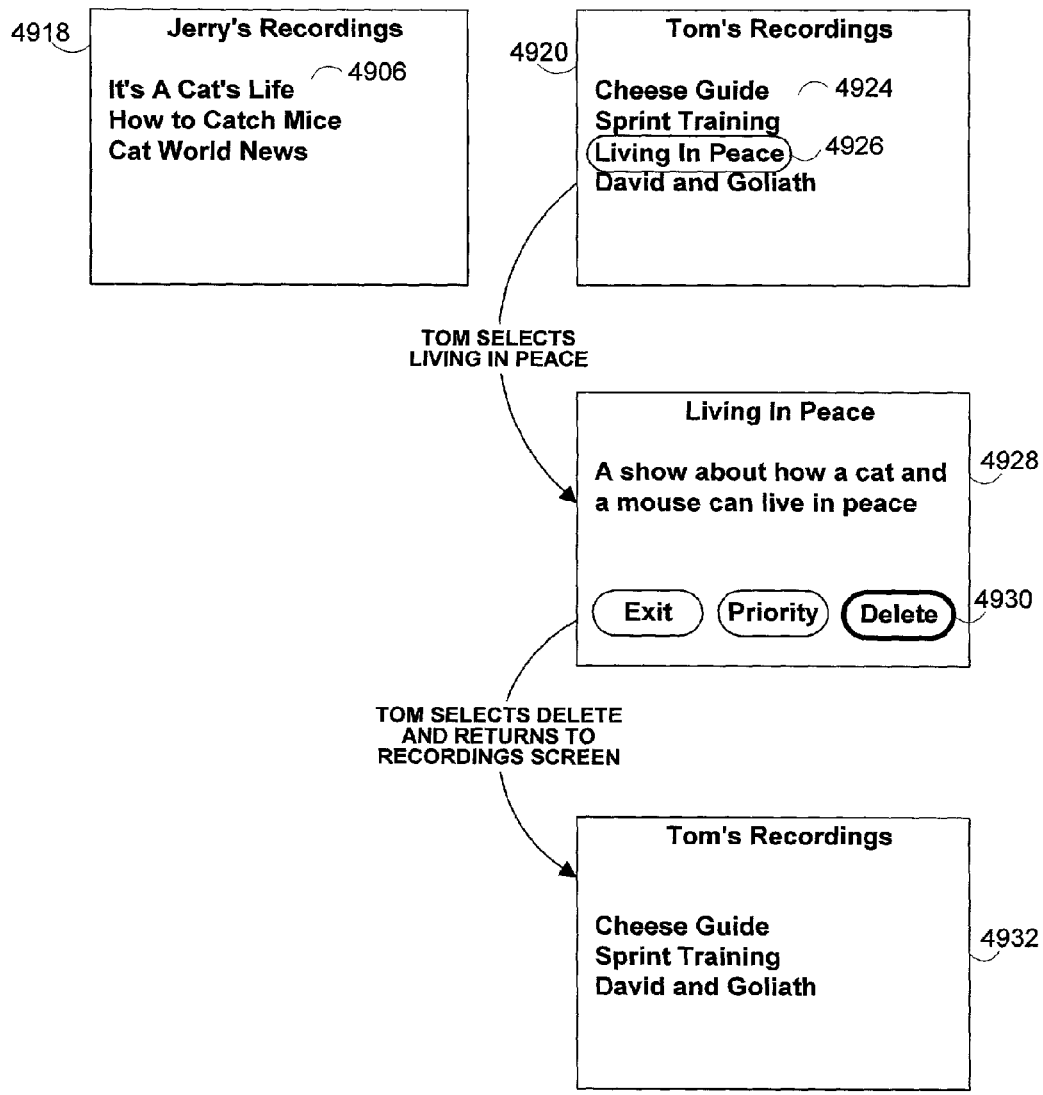

FIGS. 75 and 76 show an illustrative sequence of display screens that may be provided based on the illustrative steps shown in FIG. 74. With reference now to FIG. 75, login display screen 4802 may be displayed when a user seeks to login to their program guide. If desired, login display screen 4802 may be an overlay. In this example, there are two users that are identified in display screen 4802 as Tom and Jerry. Recordings display screen 4804 for Jerry's recordings may be displayed when Jerry logs into his program guide using login display screen 4802 and selects to access his list of recordings. Recordings display screen 4810 for Tom's recordings may be displayed when Tom logs into his program guide using login display screen 4802 and selects to access his list of recordings. As shown, the recordings contained in list 4806 in display screen 4804 for Jerry and in list 4812 in display screen 4810 for Tom are different except for one program. The program Living in Peace is listed in both lists 4806 and 4812.

Information display screen 4814 that contains information and options for the program Living in Peace may be displayed when Jerry moves highlight window 4808 in recordings display screen 4804 over the listing for the program Living in Peace and presses a remote control "OK" key. Information display screen 4814 may include delete option 4816. The program guide may allow Jerry to select delete option 4816 and to subsequently return to his updated list of programs, which are displayed in recordings display screen 4818. As shown, a listing for the program Living in Peace is no longer included in list 4806 of Jerry's recordings. Recordings display screen 4820 for Tom's recordings may be displayed after the program Living in Peace is selected to be deleted by Jerry. Recordings display screen 4820 may include list 4812 of Tom's recordings, which still contains listing 4822 for the program Living in Peace. Thus, one user may delete a recording of a program from his or her guide without changing the program guides of the other users.

FIG. 76 shows an illustrative sequence of display screens that continues the sequence shown in FIG. 75. With reference now to FIG. 76, recordings display screens 4918 and 4920 repeat recordings display screens 4818 and 4820 of FIG. 75. Recording display screen 4920 for Tom's recordings may include listing 4926 for the program Living in Peace. Information display screen 4928 containing information and options for the program Living in Peace may be displayed when the current user (Tom) selects listing 4926. Information display screen 4928 may include delete option 4930. A recording of the program Living in Peace and/or information related to that program may be deleted when delete option 4930 is selected. After delete option 4930 is selected for the program Living in Peace, the interactive television application may display recordings display screen 4932 that shows that the deleted program is no longer on Tom's list of recordings.

The interactive television application may include features for handling differences between recording settings that two different users have selected for recording the same program. The interactive television application may record the program to based on both settings (e.g., using the highest setting that is set by each user). For example, if the two users select different before/after buffer times, the application may use the longer of the two. If the two users select different record qualities, the application may select the highest quality. If two users select different record priorities, the application may use the highest specified priority.

Accordingly, multiple program guides may be provided that correspond to different users that share the same user equipment.

Figure 77:
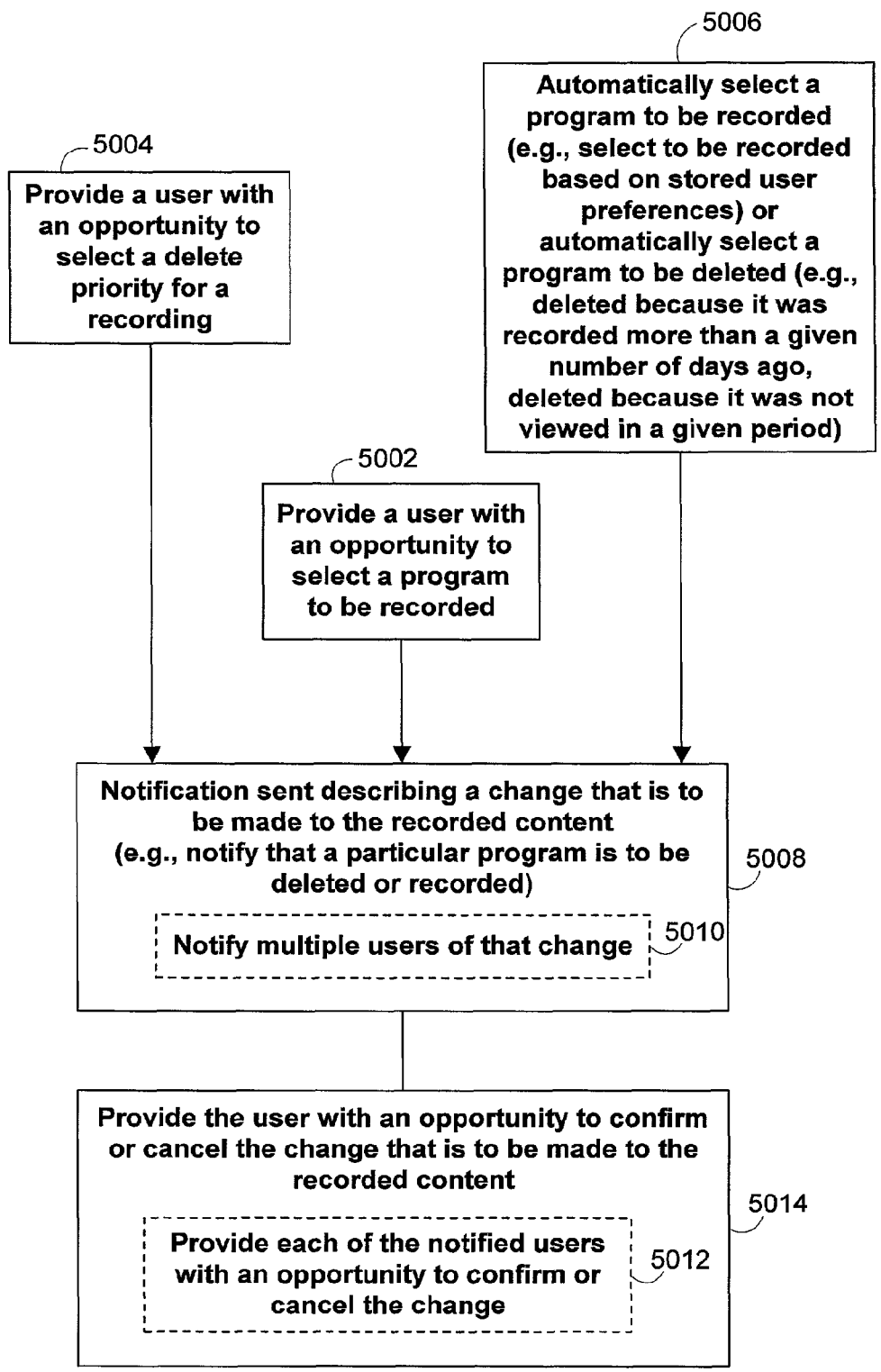
FIG. 77 shows an illustrative process for notifying users of changes in recorded content in accordance with one embodiment of the present invention.

A notification feature may be another feature that may be provided with respect to recording activity. Illustrative steps involved in providing notifications for upcoming changes in recording content are shown in FIG. 77. At step 5002, an interactive television application may provide a user with an opportunity to select a program to be recorded. At step 5004, a user may be provided with an opportunity to select delete priority settings for a particular recording.

At step 5006, an interactive television application may automatically select a program to be recorded or deleted. A particular program may be automatically selected to be recorded based on stored user preferences or other suitable criteria. A recording may be deleted automatically for example when the recording is one that was created over a certain number of days ago or when the recording has not been viewed in a given period.

At step 5008, a notification may be sent that describes a change that is to be made to the recorded content. For example, the notification may state that a particular program is about to be recorded or deleted. The change that is to be made may be determined based on steps 5002, 5004, and 5006. Step 5008 may include step 5010. At step 5010, in a multiple program guide environment, a notification may be sent to specific users to which the content of the notification is related. For example, the notification may be sent only to users who used their program guides to select a particular program to be recorded. This may be achieved by sending one notification using an e-mail and sending another notification via a program guide overlay. Other techniques may involve waiting to send a notification to a particular user until that user logs into his or her program guide. At step 5014, an opportunity to cancel or confirm the change identified in the notification may be provided to the recipient of the notification.

In a multiple program guide environment, each user that is notified of the change in the recorded content may be provided with an opportunity to confirm or cancel the change at step 5012. Information associated with each user's program guide will reflect whether that user selected to confirm or cancel the change. Step 5012 may be a substep of step 5014.

Figure 78:
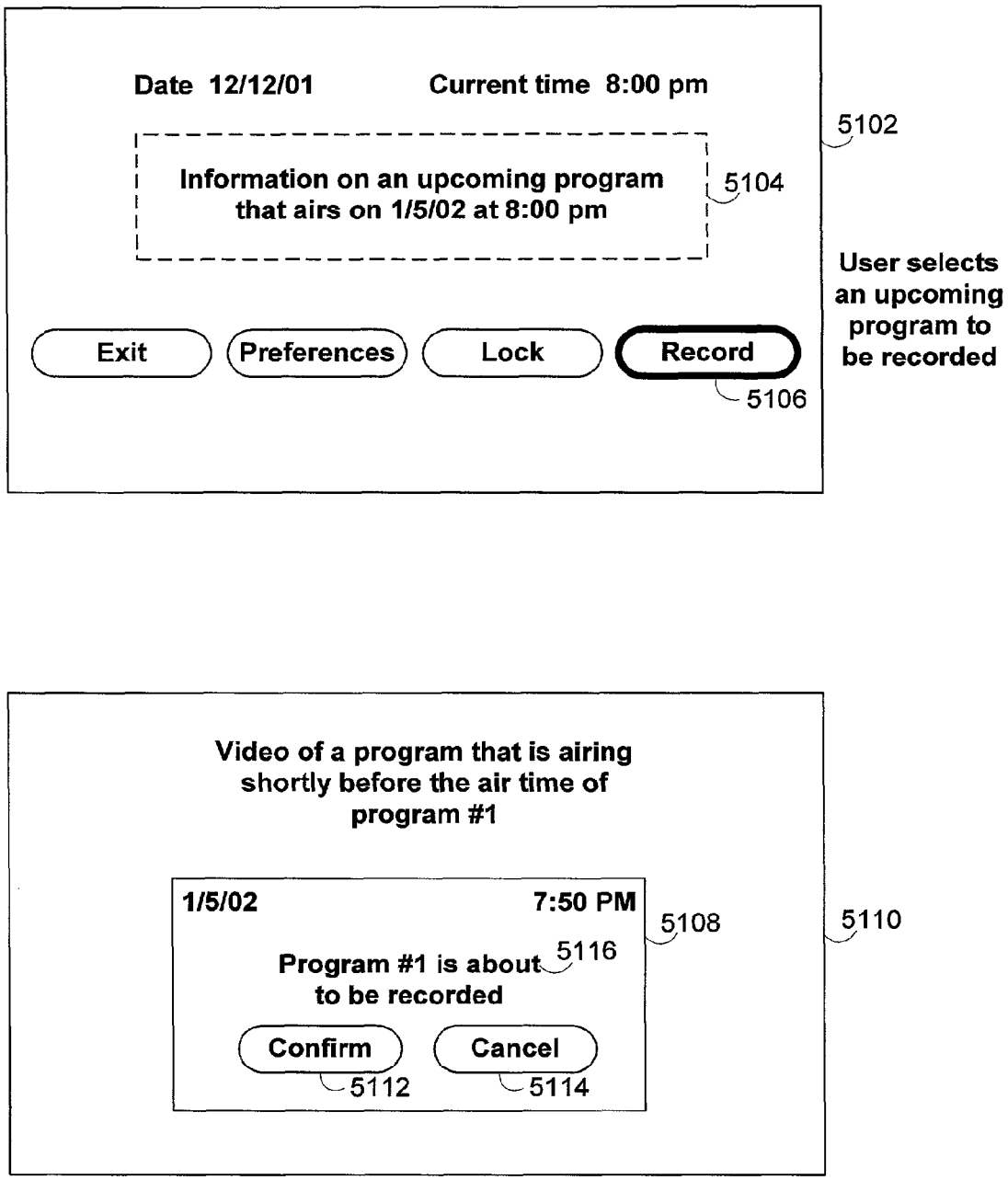
FIG. 78 shows an illustrative sequence of display screens that may be displayed in notifying a user that a program is about to be added to the recorded content in accordance with one embodiment of the present invention.

FIG. 78 shows an illustrative display sequence that may be provided based on the illustrative steps shown in FIG. 77. With reference now to FIG. 78, information display screen 5102 may contain information 5104, which describes an upcoming program, and may contain related program guide options such as record option 5106. An upcoming future program may be a program that will air in about a week. That program may be set to be recorded when record option 5106 is selected. If that program is set to be recorded, notification overlay 5108 may be displayed over video 5110 or other content shortly before that program is about to air. Notification overlay 5108 may contain text notifying the user that the selected program is about to be recorded. Notification 5108 may include confirm option 5112 and cancel option 5114 to allow the user to select to confirm or cancel the recording of the program. Video 5110 may be video of a program that is airing shortly before the airing time of the program that was selected to be recorded.

Figure 79:
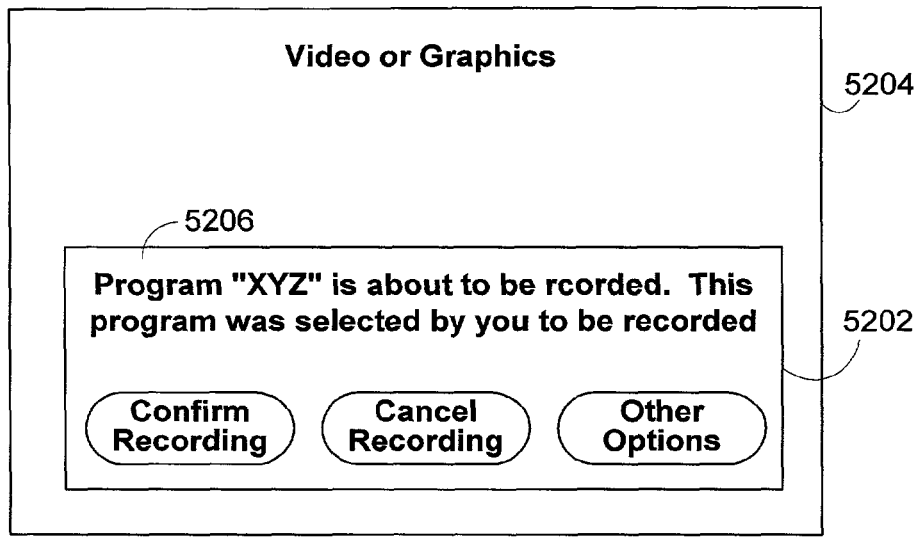
FIGS. 79-82 show illustrative notification overlays that are displayed over video or graphics in accordance with one embodiment of the present invention.

Notifications may be sent using a number of different communications techniques such as using a program guide overlay, an e-mail message, or other communications technique. A notification may specify information about a particular change that is to be made. FIGS. 79-86 are illustrative of different notification techniques. FIG. 79 shows notification overlay 5202 that is displayed over video or graphic 5404 that is generated by an interactive television application. Notification overlay 5202 includes text 5206 that informs a viewer that program XYZ is about to be recorded and also informs the viewer that program XYZ is a program that was manually selected to be recorded (i.e., the program was specifically selected to be recorded by a user).

Figure 80:
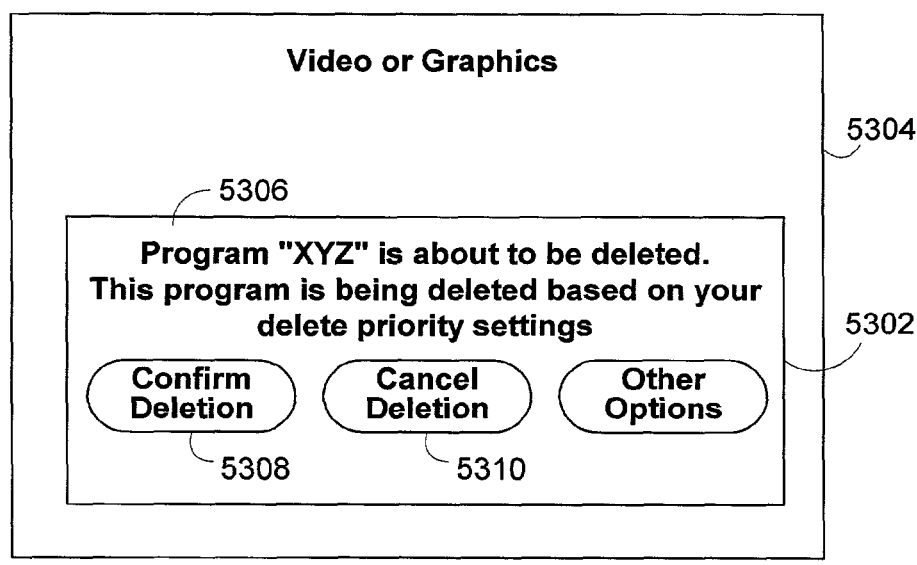

FIG. 80 shows notification overlay 5302 that is displayed over video or graphic 5304. Overlay 5302 includes text 5306 that informs a viewer that program XYZ is about to be deleted and also informs the viewer that program XYZ is being deleted based on delete priority settings. Overlay 5302 may include confirm deletion option 5308 that may be selected to confirm the deletion of program XYZ and may include cancel deletion option 5310 that may be selected to cancel the deletion of program XYZ.

Figure 81:
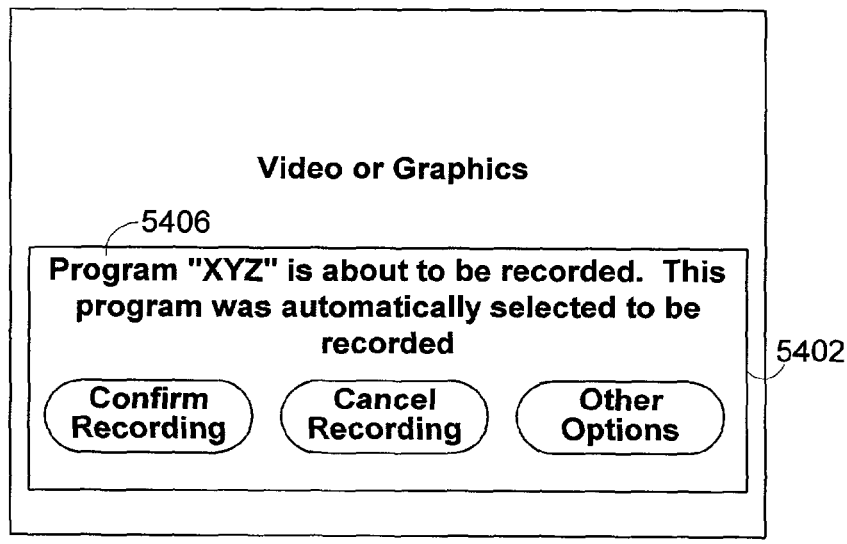

FIG. 81 shows notification overlay 5402 that is the same as notification overlay 5202 of FIG. 79 except that the text information contained in overlay 5402 is different. Text 5406 in overlay 5406 of FIG. 81 informs that program XYZ is about to be recorded and informs that program XYZ was automatically selected to be recorded. The program may have been automatically selected based on user preferences. Examples of interactive television program guide systems with user preference features are illustratively shown in Ellis et al., U.S. patent application Ser. No. 09/034,934, filed Mar. 4, 1998, which is hereby incorporated by reference herein in its entirety. The program may have also been automatically selected for recording based on user viewing or recording activity that has been monitored, or based on other criteria.

Figure 82:
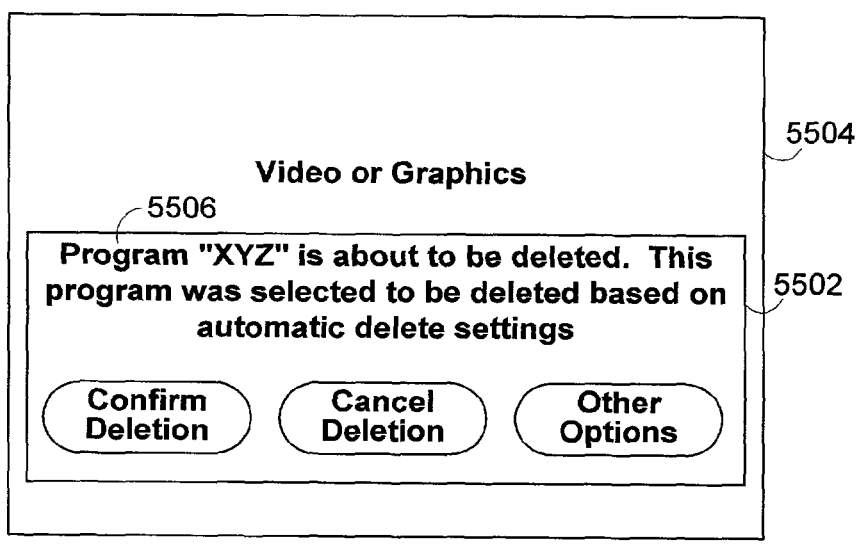

FIG. 82 shows notification overlay 5502 that is the same as notification overlay 5302 of FIG. 80 except that the text information contained in overlay 5502 is different. Text 5506 in overlay 5502 of FIG. 82 informs that program XYZ is about to be deleted and informs that program XYZ was automatically selected to be deleted based on the automatic delete settings of the system. Automatic delete settings may be settings that are not under user control. Automatic delete setting may be configured to delete a program based on the date on which the program was recorded. Other techniques may also be used. A notification such as those illustratively shown in FIGS. 78-82 may be displayed for a particular user in a multiple program guide environment when that user is currently logged into his or her guide. If that user is not currently logged into his or her guide, the interactive television application may delay sending the notification until that user logs into his or her guide. If desired, the interactive television application may avoid such delays by sending an e-mail notification to that user.

Figure 83:
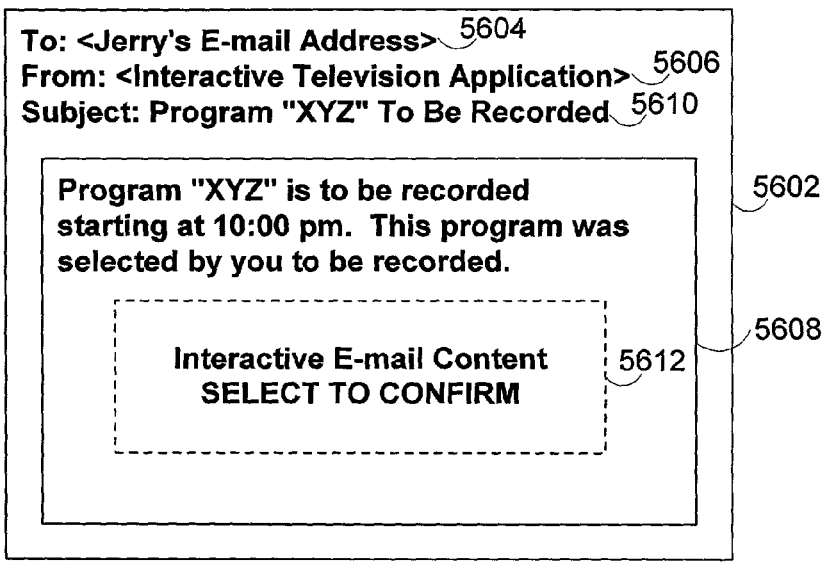
FIGS. 83-86 show illustrative notification e-mails in accordance with one embodiment of the present invention.

FIGS. 83-86 illustratively demonstrate e-mail versions of the notifications shown in FIGS. 79-82. FIG. 83 shows e-mail 5602 that includes addressee information 5604, addressor information 5606, subject information field 5610, message region 5608, and reply region 5612. Addressee information 5604 may identify an e-mail address for the recipient of e-mail 5602. The e-mail address may be a general e-mail address used by one particular household to receive e-mail notifications regarding program guide activity or may be an e-mail address for a specific user in a household that was provided by that user to receive e-mails regarding his or her program guide. Addressor information 5606 may identify the address of a facility that sent e-mail 5602. Subject information field 5610 may inform the user of the general nature of e-mail 5602 or may provide specific information describing activity that is about to occur. Message region 5608 may include text that informs the recipient that a particular program is to be recorded and informs the recipient that the program was manually selected to be recorded. If desired, message region 5608 may include reply region 5612. Reply region 5612 may include interactive e-mail content that the recipient may select to confirm or cancel the recording of the program (e.g., a link to a particular Internet Web page may be displayed). If desired, reply region 5612 may contain instructions on how the recipient can confirm or cancel the described activity (e.g., informs the recipient to send an e-mail to a particular address to cancel a recording).

Figure 84:
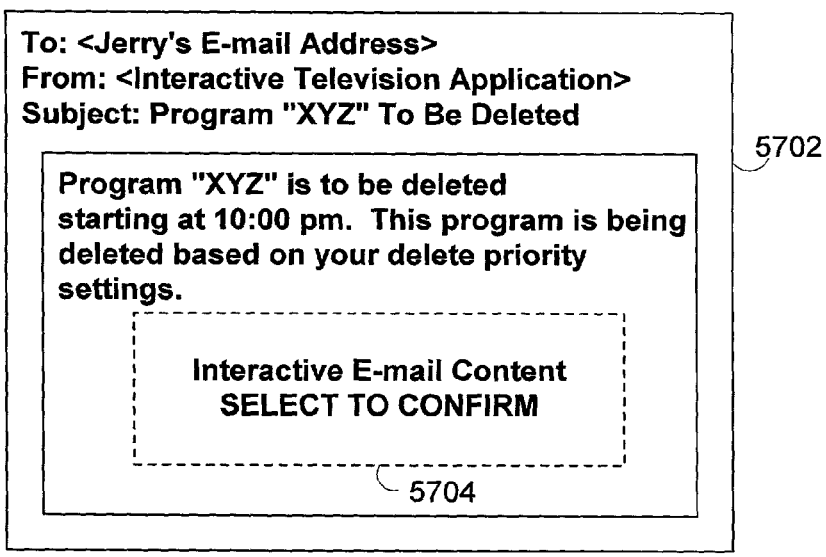
Figure 85:
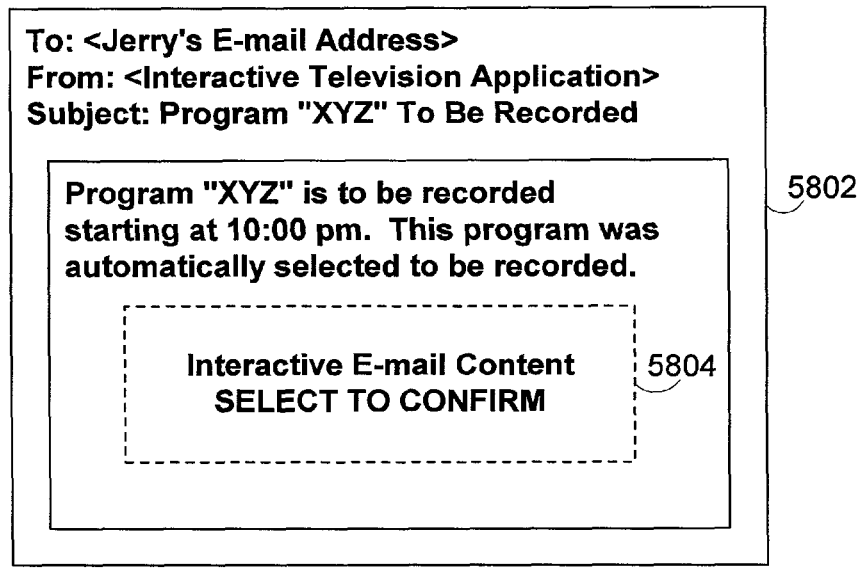
Figure 86:
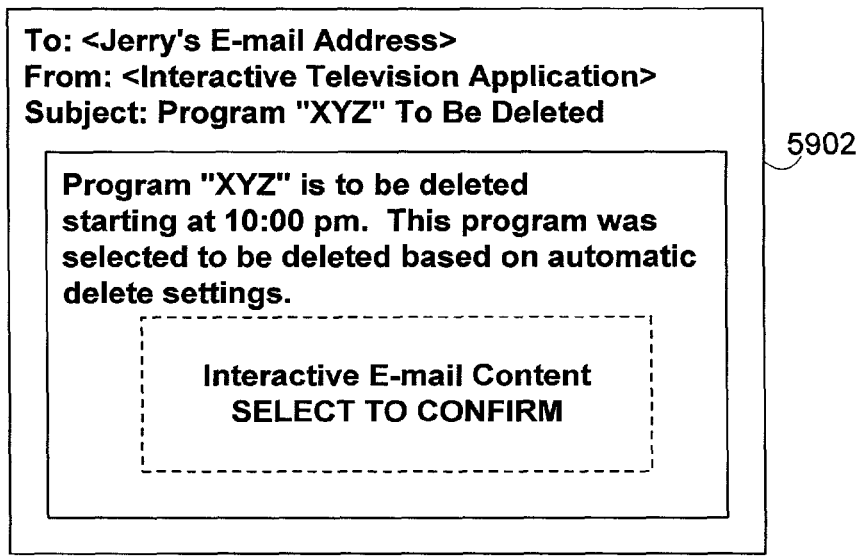

FIG. 84 shows an illustrative e-mail embodiment in which e-mail 5702 is sent to inform an e-mail recipient that a particular program is to be deleted based on delete priority settings. The content of e-mail 5702 may include reply region 5704 that may include interactive content that the recipient may use to confirm or cancel the deletion. FIG. 85 shows an illustrative e-mail embodiment in which e-mail 5802 is sent to inform an e-mail recipient that a particular program is to be recorded at a particular time and that the program was automatically selected to be recorded. E-mail 5802 may include reply region 5804 that may be used to reply to e-mail 5802. Reply region 5804 may be used to confirm or cancel the recording of the program. FIG. 86 shows an illustrative e-mail embodiment in which e-mail 5902 is sent to inform an e-mail recipient that a particular program is to be deleted based on automatic delete settings. An interactive reply region may be included in e-mail 5902 to allow a user to confirm or cancel the deletion of the program.

Figure 87:
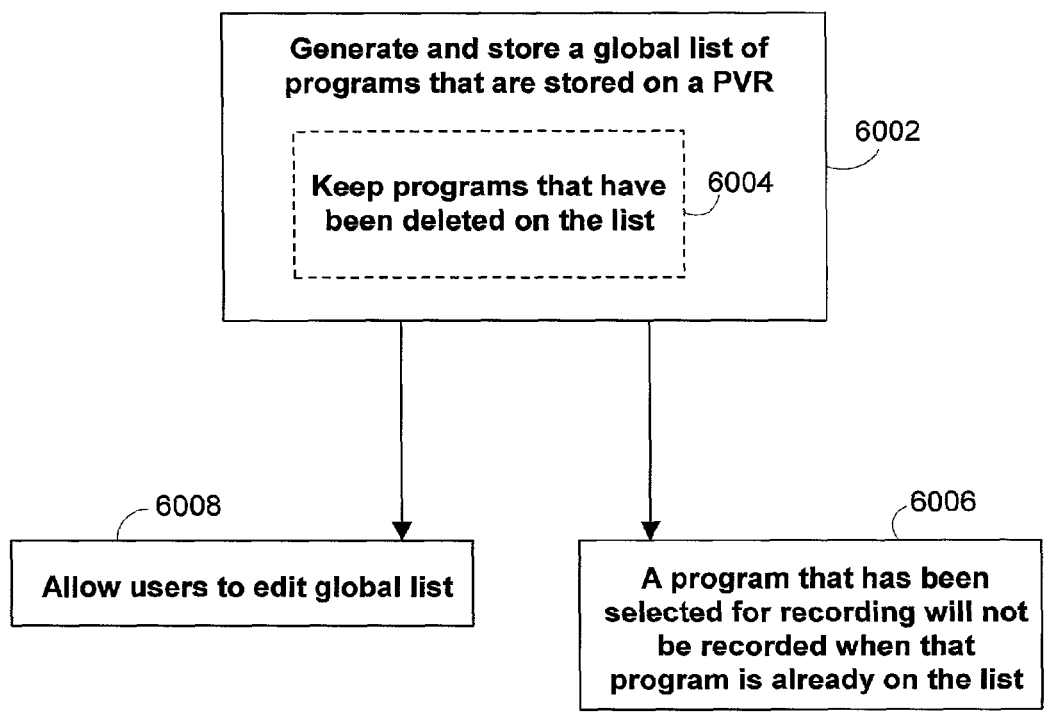
FIG. 87 shows an illustrative process for generating and using a global list of recordings in accordance with one embodiment of the present invention.

In a single or multiple program guide environment, an interactive television application may maintain a global list of programs that are available from a PVR. For example, with reference now to FIG. 87, at step 6002, a global list of programs that may currently be stored on a PVR may be generated and stored on user equipment or on a remote server. The global list may include programs that are in the recordings list(s) of the current users. Recordings may be included in the global list irrespective of whether they were recorded manually and automatically. At step 6004, programs that users deleted, but that are still available from the PVR may be kept on the global list. Step 6004 may be a substep of step 6002. If desired, programs that have been deleted and are no longer available may be included on the list.

At step 6006, an interactive television application will not record a program that is selected to be recorded (either automatically or manually) when that program is already on the global list. If desired, at step 6008, users may be permitted to edit the list. For example, a user may be provided with an opportunity to permanently delete a program that contains offensive materials. As another example, a user may remove a program from the list that was recorded, viewed, and deleted in the past, so that another copy of the program may be recorded and viewed.

A PVR or an integrated PVR-IPG may integrate content from a variety of platforms. For example, a PVR may store content from broadcast television, from pay-per-view, from video-on-demand, from the Internet, from radio, from multimedia devices (e.g., video and still cameras), from personal computers, etc. This content may be gathered based upon the same criterion or criteria. The content may be made available to the viewer through any suitable interactive television application such as a program guide. Examples of interactive television program guides that have integrated content are illustratively shown in Walker et al., U.S. patent application Ser. No. 09/829,856, filed Apr. 10, 2001, which is hereby incorporated by reference herein in its entirety.

A PVR may be accessed and/or controlled remotely. PVRs or integrated PVR-IPGs may be connected to other equipment, including other PVRs (or integrated PVR-IPGs), via any suitable connection, such as a wired or wireless network to enable control of the PVRs and/or to enable content from PVRs to be accessed at other equipment. Examples of other equipment may include web phones, personal digital assistants, two-way pagers, ebooks, etc. Examples of interactive television program guides that provide remote access are illustratively shown in Ellis et al., U.S. patent application Ser. No. 09/354,344, filed Jul. 16, 1999, which is hereby incorporated by reference herein in its entirety.

Figure 88:
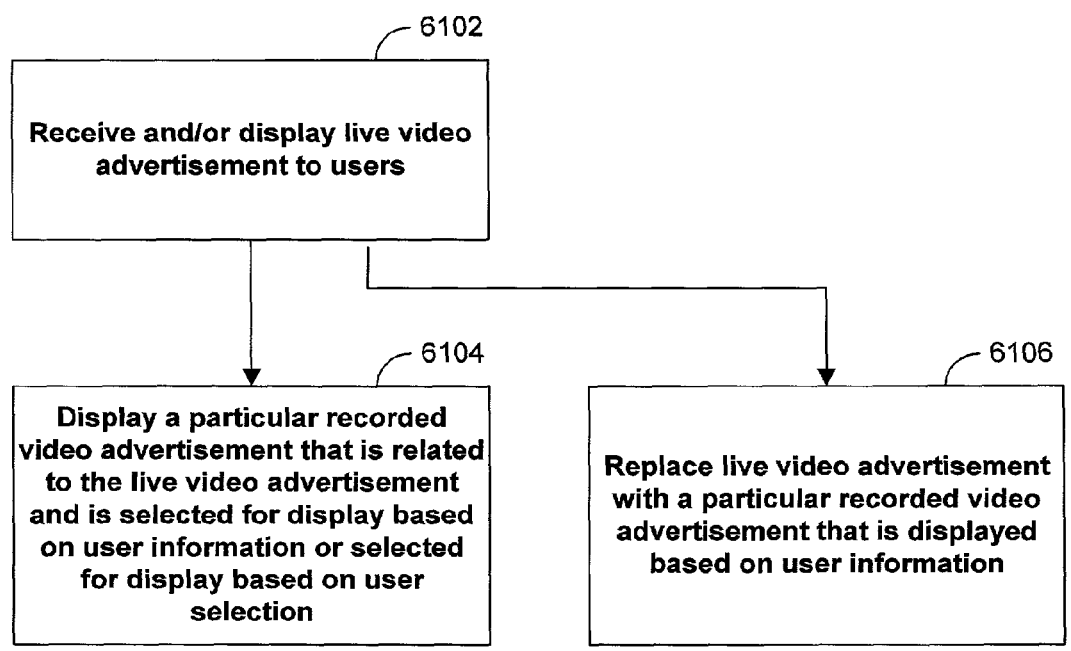
FIG. 88 shows an illustrative process for displaying stored video advertisements that may be related to live video advertisements in accordance with one embodiment of the present invention.

Promotions such as advertisements may be stored on a PVR for presentation to users. Such stored advertisements may be related to advertisements that are airing to be viewed by television viewers. For example, with reference now to FIG. 88, at step 6102, a live video advertisement (e.g., an advertisement airing during a local station break) may be received for presentation and/or may be presented to a user. At step 6104, a locally stored advertisement that is related to the live advertisement may be presented to the user. The stored advertisement may be automatically selected for display based on user preferences or may be selected for display based on user selections. At 6106, a live video advertisement that is about to be presented to a user may be replaced with a particular recorded video advertisement. The recorded video advertisement may be automatically selected for display based on user information.

Figure 89:
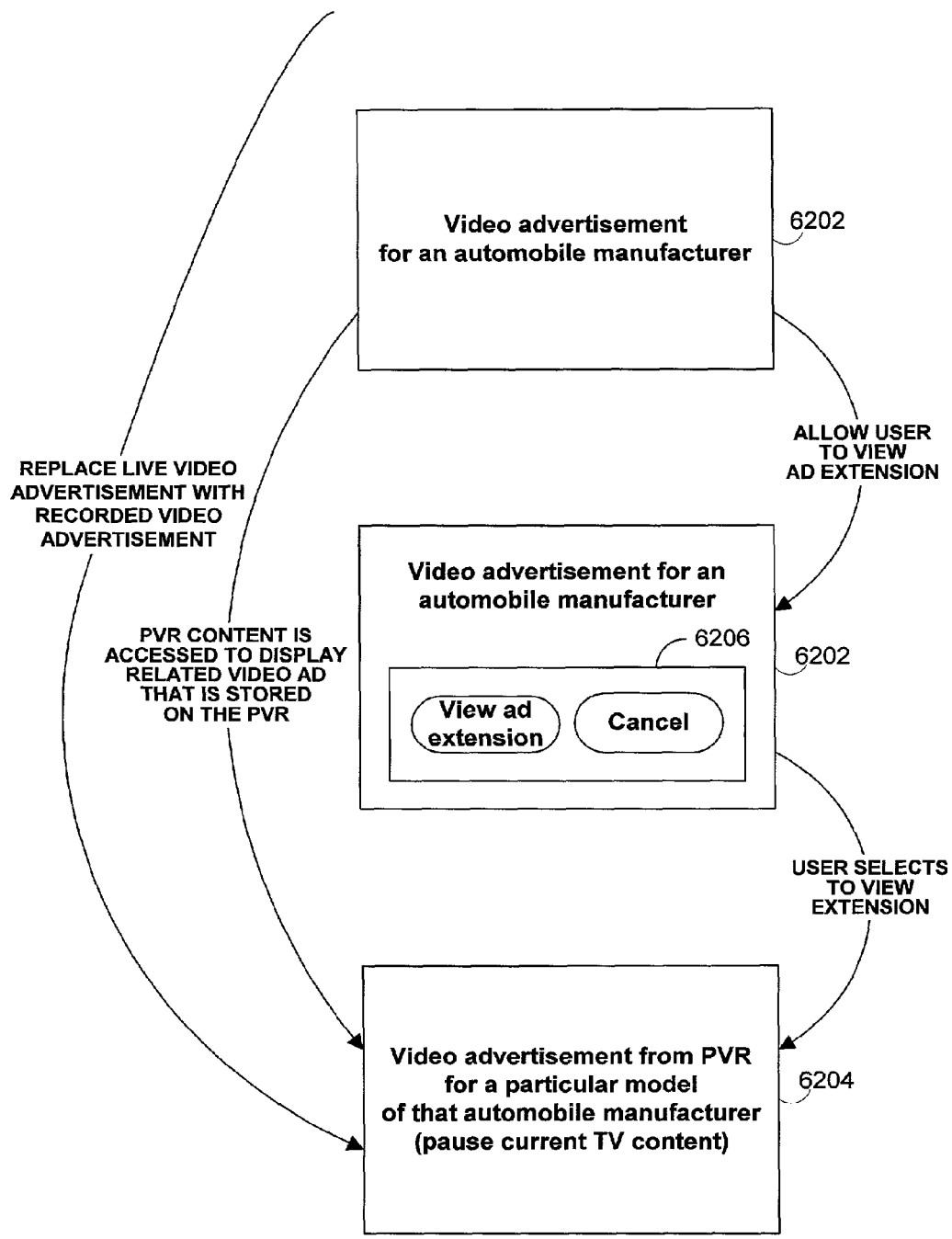
FIG. 89 shows an illustrative video presentation sequence that may be provided based on the illustrative process shown in FIG. 88 in accordance with one embodiment of the present invention.

For example, with reference now to FIG. 89, video 6204 may be used to extend or replace live video 6202 for an automobile advertisement. Live video 6202 containing an advertisement for an automobile manufacturer may be displayed during a station break. Video 6204 presenting an advertisement for a particular automobile model manufactured by that manufacturer may be displayed to a user from a local PVR following the presentation of video 6202. The stored advertisement may be selected for presentation based on user preferences. The stored advertisement may have been selected from among a number of different advertisements.

If desired, a user may be allowed to view an extension of live video 6202 for a current advertisement. The interactive television application may display overlay 6206 over live video 6202 that provides the user with an opportunity to view an extension of the current advertisement. Video 6204 of a related advertisement that is an extension of the current advertisement may be displayed when a user selects to view an extension of the current advertisement from overlay 6206. In another technique, an interactive television application may replace a current live advertisement with video 6204 of a recorded advertisement from a PVR. The recorded advertisement may be related to the current live advertisement and may be selected for display based on user information. If desired, the PVR may pause live television content when video 6204 is being displayed to a user.

Figure 90:
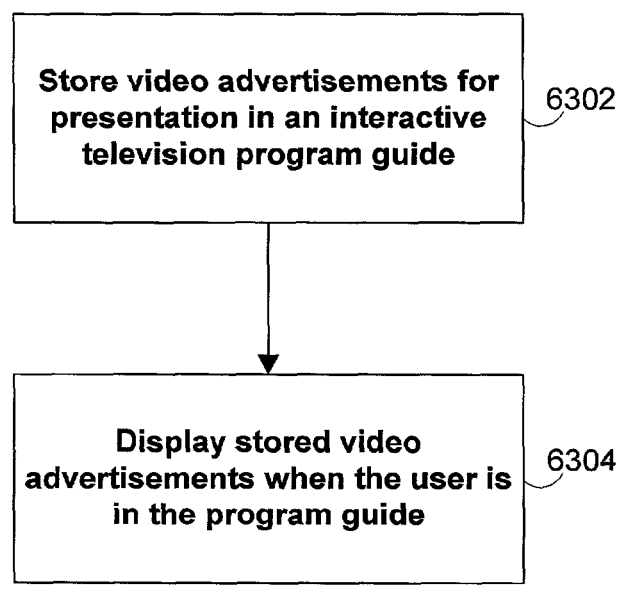
FIG. 90 shows an illustrative process for displaying stored video advertisements when a user is in a program guide in accordance with one embodiment of the present invention.

A video advertisement that is stored on a PVR may be presented to a user when the user enters a program guide. FIG. 90 shows illustrative steps that may be involved in displaying video advertisements in a program guide. With reference now to FIG. 90, at step 6302, video advertisements may be stored on a recording device such as PVR for later presentation in an interactive television application. The video advertisements may be loaded during off-hours when user equipment is not likely to be used or loaded using any other suitable technique. At step 6304, an advertisement that was stored at step 6302 may be displayed when a user is using a program guide.

Figure 91:
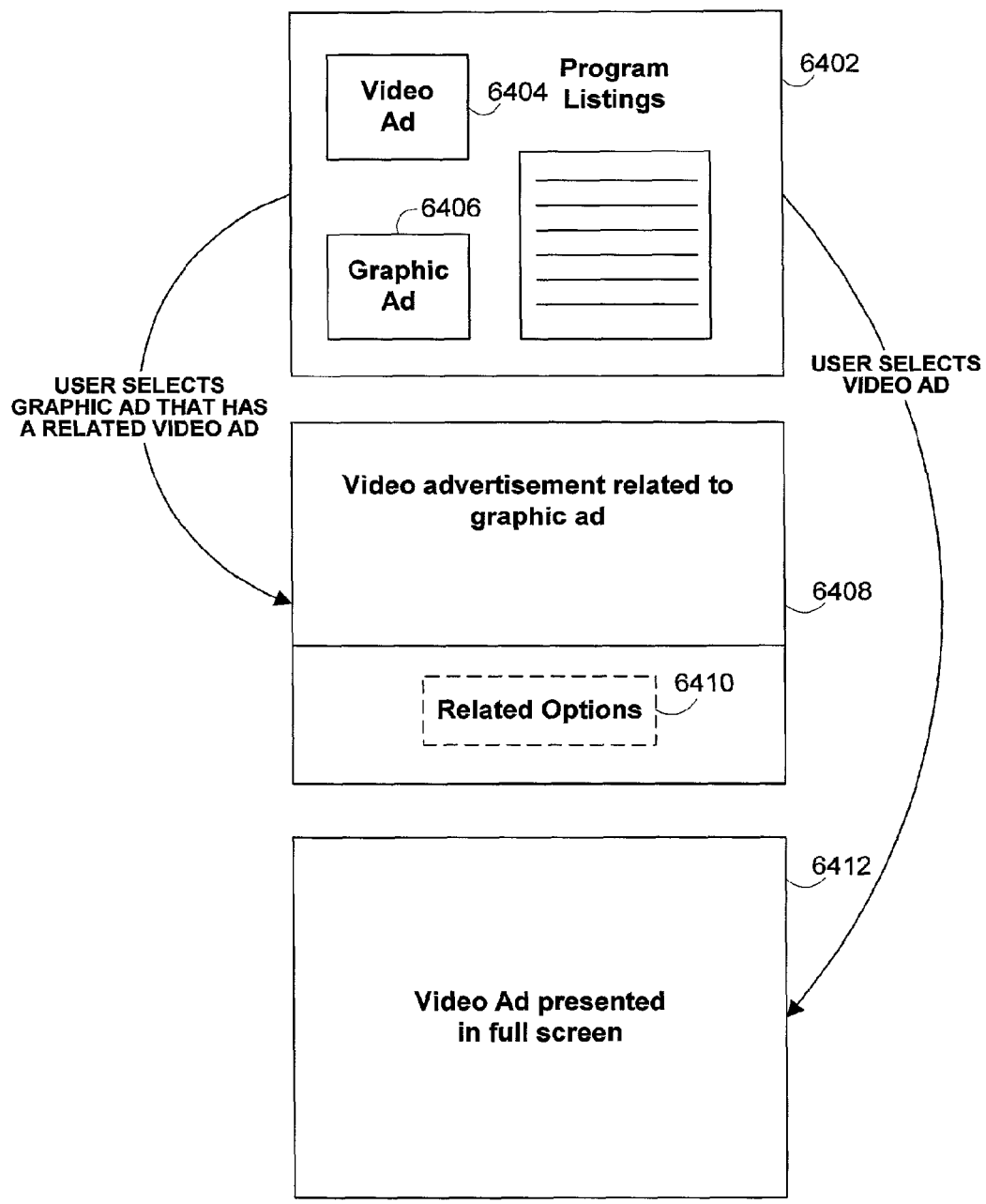
FIG. 91 shows illustrative sequences of events for displaying stored video advertisements that may be provided based on the illustrative process shown in FIG. 90 in accordance with one embodiment of the present invention.

FIG. 91 illustratively shows two different sequences for the presentation of video advertisements. With reference now to FIG. 91, an interactive television application may display program listings display screen 6402 that contains video advertisement 6404 and interactive graphic advertisement 6406. Video advertisement 6404 may contain scaled video of an advertisement that is being presented using a PVR. Video advertisement 6404 may be selectable. Video 6412 may be displayed when a user selects video advertisement 6404. Video 6412 may present video advertisement 6404 in full screen.

Interactive graphic advertisement 6406 may be a graphic that is generated by the interactive television application to present a particular advertisement. Examples of interactive television program guides that include interactive graphic advertisements are illustratively described in Knudson et al., U.S. patent application Ser. No. 09/034,939, filed Mar. 4, 1998, which is hereby incorporated herein in its entirety. Video 6408, which presents a video advertisement that is related to graphic advertisement 6406, may be displayed when a user selects graphic advertisement 6406. If desired, related options overlay 6410 may be displayed over video 6408 to allow the user to further interact with respect to the advertisement.

Figure 92:
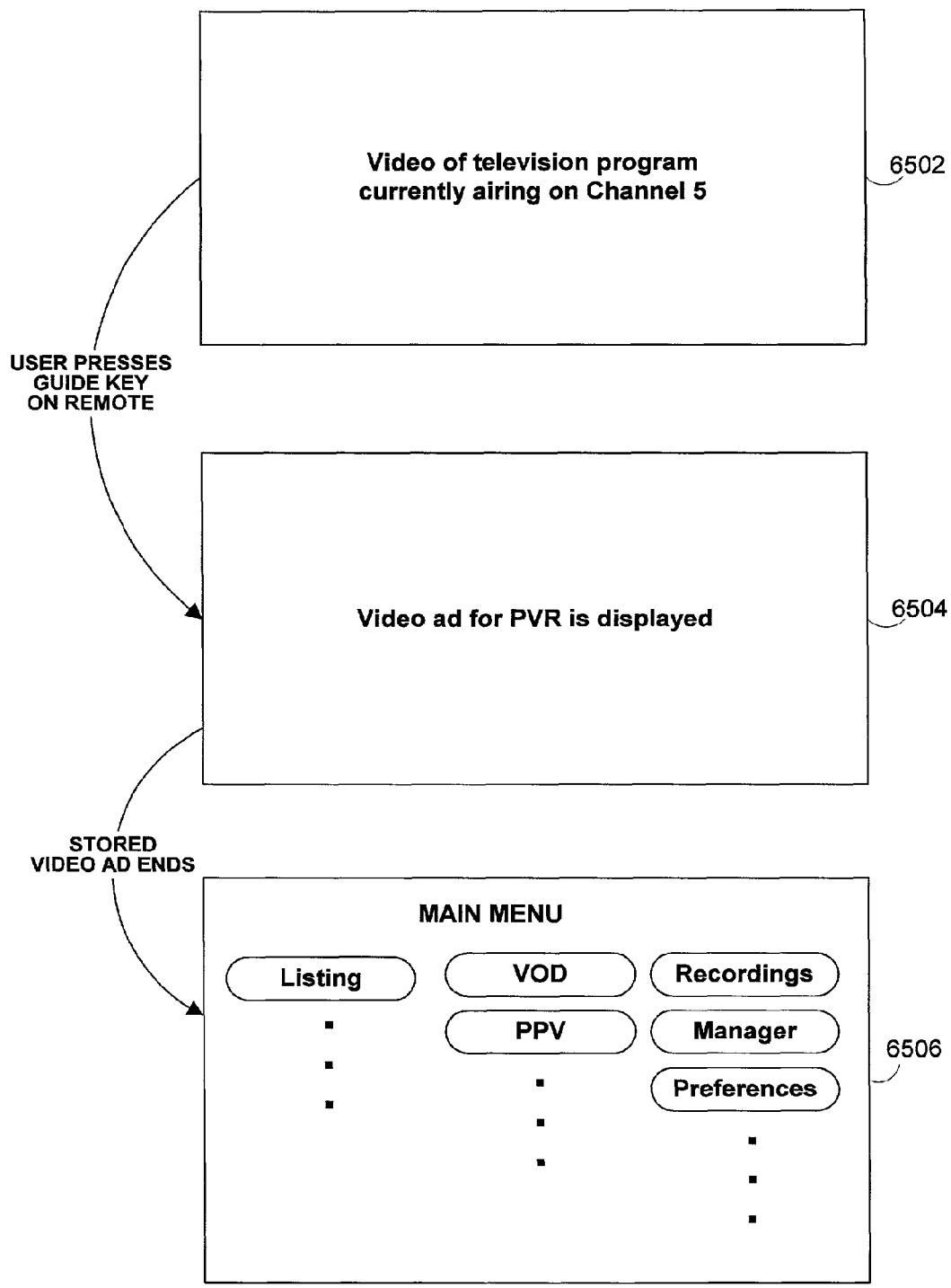
FIG. 92 shows an illustrative sequence of events that may be provided based on the illustrative process shown in FIG. 90 in accordance with one embodiment of the present invention.

A stored advertisement may be displayed when a user enters a program guide. For example, with reference now to FIG. 92, video 6504, which presents an advertisement that is stored on a PVR, may be displayed when a user who is watching video 6502 presses a remote control guide button. Main menu display screen 6506 may be displayed when video 6504 for the advertisement ends. If desired, video 6504 may be supplemented with text, graphics, interactive options, or other video.

Such video advertisements may be available not only from a local PVR, but also from remote storage devices, such as a remote storage device that is available in a client-server based program guide system. Examples of client-server based program guide systems are illustratively shown in Ellis et al., U.S. patent application Ser. No. 09/332,244, which is mentioned above. Remotely stored advertisements may be transmitted on demand, as part of a carousel, continuously, or using combinations thereof.

Figure 93:
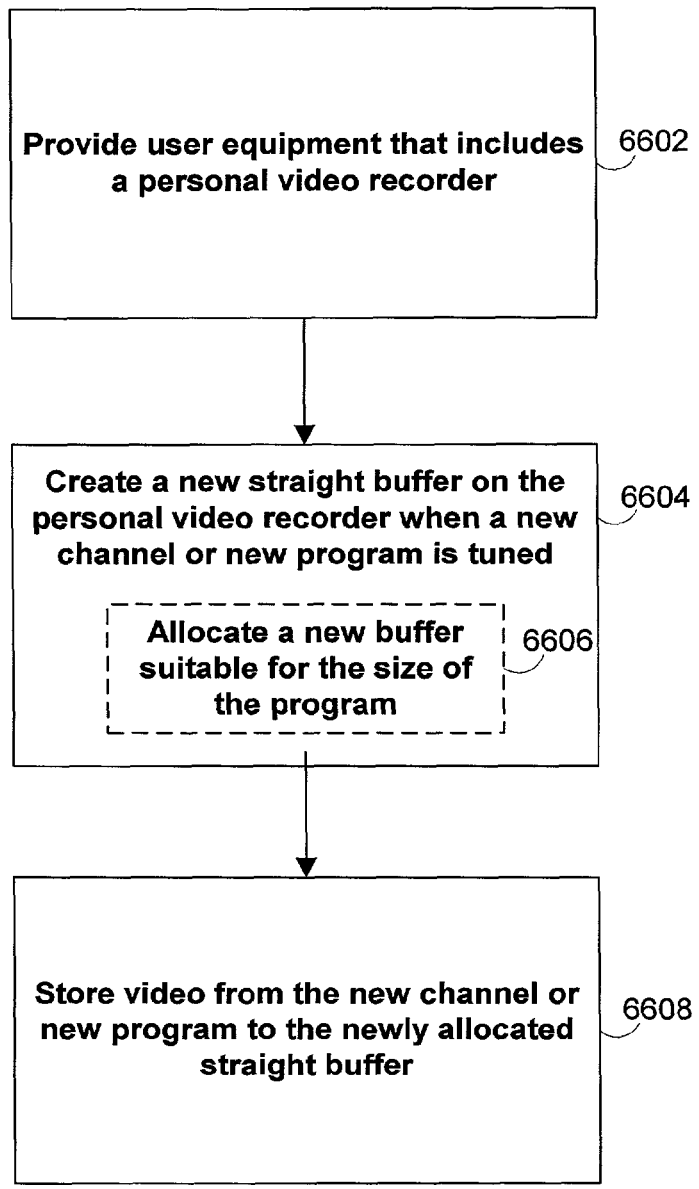
FIG. 93 shows an illustrative process for buffering television content in accordance with one embodiment of the present invention.

Buffer management techniques may be implemented with respect to television programming to enhance interactive services that are available to users. Buffer management techniques may be implemented to create new buffers based on current user activity. For example, with reference now to FIG. 93, at step 6602, user equipment that includes a PVR may be provided. The PVR may also be based on a remote server. At step 6604, a new straight buffer may be created on the PVR when a new channel or a new program is viewed by a current user.

An interactive television application may allocate a portion of the storage space on the PVR to a new buffer when that buffer is created. If desired, at step 6606, the interactive television application may allocate the size of the buffer to be a size that is suitable to hold the size of the program. If desired, buffer size may be increased incrementally to fit a program that is being buffered. At step 6608, video and/or audio from a program or channel currently tuned to may be stored to the buffer that is created when that channel or program is first tuned. For clarity and brevity, television content that is buffered is primarily referred to herein as video. The television content that is buffered may not only contain video, but also contain audio, graphics, data, or other material.

Figure 94:
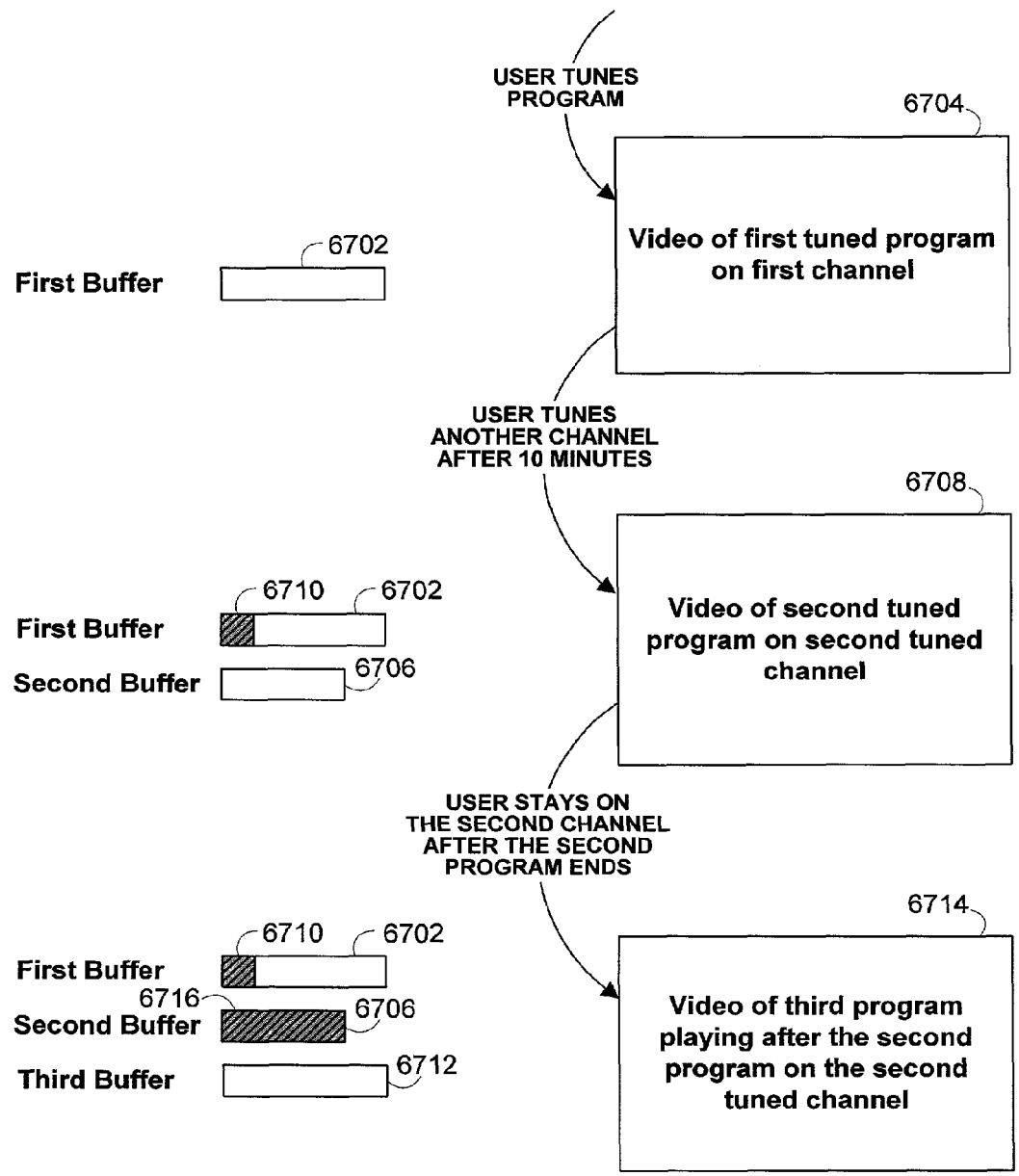
FIG. 94 shows an illustrative sequence of illustrative display screens and illustrative buffers that may be provided based on the illustrative process shown in FIG. 93 in accordance with one embodiment of the present invention.

With reference now to FIG. 94, first buffer 6702 may be created when a user first tunes to a first channel to view video 6704 of a first program. First buffer 6702 may have been allocated a size that is suitable to hold the remainder of the first program, which may, for example, be fifty minutes. Second buffer 6706 may be created when the user tunes to a second channel to watch video 6708 of a second program. The second channel may have been tuned to after the user watched the first program for ten minutes. Dashed region 6710 shown in first buffer 6702 represents what was buffered for the ten minutes that the first program was watched. The second program may have been watched to its completion, and the user may have stayed on the same the channel to watch the following program. Dashed lines 6716 are shown in second buffer 6706 to represent that second buffer 6706 holds the portion of second program that was watched by the user. Third buffer 6712 may be created when video 6714 of a third program commences following the end of the second program. Third buffer 6712 may have been allocated a size that is suitable to hold the length of the third program.

Figure 95:
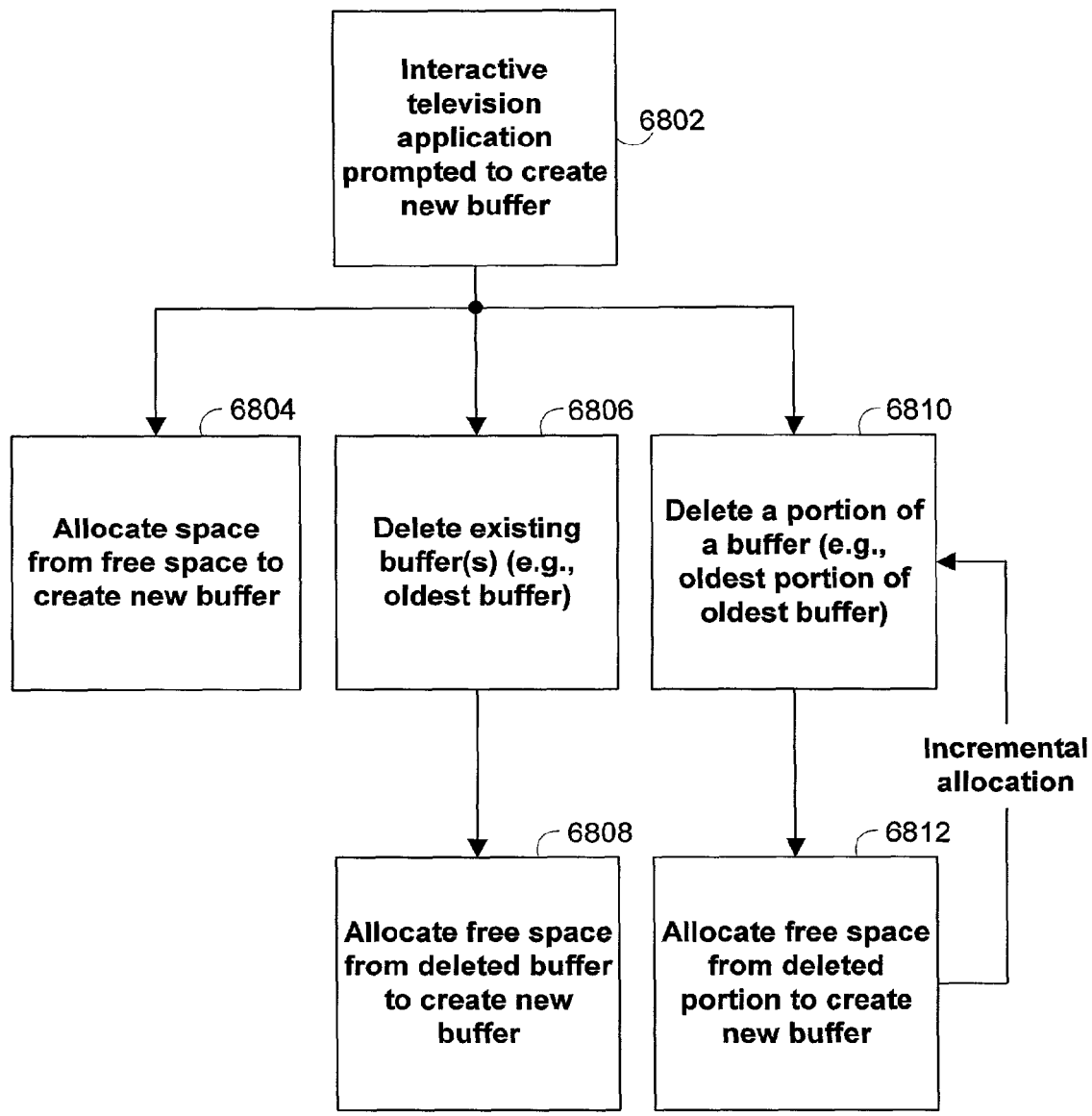
FIG. 95 shows an illustrative process for allocating space for new buffers in accordance with one embodiment of the present invention.

Storage space on a PVR may be selected to be allocated to a buffer in a number of different ways. For example, with reference now to FIG. 95, an interactive television application may be prompted to create a new buffer (e.g., a straight buffer) in step 6802. At step 6804, storage space that is not allocated to an existing buffer or is not allocated to a recording may be allocated to create the new buffer. If desired, at step 6806, one or more existing buffers (e.g., the oldest existing buffer) may be deleted to make room for the new buffer. At step 6808, space from the deleted buffer(s) may be allocated to create the new buffer. Steps 6806 and 6808 may be performed simultaneously since allocating space to a new buffer may cause the deletion of the existing buffer. If desired, at step 6810, a portion of an existing buffer (e.g., the oldest portion of the oldest buffer) may be deleted to make room for the new buffer. At step 6812, space from the deleted portion may be allocated to the new buffer. Steps 6810 and 6812 may be repeated to increase the size of the newly created buffer. For example, in some instances, new buffers may initially be assigned to have a fixed length that may be incremented thereafter.

Figure 96:
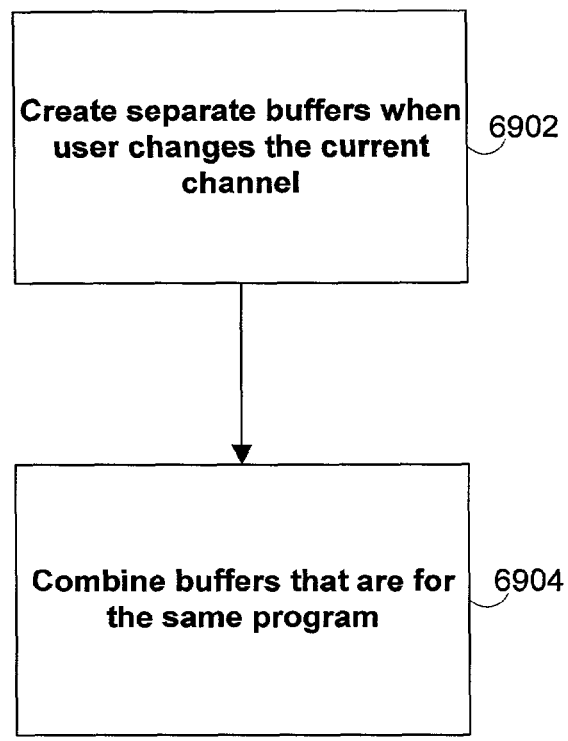
FIG. 96 shows an illustrative process for combining separate buffers in accordance with one embodiment of the present invention.

If desired, separate buffers that are for the same program may be combined into a single buffer. Illustrative steps involved in combining such buffers are illustratively shown in FIG. 96. With reference now to FIG. 96, at step 6902, a new buffer may be created when a user changes the current channel. At step 6904, separate buffers may be combined when the separate buffers contain video from the same program. In another implementation, an interactive television application may not create a new buffer when a user returns to viewing a program for which a buffer already exists. The interactive television application may simply store the program to the existing buffer.

Figure 97:
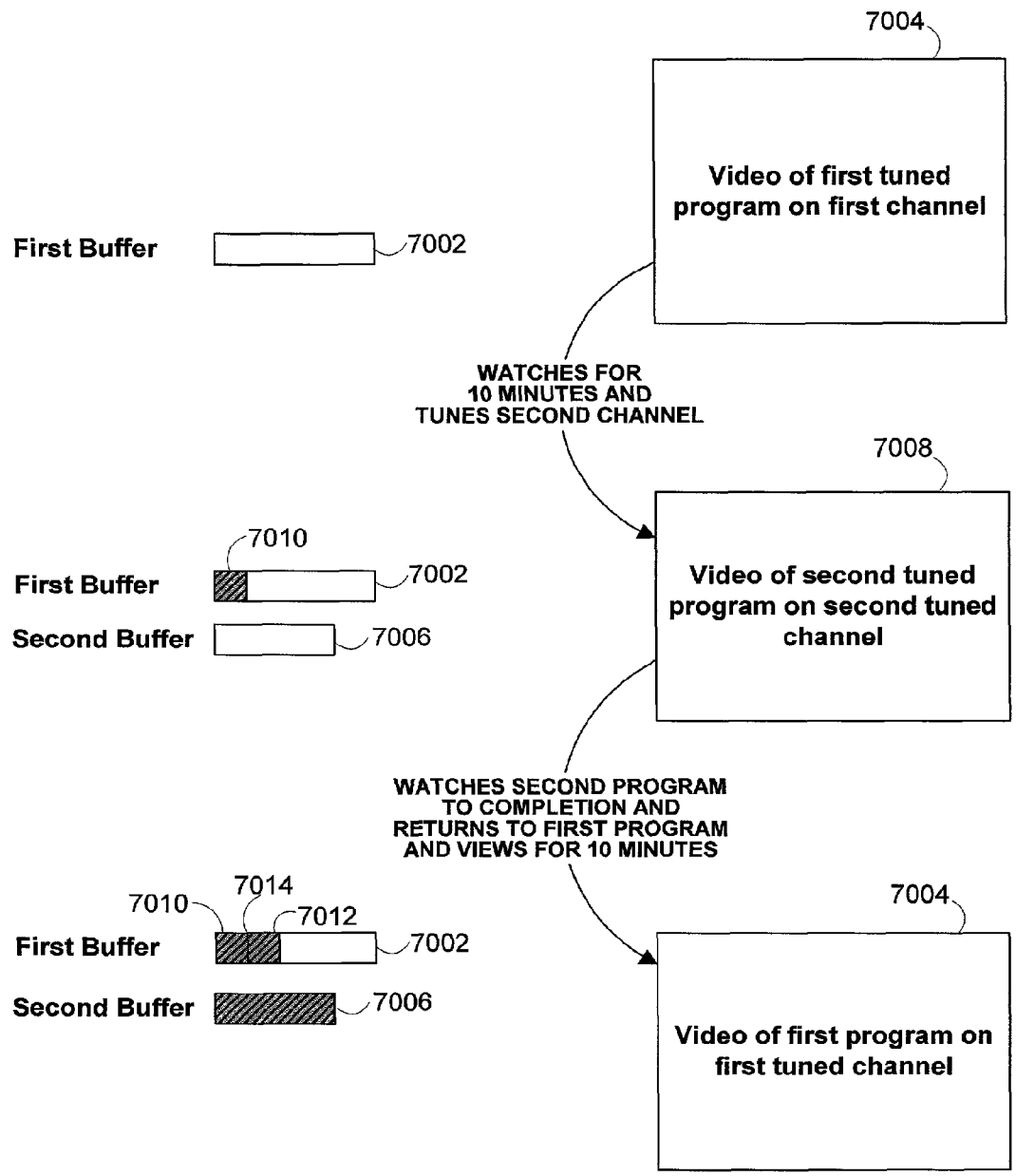
FIG. 97 shows an illustrative sequence of display screens and buffers that may be provided based on the illustrative process shown in FIG. 96 in accordance with one embodiment of the present invention.

FIG. 97 shows an illustrative buffering sequence that may be provided based on the steps shown in FIG. 96. With reference now to FIG. 97, first buffer 7002 may be created when a user changes the current channel to view video 7004 of a first program on a first channel. Second buffer 7006 may be created when the user changes the channel to watch video 7008 on a second channel. The user may have changed the channel after watching the first program for ten minutes. The ten minutes of video 7004 that was buffered by first buffer 7002 is represented by dashed region 7010. After viewing video 7008 for the second program to its completion, the user may switch back to the first channel to watch video 7002 of the first program. Dashed region 7012 in first buffer 7002 represents video 7004 of the first program that has been buffered since the user returned to watching the first program. Thus, video that is buffered when a user returns to viewing a recent program is combined with what was buffered when the user first watched that program. Line 7014 in first buffer 7002 may mark the point at which the buffered video in dashed region 7012 was added to first buffer 7002. If desired, first buffer 7002 may include a gap at line 7014 that corresponds to the length of time that the user switched away from the current program.

Buffers that are for the same program may be combined in a number of different ways. For example, with reference now to FIG. 98, at step 7102, an interactive television application may buffer separately watched or tuned portions of the same program. For example, two separate portions of a program may be buffered when a user switches away and switches back to watching a particular program. At step 7104, the buffered portions of the program may be concatenated. The concatenated buffer may not include any indicators to show that there is a break in buffered video. If desired, at step 7106, the buffered portions may be combined by inserting blank video or other content in between the buffered portions. Step 7106 may include step 7108. At step 7108, the interactive television application may insert blank video, a stored advertisement, or other content that corresponds to the length of the gap in the video for a program between separately buffered portions. If desired, short content (such as blank video, text, or a graphic) may be inserted between the gaps, along with an indication of the length of time to display the content, so that buffer storage is not required for the entire missed timed period.

Figure 98:
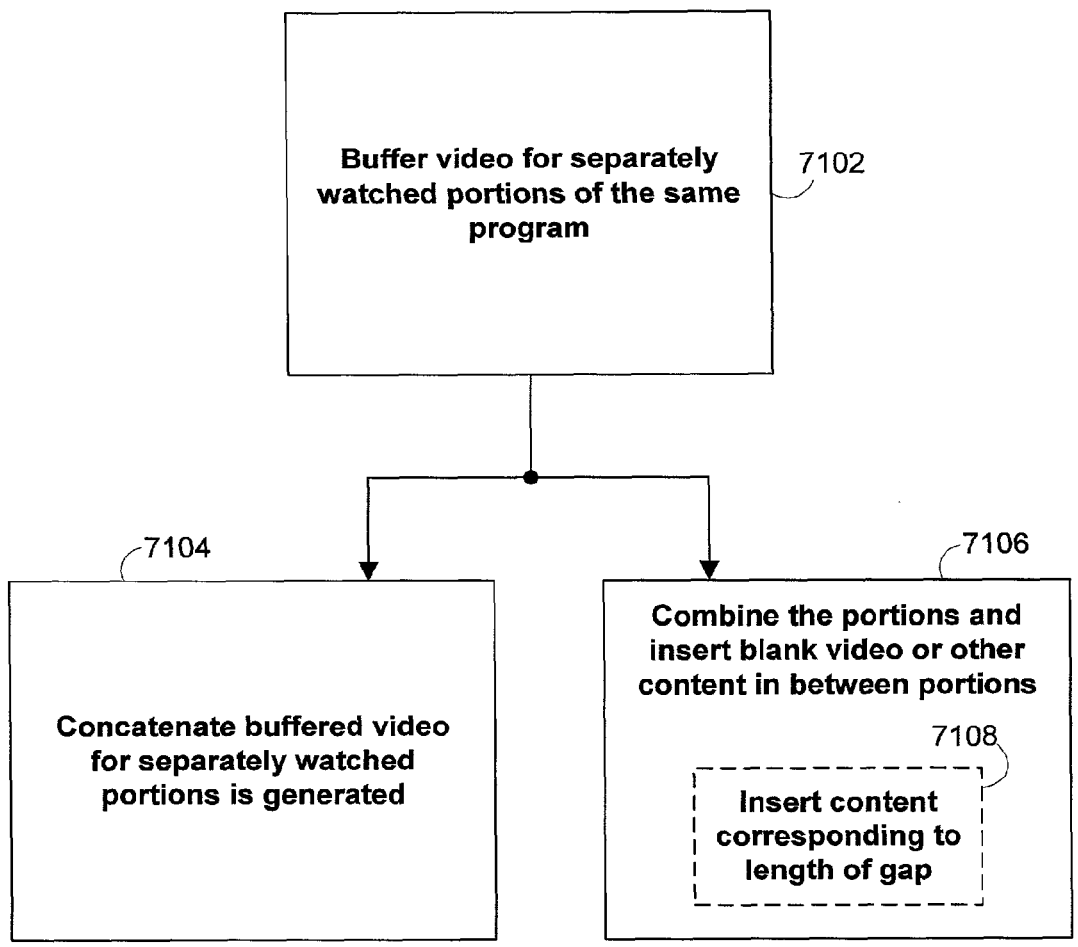
FIG. 98 shows an illustrative process for inserting content between separate buffered portions of a program in accordance with one embodiment of the present invention.
Figure 99:
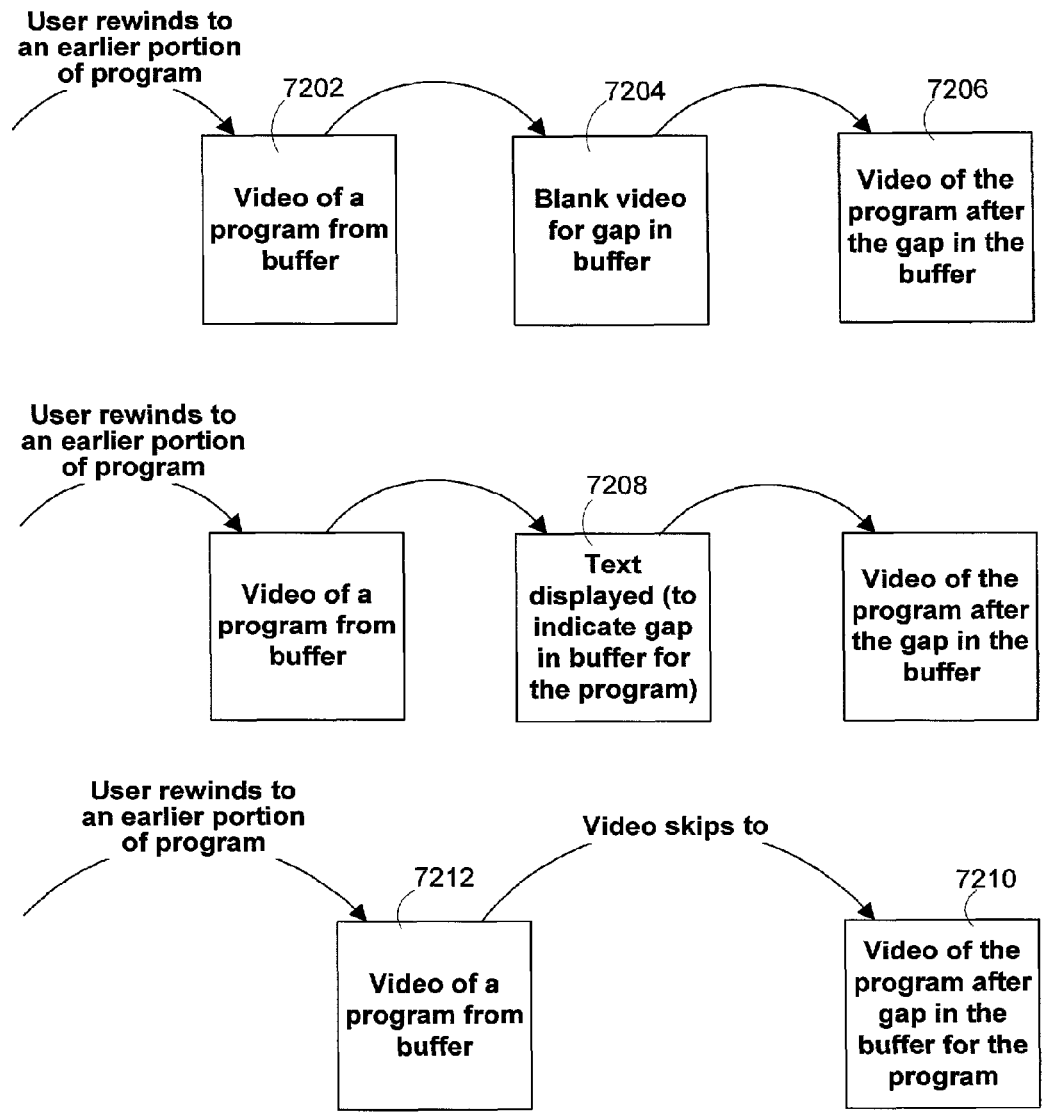
FIG. 99 shows illustrative video presentation sequences that may be provided based on the illustrative process shown in FIG. 98 in accordance with one embodiment of the present invention.

FIG. 99 shows three illustrative video presentation sequences that may be performed based on the steps shown in FIG. 98. Each sequence addresses how buffered video for nonadjacent portions of a program may be presented to a user. A user may be provided with an opportunity to rewind a program from a buffer. Video 7202 may be presented to a user when a user selects to play the program after rewinding the program to a first buffered portion of a particular program. Blank video 7204 may be displayed when the first buffered portion ends. Other content such as an advertisement stored on a PVR may also be used. Blank video 7204 may have been inserted to fill a break in the buffer. Video 7206 containing a second buffered portion of the program may be displayed when blank video 7204 has been displayed for a certain period of time (e.g., a time equal to the length of the gap in the program between the two portions).

In the next sequence shown in FIG. 99, the interactive television application displays text 7208 to inform the user of the existence of the break in the buffered video portions when video 7202 for the first buffered portions ends. Text 7208 may be presented over blank video or may be presented as part of a graphic. Text 7208 may be displayed briefly, or it may be displayed for a period of time corresponding to the gap in the programming. In the final sequence that is shown in FIG. 99, video 7210 for a second buffered portion of a program is displayed immediately following video 7212 for the first buffered portion (e.g., the portions are concatenated). In this case, both video 7210 and 7212 may be displayed without displaying blank video or text to inform the user of a break in the buffer.

Figure 100:
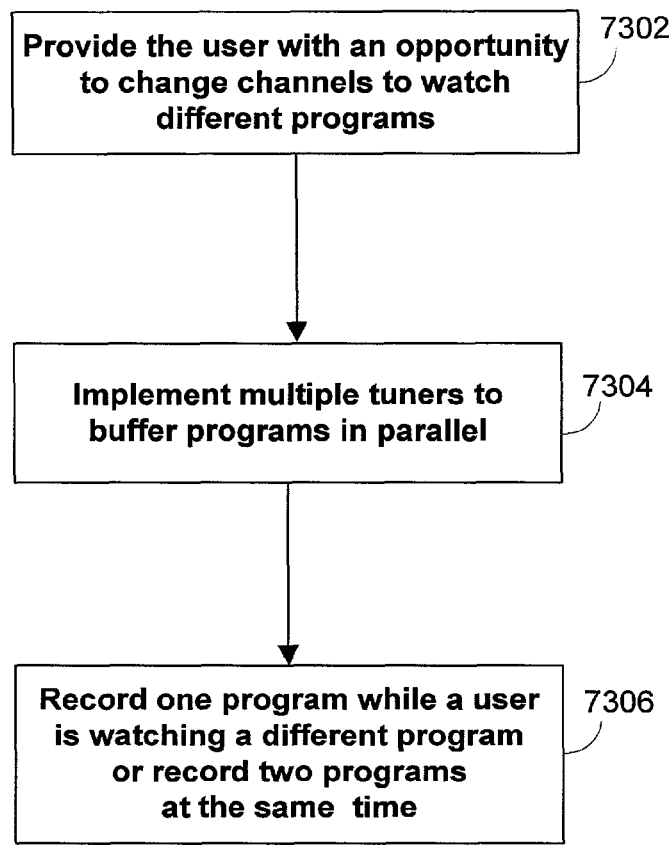
FIG. 100 shows an illustrative process for buffering two programs in parallel in accordance with one embodiment of the present invention.

Gaps in buffers of program may be avoided by buffering programs in parallel. With reference now to FIG. 100, at step 7302, a user may be provided with an opportunity to change channels to watch different programs. At step 7304, programs may be buffered in parallel by implementing multiple tuners to buffer two programs at the same time. Multiple tuners may be implemented as part of a user's local user equipment. If desired, one or more of the multiple tuners may be implemented remotely. At step 7306, an interactive television application may record one program on a storage device (e.g., PVR) while a current user is watching a different program on a different channel. This simultaneous watch/record feature may be provided when multiple tuners have been implemented. The multiple tuners may also allow the interactive television application to record two programs at the same time. Additionally, this implementation may allow the user to watch two or more programs at the same time, for example, by switching channels between the two programs and rewinding on each channel change to see the programming that was missed.

Figure 101:
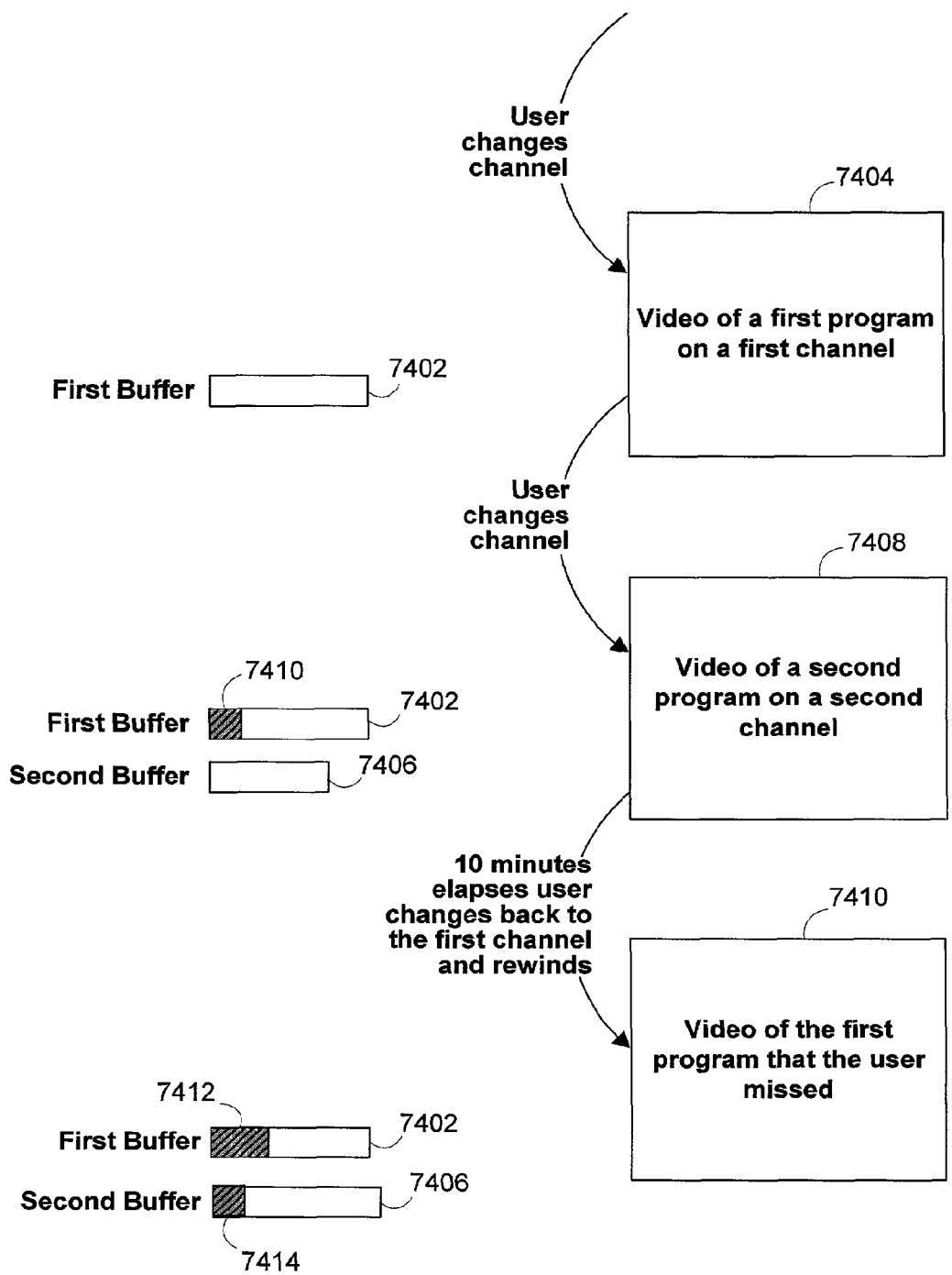
FIG. 101 shows an illustrative sequence of display screens and buffers that may be provided based on the illustrative process shown in FIG. 100 in accordance with one embodiment of the present invention.

FIG. 101 shows an illustrative sequence of video and buffered management events that may be provided based on the steps shown in FIG. 100. First buffer 7402 may be created for a first program when a user changes the channel to watch video 7404 of the first program airing on a first channel. Second buffer 7406 may be created for a second program when the user changes the channel to watch video 7408 of the second program. Dashed region 7410 in first buffer 7402 represents video 7404 that was buffered before the user changed the channel. After watching the second program for ten minutes, the user may change the channel back to the first channel to return to the first program and may press a rewind key to rewind buffered video of the first program. The portion of the first program that was missed by the user may have been buffered while the user was watching the second channel. Dual tuners may be used to buffer both programs. Dashed region 7412 in first buffer 7402 shows that the interactive television application continues to buffer the first program after the user changes the channel. Thus, when the user returns to the first program and rewinds the first program, video 7410 containing the missed portions of the first program may be presented to the user.

A user may be permitted to access additional buffer content when the user rewinds a current buffer to the top of the buffer. The top of the buffer may refer to the earliest recorded content for the program. For example, with reference now to FIG. 102, at step 7502, a user may be allowed to rewind a video for a program using a buffer that was created for that program. At step 7504, the rewinding may be stopped and the program may be automatically played when the user rewinds to the top of the buffer. At this point, a user may select to rewind again from the top of the current buffer. In response, the interactive television application may skip to the end of the previous program and rewind the previous program from the end of that program. A previous program may be a program that was previously watched by the user. In another example, a previous program may be a program that was previously recorded by the system but that may not have been watched by the user. Alternatively, at step 7508, the interactive television application may skip to the beginning of a previous program and may start to play that program when the user selects to rewind again after rewinding a current program to the top of the buffer for that program.

In the context of moving between programs that are available from program buffers, the movement may be based on the chronological order in which the buffers for the program were created.

Figure 102:
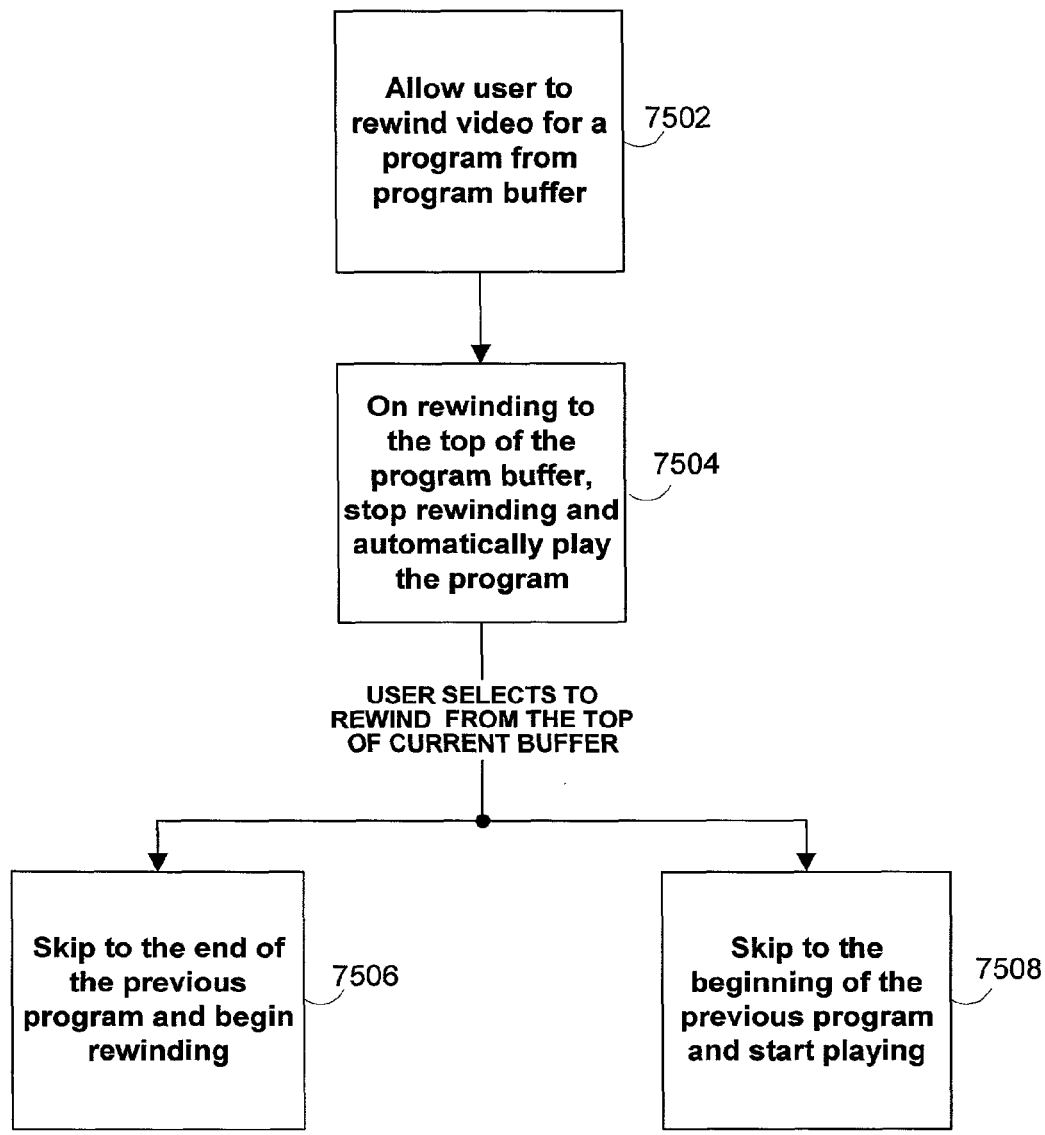
FIG. 102 shows an illustrative process for rewinding to move between buffered content in accordance with one embodiment of the present invention.
Figure 103:
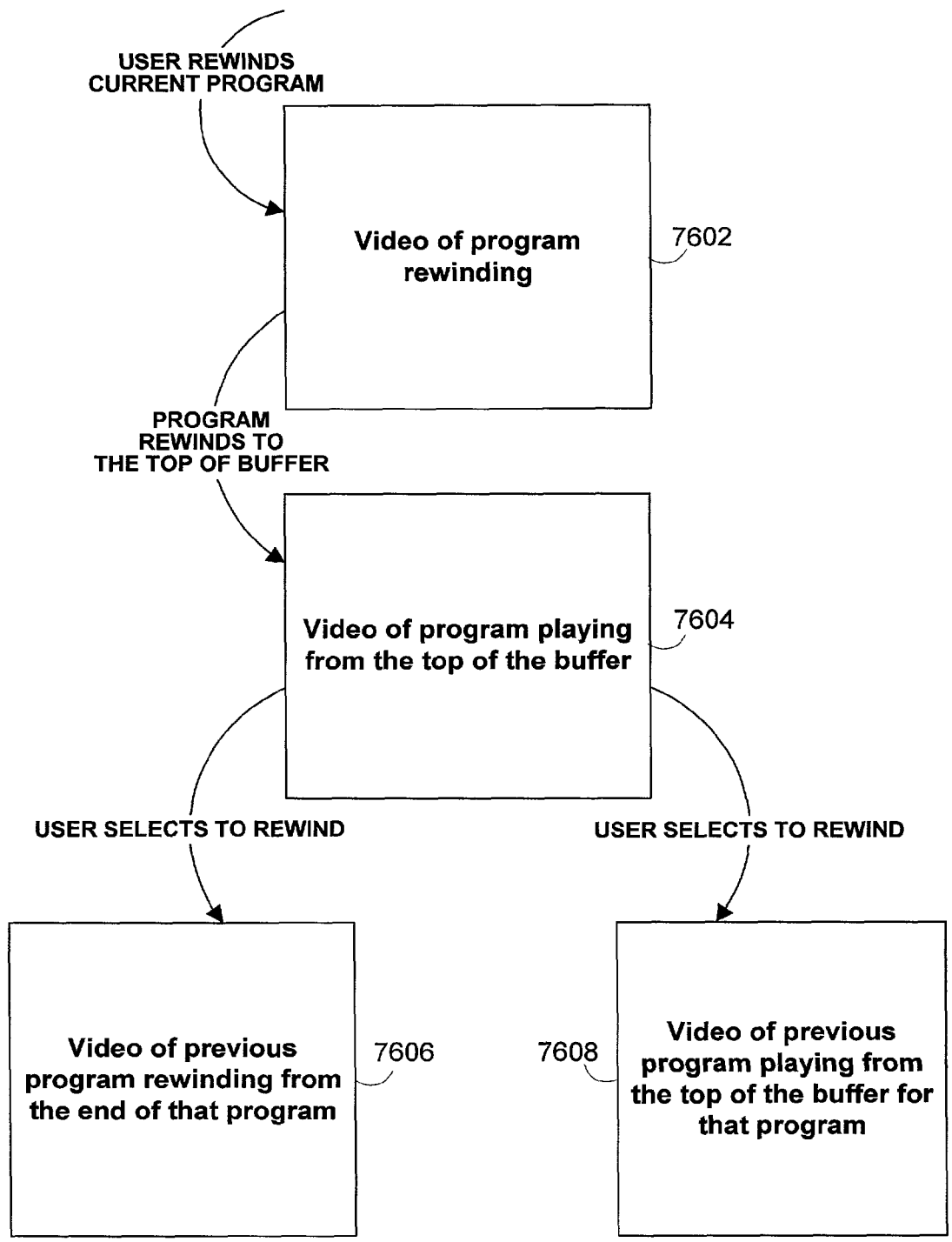
FIG. 103 shows illustrative video presentation sequences that may be provided based on the illustrative process shown in FIG. 102 in accordance with one embodiment of the present invention.

FIG. 103 shows illustrative video presentation sequences that may be provided based on the steps shown in FIG. 102. With reference now to FIG. 103, video 7602 of a program rewinding may be displayed when a user selects to rewind a current program. When the user rewinds the current program to the top of the buffer for the current program, the interactive television application may stop the rewinding and may play video 7604 of the current program. If the user selects to rewind again from the top of the current program or buffer, the interactive television application may display video 7606 that shows video of a previous program rewinding. Alternatively, the interactive television application may play video 7608 for the previous program starting from the top of the buffer for the previous program.

Figure 104:
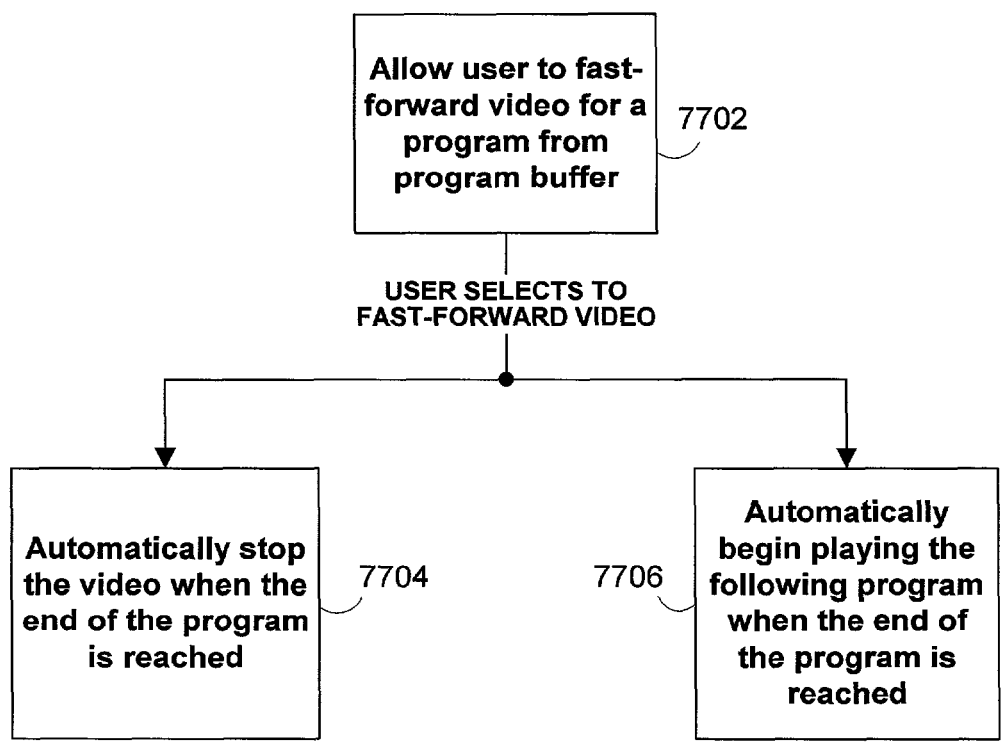
FIG. 104 shows an illustrative process for fast-forwarding to move between buffered content in accordance with one embodiment of the present invention.

A user may be permitted to fast-forward a program that is buffered. With reference now to FIG. 104, at step 7702, a user may be allowed to fast-forward video for a program that is buffered. At step 7704, the video for the program that the user has selected to fast-forward may be automatically stopped when the end of that program or the end of the buffer for that program is reached. Alternatively, at step 7706, when the end of a program or the end of a buffer for a program is reached by fast-forwarding the program, the interactive television application may begin playing a following program using a buffer for the following program. In another alternative, the video for the following program may be fast-forwarded when the end of the first program is reached. The fast-forward and rewind techniques discussed herein may also apply to situations where buffers for a previous, current, or following program do not contain an entire program, but contain a portion of a program.

Figure 105:
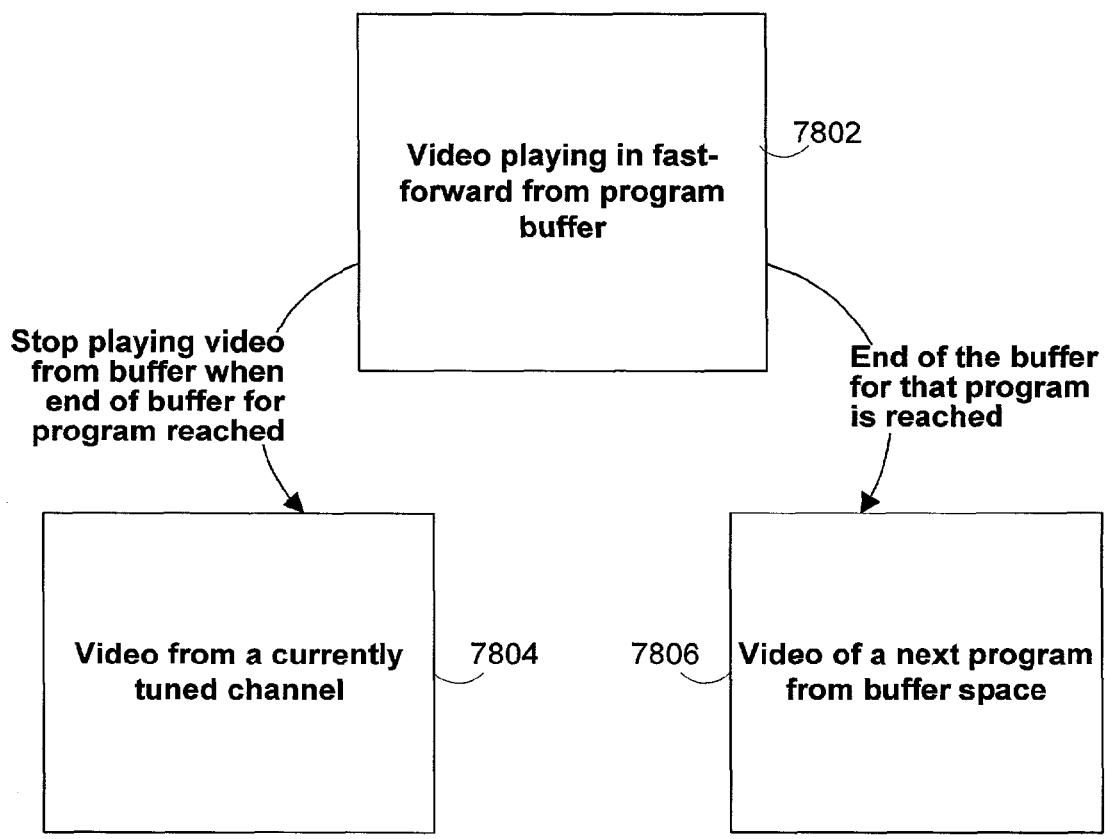
FIG. 105 shows illustrative video presentation sequences that may be provided based on the illustrative process shown in FIG. 104 in accordance with one embodiment of the present invention.

FIG. 105 shows an illustrative interactive sequence for presenting video that may be provided based on the steps of FIG. 104. As shown, video 7802 may contain video for a current program that is playing in fast-forward based on a user selection. A program buffer for the current program may be used to present video 7802. When the end of the current program is reached, the interactive television application may stop playing video 7802. Video 7804 from a currently tuned channel or a still frame from the stopped program may be displayed when the video 7802 is stopped. Alternatively, when the end of the current program is reached, video 7806 containing video for a following program may displayed. Video 7806 may be video that is presented from a buffer. Video 7806 may play in fast-forward.

Figure 106:
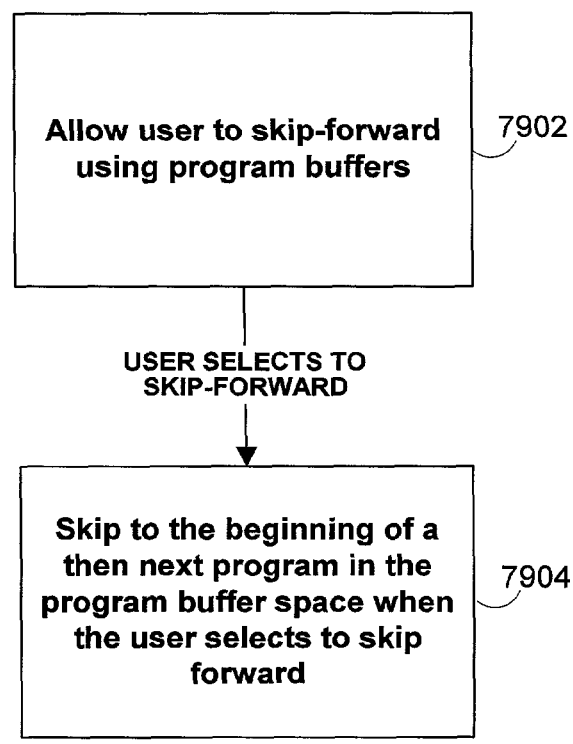
FIG. 106 shows an illustrative process for using a skip-forward feature in accordance with one embodiment of the present invention.
Figure 107:
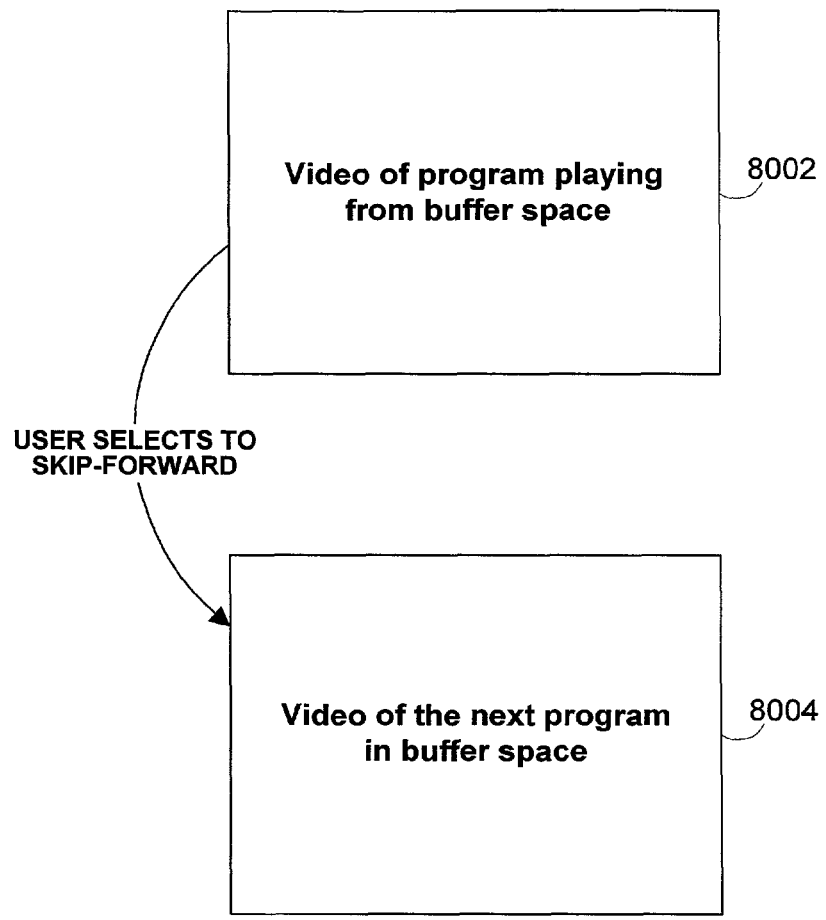
FIG. 107 shows an illustrative video presentation sequence that may be provided based on the illustrative process shown in FIG. 106 in accordance with one embodiment of the present invention.

A user may be allowed to skip-forward when viewing buffered video for a program. For example, with reference now to FIG. 106, at step 7902, a user who is watching a program that is playing from a program buffer may be allowed to skip-forward to a next program. At step 7904, the interactive television application may skip to the top of the next program when the user selects to skip-forward. Similarly, a user may be allowed to skip backward between program buffers. With reference now to FIG. 107, video 8002 may contain video for a current program that is being presented from a program buffer for that program. Video 8004 for a next program in the buffer space may be displayed when the user selects to skip-forward past video 8002 of the current program.

Figure 108:
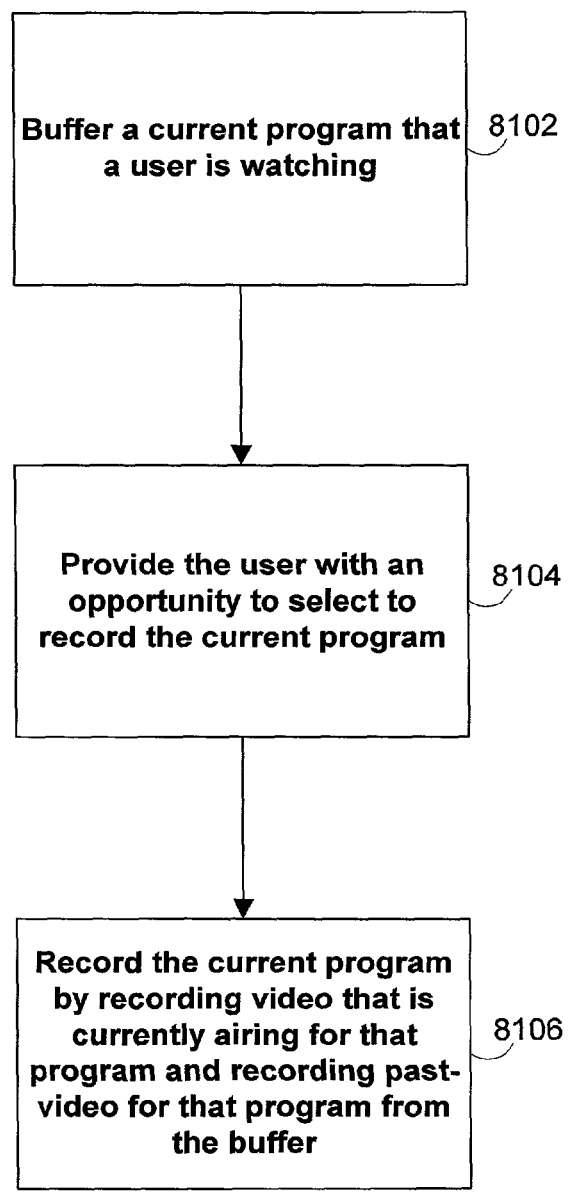
FIG. 108 shows an illustrative process for recording a program in accordance with one embodiment of the present invention.

Buffered programming may be saved as part of recording. FIG. 108 shows illustrative steps involved in recording a current program. For example, with reference now to FIG. 108, at step 8102, a current program that a user is watching may be buffered. At step 8104, the user may be provided with an opportunity to select to record the current program. At step 8106, the current program may be recorded by recording video that is currently airing and that is to air for that program and by saving video for that program that was recorded and is available from the buffer as part of the recording.

Figure 109:
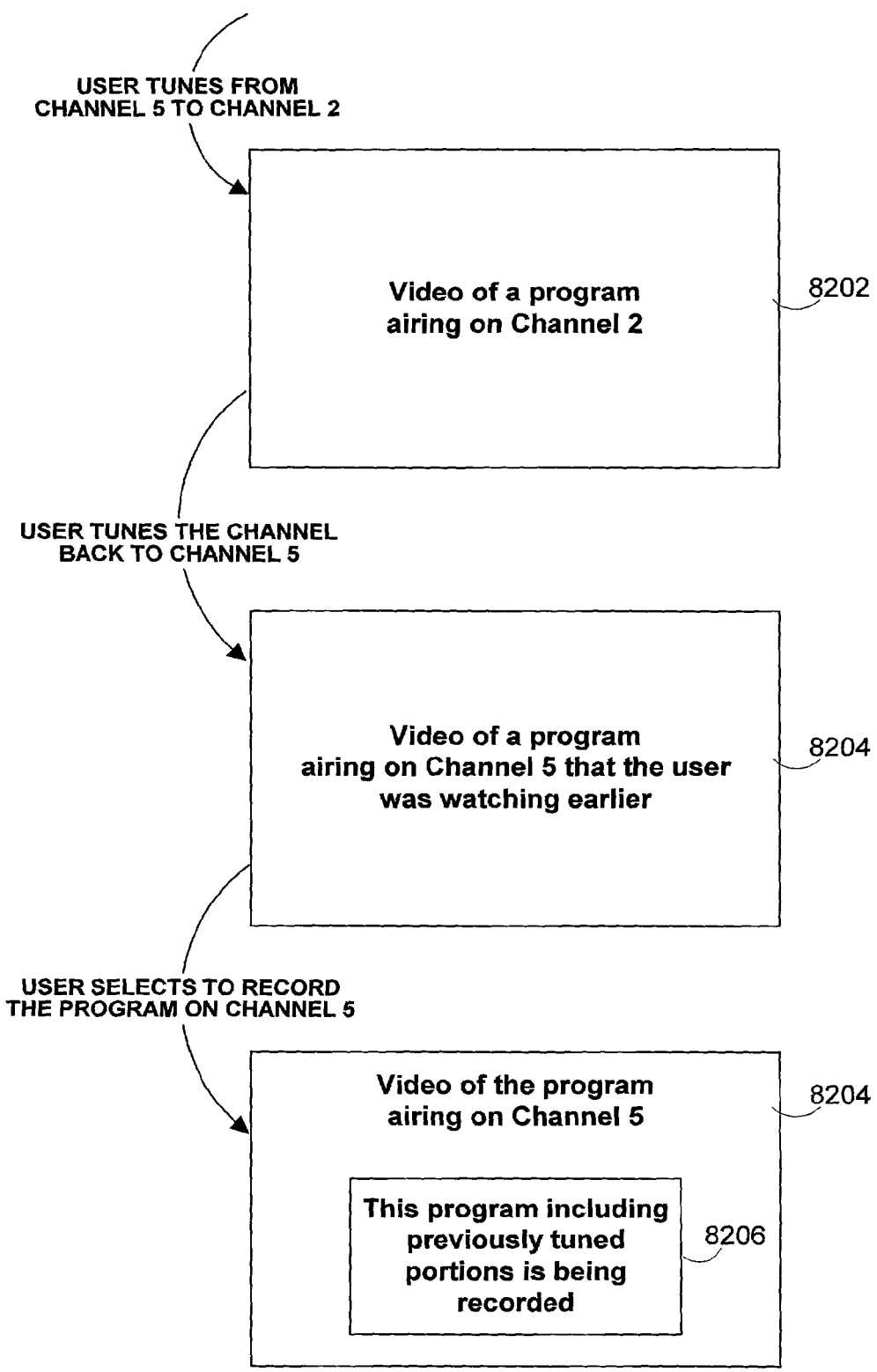
FIG. 109 shows illustrative sequences of events that may be provided based on the illustrative process shown in FIG. 108 in accordance with one embodiment of the present invention.

FIG. 109 shows an illustrative sequence of events for recording a current program that is provided based on the steps of FIG. 108. With reference now to FIG. 109, video 8202 containing video for a current program on channel 2 may be displayed when the user selects to switch away from a program that the user was watching on channel 5. A buffer for the program on channel 5 may have existed when the user changed the channel to channel 2. After watching video 8202 for a period of time, the user may decide to switch back to channel 5. Video 8204 containing current video of the program on channel 5 may be displayed when the user selects to change the channel back to channel 5.

Overlay 8206 may be displayed when the user selects to record the current program on channel 5. The user may select to record the program on channel 5 by pressing a remote control record key when the user is watching video 8204 of that program. Overlay 8206 may inform the user that the current program on channel 5 is being recorded and that the recording for the program will contain portions of that program that were previously tuned. In a multi-tuner environment, the recording may include both previously tuned portions and portions that were missed by the user (e.g., missed because the user changed the channel to view another program). If desired, information in overlay 8206 may reflect the additional content that will be recorded in a multi-tuner environment.

Figure 110:
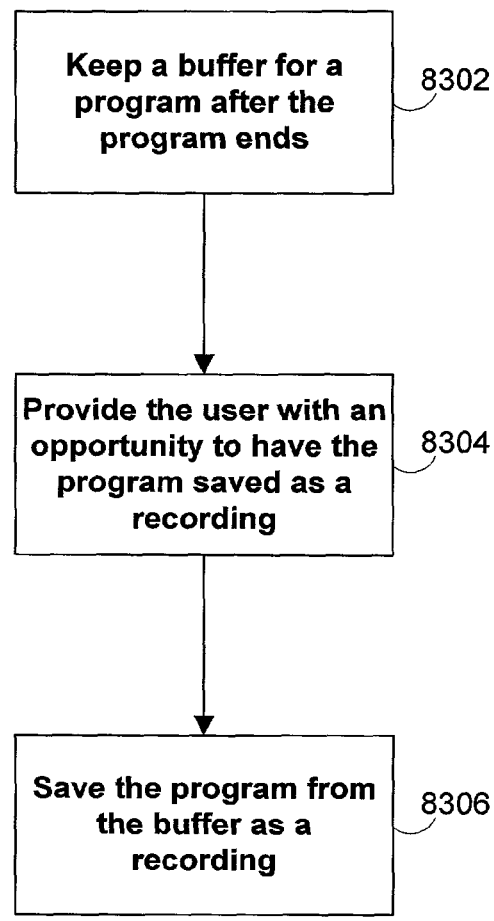
FIG. 110 shows an illustrative process for recording a program after it has ended in accordance with one embodiment of the present invention.

A buffered program may be saved as a recording even after the completion of that program. FIG. 110 shows illustrative steps that may be involved in saving a buffered program as a recording. With reference now to FIG. 110, an interactive television application may keep a buffer for a program after the program ends. At step 8304, a user may be provided with an opportunity to have the program saved as a recording. At step 8306, the program may be saved as a recording from the buffer.

Figure 111:
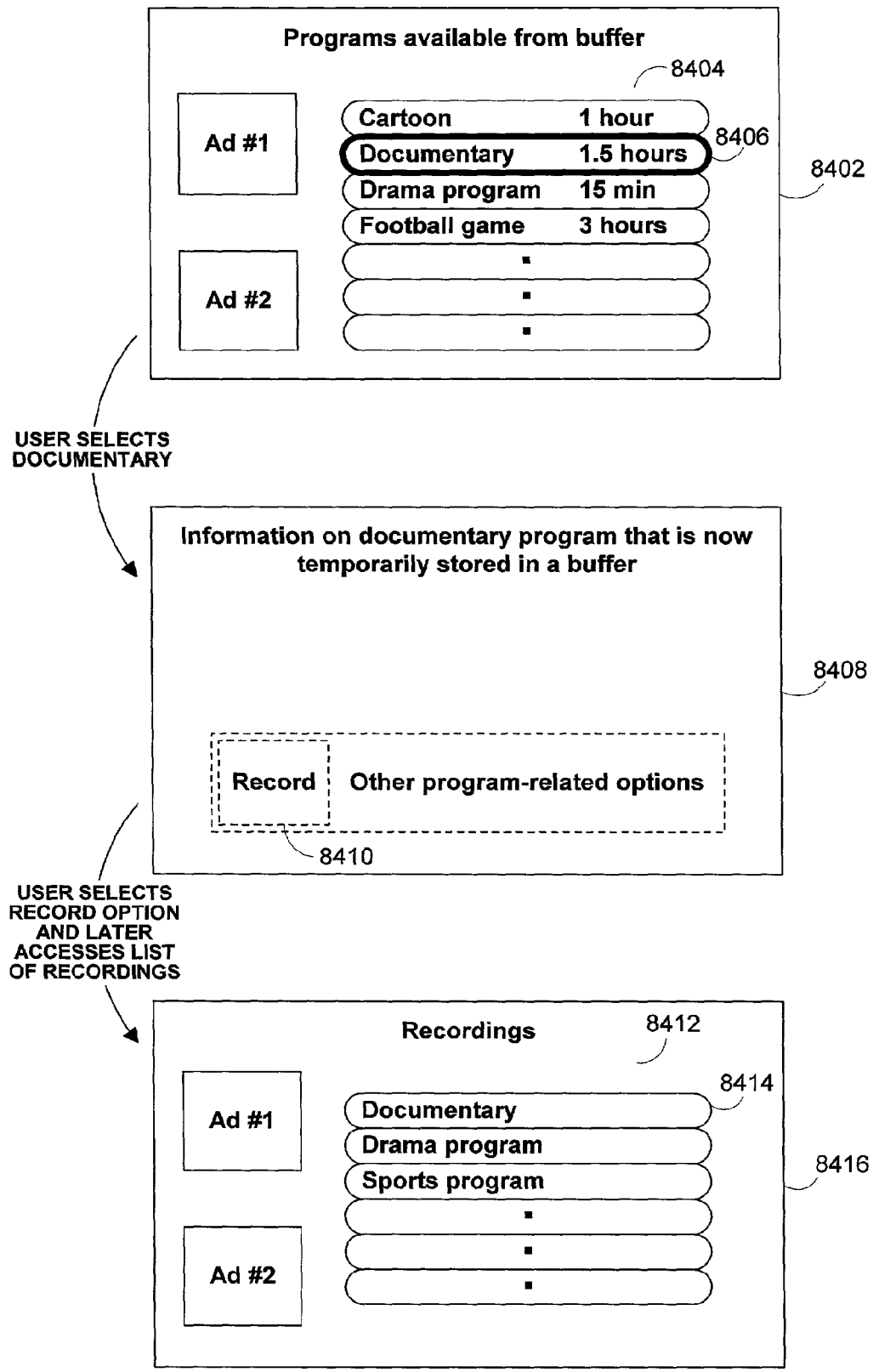
FIG. 111 shows an illustrative sequence of display screens that may be provided based on the illustrative process shown in FIG. 110 in accordance with one embodiment of the present invention.

FIG. 111 shows an illustrative sequence of display screens that may be presented based on the steps shown in FIG. 110. Program buffer display screen 8402 may be displayed when a user selects a buffer listing option from an appropriate display screen (e.g., a main menu display screen) in a program guide. Program buffer display screen 8402 may include list 8404 identifying programs that are presently available from a buffer.

Information display screen 8408 may be displayed when a user selects listing 8406 for a documentary from list 8404. Information display screen 8408 may include information about the documentary and may include program-related options such as record option 8410. Record option 8410 may be selected to have the program buffer for the documentary saved as a recording. Recordings display screen 8416 may be displayed when the user later accesses the list of recordings that are currently available. List 8412 in recordings display screen 8416 may contain listing 8414 for the buffered program (the documentary) that the user selected to save as a recording. If desired, list 8404 in program buffer display screen 8402 may identify how much of a particular program was buffered. If desired, list 8404 in program buffer display screen 8402 may be modified to remove listing 8406 when a user selects that program to be recorded from the buffer. The buffer memory may be converted to program recording memory, or the program may be copied into program recording memory.

In another example of recording a program that has ended, the guide may allow a user to rewind or skip back to a previous program, as described previously. While watching a previous program, the user may be allowed to press a remote control info key to display program information screen 8408, or to press a remote control record key to record the program from the buffer.

Figure 112:
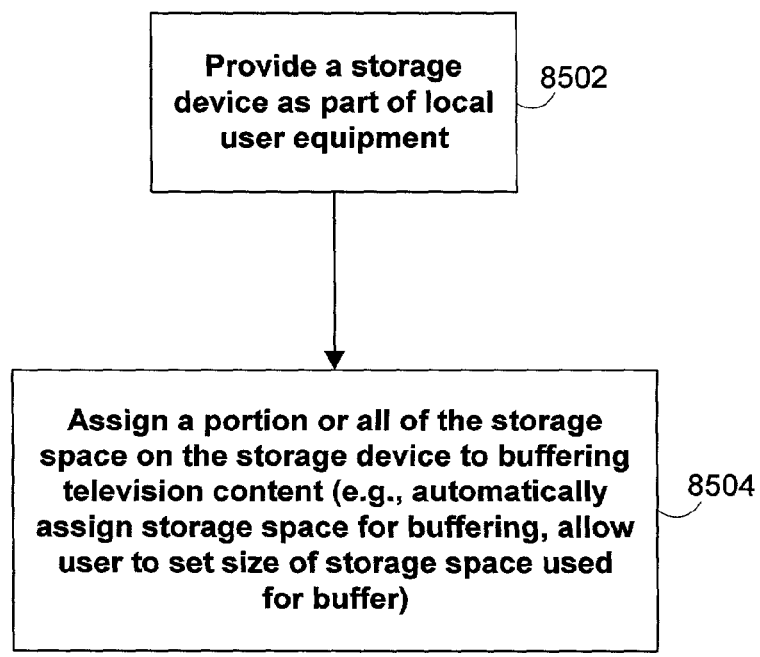
FIG. 112 shows an illustrative process for assigning a portion of a storage space for buffering a program in accordance with one embodiment of the present invention.

The size of the storage space that is used to buffer programs may be set manually or automatically. For example, with reference now to FIG. 112, at step 8502, a storage device such as a PVR may be provided as part of a user's local equipment. At step 8504, a portion (or all) of the storage space on the storage device may be assigned to buffering television content. Step 8504 may apply to single or multiple tuner environments. At step 8504, the size of the buffer space may be set automatically when the system is configured by a system operator or be set manually by the user. An example of setting the size of the buffer space automatically is automatically using all free storage space for program buffers. If desired, a minimum size of buffer space may be allocated automatically, even if that reduces the amount of programming that can be recorded.

Figure 113:
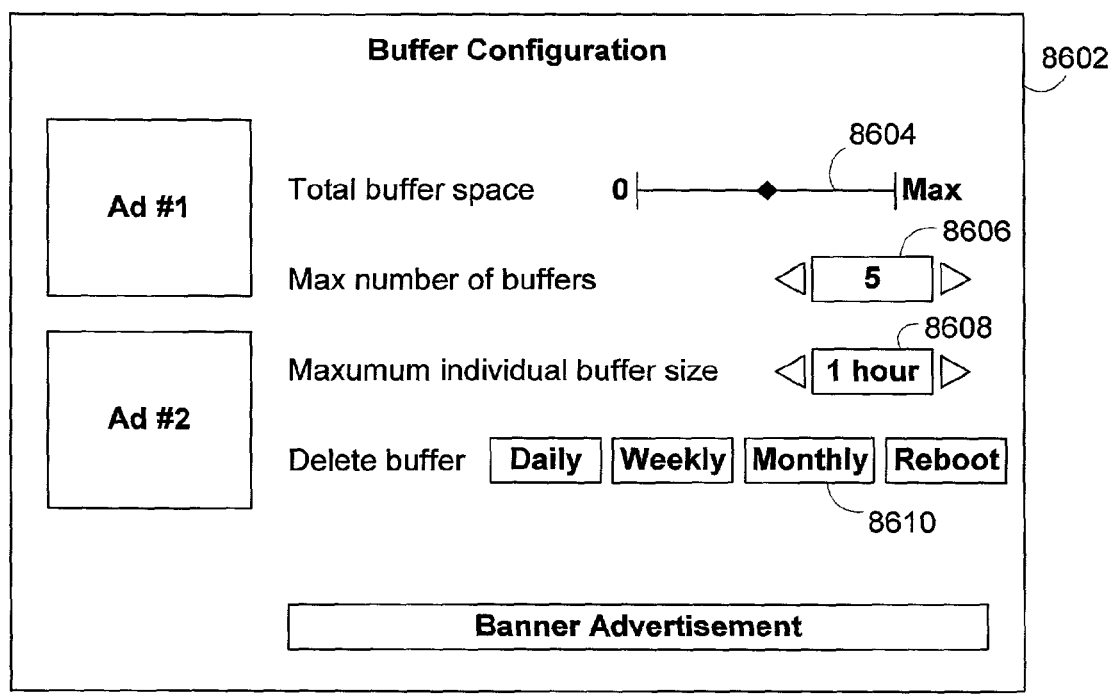
FIG. 113 shows an illustrative buffer configuration display screen in accordance with one embodiment of the present invention.

With reference now to FIG. 113, buffer configuration display screen 8602 may be displayed when a user selects a buffer setup option from an appropriate display screen such as a main menu display screen or a PVR setup display screen. Buffer configuration display screen 8602 may include buffer space option 8604 that the user may use to select the total storage space that will be allocated to creating buffers, may include number of buffers option 8606 that may be used to select the maximum number of buffers that will be active at the same time, may include buffer size option 8608 that may be used to specify a fixed or maximum buffer size, and may include option 8610 for selecting when buffers will be deleted (e.g., deleted every day, every week, every month, etc.). If desired, there may not be an option to select when buffers are deleted, as older buffers may be deleted when space is needed for newer buffers. Buffer size for each buffer may be set to a fixed size, may be set automatically based on program size, or may be set using other suitable techniques.

Figure 114:
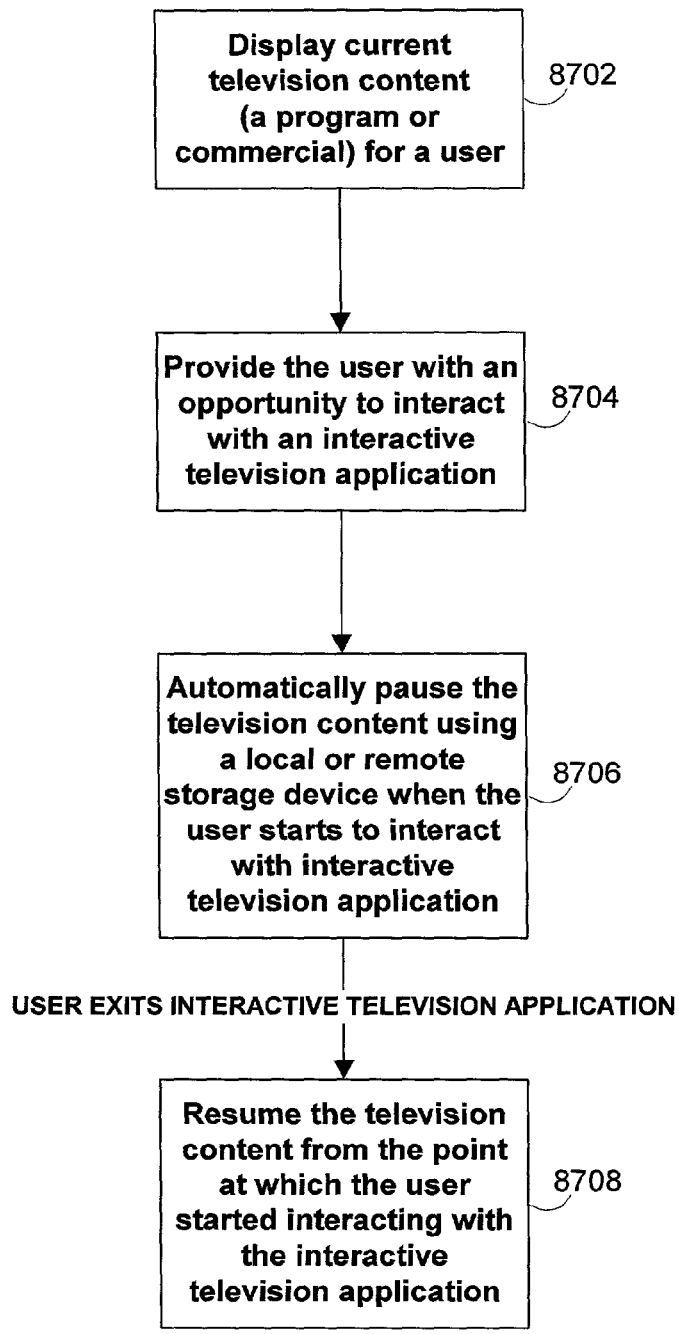
FIG. 114 shows an illustrative process for automatically pausing television content in accordance with one embodiment of the present invention.

A recording device such as a PVR may be used to automatically pause television content when a user interacts with an interactive television application. Illustrative steps involved in pausing television content are shown in FIG. 114. With reference now to FIG. 114, at step 8702, television content such as video for a program or commercial may be presented to a user. The television content may be content that is currently airing, may be content that was previously recorded, or may be content that is playing from a buffer. At step 8704, the user may be provided with an opportunity to interact with an interactive television application. The interactive television application may for example be an interactive television application that has been implemented on a television system to provide interactive services to the user. At step 8706, the current television content that the user is watching may be automatically paused when the user starts to interact with the interactive television application. The current television content may be live television content or may be other television content such as a recorded program that a user is watching, a VOD program that a user is watching, etc. The user may start to interact with the interactive television application by for example pressing a remote control button. At step 8708, the display of the television content may resume when the user exits the interactive television application. The television content may be resumed from the point at which was automatically paused.

Figure 115:
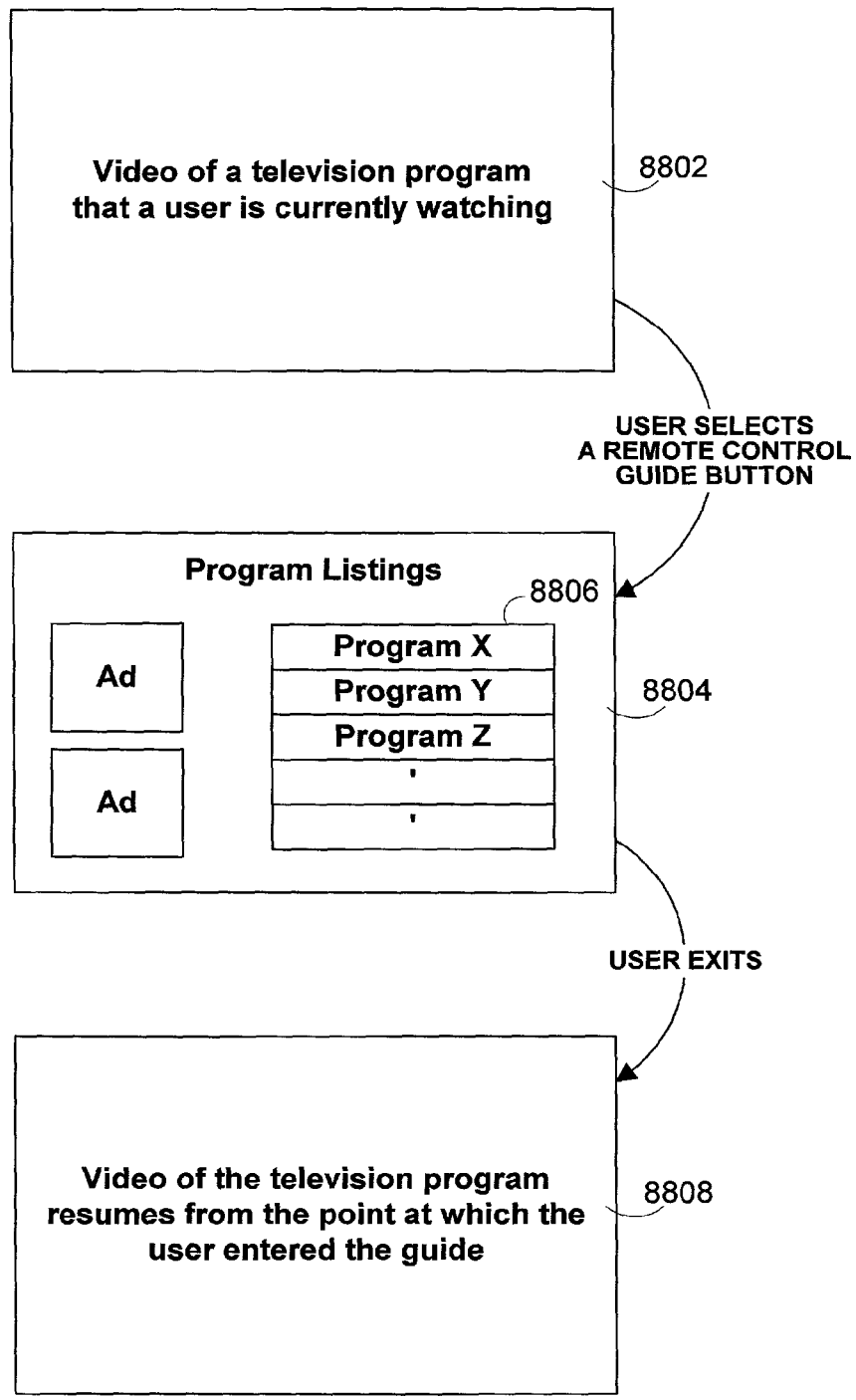
FIGS. 115-121 show different illustrative sequences of video and/or graphic presentations that may be provided based on the illustrative process shown in FIG. 114 in accordance with one embodiment of the present invention.

FIGS. 115-120 show illustrative video and display screen sequences that may be provided based on the steps shown in FIG. 114. With reference now to FIG. 115, video 8802 of a television program that a user is currently watching may be automatically paused when the user enters a program guide by selecting a remote control guide button to display program listings display screen 8804. Program listings display screen 8804 may include listings 8806, which may be scrolled to find listings. If desired, the user may take further actions to display other display screens after program listings display screen 8804 is displayed. Video 8808 of the television program, which the user was watching before entering the program guide, may be resumed from the point at which it was paused. The television program may be resumed when the user exits the program guide. Thus, a recording device such a PVR may be used to automatically pause content when a user interacts with an interactive television application.

Figure 116:
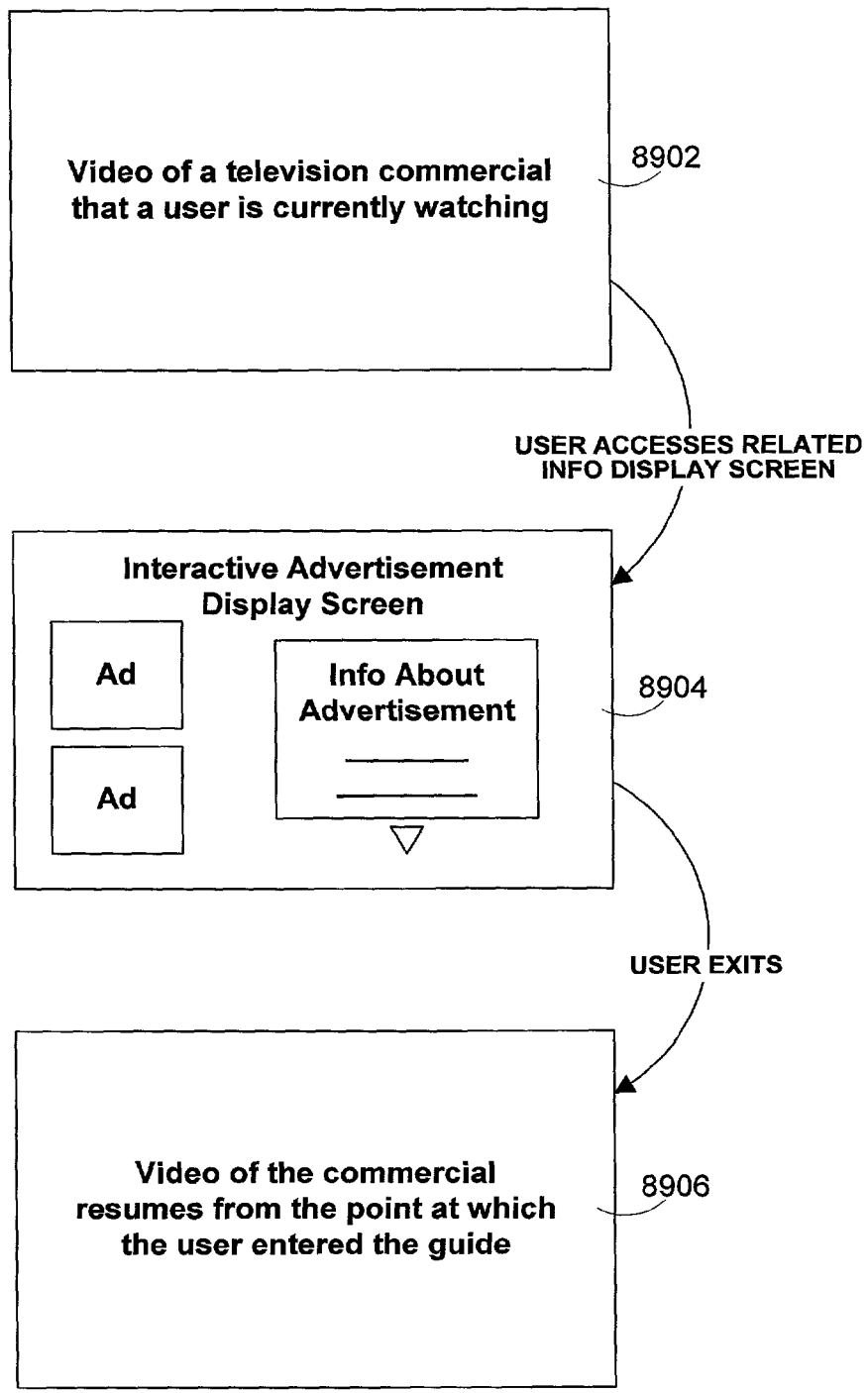

With reference now to FIG. 116, video 8902 of a television commercial that a user is currently watching may be paused automatically when a user selects a remote control button such as an info button to display advertisement information display screen 8904. Advertisement information display screen 8904 may contain information about the commercial that the user was watching. The user may interact with display screen 8904 and may further use other features in the interactive television application before exiting to video 8906. Video 8906 may contain video of the commercial that the user was watching when advertisement information display screen 8904 was displayed. Video 8906 may resume playing the commercial from the point at which the interactive television application was used to display information display screen 8904.

Figure 117:
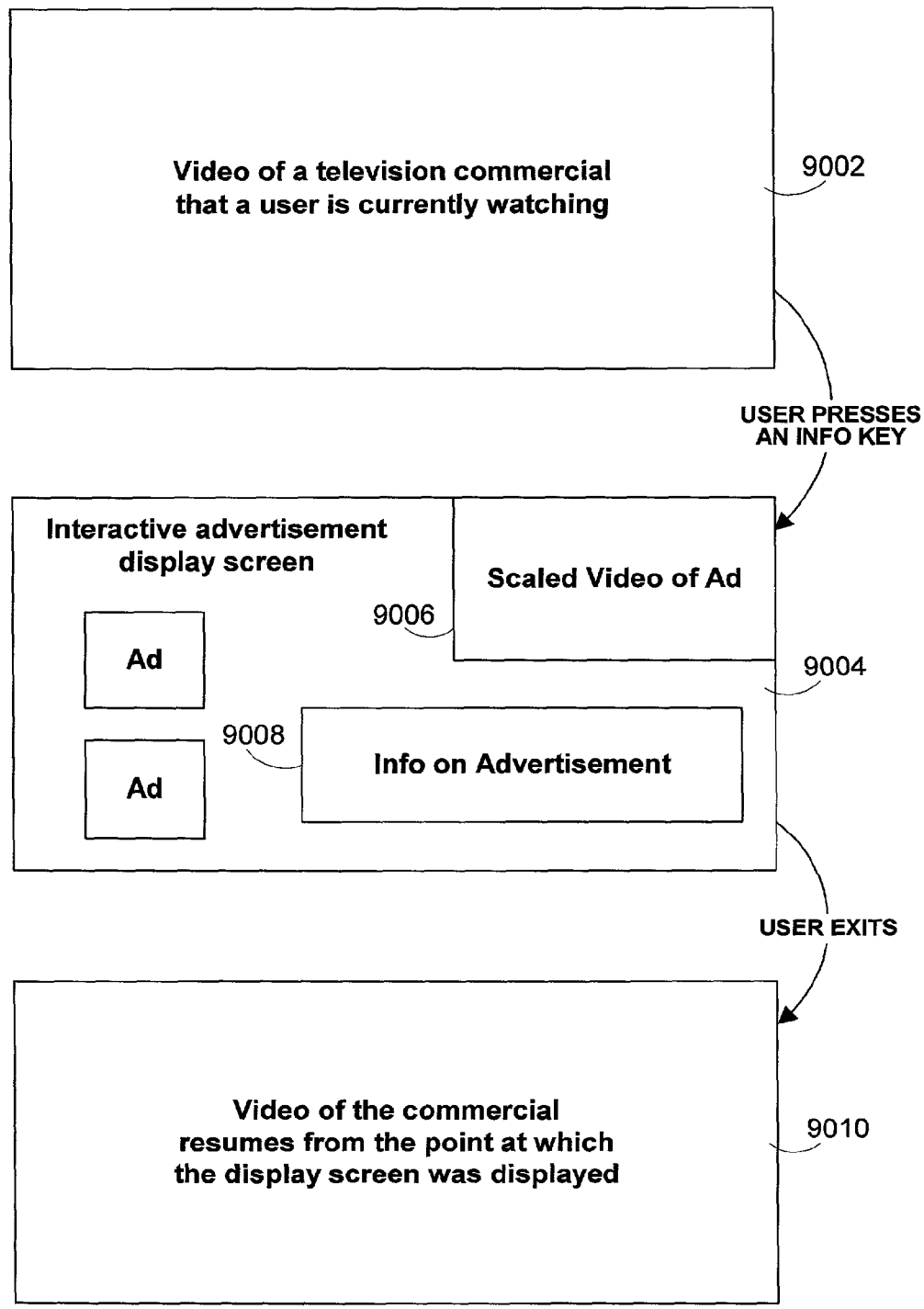

With reference now to FIG. 117, interactive advertisement display screen 9004 may be displayed for example when a user presses a remote control info key while watching video 9002 of a television commercial. Interactive advertisement display screen 9004 may contain information 9008 that is related to the television commercial that the user was watching, along with selectable options related to the advertisement. Interactive advertisement display screen 9004 may continue playing the television commercial that the user was watching using scaled video 9006 of the commercial. When the user exists interactive advertisement display screen 9004, video 9010 may be displayed that resumes the commercial in full screen from the point at which interactive advertisement display screen 9004 was displayed. The video may be resumed from that earlier point because the user may have not devoted his/her full attention to the video when the user was interacting with interactive advertisement display screen 9004.

Figure 118:
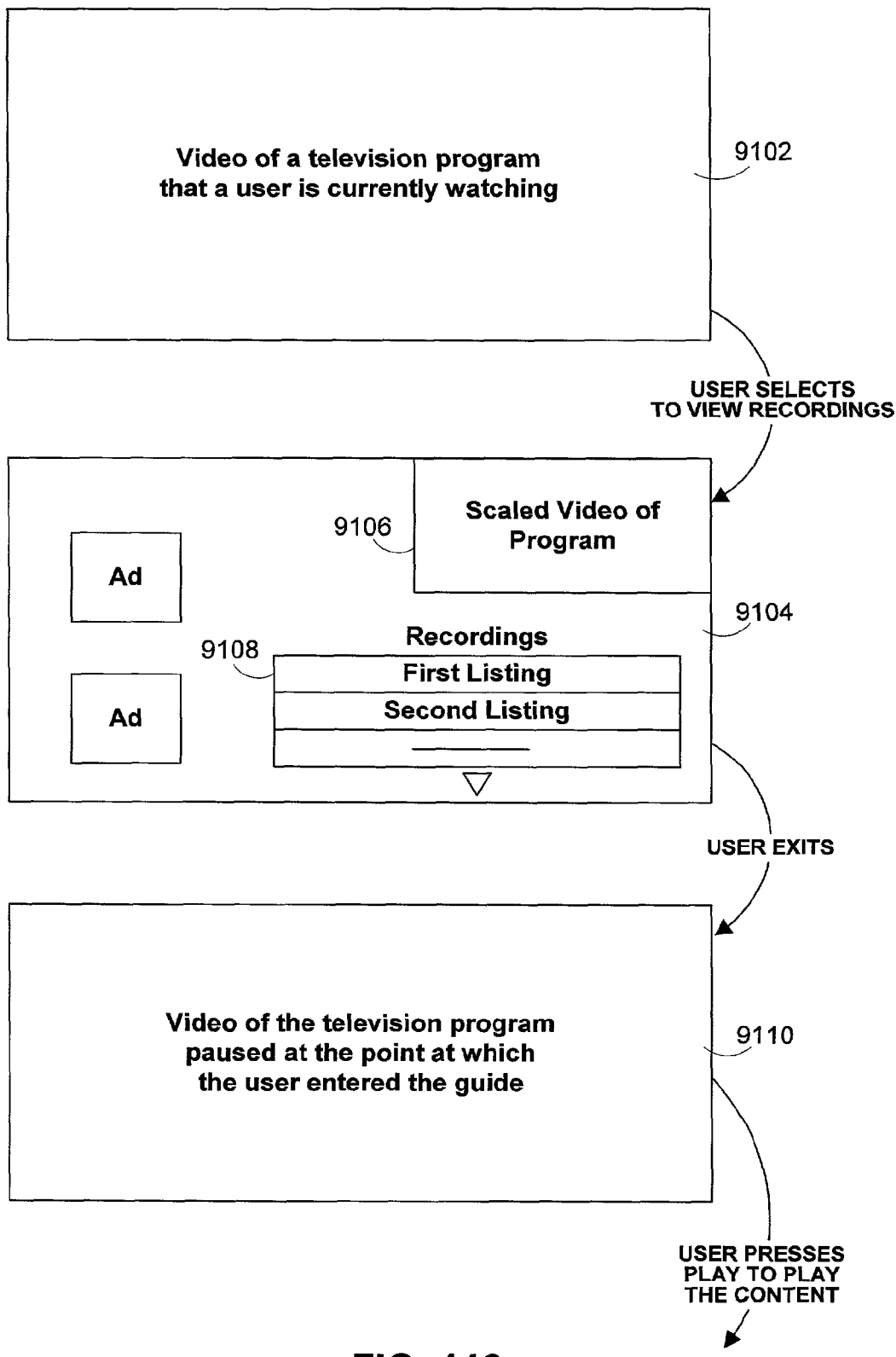

With reference now to FIG. 118, recordings display screen 9104 may be displayed when a user presses a particular remote control button to view which recordings are currently available to that user. The user may have selected to view recordings display screen 9104 while watching video 9102 of a current television program. Recordings display screen 9104 may include scaled video 9106 of the program that the user was watching when the user selected to view display screen 9104. Recordings display screen 9104 may include listings 9108 that identify the recordings that are currently available to the user for playback. Video 9110 may be displayed when the user exits recordings display screen 9108. Video 9110 may be video of the television program that the user was watching paused at the point where display screen 9104 was displayed. The user may press a remote control key to play the television program.

Figure 119:
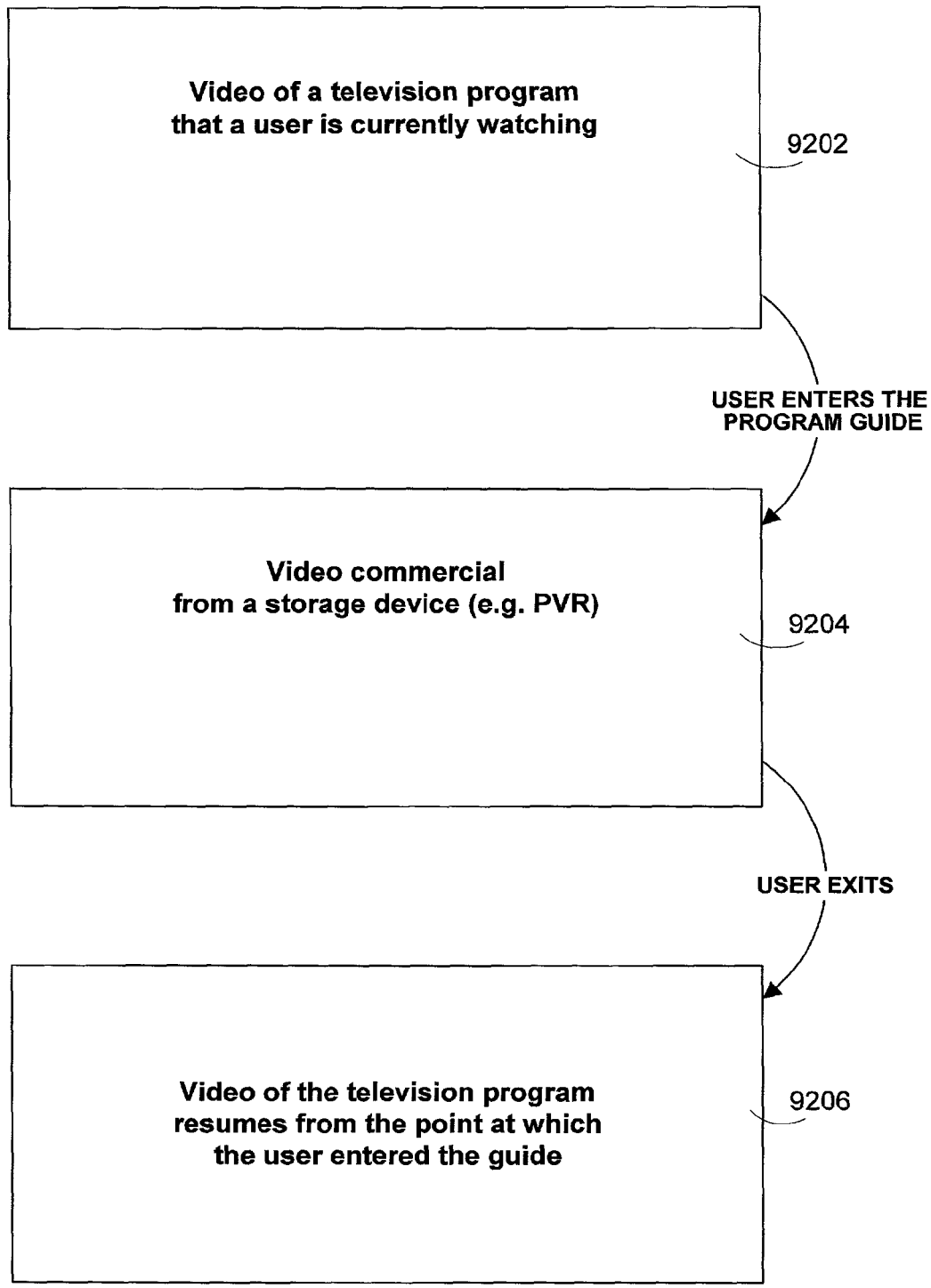
Figure 120:
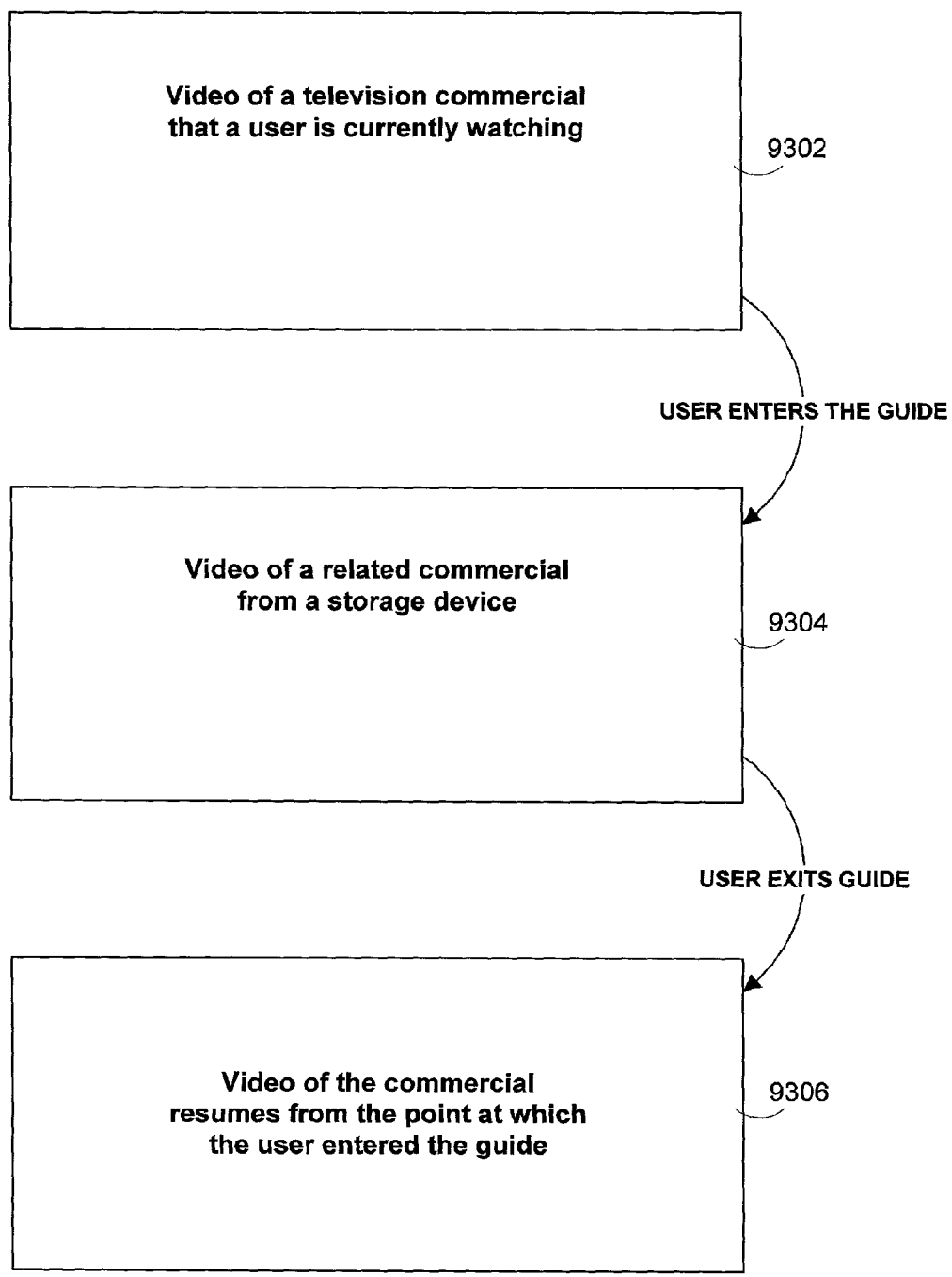

With reference now to FIG. 119, video 9204 of a locally stored video commercial may be displayed when a user selects to enter a program guide while watching video 9202 of a particular television program. When the user exits the program guide, video 9206 of that particular television program may resume automatically from the point at which the presentation of video 9202 was halted by the display of video 9204. FIG. 120 shows an illustrative sequence that is the same as the sequence shown in FIG. 119 except that video 9302 is for a television commercial that is automatically paused and later resumed by displaying video 9306 when the user exits the program guide.

Figure 121:
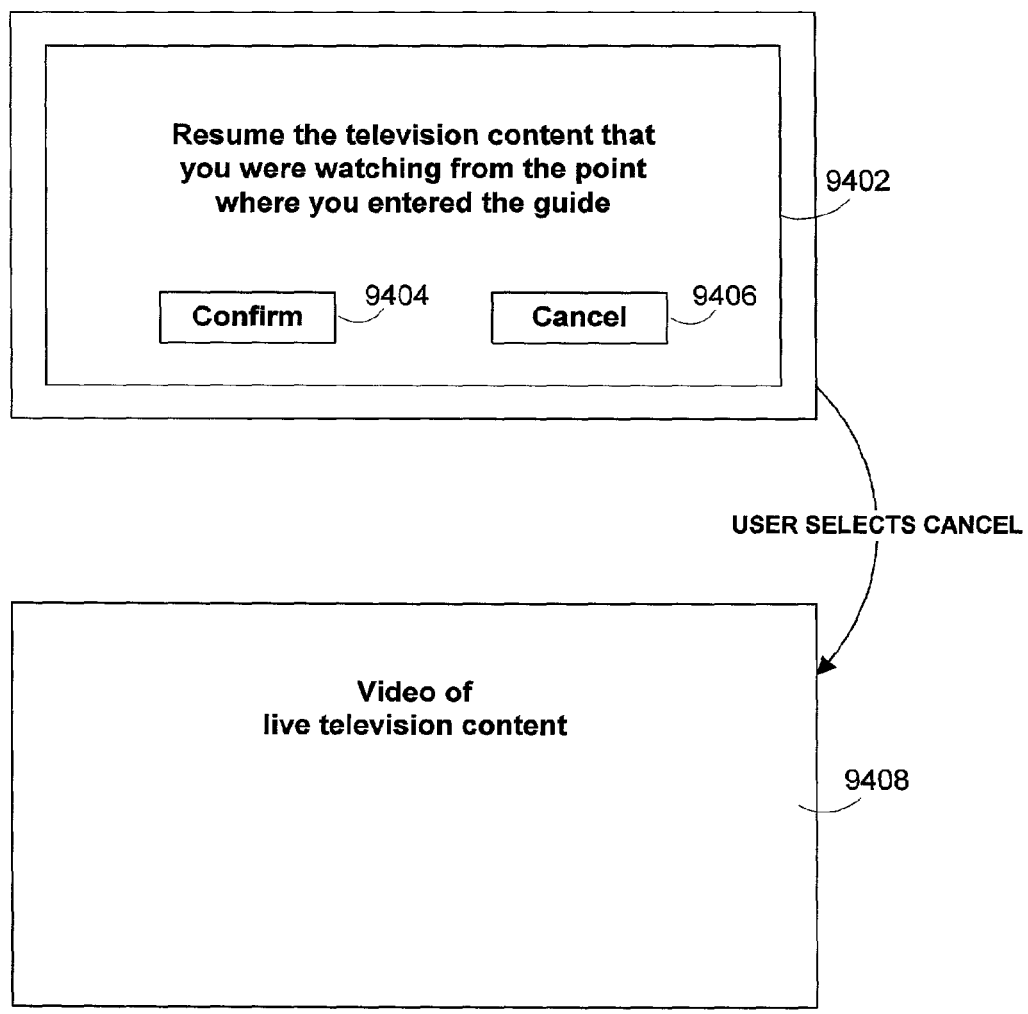

A user may be given the option to resume the television content from the point at which it was automatically paused or from its current point. For example, with reference now to FIG. 121, overlay or display screen 9402 may be displayed to request whether the television content should be resumed from the point at which the user entered the program guide. Overlay or display screen 9402 may include confirm option 9404 and cancel option 9406. Video 9408 of the television content at its current point (e.g., live television) may be displayed when the user selects cancel option 9406. If confirm option 9404 is selected, the television content may be resumed from the point at which the user entered the program guide.

Figure 122:
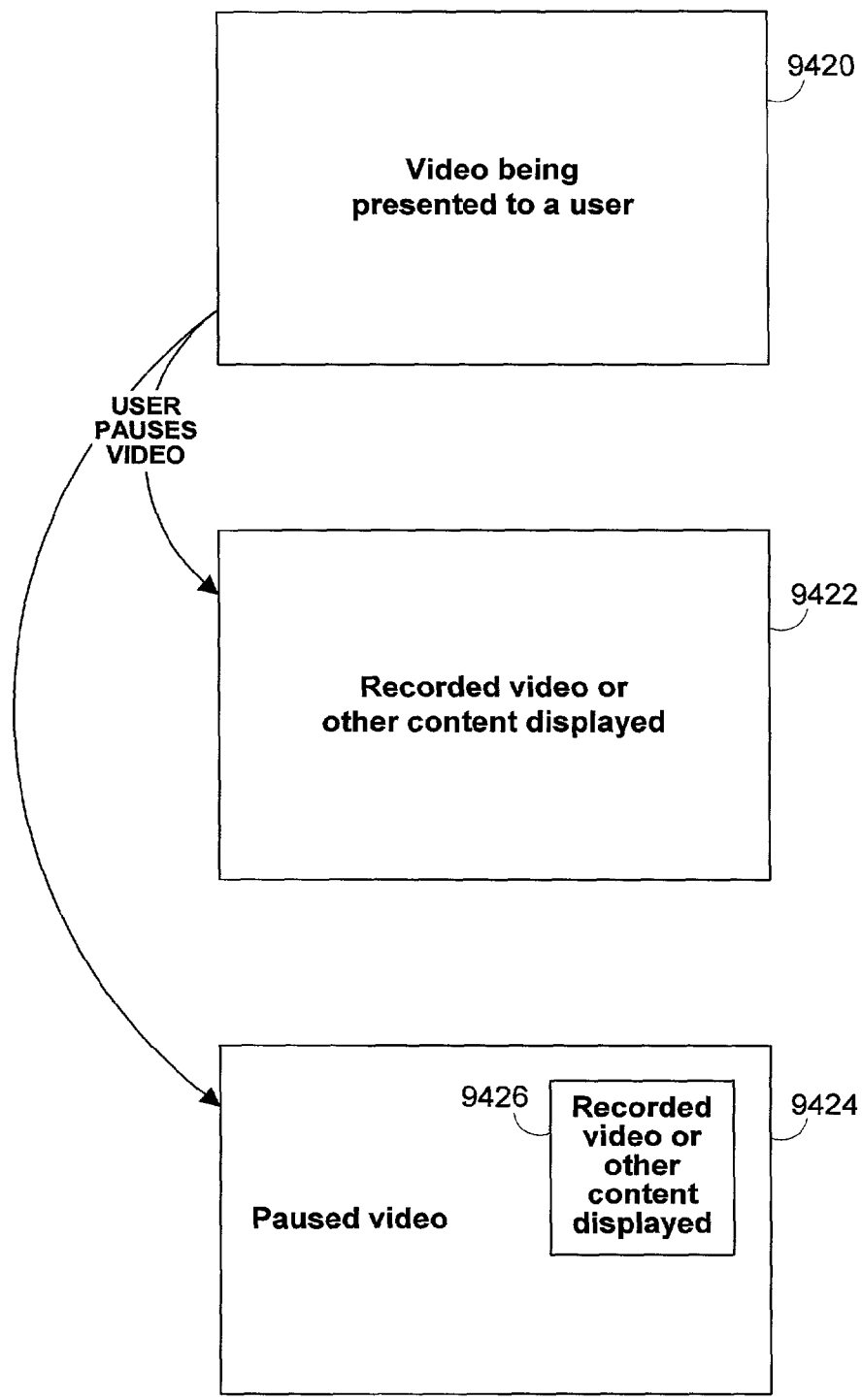
FIG. 122 shows an illustrative sequence for presenting recorded video when a current program is paused in accordance with one embodiment of the present invention.

Video or other stored content may be displayed when a program is paused. For example, with reference now to FIG. 122, a user may select to pause video 9420 for a program that is being presented to a user. Recorded video or other content 9422 (e.g., from a PVR) may be displayed when the program is paused. Recorded video or other content 9422 may be displayed as a full-screen type display. If desired, recorded content or other content 9426 may be displayed over paused video 9424 when a user selects to pause a current program. Recorded content or other content 9426 may for example be displayed as an overlay. The recorded video may be a video advertisement or other video content. Other content that may be displayed may be still content, animation, a still image, etc.

Figure 123:
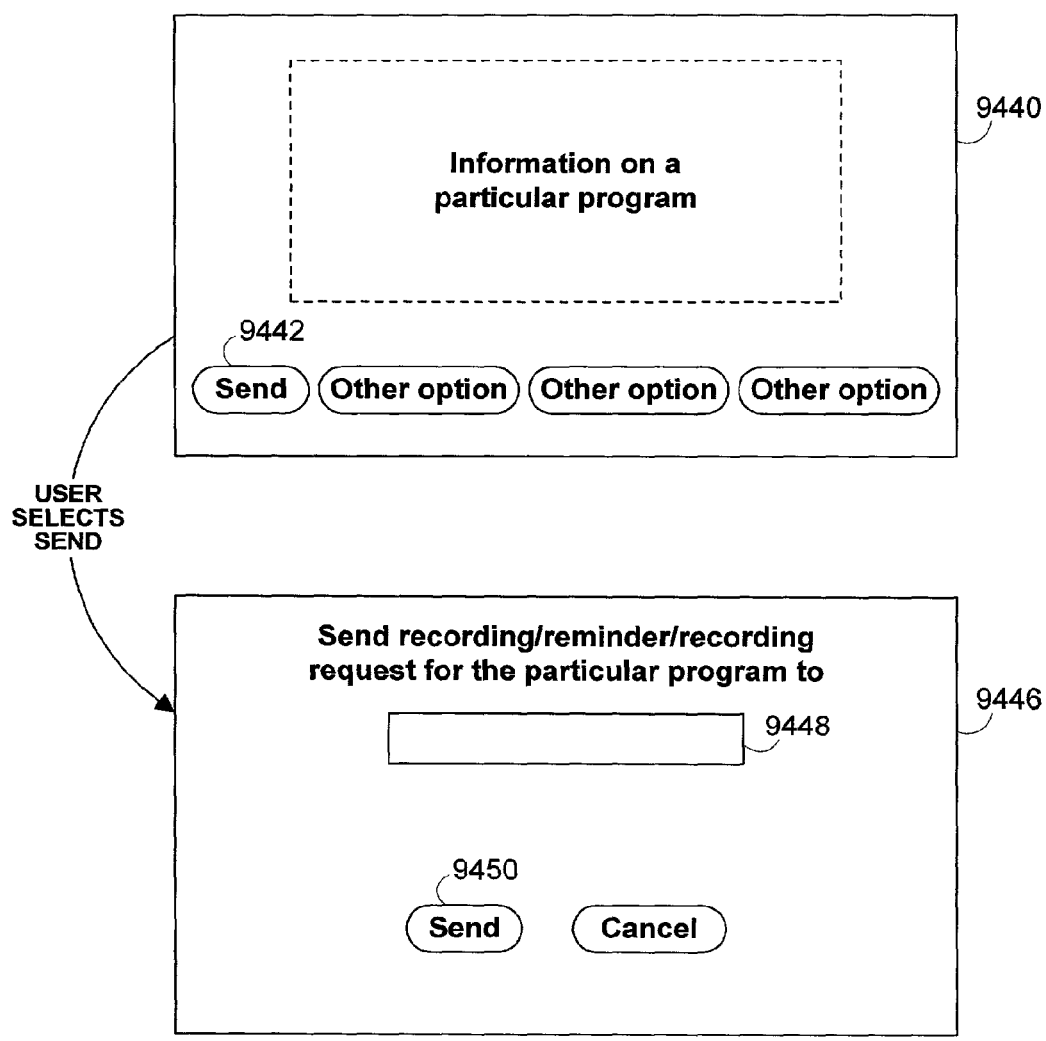
FIG. 123 shows an illustrative sequence of display screens for sending a recording, a reminder, or a recording request in accordance with one embodiment of the present invention.

A user may be allowed to send a recording, a reminder, or a recording request to another user (e.g., another user in the same household or to other users in other households). For example with reference now to FIG. 123, information display screen 9440 may be displayed when a user selects to receive information on a particular program. Information display screen may be for an upcoming program or for a program that has already aired and been recorded (e.g., recorded at least in part). Information display screen 9440 may include send option 9442. Send display screen 9446 may be displayed when send option 9442 is selected. Send display screen 9446 may provide a user with an opportunity to send a recording, send a reminder, or send a recording request for a program to another user. Send display screen 9446 may allow a user to send a recording when information display screen 9440 is displayed for a program that has an associated recording. Send display screen 9446 may allow a user to send a reminder or send a recording request when information display screen 9446 is displayed for an upcoming program. Send display screen 9446 may be displayed specifically for the particular program for which information display screen 9440 is displayed. Send display screen 9446 may include data entry area 9448 to allow a user to enter the name or address of an intended recipient of a recording, reminder, or recording request. Send option 9450 may be included in send display screen 9446 that a user may select to send a recording, reminder, or recording request to a particular user. If desired, send display screen 9446 may include an option to allow the user to select the messaging technique (e.g., e-mail messaging) that will be used.

Figure 124:
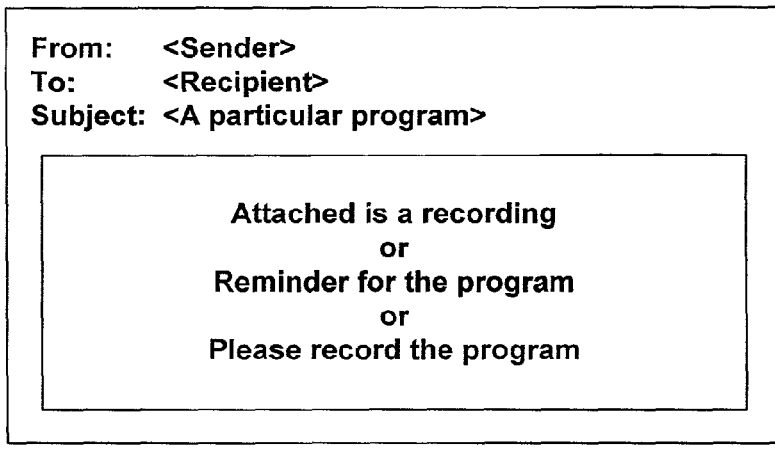
FIGS. 124-126 show illustrative techniques by which a user may receive a recording, a reminder, or a recording request in accordance with one embodiment of the present invention.
Figure 125:
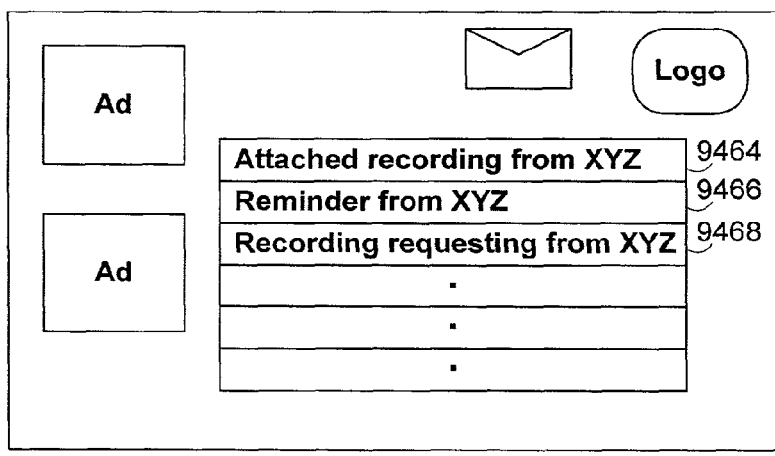
Figure 126:
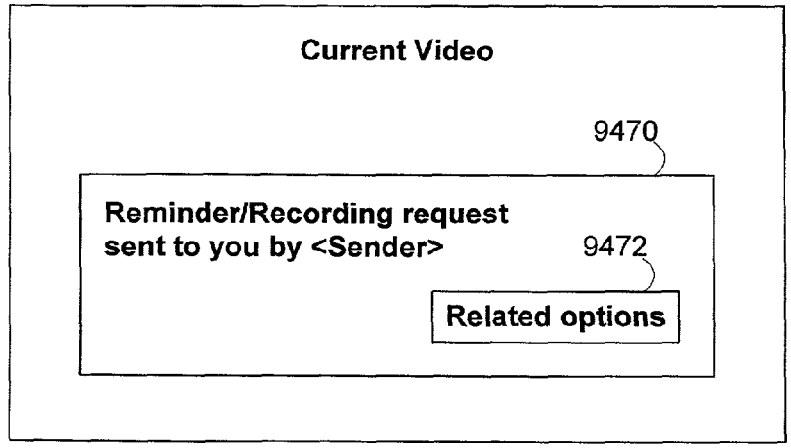

FIG. 124 shows e-mail 9460 to a particular user that provides the user with an attached recording, a reminder for an upcoming program, or a recording request for an upcoming program depending on whether the particular program that is the subject of e-mail 9460 is a recording or an upcoming program. E-mail 9460 may be sent using a wide area network such as the Internet. FIG. 125 shows message listings display screen 9462 that a user may access from within a guide. Message listings display screen 9462 may provide a list of messages that have been received for the current user. Listing 9462 shows that a recording from sender XYZ has been received for the current user. Listing 9466 shows that a current user has received a reminder for a particular program from sender XYZ. Listing 9468 shows that a current user has received a recording request for a particular program from sender XYZ. The current user may select each listing to view additional information related to that message. FIG. 126 shows overlay 9470 that may be displayed to inform a current user of a reminder or recording request that has been sent to the current user. Overlay 9470 may include related options 9472 that may allow a user to take particular actions in connection with the reminder or recording request. Related options 9472 may allow a user to select to record or tune a program that is the subject of overlay 9470. If desired, the interactive television application may automatically process the content of the message. For example, on receiving a recording, the recording may be added to the list of recordings available to the receiving user. On receiving a reminder, the interactive television application may set a reminder locally. On receiving a record request, the interactive television application may automatically schedule a local recording for the program. Examples of television messaging systems are illustratively shown in McKissick et al., U.S. patent application Ser. No. 09/356,245 filed Jul. 16, 1999, which is hereby incorporated herein by reference in its entirety. If desired and as mentioned above, copy protection schemes may be provided for users with PVRs. Programming or other content that can be displayed on user equipment may be copy protected. Copy protection information that is associated with programming or other content may be provided to user equipment to support copy protection schemes. Copy protection schemes may be implemented that use the copy protection information to prevent users from copying programming or other content without authorization. For example, an interactive television application may block a program from being recorded to a PVR when that program is copy-protected. The recording of the program may be blocked by preventing the recording from being scheduled. A graphic (e.g., an overlay or display screen) may be displayed that informs a viewer that a particular program or other content that was selected to be recorded cannot be recorded due to copyright protections. The MPEG-4 standard may be used to transmit programs with information on copyright protections. Other standards that support such activity may also be used.

As mentioned above, a PVR may automatically record programs based on user preferences. Other inference engines may use information such as user demographics or keyword searches (mentioned above) to select programs to automatically record. Examples of interactive television program guides that use demographics are illustratively shown in Knee et al., U.S. patent application Ser. No. 09/139,777, filed Aug. 25, 1998, which is hereby incorporated by reference herein in its entirety. Programs may be recorded automatically based on keywords that a user has entered into the system.

If desired and as mentioned above, conflict resolution schemes may be provided to support mechanisms for the viewer to resolve scheduling conflicts. An interactive television application may present options, configuration settings, or prompts that may be used by a user to resolve scheduling conflicts. Conflicts may be resolved by allowing a user to interact with the interactive television application to resolve each conflict as it arises. The interactive television application may also allow the user to set a conflict resolution scheme (e.g., set the interactive television application to resolve scheduling conflicts in favor of one type of recording such as a series recording).

As mentioned above, personal video recorders and other digital recording devices record television programs onto a digital medium, such as a hard disk. The amount of programming that can be stored by such a device is limited by the capacity of the storage medium. A typical unit might store 30 hours of video programming, compressed at the maximum level.

Systems today use digital video compression methods such as MPEG-2, which are practical in real-time. An incoming audio/video program can be digitized, compressed, and stored as the signal is received. More efficient compression methods are available, such as MPEG-4. However, these methods are much more computationally intensive. Hardware that is inexpensive enough to be widely deployed may not be capable of compressing video using more efficient compression methods (e.g., using the MPEG-4 standard) in real-time.

The computational tasks associated with a digital video recorder are not in general excessive. A processor in such a device typically has spare processor cycles available. These spare cycles may be used to compress stored audio/video programs more efficiently.

For example, the system may record programs using the MPEG-2 standard, the same as other existing systems. However, in the background, using processor cycles that are not needed for storing, managing, and retrieving programs, the processor may scan through previously stored programs and compresses them in a more efficient format. After compressing a program in a more efficient format, such as MPEG-4, the less efficient version can be deleted, freeing up storage space for additional programs.

Programs may also be compressed in multiple passes. For example, it may make one pass through an audio/video file to reduce it in one way, and another pass to reduce it further. Each pass may eliminate a specific type of redundancy, for example. As each compression pass is completed, the previous version may be deleted.

The user, network operator, or programmer may be allowed to set parameters as to what types of compression are allowed, either in general or for a specific program. For example, a specific "lossy" type of compression may be optional. The more lossy types of compression may also be reserved for programs that are archived for a longer period of time, or which have already been viewed.

An advantage of this technique is that it allows many more hours of programming to be stored in the same amount of storage. For example, most or all of the program currently in progress may be stored in the least efficient format. Programs recorded recently may be stored in a more efficient format. And programs that have been stored for a longer period of time may be stored in the most efficient format.

A more advanced compression standard such as MPEG-4 may also allow for new features. For example, MPEG-4 allows objects in the video to be explicitly defined. A web address or commerce application could be linked to one of these objects. MPEG-4 supports management of intellectual property. These new features may be limited to programs that were originally broadcast in the MPEG-4 standard, or may be provided with other formats by translating the information received into MPEG-4.

If desired, a computer readable medium such as a floppy disk, optical disk, etc. may be used to store machine executable code for implementing an interactive television application for providing PVR and/or IPG features. If desired, equipment such the equipment discussed in FIGS. 1-2C may be configured to provide features, options, or techniques that are illustratively described herein.

Thus, interactive television systems and methods that provide enhanced PVR and interactive television application features are provided. One skilled in the art will appreciate that the present invention can be practiced by other than the described embodiments, which are presented for purposes of illustration and not of limitation, and that the present invention is limited only by the claims which follow.

The invention claimed is:

1. A method comprising:
   storing first information identifying media assets that have been stored;
   automatically storing second information identifying at least one media asset that has been viewed by a user;
   receiving, with control circuitry, a first user selection to cause a media asset series to be stored;
   receiving a second user selection not to store media assets in the series that the user has viewed;
   determining which media assets in the series have been viewed by the user based on the second information;
   automatically selecting for storage only unviewed media assets of the series based on the determining and the second user selection; and
   storing the automatically selected unviewed media assets of the series.

2. The method of claim 1, further comprising scheduling to record the unviewed media assets of the series.

3. The method of claim 1, further comprising retrieving from a database the unviewed media assets of the series.

4. The method of claim 1, further comprising preventing the storing of one of the unviewed media assets if the one of the unviewed media assets is already stored.

5. The method of claim 1, further comprising generating for display a listing of at least one stored media asset of the unviewed media assets.

6. The method of claim 1, further comprising:
   receiving a third user selection of a stored media asset; and
   playing back the selected stored media asset.

7. The method of claim 1, wherein the storing comprises storing the unviewed media assets of the series on a storage device.

8. The method of claim 1, wherein the user is a first user and the second information includes a first log, the method further comprising:
   maintaining a second log of media assets that have been viewed by a second user;
   receiving from the second user a selection to schedule at least one series for storage;
   identifying which media assets in the at least one series have been viewed by the second user based on the second log; and
   in response to the identifying, storing only those media assets of the at least one selected series that have not been viewed by the second user.

9. The method of claim 1, wherein the first information is a list of recorded programs.

10. A system comprising:
    a storage device; and
    control circuitry configured to:
      store first information identifying media assets that have been stored;
      automatically store second information identifying at least one media asset that has been viewed by a user;
      receive a first user selection to cause a media asset series to be stored;
      receive a second user selection not to store media assets in the series that the user has viewed;
      determine which media assets in the series have been viewed by the user based on the second information;
      automatically select for storage only unviewed media assets of the series based on the determining and the second user selection; and
      store the automatically selected unviewed media assets of the series.

11. The system of claim 10, wherein the control circuitry is further configured to schedule to record the unviewed media assets of the series.

12. The system of claim 10, wherein the control circuitry is further configured to retrieve from a database the unviewed media assets of the series.

13. The system of claim 10, wherein the control circuitry is further configured to prevent the storing of one of the unviewed media assets if the one of the unviewed media assets is already stored.

14. The system of claim 10, wherein the control circuitry is further configured to generate for display a listing of at least one stored media asset of the unviewed media assets.

15. The system of claim 10, wherein the control circuitry is further configured to:
    receive a third user selection of a stored media asset; and
    play back the selected stored media asset.

16. The system of claim 10, wherein the storing comprises storing the unviewed media assets of the series on a storage device.

17. The system of claim 10, wherein the user is a first user and the second information includes a first log, and wherein the control circuitry is further configured to:
    maintain a second log of media assets that have been viewed by a second user;
    receive from the second user a selection to schedule at least one series for storage;
    identify which media assets in the at least one series have been viewed by the second user based on the second log; and
    in response to the identify, store only those media assets of the at least one selected series that have not been viewed by the second user.

18. The system of claim 10, wherein the first information is a list of recorded programs.

* * * * *